US00RE40187E

(19) United States
(12) Reissued Patent
Abraham et al.

(10) Patent Number: US RE40,187 E
(45) Date of Reissued Patent: Mar. 25, 2008

(54) METHOD AND APPARATUS FOR MANAGING INTERNETWORK AND INTRANETWORK ACTIVITY

(75) Inventors: Dalen M. Abraham, Duvall, WA (US); Todd A. Barnes, Snohomish, WA (US); Paul F. Bouche, Bellevue, WA (US); Thomas P. Bougetz, Bothell, WA (US); Tracy A. Gosselin, Renton, WA (US); Mark G. Grieve, Bellevue, WA (US); Brent A. Langdon, Redmond, WA (US); Robert C. Allison, Kirkland, WA (US); Michael S. Nikkel, Redmond, WA (US); Stuart Rosove, Bellevue, WA (US)

(73) Assignee: Websense, Inc., San Diego, CA (US)

(21) Appl. No.: 10/918,833
(22) Filed: Aug. 12, 2004

Related U.S. Patent Documents

Reissue of:
(64) Patent No.: 5,983,270
Issued: Nov. 9, 1999
Appl. No.: 08/825,775
Filed: Apr. 2, 1997

U.S. Applications:
(60) Provisional application No. 60/040,424, filed on Mar. 11, 1997.

(51) Int. Cl.
*H04L 29/06* (2006.01)
*G06F 21/20* (2006.01)
*G06F 13/00* (2006.01)
G06F 17/00

(52) U.S. Cl. ..... 709/224; 709/225; 709/250; 726/13

(58) Field of Classification Search ..... 709/224, 709/225, 229, 250; 726/13; 713/201
See application file for complete search history.

(56) References Cited

U.S. PATENT DOCUMENTS 5,317,568 A * 5/1994 Bixby et al. ..... 370/401

(Continued)

FOREIGN PATENT DOCUMENTS

EP 0658837 A2 * 6/1995
EP 0658837 A3 * 6/1995
WO WO9605549 A1 * 2/1996

OTHER PUBLICATIONS

Molitor, Andrew "An Architecture for Advanced Packet Filtering", Jun. 1995 Proceedings of the Fifth Usenix Unix Security Symposium pp. 1–11.*

(Continued)

*Primary Examiner*—Andrew Caldwell
*Assistant Examiner*—Matthew Henning
(74) *Attorney, Agent, or Firm*—Knobbe Martens Olson & Bear, LLP

(57) ABSTRACT

In accordance with the present invention, a network management program (80) is provided that manages the communication of data packets between an intranetwork (44) and an internetwork (40). An operator of a computer connected to the intranetwork (44) inputs vital information regarding users of computers connected to the intranetwork (44), mapping information regarding computers connected to the intranetwork (44), and policies to be applied against those users and computers, using a graphical user interface (GUI 70). The GUI (70) communicates the vital user information, mapping information and policies to a database (72) which stores and organizes the vital user information, mapping information and policies. A filter executive (76) optimizes the policies stored in the database (72) into a set of rules for each user and passes the rules to a filter engine (78). The filter engine (78) filters all outbound data packets transmitted from the intranetwork (44) to the internetwork (40) and verifies all inbound data packets from the internetwork (40) according to the rules provided by the filter executive (76). The filter executive (76) also communicates the mapping information stored in the database (72) to a naming service manager (74) which further updates the mapping information and returns the updated mapping information to the filter executive (76). Consequently, the filter executive (78) filters the data packets according to the most recent mapping information.

79 Claims, 70 Drawing Sheets

U.S. PATENT DOCUMENTS

| | | | | | |
|---|---|---|---|---|---|
| 5,347,633 | A | * | 9/1994 | Ashfield et al. | 395/200.68 |
| 5,377,323 | A | * | 12/1994 | Vasudevan | 395/200.56 |
| 5,425,028 | A | * | 6/1995 | Britton et al. | 370/389 |
| 5,522,045 | A | * | 5/1996 | Sandberg | 395/200.45 |
| 5,586,121 | A | * | 12/1996 | Moura et al. | 370/404 |
| 5,606,668 | A | * | 2/1997 | Shwed | 713/201 |
| 5,648,965 | A | * | 7/1997 | Thadani et al. | 370/241 |
| 5,742,769 | A | * | 4/1998 | Lee et al. | 395/200.36 |
| 5,781,801 | A | * | 7/1998 | Flanagan et al. | 710/56 |
| 5,796,944 | A | * | 8/1998 | Hill et al. | 709/250 |
| 5,842,040 | A | * | 11/1998 | Hughes et al. | 710/11 |
| 5,864,683 | A | * | 1/1999 | Boebert et al. | 709/249 |
| 5,884,033 | A | * | 3/1999 | Duvall et al. | 709/206 |
| 6,173,364 | B1 | * | 1/2001 | Zenchelsky et al. | 711/118 |
| 6,178,505 | B1 | * | 1/2001 | Schneider et al. | 713/168 |
| 6,832,256 | B1 | * | 12/2004 | Toga | 709/229 |

OTHER PUBLICATIONS

IBM Corp., "Enforced Separation of Roles In A Multi–User Operating System," *IBM Technical Disclosure Bulletin*, vol. 34, No. 7B, pp. 120–122 (Dec. 1991).*

J. Bruce Dawson, "Intrusion Protection for Networks," *BYTE*(Apr. 1995).*

Jim Reid, "Open Systems Security: Traps and Pitfalls," *Computer & Security*14:496–517 (1995).*

S.M. Bellovin and W.R. Cheswick, "Network Firewalls," *IEEE Communications Magazine,* No. 9 New York, US (1994).*

D. Brent Chapman, *Network (In)Security Through IP Packet Filtering,* USENIX Symposium Proceedings, UNIX Security III, Baltimore, Maryland, Sep. 14–16, 1992.*

D. Brent Chapman and Elizabeth D. Zwicky, *Building Internet Firewalls,* Chapters 6 & 8 (O'Reilly & Associates, Inc., 1995).*

Chris Hare and Haranjit Siyan, *Internet Firewalls and Network Security,* Chapter 5 (New Riders Publishing, 2d Ed. 1996).*

* cited by examiner

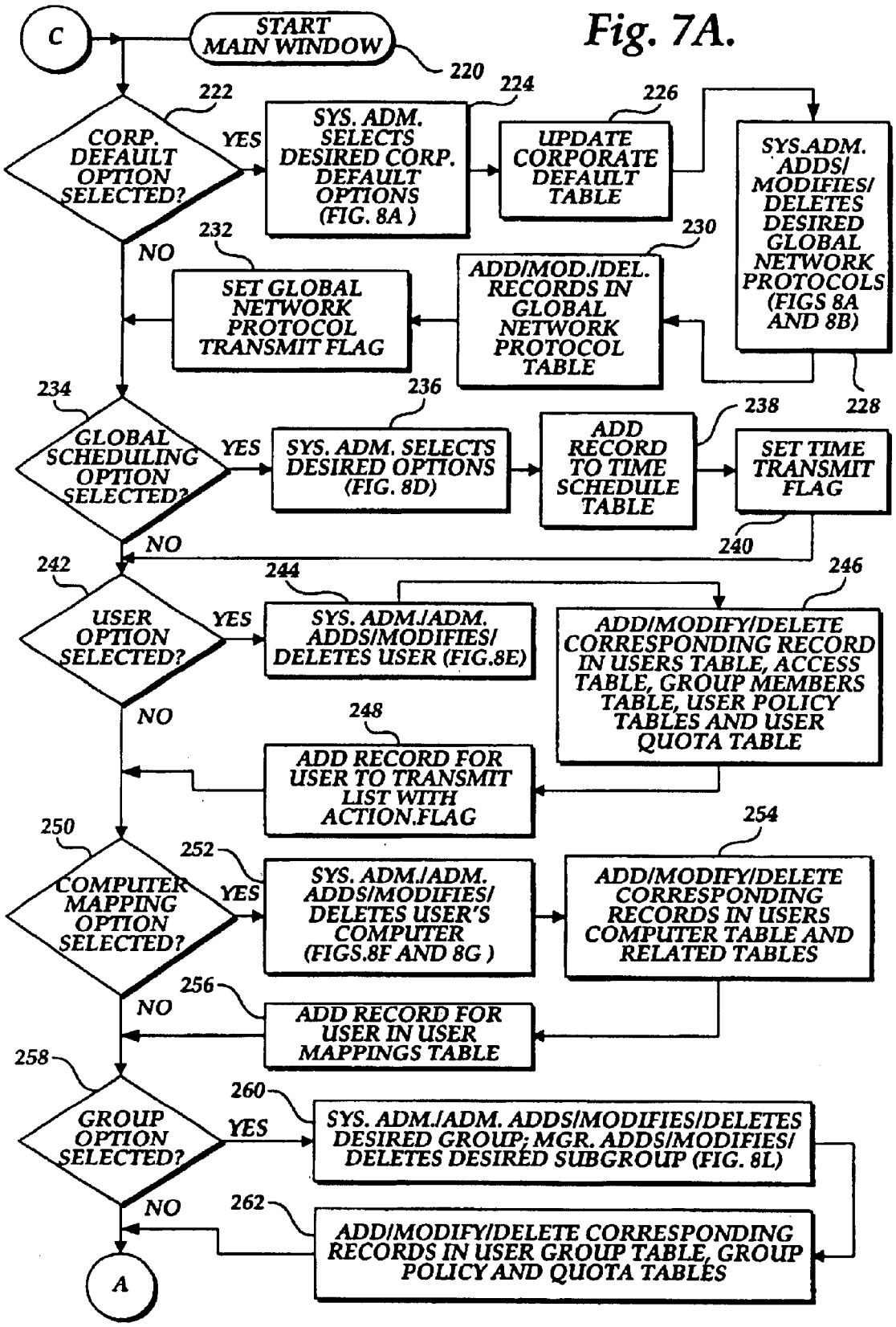
Fig. 7A.
C
START MAIN WINDOW
220
222
CORP. DEFAULT OPTION SELECTED?
YES
NO
224
SYS. ADM. SELECTS DESIRED CORP. DEFAULT OPTIONS (FIG. 8A)
226
UPDATE CORPORATE DEFAULT TABLE
SYS.ADM. ADDS/ MODIFIES/ DELETES DESIRED GLOBAL NETWORK PROTOCOLS (FIGS 8A AND 8B)
228
230
ADD/MOD./DEL. RECORDS IN GLOBAL NETWORK PROTOCOL TABLE
232
SET GLOBAL NETWORK PROTOCOL TRANSMIT FLAG
234
GLOBAL SCHEDULING OPTION SELECTED?
YES
NO
236
SYS. ADM. SELECTS DESIRED OPTIONS (FIG. 8D)
238
ADD RECORD TO TIME SCHEDULE TABLE
240
SET TIME TRANSMIT FLAG
242
USER OPTION SELECTED?
YES
NO
244
SYS. ADM./ADM. ADDS/MODIFIES/ DELETES USER (FIG.8E)
246
ADD/MODIFY/DELETE CORRESPONDING RECORD IN USERS TABLE, ACCESS TABLE, GROUP MEMBERS TABLE, USER POLICY TABLES AND USER QUOTA TABLE
248
ADD RECORD FOR USER TO TRANSMIT LIST WITH ACTION.FLAG
250
COMPUTER MAPPING OPTION SELECTED?
YES
NO
252
SYS. ADM./ADM. ADDS/MODIFIES/ DELETES USER'S COMPUTER (FIGS.8F AND 8G)
254
ADD/MODIFY/DELETE CORRESPONDING RECORDS IN USERS COMPUTER TABLE AND RELATED TABLES
256
ADD RECORD FOR USER IN USER MAPPINGS TABLE
258
GROUP OPTION SELECTED?
YES
NO
260
SYS. ADM./ADM. ADDS/MODIFIES/DELETES DESIRED GROUP; MGR. ADDS/MODIFIES/ DELETES DESIRED SUBGROUP (FIG. 8L)
262
ADD/MODIFY/DELETE CORRESPONDING RECORDS IN USER GROUP TABLE, GROUP POLICY AND QUOTA TABLES
A

METHOD AND APPARATUS FOR MANAGING INTERNETWORK AND INTRANETWORK ACTIVITY

Matter enclosed in heavy brackets [ ] appears in the original patent but forms no part of this reissue specification; matter printed in italics indicates the additions made by reissue.

RELATIONSHIP TO OTHER APPLICATIONS

This application claims the benefit of U.S. Provisional Application No. 60/040,424 filed Mar. 11, 1997. The subject matter of Provisional Application Ser. No. 60/040,424 is incorporated herein by reference.

FIELD OF THE INVENTION

This invention generally relates to managing the communication of data packets transmitted via an intranetwork or an internetwork and more particularly to monitoring, logging and blocking data packets transmitted via an intranetwork or internetwork.

BACKGROUND OF THE INVENTION

Communication networks are well-known in the computer communications field. By definition, a network is a group of computers and associated devices that are connected by a communications facilities or links. Network connections can be of a permanent nature, such as via cables, or can be of a temporary nature, such as connections made through telephone or other communication links. Networks vary in size, from a local area network (LAN) consisting of a few computers and related devices, to a wide area network (WAN) which interconnects computers and LANs that are geographically dispersed. An internetwork, in turn, is the joining of multiple computer networks, both similar and dissimilar, by means of gateways or routers that facilitate data transfer and conversion from various networks. A well-known abbreviation for internetwork is "internet." As currently understood, the capitalized term "Internet" refers to the collection of networks and routers that use a Transmission Control Protocol/Internet Protocol (TCP/IP) to communicate with one another.

A representative section 40 of the Internet is shown in FIG. 1 (Prior Art) in which a plurality of local area networks (LANs) 44 are connected by routers 42. The routers 42 are generally special purpose computers used to interface one LAN to another. Communication links within the LANs may be twisted wire pair, or coaxial cable, while communication links between networks may utilize 56 Kbps analog telephone lines, 1 Mbps digital T-1 lines and/or 45 Mbps T-3 lines. It will be appreciated that the Internet comprises a vast number of such interconnected networks and routers and that only a small, representative section of the Internet is shown in FIG. 1.

The Internet has recently seen explosive growth by virtue of its ability to link computers located throughout the world. In conjunction, the number of information services available on the Internet has grown significantly. For example, such services include electronic mail, Usenet (a collection of news groups dedicated to specific topics, Gopher (an information retrieval system created by the University of Minnesota), bulletin boards and the World Wide Web (WWW). Information provided by these services are transferred via the Internet using communication protocols that are designed specifically for the requirements of the particular service and used on top of TCP/IP to transfer information. For example, hypertext documents provided by the World Wide Web are transferred using a protocol known as HyperText Transfer Protocol (HTTP). Electronic mail can be transferred using the Simple Mail Transfer Protocol (SMTP), the Post Office Protocol-Version 2 (POP2) or the Post Office Protocol-Version 3 (POP3). Although HTTP, SMTP, POP2 and POP3 are mentioned here, those of ordinary skill in the art will appreciate that these protocols are only a representative sample of the plethora of protocols used to transfer information via the Internet and that new protocols and services are being added to the Internet each day.

In summary, the Internet is a conduit of information and services to any one of the smaller LANs or WANs belonging to it. The proliferation of information and services on the Internet has created the need for a method and apparatus to manage the communication of the information and services between the Internet and its member intranetworks. The method and apparatus for managing such communication should be capable of monitoring and logging the transmission of data packets between the intranetwork and the Internet. In addition, the method and apparatus should be capable of setting rules for the users of computers connected to the intranetwork that deny or allow access to certain Internet resources, e.g., denying or allowing access to certain WWW sites, denying or allowing retrieval of files from the Internet having certain file extensions, and denying or allowing the transfer of data to destinations in the intranetwork based on the type of protocol used to transfer the data. As described in the following, the present invention provides a method and apparatus that meet these criteria and solves other shortcomings in the prior art.

SUMMARY OF THE INVENTION

In accordance with the present invention, a network management program is provided that manages the communication of data packets between an intranetwork and an internetwork. The intranetwork includes a plurality of computers connected via a communications medium. The internetwork includes a plurality of computers connected by other communications media. An operator of a computer connected to the intranetwork inputs vital information regarding users of computers connected to the intranetwork, mapping information regrading computers connected to the intranetwork, and policies to be applied against those users and computers, using a graphical user interface. The GUI communicates the vital user information, mapping information and policies to a database which stores and organizes the vital user information, mapping information and policies. A filter executive optimizes the policies stored in the database into a set of rules for each user and passes the rules to a filter engine. The filter engine filters all outbound data packets transmitted from the intranetwork to the internetwork and verifies all inbound data packets from the internetwork according to the rules provided by the filter executive.

In accordance with other aspects of the present invention, the filter executive also communicates the mapping information stored in the database to a naming service manager which further updates the mapping information and returns the updated mapping information to the filter executive. Consequently, the filter executive filters the data packets according to the most recent mapping information.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 7A through 7C are a flow chart illustrating the logic used by the GUI to process the vital, mapping and policy information input via the main window shown in FIG. 6;

DETAILED DESCRIPTION OF THE PREFERRED EMBODIMENT

Figure 1:
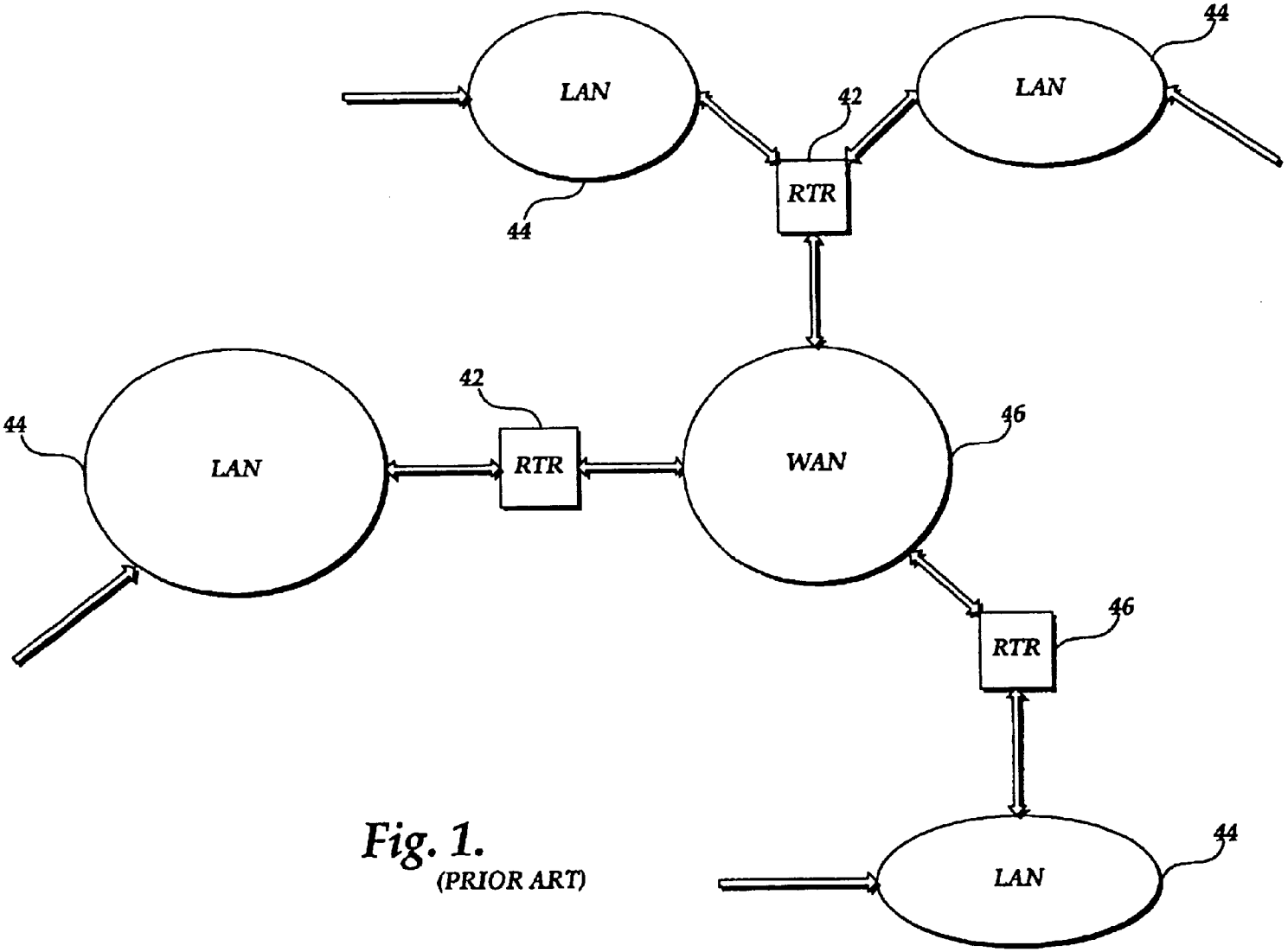
Fig. 1. (PRIOR ART)
FIG. 1 (Prior Art) is a block diagram of a representative portion of the Internet.
Figure 2:
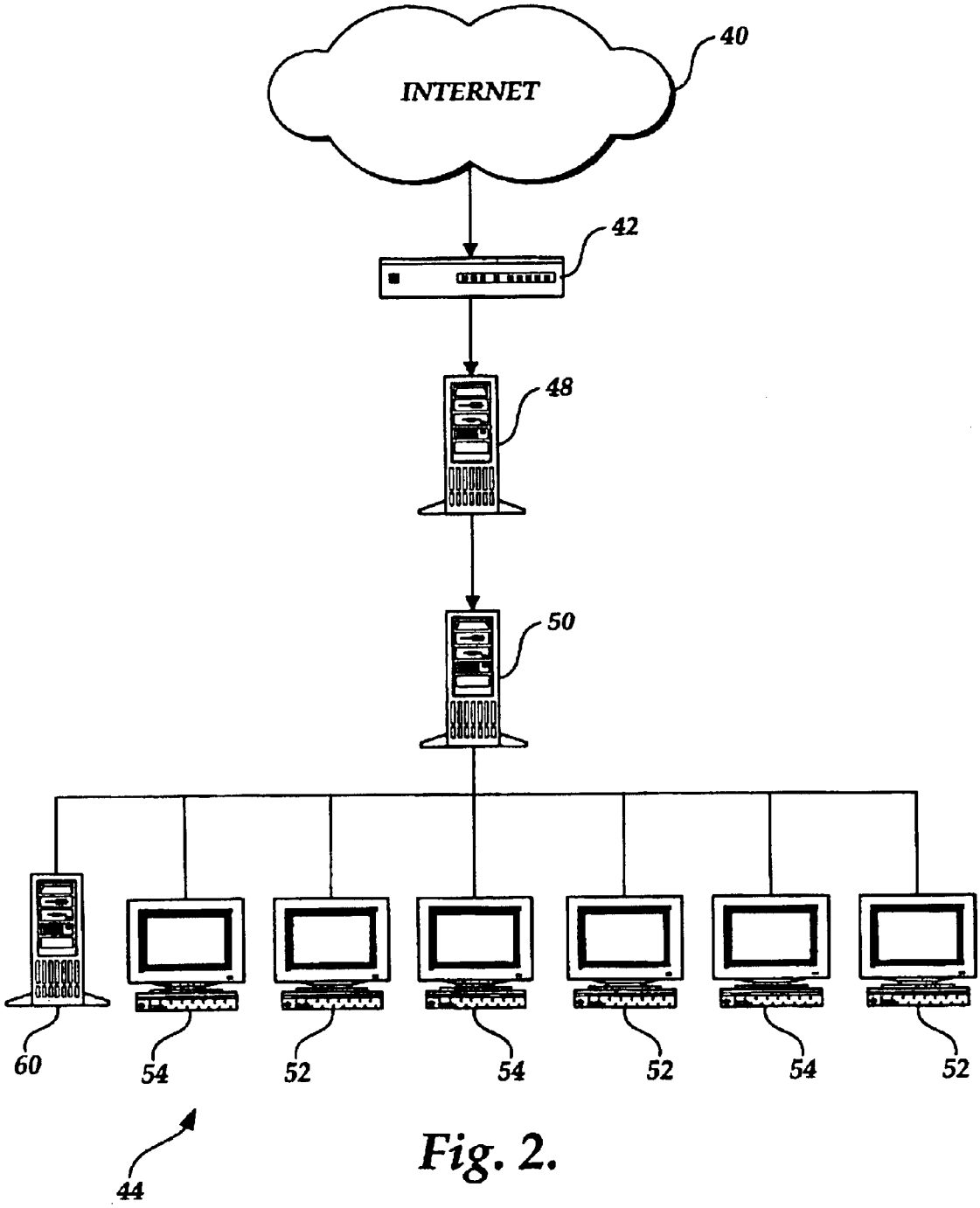
FIG. 2 is a pictorial diagram of a plurality of client computers and servers interconnected to form a local area network (LAN) as that typically connected to the Internet as shown in FIG. 1.

As previously described and shown in FIG. 1, the Internet 40 is a collection of local area networks (LANs) 44, wide area networks (WANs) 46, and routers 42 that use the Transmission Control Protocol/Internet Protocol (TCP/IP) to communicate with each other. FIG. 2 illustrates in more detail a LAN 44 such as that typically connected to the Internet 40. In the actual embodiment of the present invention depicted in FIG. 2, the LAN 44 is a bus network interconnecting various clients and servers. The LAN 44 shown in FIG. 2 can be formed of various coupling media such as glass or plastic fiberoptic cables, coaxial cables, twisted wire pair cables, ribbon cables, etc. In addition, one of ordinary skill in the art will appreciate that the coupling medium can also include a radio frequency coupling media or other intangible coupling media. In view of the availability of preinstalled wiring in current commercial environments, twisted wire pair copper cables are used to form the LAN 44 in the actual embodiment of the present invention described herein.

As shown in FIG. 2, the computers interconnected by the LAN 44 include a plurality of client computers 52, some of which have been equipped with certain components of the present invention and some of which have not. Those client computers equipped with at least a graphical user interface component of the present invention are known as "administrative clients" 54. In the actual embodiment of the present invention described herein, operators of the administrative clients are organized into three hierarchical levels of administration, namely, a system administrator, a mid-level administrator and a manager. The system administrator is capable of setting specific policies for the users of the LAN 44 regarding what type of services and information each user may have access to on the Internet 40. The mid-level administrator and manager, on the other hand, have more limited capabilities, as will be described in more detail below.

The LAN 44 also includes a domain controller server 60 that keeps track of which users are logged into which client computers 52 and which administrative computers 54 at any given time. For example, when a user logs in to a client computer 52, the user is said to have started a "session" with the LAN 44. The domain controller server 60 captures a record of this session and stores the logic name of the user and the computer name or "host name" of the computer logged into by the user.

The LAN 44 is insulated from the Internet 40 by a firewall server 48 which tracks and controls the flow of all data packets passing through it using the TCP/IP protocol, i.e., all internet protocol or "IP" packets. The firewall 48 protects the LAN 44 from malicious inbound IP packet traffic, but does not allow users of the LAN 44 to dynamically select to which information and services on the internet the users of the LAN 44 may have access.

All inbound IP packet traffic from the Internet 40 passing through the firewall 48 and all outbound IP packet traffic from the LAN 44 passes through a network server 50 equipped with a network operating system that coordinates this transfer of data packets. In one actual embodiment of the present invention, the network operating system installed on the network server 50 is Microsoft Windows NT. However, those of ordinary skill in the art will recognize that various other suitable network operating systems may be used, including the UNIX based network operating systems.

The present invention provides a method and apparatus that enables the network server 50 to manage the communication of IP packets between the LAN 44 and the Internet 40. Using an administrative computer 54, a system administrator, mid-level administrator or manager can set specific rules for the users of the computers connected to the LAN 44 regarding what type of services and information on the Internet 40 to which any user may have access. Thus, if a rule denies a user access to a particular service or type of information, any IP packets from that user requesting access for that service or that type of information will not be allowed to pass through the network server 50 to its intended destination in the Internet 40 or the LAN 44.

Figure 3A:
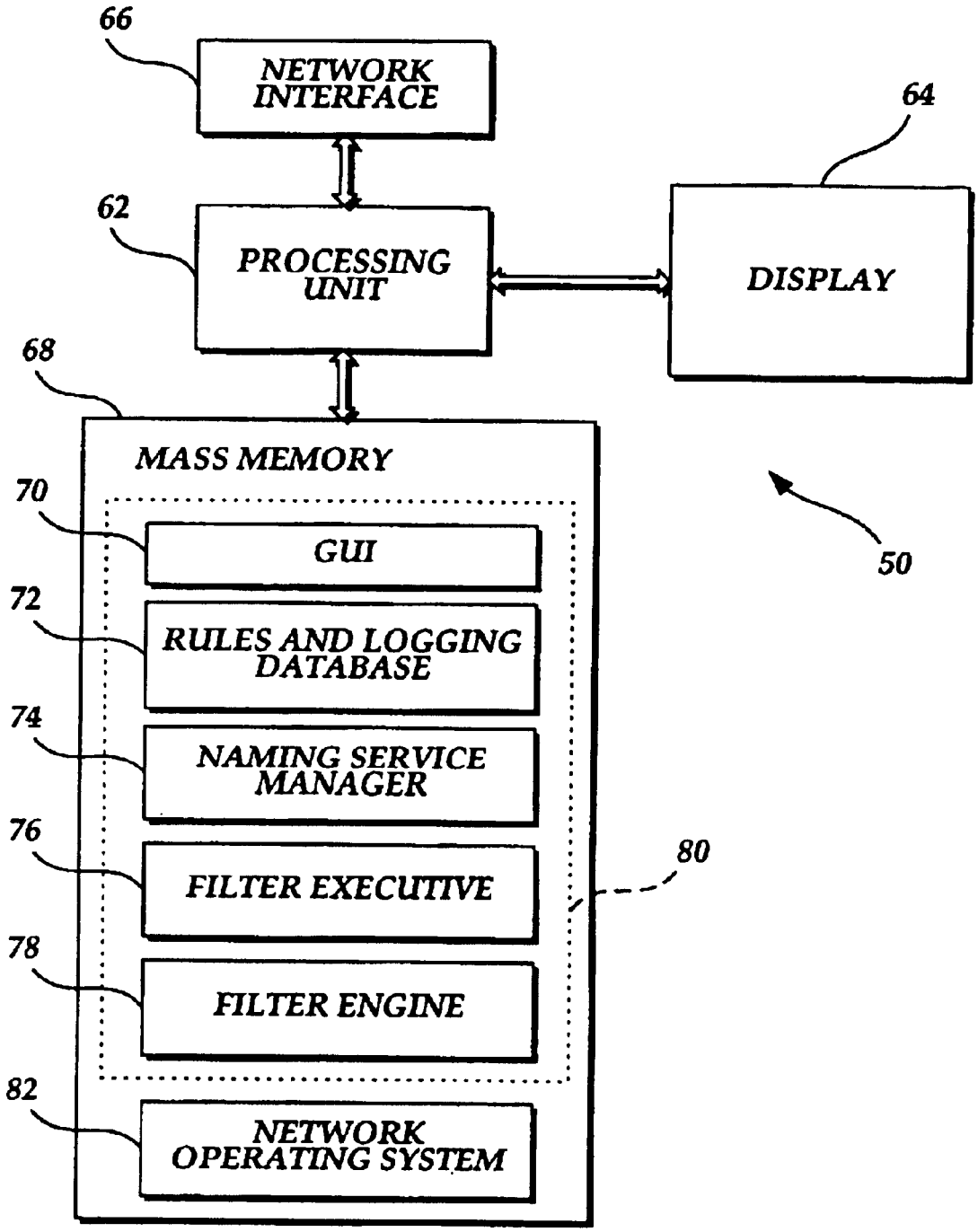
FIG. 3A is a schematic block diagram of the several components of a network server shown in FIG. 2 that is used to store a network access program that manages intranetwork and internetwork activity in accordance with the present invention.

Relevant Network Server Administrative Computer and Domain Controller Server Components FIG. 3A depicts several of the key components of the network server 50. It will be appreciated by those of ordinary skill in the art that the network server 50 includes many more components than those shown in FIG. 3A. However, it is not necessary that all of these generally conventional components be shown in order to disclose an illustrative embodiment for practicing the present invention. As shown in FIG. 3A, the network server 50 is connected to the LAN 44 via a network interface 66. Those of ordinary skill in the art will appreciate that the network interface 66 includes the necessary circuitry for connecting the network server 50 to the LAN 44 and the tirewall server 48, and is constructed for use with the TCP/IP protocol, the bus network configuration of LAN 44 and a particular type of coupling medium.

The network server 50 also includes a processing unit 62, a display 64 and a mass memory 68. The mass memory 68 generally comprises a random access memory (RAM), read only memory (ROM), and a permanent mass storage device, such as a hard disk drive, tape drive, optical drive, floppy disk drive, or combination thereof. The mass memory 68 stores the program code and data necessary for managing IP packet traffic in accordance with the present invention. More specifically, the mass memory 68 stores a network management program 80 formed in accordance with the present invention for managing the flow of IP packet traffic passing through the network server 50. As will be described in more detail below, the network management program 80 comprises a graphical user interface 70, a rules and logging database 72, a naming service manager 74, filter executive 76, and a filter engine 78.

The graphical user interface (GUI) 70 is a display format that enables operators of the administrative clients 54 to choose commands, start programs, and select options provided by the network management program 80 by pointing to pictorial representations and lists of menu items on the display using a computer input device, such as a mouse or keyboard. As will be described in more detail below, the options and commands provided by the GUI 70 to the operator of the administrative client depends upon the level of administration provided to that operator by the network management program 80, i.e., whether the operator is a system administrator, a mid-level administrator or a manager. Using the GUI 70, the operator provides information and sets policies for the users of the LAN 44 regarding what types of services and information to which the user may have access on the Internet 40. The GUI 70 transmits the information provided and the policies set by the operator for each user to a rules and logging database 72.

The rules and logging database 72 is a relational database stored in mass memory 68 consisting of the tables shown in FIGS. 9A–9D and FIGS. 25A and 25B which are used by the network management program 80 to manage IP packet traffic passing through the network server 50. In the actual embodiment of the invention described herein, the database 72 is a relational database managed and controlled using the structured query language (SQL). SQL is used in accordance with the present invention in querying, searching, sorting, updating and managing the database 72. Those of ordinary skill in the are will recognize, however, that any kind of database, e.g., file, sequential, object-oriented, etc., could be use to implement the present invention. In addition, access languages other than SQL could be used to manage and control the database 72 without departing from the scope of the present invention.

As will be described in more detail below in connection with FIGS. 9A–9D, the tables of the database 72 store information about each user of the LAN 44 and the policies set for each user via the GUI 70. The tables shown in FIGS. 25A and 25B, on the other hand, store information regarding each IP packet received and logged by the network server 50 in accordance with the present invention. Although the database 72 is stored in mass memory 68 of the network server 50 in the actual embodiment of the present invention described herein, those of ordinary sill in the art will recognize that in other embodiments the database 72 may be stored in memory of any other suitable computer connected to the LAN 44.

The filter executive 76 is the component of the network management program 80 that provides communication and policy processing between the database 72 and a filter engine 78 that actually filters the IP packets passing through the network server 50. The filter executive 76 loads the policies for each user collected by the database 72, optimizes them into a set of rules for each user, and provides the optimized rules to the filter engine 78.

The filter engine 78 filters all IP packets passing through the network server 50 using the rules for each user provided by the filter executive 76. The contents of the IP packets contain the information necessary to determine if the IP packets comply with the rules in effect. If an IP packet does not comply, the IP packet may be discarded by the filter engine 78 and thus, prevented from reaching its intended destination. In addition, the filter engine 78 may log the filtered packet and notify the user of the action taken by it.

Finally, the network management program 80 stored in mass memory 68 of the network server 50 includes a naming service manager 74 that collects and maintains mapping information which identifies and correlates users of the LAN 44 to the clients computers connected to the LAN 44 currently being utilized by those users. More specifically, the naming service manager 74 dynamically correlates or "maps" a user's login name and domain name to the computer name (or "host name") and Internet protocol (IP) address of the computer currently, or in some cases formerly, utilized by the user. One of ordinary skill in the art will recognize that the IP address is the four-part number that uniquely identifies a computer connected to the Internet 40. As will be described in more detail below, the naming service manager 74 collects mapping information, i.e., login names, domain names, computer names and IP addresses, from the filter executive 76 and other agents located on the LAN 44 and correlates the information into a current computer-to-user assignment mapping for each user of the LAN 44. The naming service manager 74 then provides the filter executive 76 with updated mapping information so that the filter executive 76 can transfer the updated mapping information to the filter engine 78 along with the user rules. Consequently, as a user logs into and out of the LAN 44, the filter engine 78 begins or ceases to filter IP packets passing through to network server 50 for the user accordingly.

Now that the network server 80 and the components of the network management program 80 that are implemented by the network server 50 have been described in more detail, the relevant components of the administrative clients 54 will be discussed. FIG. 3B depicts several of the key components of the administrative computers 54 which are used to define the set of rules to be applied to users of the LAN 44 in order to manage LAN activity in accordance with the present invention. Those of ordinary skill in the art will appreciate that the administrative clients 54 include many more components than those shown in FIG. 3B. However, it is not necessary that all of these generally conventional components be shown in order to adequately disclose an exemplary embodiment for practicing the present invention. The administrative clients 54 are connected to the LAN 44 via a network interface 56 similar to the network interface 66 of the network server 50. Each administrative computer 54 also includes a processing unit 55, a display 58, and a memory 57. The memory 57 comprises a conventional disk, read-only memory, and random access memory for storing the network operating system 82 and the GUI 70 of the network management program 80. In the actual embodiment of the present invention described herein, the administrative computer 54 is not equipped with any of the remaining components of the network management program 80. Only GUI 70 is required in order to enable an operator of the administrative computer 54 to input information regarding users and set policies for users. The information and policies are then passed by the GUI 70 to the rules and logging database 72 located at the network server 50 for further processing.

As for the remaining client computers 52 connected to the LAN 44, these client computers 52 are not installed with any of the components of the network management program 80. Therefore a detailed description of the electronic components of the client computers 52 is not required to adequately disclose an exemplary embodiment of the present invention. However, in accordance with the present invention, any IP packets transmitted by the client computers 52, and hence, any requests for services and/or information made by the user of a client computer 52 from the Internet 40 are still filtered by the filter engine 78 as they pass through the network server 50.

Figure 3C:
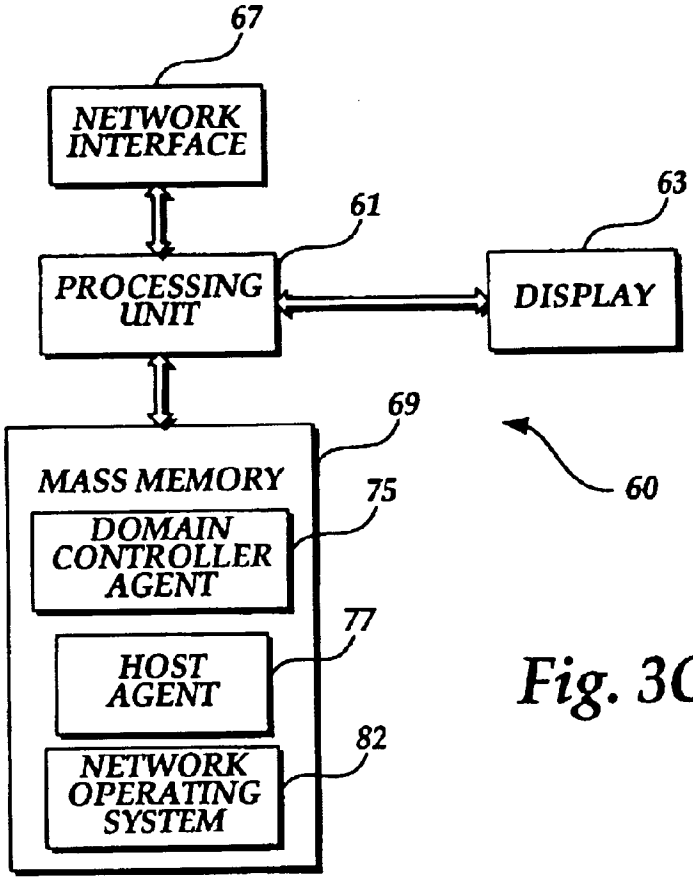
FIG. 3C is a schematic block diagram of the several components of a server shown in FIG. 2 that is used to store and implement certain portions of the network access program.
Figure 3B:
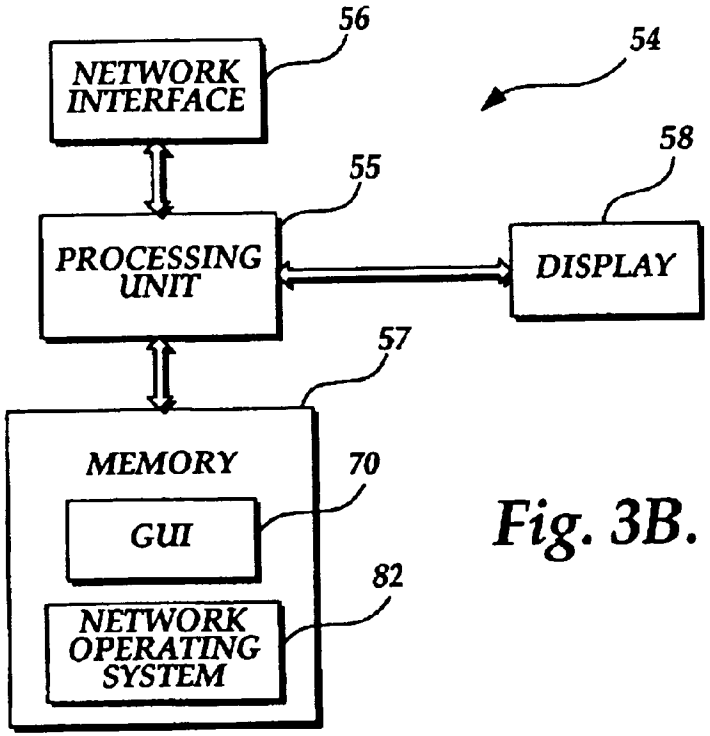
FIG. 3B is a schematic block diagram of the several components of a client computer shown in FIG. 2 that are used to store and implement certain portions of the network management program.

FIG. 3C depicts several of the key components of the domain controller server 60. As noted above, the domain controller server 60 keeps track of which users are logged into which computers at any given time. For example, when a user logs into a computer and the computer begins actively communicating with the LAN 44, the computer is said to have started a "session" with the LAN 44. The domain controller server 60 captures a record of this session and stores the login name of the user, and the computer name and IP address of the computer logged into by the user.

The domain controller server 60 comprises a network interface 67, similar to the network interface 65 of the administrative computer 54, that connects the domain controller server 60 to the LAN 44. In addition, the domain controller server includes a processing unit 61, display 63 and mass memory 69 similar to those found in the network server 50. However, mass memory 69 of the domain controller server 60 stores either a domain controller agent 75 or a host agent 77 that can be used in conjunction with the naming service manager 74 of the network access program 80 to maintain updated and accurate user mapping information for each user of the LAN 44 at any given time. As will be described in more detail below, the domain controller agent 75 collects dynamic user login and logout information. The host agent 77, on the other hand, collects current IP address assignments for the computers connected to the LAN 44. The domain controller agent 75 and host agent 77 periodically transmit the collected information to the naming service manager 74. Although both the domain controller agent 75 and the host agent 77 are shown in FIG. 3C, it will be appreciated that only one or the other is normally employed. For example, if dynamic user-to-computer mapping and computer-to-IP address mapping is desired, the domain controller agent 75 is employed. However, if user-to-computer assignments are to remain static or permanent, but updates to IP address assignments are still desired, the host agent 77 is employed. Although the host agent 77 is described herein as being located on the domain controller server 60, those of ordinary skill in the art will recognize that the host agent may be located on any suitable computer connected to the LAN 44.

The Network Management Program

Figure 4:
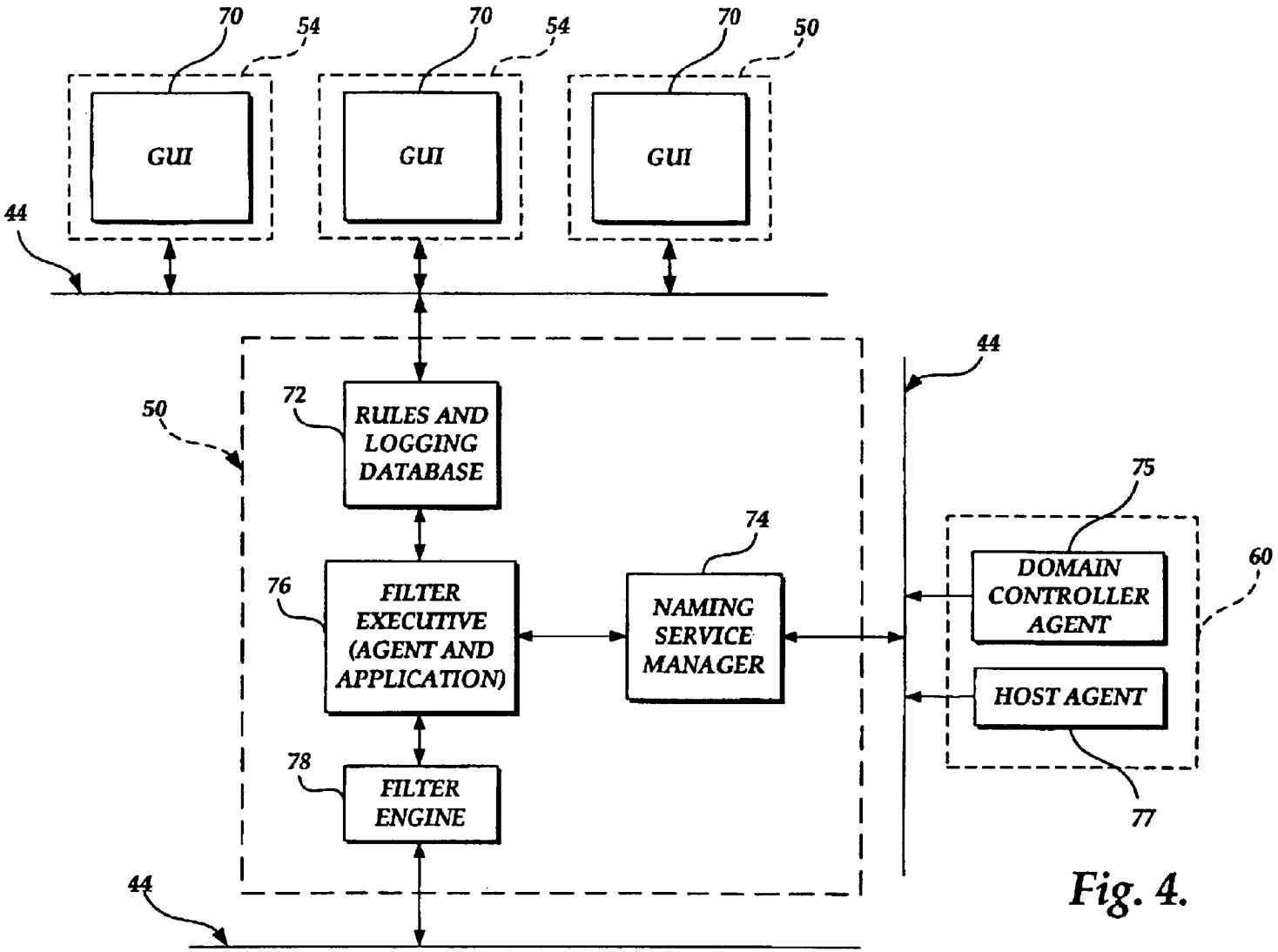
FIG. 4 is a block diagram illustrating the distribution of a plurality of components comprising the network management program among the client computers and servers shown in FIG. 2.

FIG. 4 is a block diagram of the component parts of the network management program 80 as distributed among the various computers and servers connected to the LAN 44. The GUI 70 of each administrative computer 54 and the network server 50 communicate the information and policies input by the operators of those computers to the rules and logging database 72 located on the network server 50 via the LAN 44. These policies are stored and processed by the rules and logging database 72, which then passes the user policies along to the filter executive 76 along with mapping information for each user. The filter executive 76 optimizes the policies into a set of rules for each user and passes the rules and user mapping information to the filter engine 78. The filter engine 78 filters all outbound IP packets transmitted from the LAN 44 to the Internet 40 and verifies all inbound IP packets from the Internet 40 according to the rules provided to the filter engine 78 by the filter executive 76. As this occurs, the naming services manager 74 provides the filter executive 76 with updated mapping information which the filter executive then passes on to the filter engine 78 so that the filter engine begins and ceases filtering of IP packets dynamically as users log into and out of the LAN 44.

Now that the overall distribution of the component parts of the network management program 80 have been generally described, the operation of the network management program 80 will be described in more detail.

Information Gathering and Policy Setting

Figure 5:
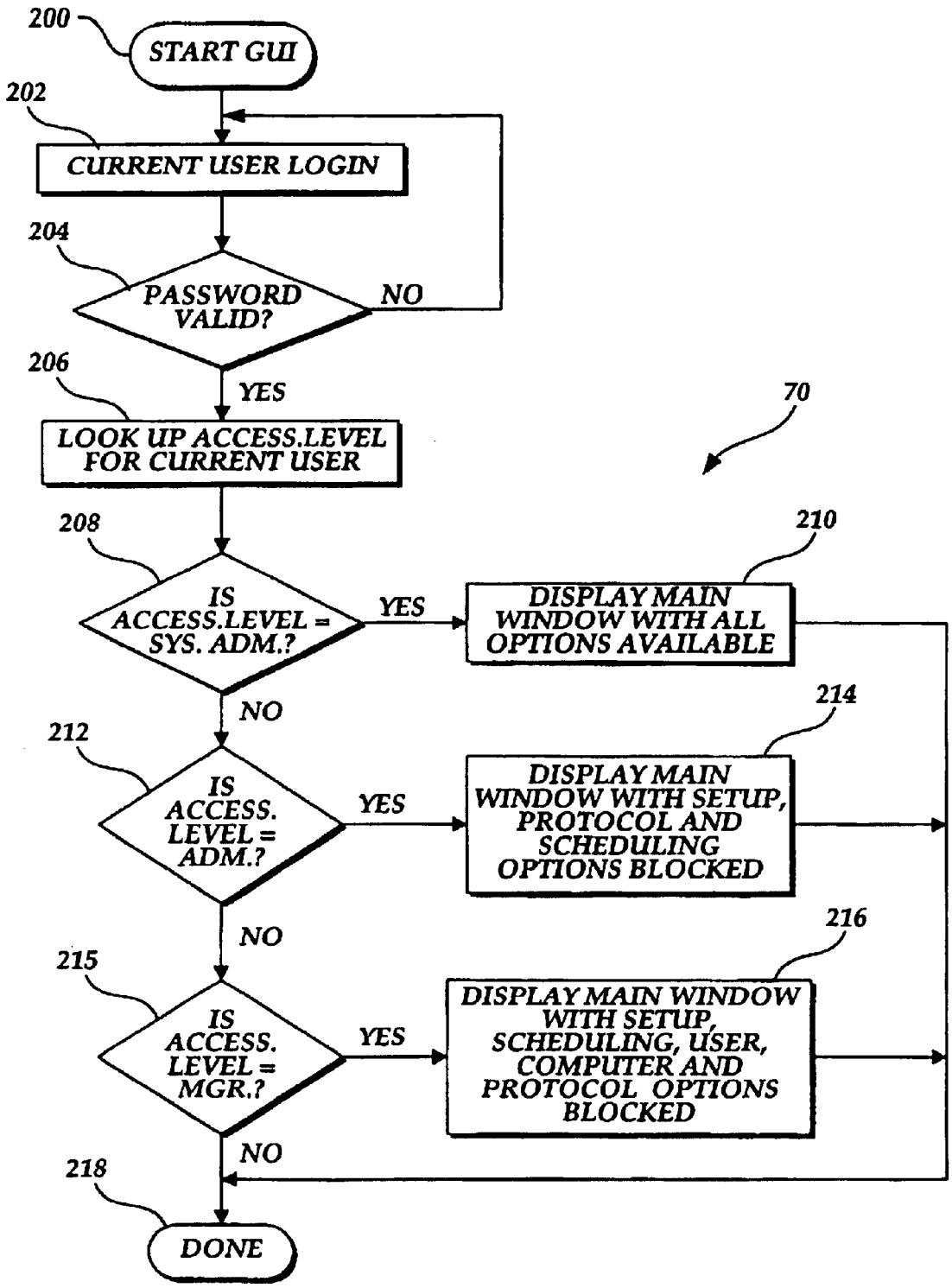
FIG. 5 is a flow chart illustrating the logic used by a graphical user interface (GUI) component of the network management program.

FIG. 5 is a flow chart illustrating the logic used by the GUI 70 of the network management program 80 to determine which network options are to be presented to the operator of the administrative computer 54, depending upon the system administration level of the operator. As described below, the network management options are displayed in a main window 84 generated by the GUI 70 on the display 58 of the administrative computer.

Figure 6:
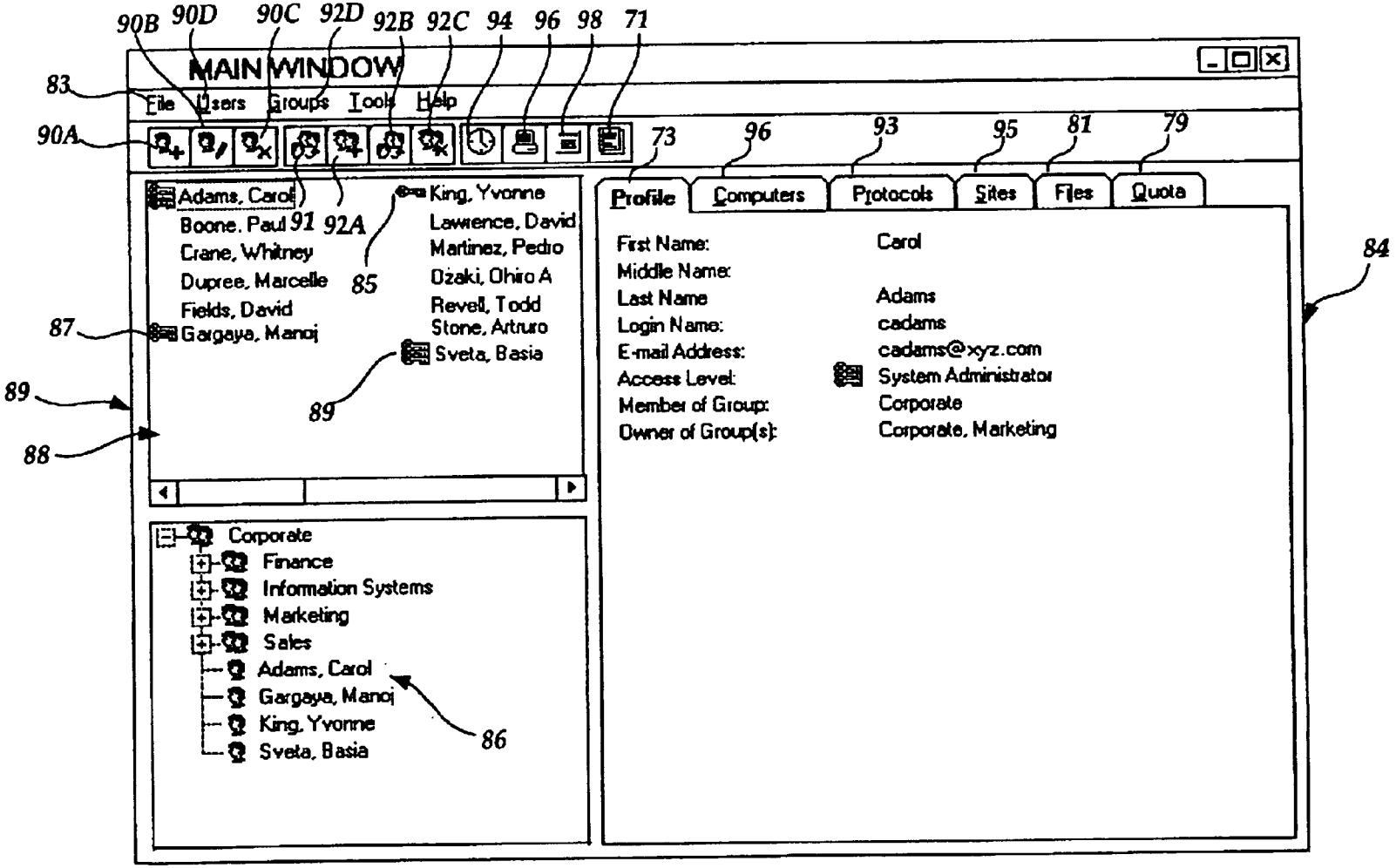
FIG. 6 is a main window produced by the GUI into which an operator inputs vital information regrading the user of each computer connected to the LAN shown in FIG. 2, mapping information regarding each such user to each such computer, and policy information to be applied against each such user.

As shown in FIG. 6, the main window 84 provides the operator with certain information regarding all identified users of the LAN 44 and numerous policy setting options for defining what information and services will be available to those users. In this regard, the main window 84 includes a user list 88 that identifies all users of the LAN 44. For example, if the present invention were used in a corporate environment, the LAN 44 would comprise the corporation's private intranetwork and each user of the LAN 44 would be an employee of the corporation. Thus, the user list 88 would identify each employee of the corporation. In accordance with the present invention, users can be assigned an administrative access level, such as system administrator, mid-level administrator, or manager. If a "three-key" icon 89 appears beside a user's name in the user list 88 of the main window 84, the user is a system administrator. Accordingly, a "two-key" icon 87 indicates a mid-level administrator, and the "one-key" icon 85 indicates a manager.

Users are added, modified, or deleted in the user list 88 by using the user add, edit, or delete tool bar buttons 90a, 90b, and 90c, respectively. For example, a user can be added to the user list 88, and their administrative access level defined, by selecting the user add tool bar button 90a as will be described in more detail below. Those of ordinary skill in the art will also appreciate that the user add, edit and delete options may also be selected from a "pull-down" user menu 90d.

In accordance with yet other aspects of the present invention, all users of the LAN 44 can be organized into groups in a hierarchical fashion. In this regard, the main window 84 includes a group hierarchy 86 in which the root of the hierarchy is a group containing all of the users identified in the user list 88. As with any hierarchy, the root group containing all users can be subdivided into various subgroups or "children," each child group can further be divided into subgroups, i.e., "grandchildren," and so on. Again, using the corporate environment as an illustrative example, the root group of the hierarchy would be the "corporate group." The corporate group can be subdivided into subgroups corresponding to various departments of the corporation, e.g., the finance department, information system department, marketing department and sales department, as shown in FIG. 6. Accordingly, the employees of each of those departments comprise the users belonging to those subgroups.

As will be described in more detail below, the operator of an administrative client 54 with an access level of system administrator, mid-level administrator or manager can add, modify, and delete subgroups of the root group or "corporate group" using the group add, edit, and delete toolbar buttons 92a, 92b, and 92c or group pull-down menu 92d. Once a subgroup is defined, users are added as members to the subgroup by selecting a user to group toolbar button 91.

Once the users of the LAN 44 have been defined and added to groups, depending upon the administration level of the operator of the administrative computer 54, i.e., system administrator, mid-level administrator or manager, the operator can set certain policies using the GUI 70 and apply those policies broadly against groups or individually against users to control user or group access to Internet resources. In the exemplary embodiment of the present invention described herein, the operator can apply protocol policies, site policies, file type policies, quota policies, and time scheduling policies via the main window 84 generated by the GUI 70. These policies are more specifically described below.

Protocol Policy

Internet resources, such as WWW servers, electronic mail servers, Usenet readers and Telnet servers, use universally known protocols and port numbers to communicate via the Internet. For example, electronic mail is commonly sent via the Internet using SMTP via port number 25, POP2 via port number 106, or POP3 via port number 110. Using the GUI 70, system administrators, mid-level administrators and managers can establish a policy to deny or allow access to such resources by denying or allowing the transmission of IP packets to the protocols used to transmit them. This "protocol policy" can then be applied broadly against a group (thus, specifically against each user belonging to the group) and individually against particular users.

Site Policy

The WWW is a vast collection of interconnected hypertext documents written in the HyperText Markup Language (HTML) that are electronically stored at "web sites" throughout the Internet 40. A web site is a server connected to the Internet 40 that has mass storage facilities for storing hypertext documents and that runs administrative software for handling requests for those documents. Using the GUI 70, a system administrator, mid-level administrator or manager can establish a site policy to deny or allow such requests from users of the LAN 44 by identifying the site by either its unique IP address or its fully qualified domain name. As noted above in connection with protocol policies, site policies can also be applied broadly against a group or individually against specific users.

File Type Policy

Information is often retrieved from the Internet resources mentioned above in the form of a file, such as an executable (.exe) file or an archive (.zip) file. Using the GUI 70, a system administrator, mid-level administrator or manager can set a file type policy to prevent users from downloading certain types of files from the Internet 40 by identifying the file extension, e.g., .exe or .zip, of the file type being denied. As noted above in connection with the protocol and site policies, file type policies can be applied broadly against groups or individually against specific users.

Quota Policy

During the course of any given day, each of the users of the LAN 44 will transmit and receive millions of bytes of data contained in IP packets. Quotas can be set specifying how many megabytes of data can be transmitted and received by any user during any given time period. In the actual embodiment of the present invention described herein, this time period is twenty-four hours. Such quota policies ensure that the LAN 44 operates at optimum efficiency and that users do not violate acceptable on-line usage policies. As noted above in connection with the protocol, site and file policies, quota policies can be applied broadly against groups or individually against specified users.

Time Schedule Policy

Finally, using the GUI 70, system administrators (but not mid-level administrators or managers) can establish time schedule policies denying users access information communicated via certain protocols during specified hours of the day. For example, a system administrator can allow electronic mail only during the hours of 8 a.m. until 10 a.m., by blocking access to the electronic mail protocols (e.g., SMTP, POP2, and POP3) all other hours of the day. As opposed to protocol, site, file type and quota policies, time schedule policies can only be applied to the root or corporate group, rather than against users individually or against subgroups of the corporate group. However, since the time schedule policies are applied to the corporate group, the time schedule policies are inherited by all subgroups of the corporate group and all users belonging to the corporate group and its subgroup.

Returning to FIG. 5, the logic employed by the GUI 70 to display the main window 84 from which system administrators, mid-level administrators and managers can input information and set policies begins in a block 200 and proceeds to a block 202 in which the current operator logs into the administrative computer 54. In a block 204, the logic determines if the password entered by the user is valid. If not, the logic returns to block 202, and the user makes another login attempt. However, if the user enters a valid password, the logic proceeds to a block 206 where the administrative access level for the user, i.e., system administrator, mid-level administrator or manager, is found by querying the database 72. If the logic determines in a decision block 208 that the current operator in a system administrator, the main window 84 is displayed on the display 58 of the operator's administrative computer 54 with all network management program 80 options available in block 210. However, if the user is not a system administrator, the logic proceeds from block 208 to a decision block 212 where it determines if the user is a mid-level administrator. If so, the main window 84 will be displayed with certain options blocked, namely, corporate default options, protocol add/edit/delete options, and the time scheduling options.

If the operator is neither a system administrator nor a mid-level administrator, the logic proceeds to a decision block 215 where it determines if the operator is a manager. If so, the main window 84 is displayed with the corporate default options, time scheduling options, user add/edit/delete options, computer add/edit/delete options, and protocol options blocked. The logic then ends in 218.

If the operator logged into the administrative computer 54 is not a system administrator, mid-level administrator or manager, then the operator is not allowed to set policies or input information using the GUI 70, and the GUI 70 is exited in block 217.

Figure 7B:
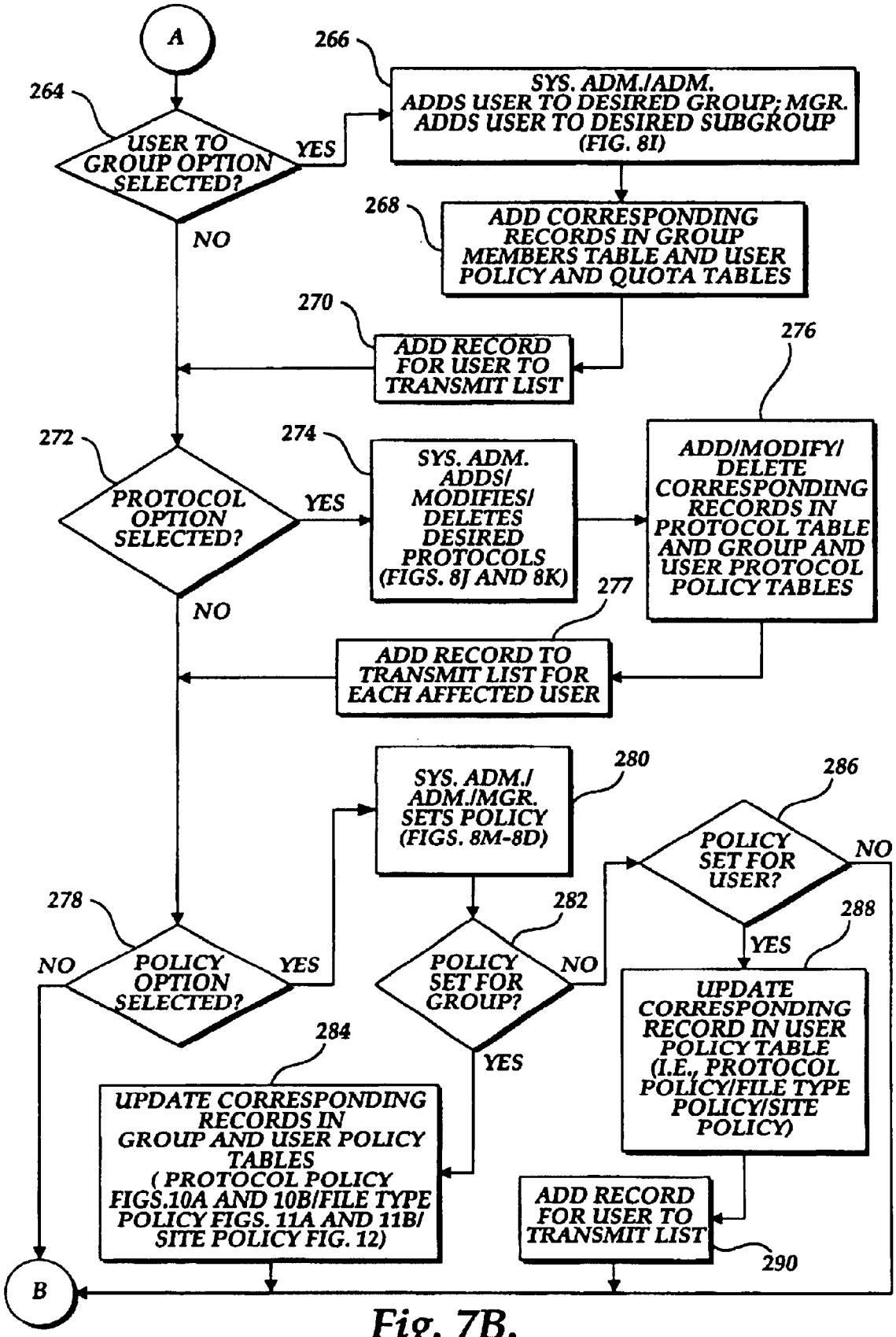
Figure 7C:
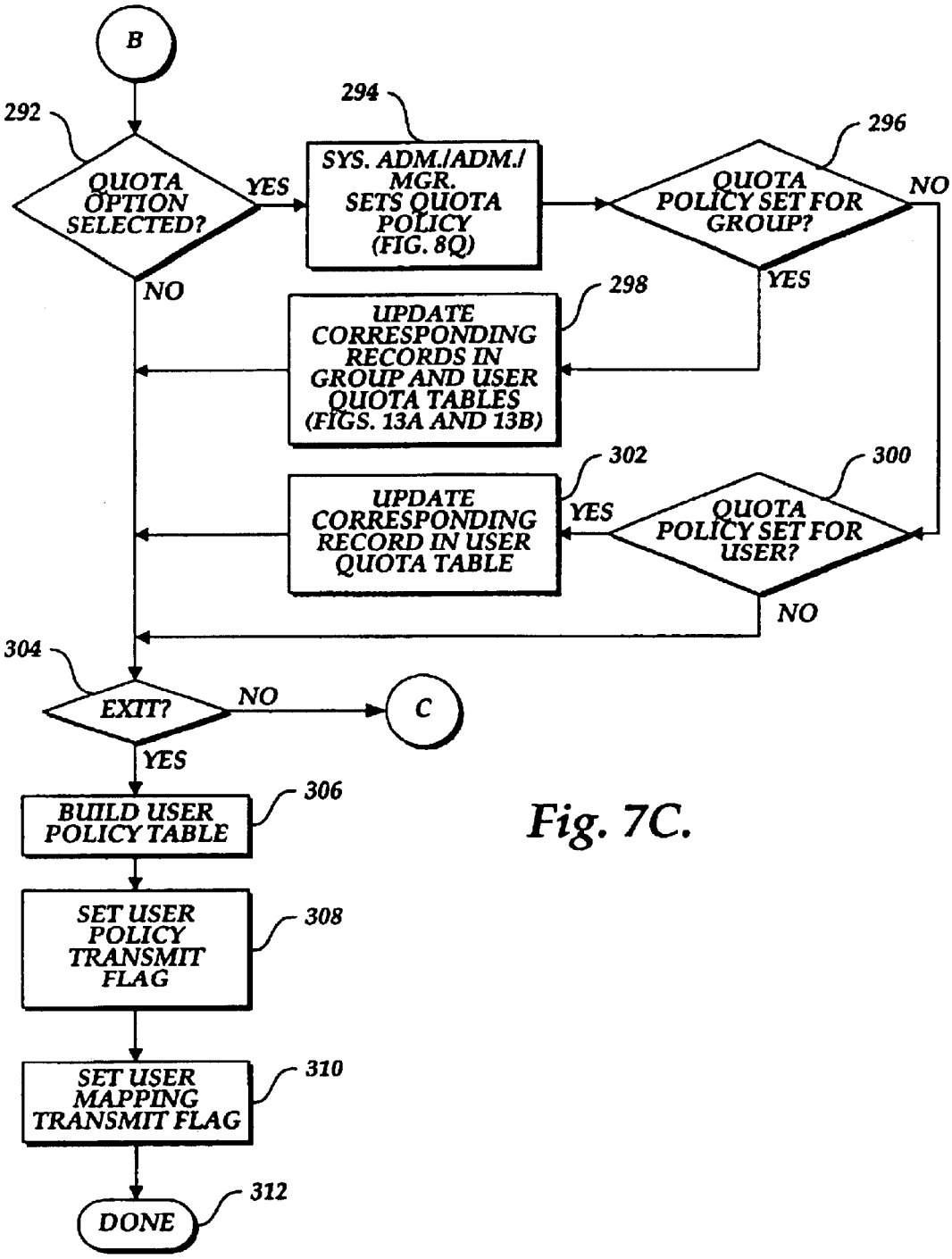
Figure 9A:
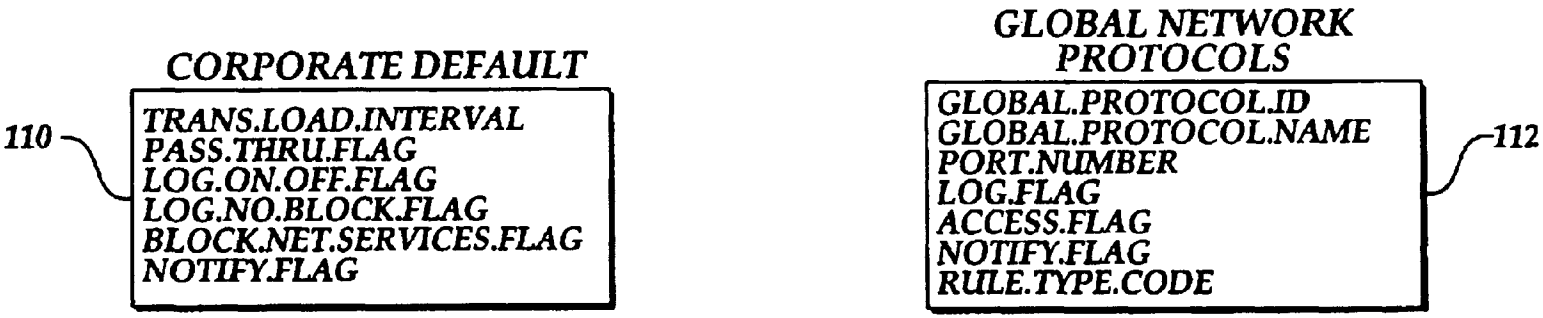
FIGS. 9A through 9D are block diagrams illustrating a plurality of tables stored by a database component of the network management program for organizing the vital, mapping and policy information provided by the GUI.

FIGS. 7A, 7B and 7C illustrate the logic implemented by the GUI 70 to process the options selected by the operator of the administrative computer 54 from the main window 84. It will be appreciated, however, that each option selected from the main window 84 causes the rules and logic database 72 to be updated with the information provided by the operator. The tables comprising the database 72 are illustrated in FIGS. 9A and 9B and will be referred to during the discussion of FIGS. 7A–7C.

Figure 8A:
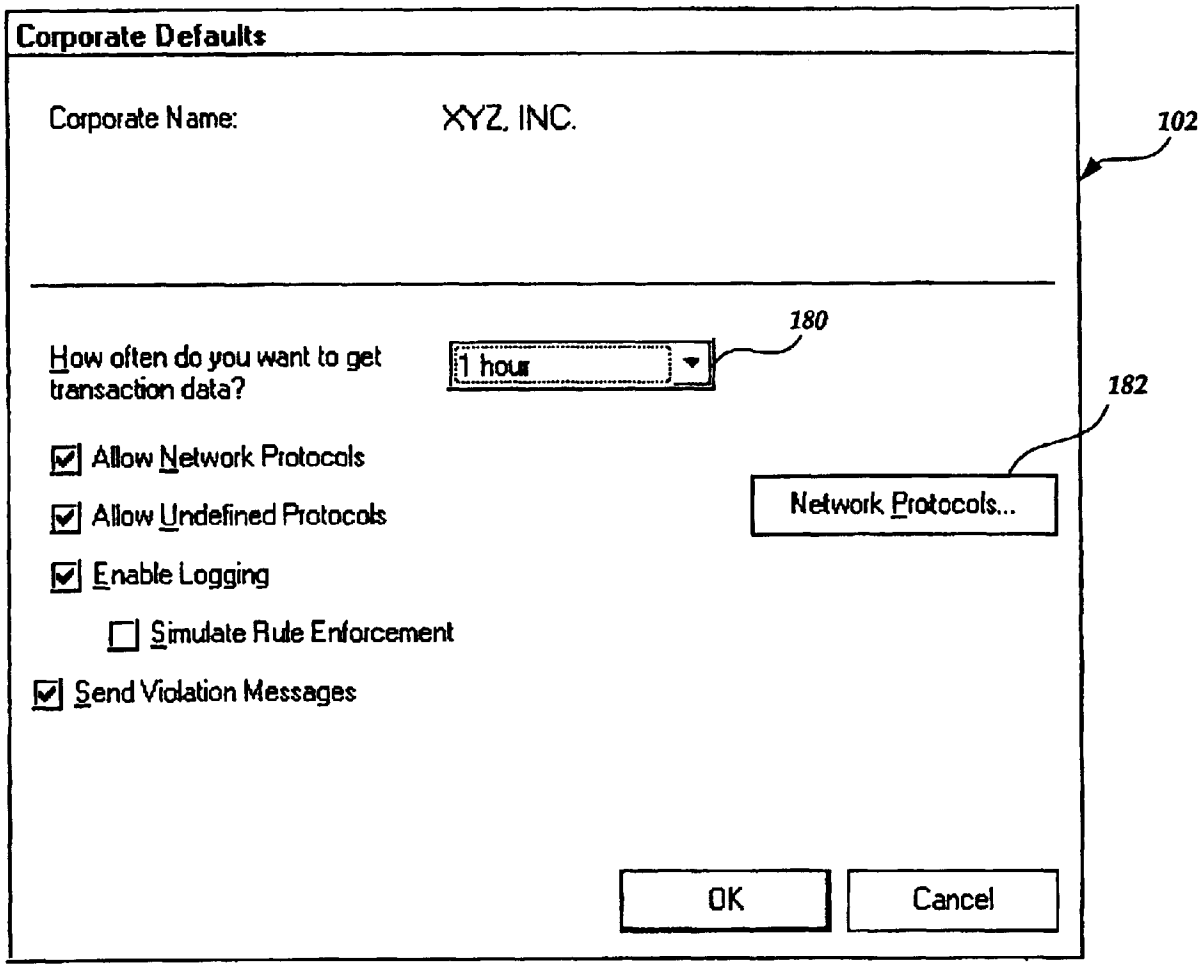
FIGS. 8A through 8Q are various other windows produced by the GUI for inputting vital, mapping and policy information.

The logic begins in FIG. 7A in a block 220 and proceeds to a decision block 222 where it determines if the operator has selected the corporate default option from a File pull-down menu 83 in the main window 84. As noted above, the corporate default option is only made available in the main window 84 to system administrators. Those of ordinary skill in the art will recognize that to mid-level administrators and managers, the corporate default option will appear "greyed out" in the main window 84 and any attempts to select this option by such operators will be ignored by the GUI 70. When the system administrator selects the corporate default option from the main window 84, a corporate default window 102 as shown in FIG. 8A, is generated by the GUI 70 on the display 58 of the administrative computer 54 being used by the system administrator. From the corporate default window 102, the system administrator can set the following default options that apply to the corporate group by selecting or clearing the corresponding check box.

Transaction Load Interval

The system administrator can select how frequently the filter engine 78 transfers logged IP packets to the rules and logging database 72 from the transaction time pull-down menu 180. When the system administrator enters a value for the transaction load interval, the value is stored in the database 72 in the transaction load interval field in a corporate default table 110 shown in FIG. 9A.

Allow Network Protocols

If the system administrator selects the Allow Network Protocols check box in the corporate default window 102, IP packets communicated using a predefined list of network protocols are allowed to pass through the filter engine 78 unconditionally. As opposed to application protocols, network protocols are those used by the computers and servers connected to LAN 44 for intranetwork communication. It will be appreciated that network protocols will normally be allowed to pass through the filter engine 78 in order to conserve space in the database 72. If the system administrator selects the Allow Network Protocols check box, the block network services flag of the corporate default table 110 is set. Otherwise, the block network services flag is cleared.

Allow Undefined Protocols

If the system administrator selects the Allow Undefined Protocols check box in the corporate default window 102, IP packets communicated using any application protocol that has not been previously defined by the network management program 80 and for which no record is stored in the database 72 are allowed to pass through the filter engine 78. If the Allow Undefined Protocol check box is selected, the pass through flag is set in the corporate default table 110. Otherwise, the flag is cleared.

Enable Logging

When the Enable Logging check box is selected in the corporate default window 102, all IP packets permitted by the filter engine 78 to pass through to their intended destination are also logged by the filter engine 78. When the system administrator selects the Enable Logging check box, a log-on-off flag in the corporate default table 110 of the database 72 is set. Otherwise, the log-on-off flag is cleared.

Simulate Rule Enforcement

When the Simulate Rule Enforcement check box is selected by the system administrator, all IP packets passing through the filter engine 78 are logged as though the protocol, site, file type and quota policies described above were being enforced, although in reality they are not. When the Simulate Rule Enforcement check box is selected, a log-no-block flag is set in the corporate default table 110. Otherwise, the log-no-block flag is cleared.

Send Violation Messages

If the system administrator selects the Send Violation Messages check box, violation messages will be sent to users of the LAN 44 when the policies or quotas set for that user have been violated. When the Send Violation Messages check box is selected, a notify flag is set in the computer default table 110. Otherwise, the notify flag is cleared.

Returning to FIG. 7A, once the system administrator has selected or cleared all of the desired corporate default check boxes in the corporate default widow 102 and the corporate default table 110 in the database 72 has been updated accordingly in block 226, the logic proceeds to a block 228 where the system administrator is allowed to add, edit or delete network protocols to a list of network protocols, which by default are not blocked by the filter engine 78.

Figure 8B:
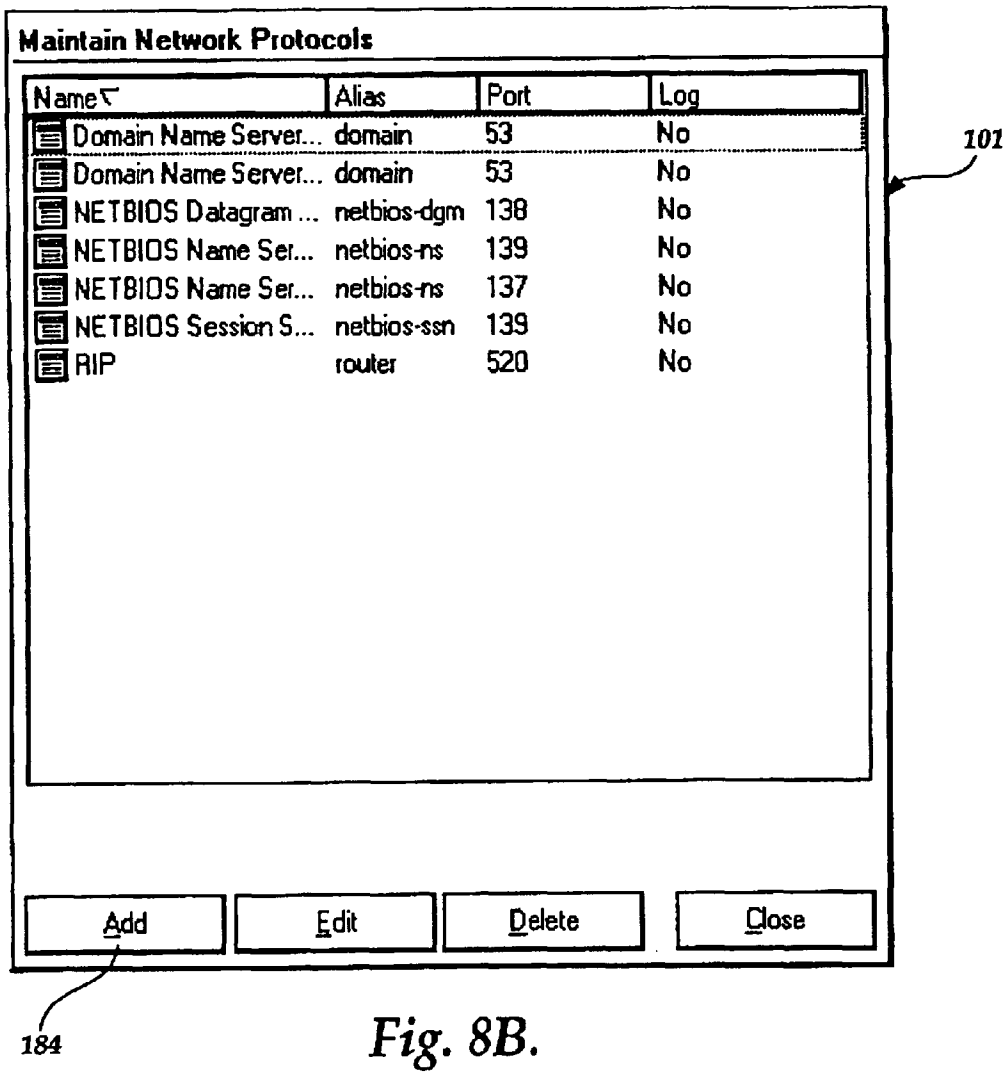
Figure 8C:
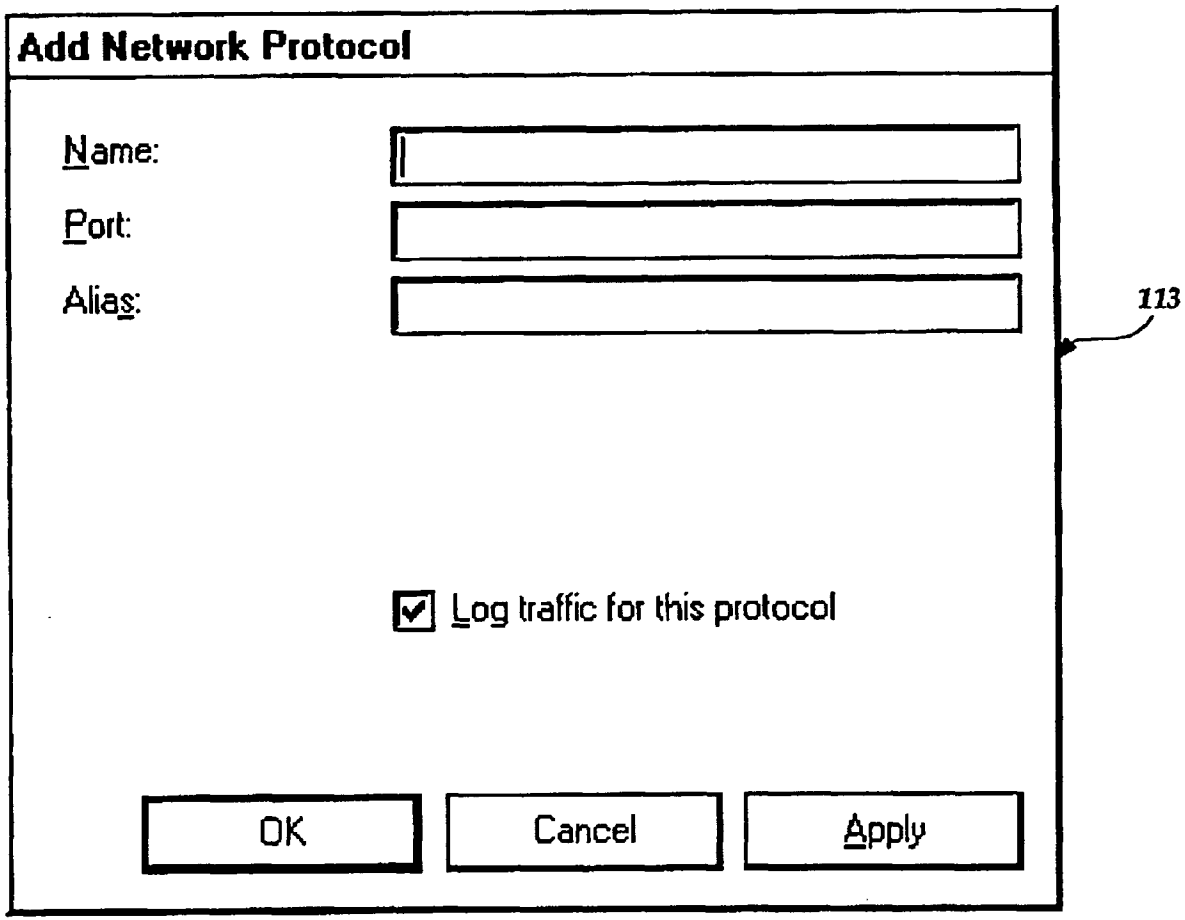

The system administrator may add, edit or delete network protocols by selecting a network protocols button 182 in the corporate default window 102. If selected, the GUI 70 will generate a maintain network protocols window 101 as shown in FIG. 8B on the display 58 of the system administrator's administrative computer 54. To add a network protocol to the list of network protocols shown in the maintain network protocols window, the system administrator selects an Add button. The GUI 70 will then generate an add network protocol window 113 as shown in FIG. 8C. To add a network protocol to the network protocol list, the system administrator inputs the information requested in the add network protocol window 113, i.e., the name of the protocol, the port number associated with the protocol, and the commonly known alias for the protocol, and selects a log traffic check box to indicate that IP packets transferred via the network protocol are to be logged. Finally, the operator selects the Apply button. A record is then added to a global network protocols table 112 in the database 72 shown in FIG. 9A for the newly added protocol.

The record added to the global network protocols table 112 includes a global protocol ID identifying the record itself, a global protocol name of the network protocol, the commonly known port number for the protocol. In addition, a log flag is set or cleared to indicate whether or not IP packets transmitted using the network protocol are to be logged, and an access flag is set or cleared to indicate whether or not IP packets transmitted using the network protocol are allowed to pass through the filter engine 78. Finally, a notify flag is set or cleared to indicate whether or not a user is to be notified of the action taken by the filter engine 78 when filtering an IP packet transmitted using the network protocol. It will be appreciated that if the log traffic check box is selected by the system administrator, the log flag is set. Otherwise, it is cleared. In addition, the access flag is set to the same value as block network services flag and the notify flag is set to the same value as the notify flag in the corporate default table 110. Finally, a rule type code is set to indicate that the rule to be defined from the policy is a network protocol rule.

Returning to FIG. 8B, if the system administrator wishes to edit a network protocol listed in the maintain network protocols window, the system administrator highlights the desired protocol and selects the Edit button. The add network protocol window 113 is generated by the GUI 70 once again, and the system administrator can enter the updated information for the network protocol. The corresponding record for the network protocol will then be updated by the database 72 in the global network protocols table 112.

If the system administrator wishes to delete a network protocol from the network protocol list shown in the maintain network protocols window, the system administrator highlights the desired network protocol and selects the Delete button. The database 72 then deletes the corresponding record for the network protocol from the global network protocols table 112. Returning to FIG. 7A, once the global network protocols table 112 is updated in block 230, the database 72 sets a global network protocol transmit flag in a block 232.

Figure 8D:
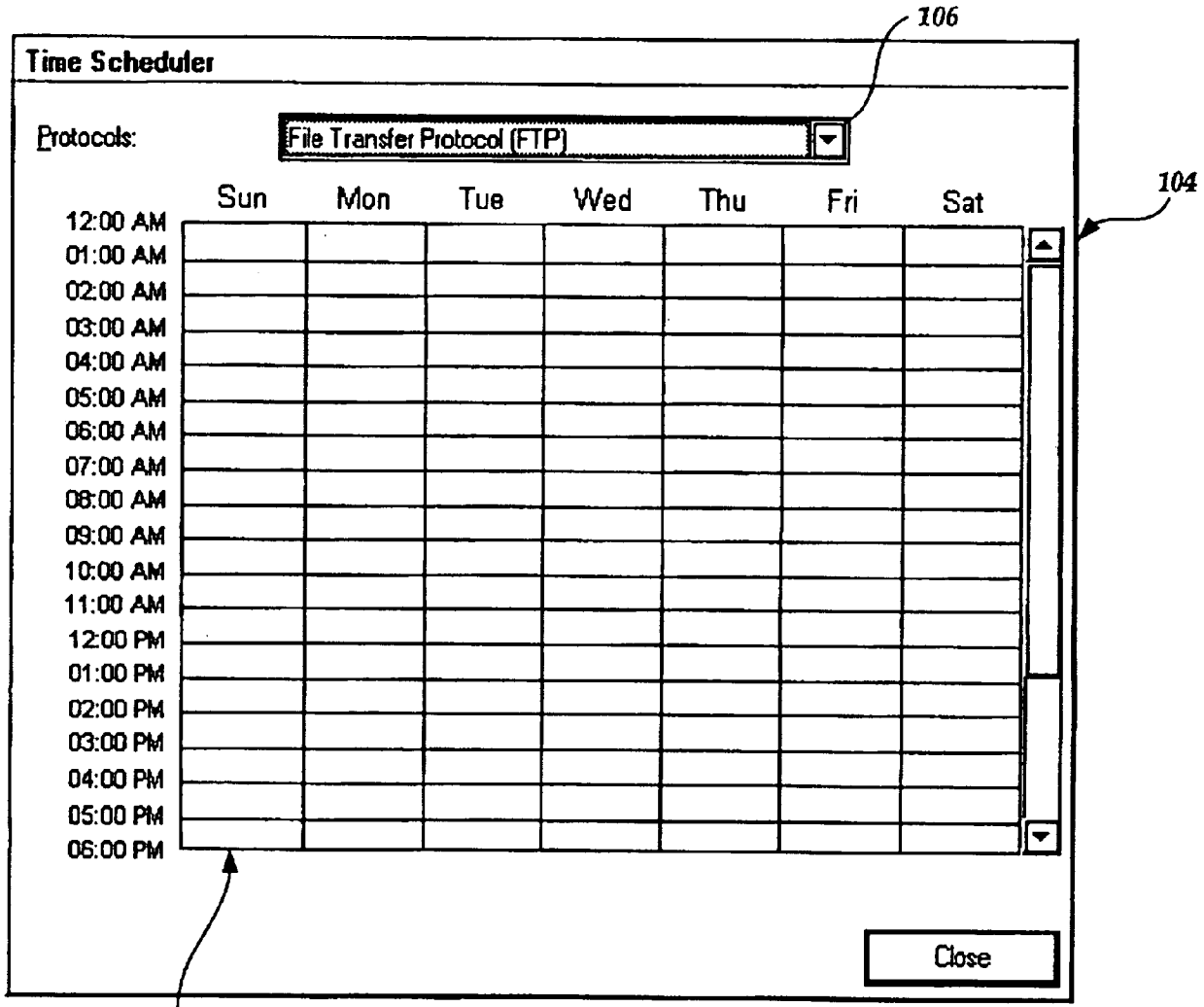

Returning to decision block 222, if the corporate default option is not selected, is not available to the operator of the administrative computer (because the operator is a mid-level administrator or a manager), or has been selected and the corporate defaults chosen, the logic will proceed to a decision block 234 where it determines if the time scheduling toolbar button 94 has been selected. It will be appreciated by those of ordinary skill in the art that the time scheduling toolbar button 94 will be greyed out in the main window 84 displayed to a mid-level administrator or a manager. If the time scheduling toolbar button 94 is selected by the system administrator, a time scheduling window 104 as shown in FIG. 8D is generated by the GUI 70 on the display 58 of the system administrator's administrative computer 54. To schedule times when all users of the LAN 44 are denied access to information communicated via certain application protocols, the system administrator selects the desired protocol from a pull-down protocol menu 106 and highlights a block of time during which the protocol is to be denied in a time table 107. For example, if a system administrator determines that users do not require access to the WWW for business purposes, the system administrator can allow access to information communicated via HTTP after business hours only by selecting HTTP from the pull-down protocol menu 106 and highlighting the hours of 9 a.m. through 5 p.m. in the time table 107. The information is transmitted by the GUI 70 to the database 72 when the system administrator closes the window 104 using the Close button.

Figure 9D:
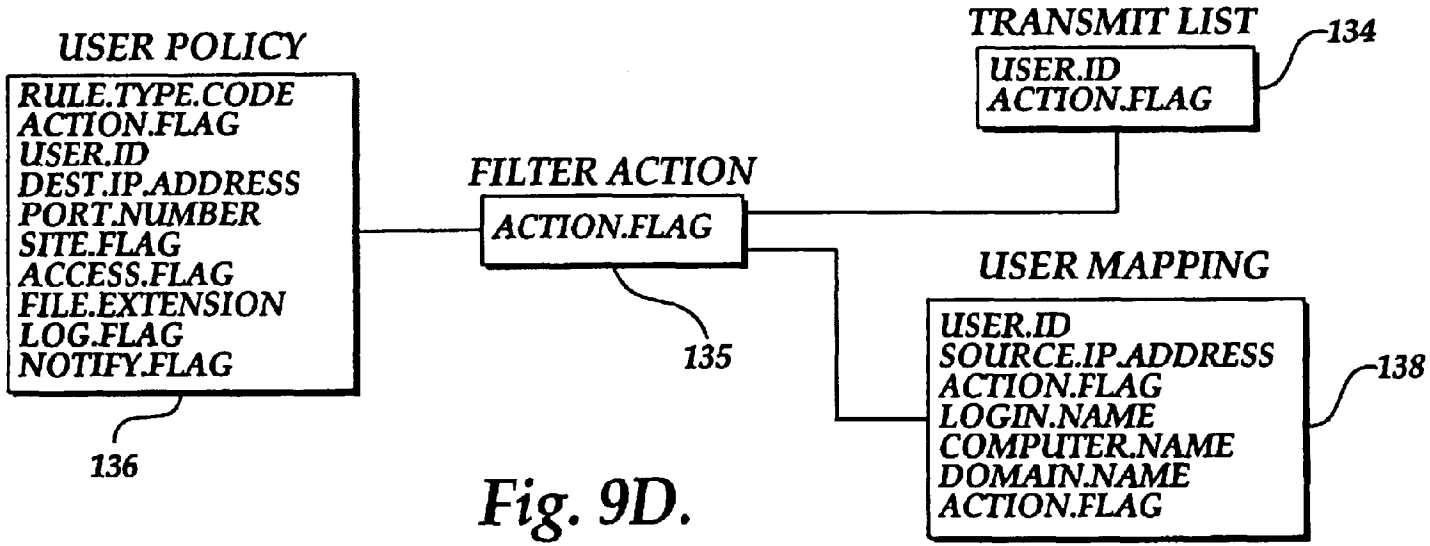
Figure 9B:
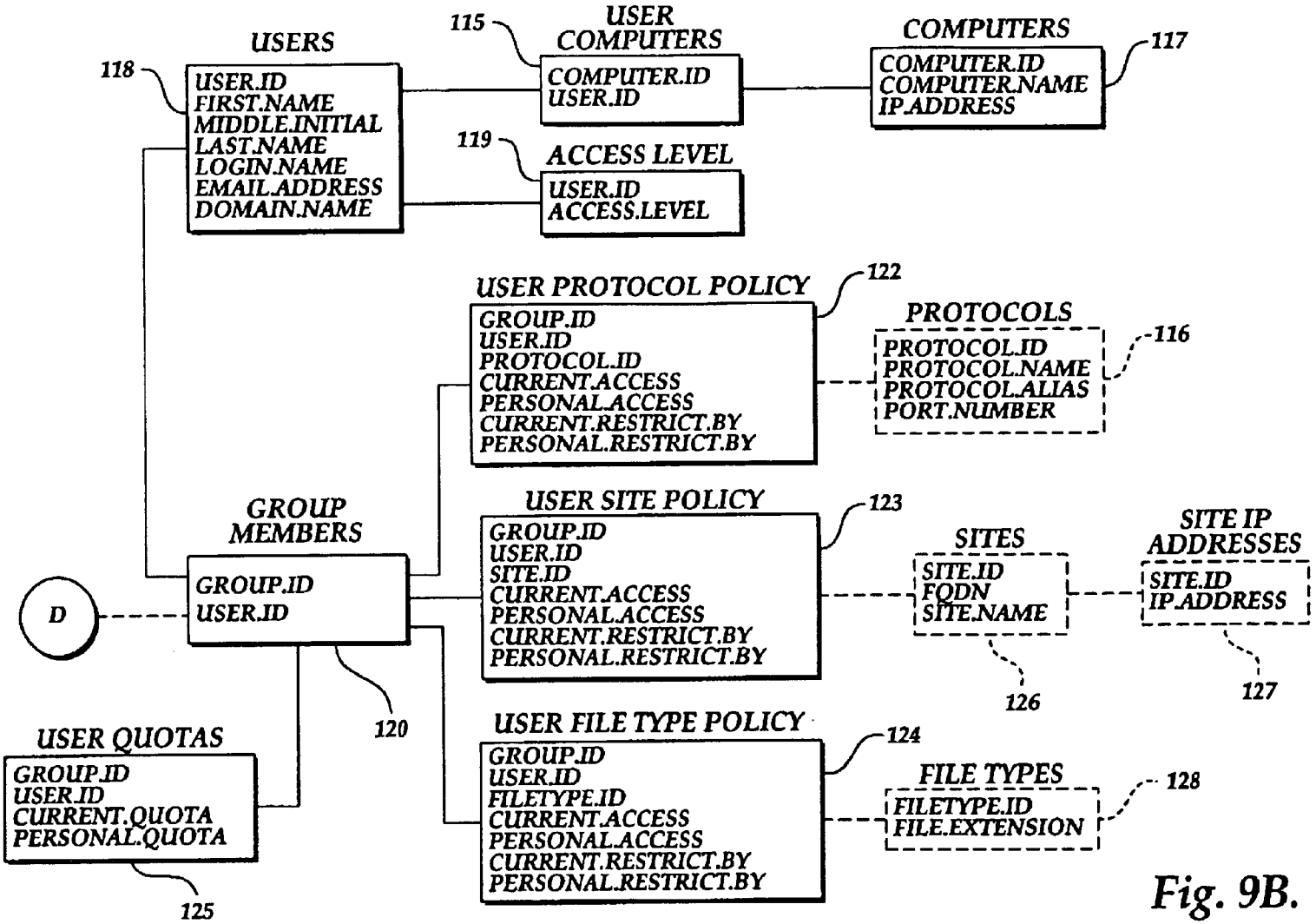
Figure 9C:
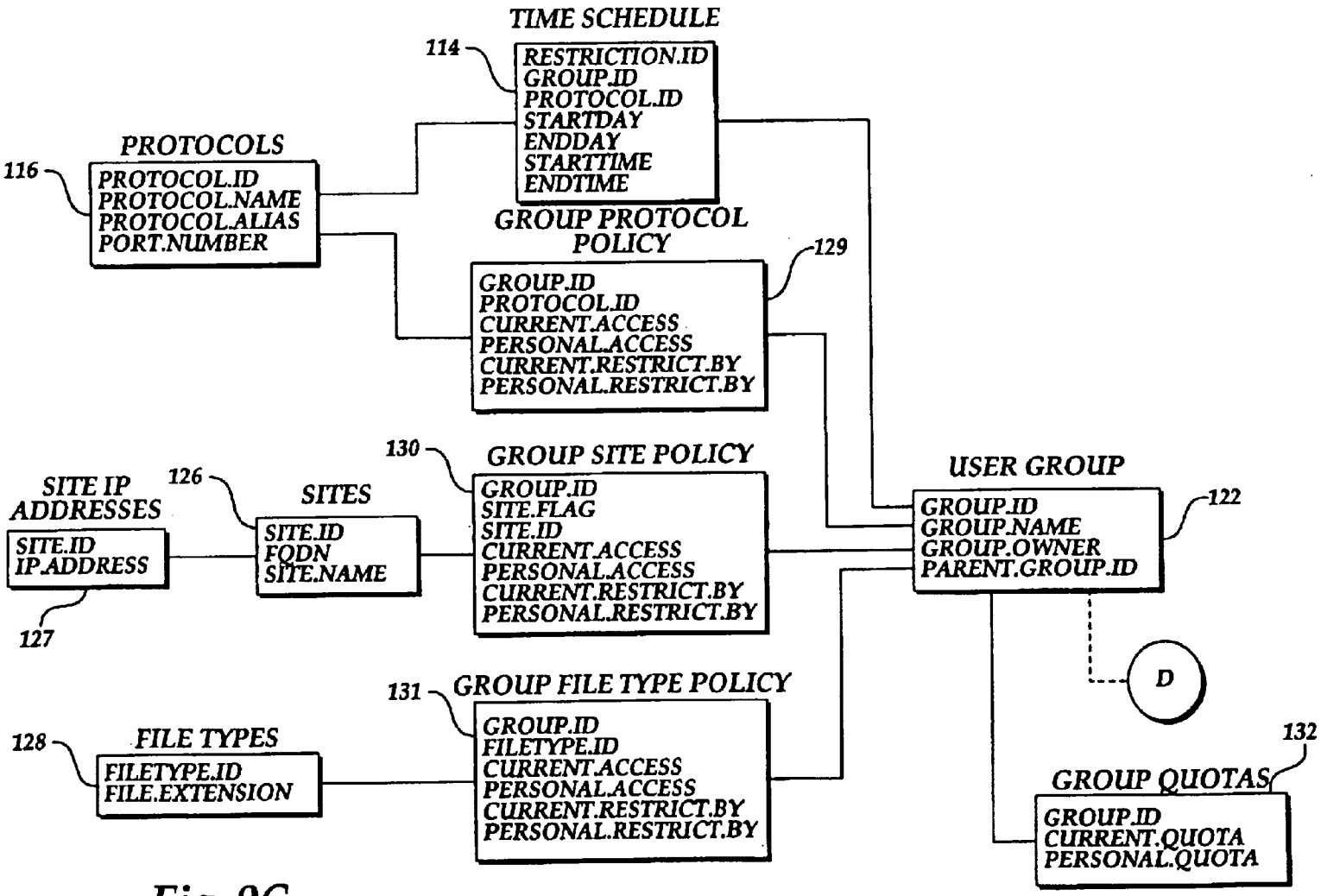

Returning to block 236 in FIG. 7A, once the system administrator selects the desired protocol and the time period during which the desired protocol is to be denied, a record is added in block 238 to a time schedule table 114 maintained in the database 72 as shown in FIG. 9C. Specifically, the record includes a restriction ID field identifying the record itself, a group ID identifying a record in a user group table 121 containing certain information about the corporate group, a start day, and end day, a start time, and an end time, which identify the day and time at which the protocol restriction is to begin and end, respectively. In addition, the time schedule record includes a protocol ID which identifies a record in a protocols table 116 containing certain information about the protocol being denied. After the time schedule record for the newly defined time restriction is added to the time schedule table 114 in block 238, a time schedule transmit flag is set in a block 240 that indicates that the time schedule table 114 is ready to be transmitted to the filter executive 76.

Returning to decision block 234, in FIG. 7A if the time scheduling option has not been selected, is not available, or has been selected and the desired time restrictions entered by the system administrator, the logic proceeds from decision block 234 to a decision block 242 where it determines if a user add, edit, or delete tool bar button, 90a, 90b, or 90c, respectively, has been selected. As noted above, only system administrators and mid-level administrators may add, modify or delete users to the user list 88. Managers are prohibited from doing so, and thus the user add, edit and delete toolbar buttons 90a, 90b and 90c in the main window 84 displayed to a manager are greyed out.

Figure 8E:
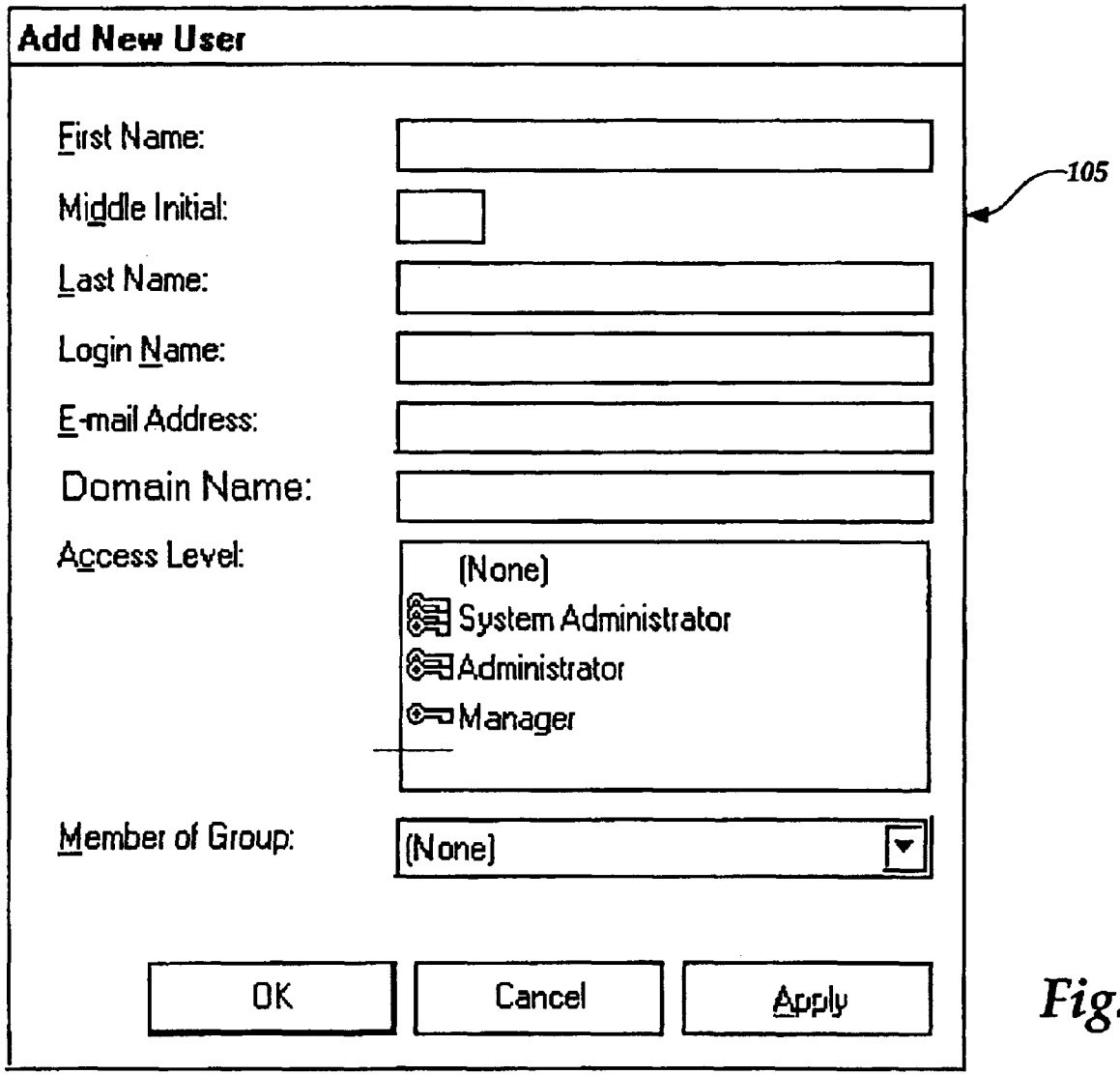

When a system administrator or mid-level administrator selects the user add toolbar button 90a, an add new user window 105 is generated by the GUI 70 as shown in FIG. 8E. The system administrator or mid-level administrator inputs the information requested for the user, i.e., the user's first name, middle name, last name, login name, E-mail address and domain name. In addition, the user is assigned an access level, i.e., system administrator, mid-level administrator, manager or none. Once the system administrator or administrator inputs the appropriate information and selects the Apply button, a corresponding record for the user is inserted in a users table 118 in the database 72 as shown in FIG. 9B. The user record includes a user ID identifying the record itself, the first name, the middle initial, the login name, the E-mail address, and the domain name inputted by the user. If the user being added is a system administrator, mid-level administrator or manager, a record is also added to an access level table 119, otherwise a record is not added to the access level table 119. The access level record includes the user ID of the user's record in the users table 118 and the access level assigned to the user, i.e., system administrator, mid-level administrator, manager or none. Those of ordinary skill in the relational database arts will recognize that the user ID is used to match information for the user stored in the access level table 119 to information for the user stored in the users table 118.

Once a user is added to the user list 88, the user automatically becomes a member of the corporate group. Therefore, a record is added to the group members table 120. The group member record includes the user ID identifying the record in the users table 118 containing the user's vital information, and a group ID indexing the group member record in the group member table containing the pertinent information of the corporate group.

Finally, when a user is added to the user list 88, records for that user will be added to certain "policy" tables in the database 72. As will be described in more detail below, these policy tables include a user protocol policy table 122, a user site policy table 123, and a user file type policy table 124. In each table, a record is added for the user for each policy inherited by the user from the corporate group. Each such record includes: (1) the group ID which indexes the corporate group in the group members table 120; (2) the user ID which indexes the user in the users table 118; (3) a current access field which identifies whether the current policy for that user is to deny or allow access to a particular protocol, site or file type; (4) a personal access field for the user that identifies whether the personal policy for the user is to allow or deny access to a particular protocol, site or policy regardless of what the current access is for that user; (5) a current restricted by field which identifies the group or subgroup currently imposing a deny policy upon the user; and (6) a personal restricted by field that identifies from which group or subgroup the user would personally inherit its policy setting if not currently restricted by the group identified in the current restrict by field. The record added to each of the policy tables also includes an index into the table containing specific information regarding the particular policy being set. For example, each record added to the user protocol policy table 122 also includes a protocol ID which identifies the record in the protocols table 116 containing name, port, and alias information for the subject protocol. Similarly, each record for the user added to the user site policy table 123 includes a site ID identifying the record in a site table 126 containing domain name information for the subject site. Finally, each record for the user added to the user file type policy table 123 includes a file type ID identifying a record in a file type table 128 that identifies the file extension to which the user is being denied access.

In addition to the user protocol, site and file type policy tables 122, 123 and 124, a user quota table 125 is updated when a user is added to the user list 88. More specifically, a record for the user is added to the user quota table 125 that includes the group ID for indexing the corporate group record in the group members table 120, and the user ID for indexing the user's record in the users table 118, a current quota field identifying the current data transfer quota being imposed on the user, and a personal quota field that identifies that user's personal data quota that would be imposed if the user's current quota was removed.

Returning to block 246 in FIG. 7A, after the system administrator or midlevel administrator has added a user to the user list 88 and corresponding records have been added for the user to the users table 118, access level table 119, group members table 120, user protocol policy table 122, user site policy table 123, user file type policy table 124 and user quota table 125, the logic proceeds to a block 248 where a record for the user is added to a transmit list 134 stored in the database 72 as shown in FIG. 9D. As will be discussed in more detail below, the transmit list 134 is used to construct a user policy table 136. The user policy table 136 is a collection of records for each user from each of the user protocol, site and file type policy tables 122, 123 and 124. The user policy table 136 is ultimately provided to the filter executive 76 so that the filter executive may optimize the policies into a set of rules for each user that are used by the filter engine 78 to process IP packet traffic passing through the network server 50. The record for the user added to the transmit list includes the user's user ID and an action flag that indicates whether the filter engine 78 should add, replace or delete its corresponding rule for the user. When a user is being added to the user list 88, the action flag is correspondingly set to add, rather than replace or delete.

Although a user can be added to the user list 88 as just described, it is also possible to edit the user's existing records in the database 72 or to delete the user from the user list 88 entirely. To modify the user's vital information, the system administrator or mid-level administrator highlights the desired user in the user list 88 and selects the user edit toolbar button 90b in the main window 84. The add new user window 105 is displayed again and the system administrator or mid-level administrator inputs the new information. The user's record in users table 118 is then modified with the new information. If the user's access level is changed, the user's corresponding record in the access level table 119 will be modified accordingly. However, since the user's user ID will not change upon modification of vital information, it is not necessary to add, modify or delete any of the user's corresponding records in the group members table 120, user quota table 125, user file type policy table 124, user site policy table 123, or user protocol table 122.

If the user's corresponding records in the users table 118 are modified in block 246, the logic proceeds to a block 248 where a record for the user is added to the transmit list 134 containing the user's user ID and a replace action flag.

A user is deleted from the user list 88 by highlighting the desired user in the user list 88 and selecting the delete user toolbar button 90c. Consequently, the database 72 deletes all of the user's corresponding records in the users table 118, access level table 119, user protocol policy table 122, user site policy table 123, user file type policy table 124, user quota table 125 and group members table 120 in block 246 of FIG. 7A. In block 248, a record for the deleted user is added to the transmit list 134 containing the user's user ID and a delete action flag.

Figure 8F:
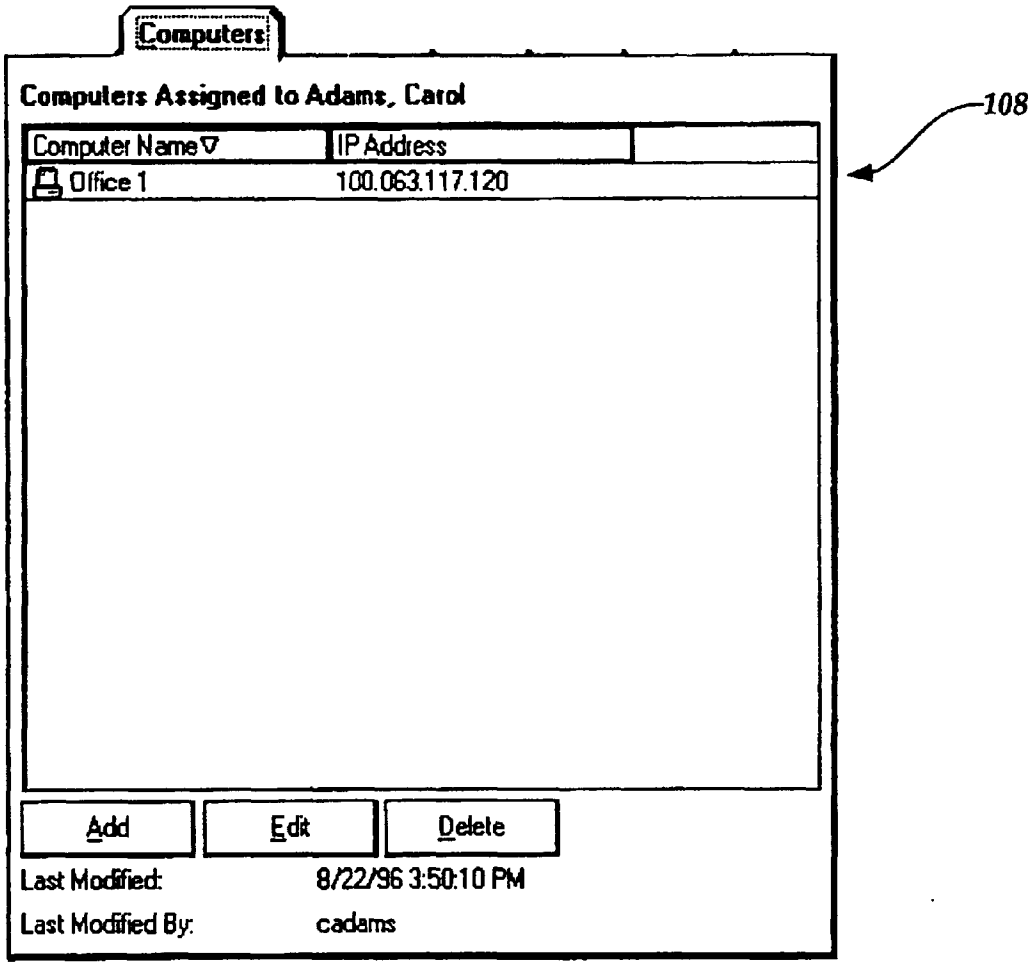
Figure 8G:
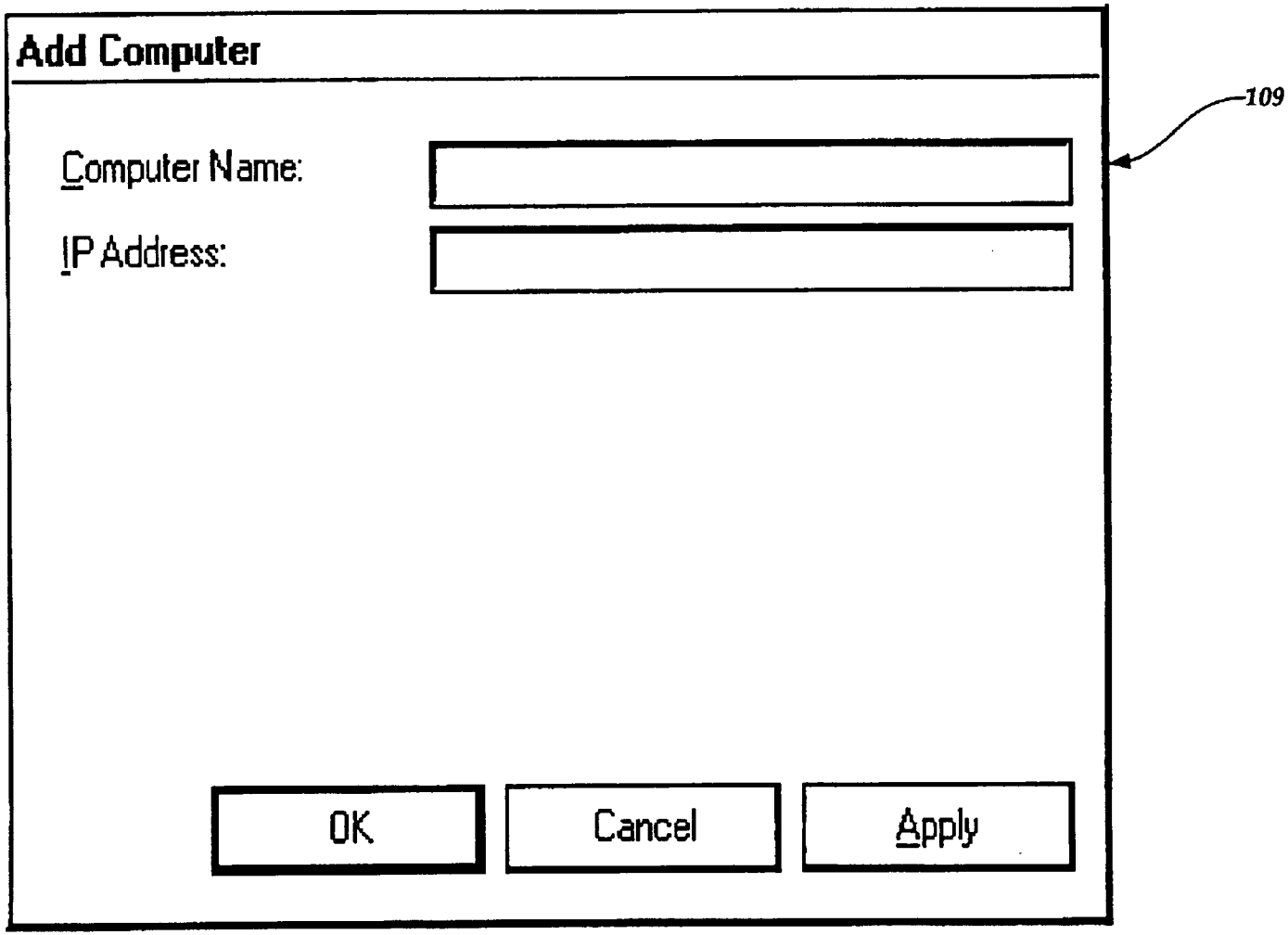

Returning to decision block 242 in FIG. 7A, if a user add/edit/delete option is not selected, is not available, or has been selected and a user has accordingly been added, modified, or deleted, the logic will proceed to a decision block 250 where it determines if the computer mapping option has been selected from the main window 84. To assign a user to an administrative computer 54 or a client computer 52, the system administrator or mid-level administrator highlights the desired user in the user list 88 and selects a computer tab 96 in the main window 84. In response, the GUI 70 generates a computer tab window 107 as shown in FIG. 8F. The computer tab window 108 lists the current mapping information, i.e., computer-to-user assignment or mappings for the highlighted user. To map a computer to the user, the Add button is selected and an add computer window 109 is generated by the GUI 70 as shown in FIG. 8G. The system administrator or mid-level administrator inputs the name of the computer to be assigned to the user and the IP address for the computer and selects the Apply button to transfer this information to the database 72.

Returning to block 252 in FIG. 7A, once the system administrator or mid-level administrator assigns the user to a computer, a record for the user's computer is added to a user computer table 115 in the database 72 in a block 254. As shown in FIG. 9B, the user computer record includes the user's user ID and a computer ID identifying a record in a computer table 117 that includes a computer name of the inputted computer (also referred to as a "host name") and the IP address of the computer inputted in the add computer window 109. It will be appreciated by those of ordinary skill in the relational database arts that a separate table 117 of computer records is maintained because it is possible for each user to be assigned to more than one computer on the LAN 44.

Once the user computer table 115 and the computer table 117 are updated as described above, a record for the user is added to a user mapping table 138 stored in the database 72 in a block 256. As shown in FIG. 9D, the user mapping table 138 includes a record for each mapping between a user in the user list 88 and a client computer 52 or administrative computer 54 connected to the LAN 44. Each user mapping record includes the user's user ID, the name of the computer to which the user is assigned, the IP address of the user's computer, the user's login name, the user's domain name, and an add action flag.

In addition to assigning a user to a computer, it is possible to modify or delete an existing computer-to-user assignment or mapping. To modify an existing mapping, the system administrator or mid-level administrator inputs a new computer name and/or IP address in the add computer window 109 shown in FIG. 8G and selects the Apply button. The user's records in the user computer table 115 and in the computer table 117 are then modified accordingly in block 254. In block 256, a record will be added for the user to the user mapping table 138 including the new computer name and/or IP address for the computer. In addition, the action flag will be set to replace so that the filter engine 78 replaces its current mapping record for the user with the modified user mapping record.

If the system administrator or administrator deletes a computer-to-user mapping in block 252, the corresponding records in the user computer table 115 will then be deleted in block 254. Accordingly, in block 256 a record for the user whose current mapping has just been deleted is again added to the user mapping table 138. However, an invalid IP address is stored in the user mapping record. In addition, the action flag is set to delete so that the filter engine 78 deletes the mapping for the corresponding user in its own user mapping table.

Returning to decision block 250 in FIG. 7A, if the computer mapping option is not selected, is not available, or has been selected and the mapping assigned, the logic will proceed to a decision block 258 where it determines if one of the add, edit or delete group toolbar buttons 92a, 92b or 92c has been selected. As noted above, managers, as well as system administrators and mid-level administrators, may add, modify and delete groups. However, in the actual embodiment of the invention described herein, managers are only allowed to modify and delete subgroups of the corporate group for which the manager is a group owner of the subgroup itself or one of the subgroup's ancestors, i.e., a manager is only allowed to delete subgroups that the manager has created itself, subgroups for which the system administrator or mid-level administrator has made the manager the group owner, or subgroups of such groups.

Figure 8H:
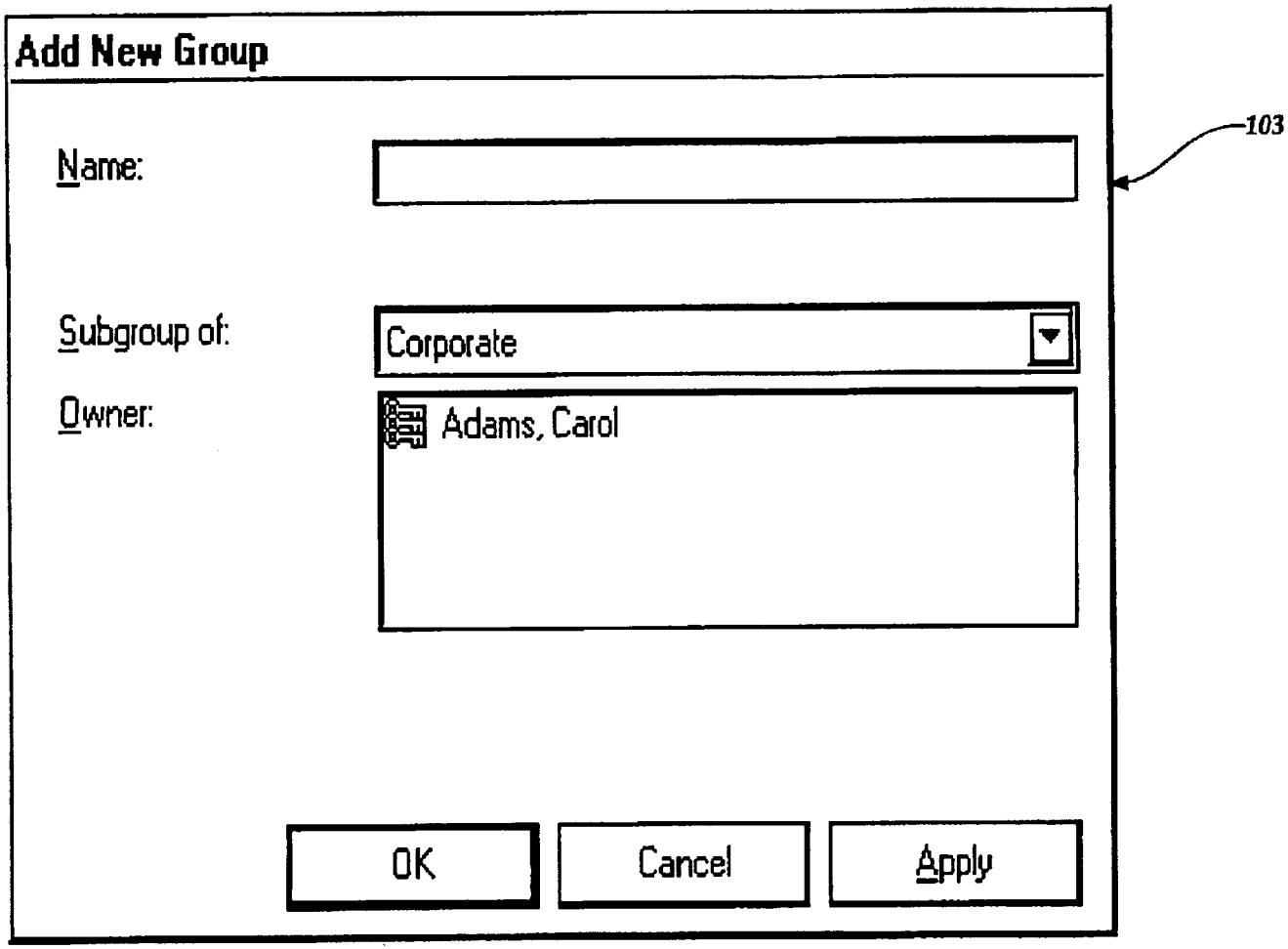
Figure 8I:
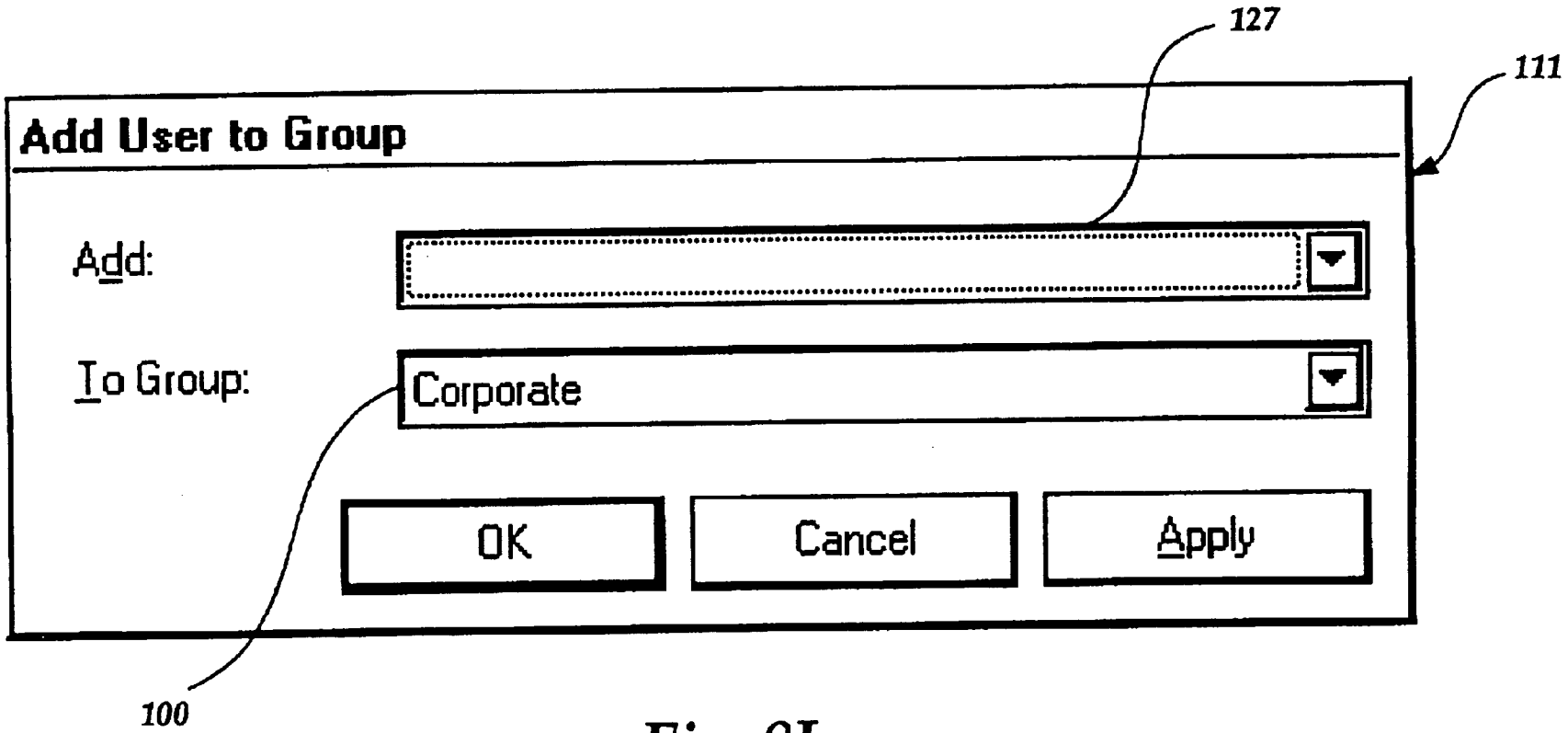

Returning to decision block 258, if the add group toolbar button 92a is selected by the system administrator, mid-level administrator, or manager (collectively referred to hereafter as "operator"), an add group window 103 as shown in FIG. 8H is generated by the GUI 70 on the display 58 of the administrative computer 54. The operator inputs the name of the new subgroup, selects the parent group of the new subgroup from a pulldown menu of existing groups and identifies the group owner of the subgroup, i.e., herself or another system administrator, midlevel administrator or manager.

Using the corporate environment example, a system administrator or mid-level administrator can create a subgroup of the corporate group for the finance department. The name of the new subgroup would be "Finance" and the new group would be a subgroup of the corporate group. The system administrator or mid-level administrator could then identify a manager as the group owner. If the manager wanted to subdivide the finance group into an international finance group and a domestic finance group, the manager wold enter the name of the international finance group and define it as a subgroup of the finance group, and so on. As will be described in more detail below, when a group is added, this group inherits all of the policies and quotas set for its parent group. In the example set forth above, the finance group inherits all of the policies and quotas set for the corporate group.

After the system administrator, mid-level administrator, or manager has added a new group to the group hierarchy 86 in block 260, a record for the group is added to the user group table 121 in the database 72. As shown in FIG. 9C, the user group record includes a group ID identifying the record itself, the name of the group, a group owner field storing the user ID of the operator who owns the group, and a parent group ID field. The parent group ID field stores the group ID of the record in the user group table 121 containing the parent group's relevant information.

A record for the newly added group is also added to a group protocol policy table 129, a group site policy table 130, a group file type policy table 131, and a group quota table 132. The group policy tables 129, 130, and 131 and the group quota table 132 are very similar to the user protocol, site and file type policy tables 122, 123, and 124 and user quota table 125 described above. More specifically, the records in each group policy table 129, 130, and 131 include group ID field, current access and personal access fields, and current restricted by and personal restricted by fields. In addition, the records of the group protocol policy table 129 include a protocol ID indexing the record in the protocol table 116 which identifies the allowed or denied protocol. Similarly, records of the group site policy table 130 include a site ID field indexing the group site table 126 and the records of the group file type policy table 131 include a file type ID field indexing the group file type table 128. Each record of the group quota table 132 also includes a group ID, a current quota and a personal quota. The difference between the group policy and quota tables and the user policy and quota tables is that records of the user policy and quota tables also include a user ID field that identifies corresponding user records in the users table 118.

It will be appreciated that when a new subgroup is added to the group hierarchy 86 and a record for the new subgroup is added to the group protocol policy table 129, the group site policy table 130, the group file type policy table 131, and the group quota table 132, the current access of the record is set equal to the current access in the parent group's corresponding policy record and a null value is stored in the personal access. In addition, the current restricted by field in the record is stored with the group ID of the parent group and a null value is stored in the personal restricted by field. Similarly, in the record added to the group quota table 132, the current quota for the newly added subgroup is set equal to the current quota in the parent group's corresponding quota record and the personal quota for the newly added subgroup will be set to zero.

Returning to decision block 250 in FIG. 7A, if the group edit toolbar button 92b is selected by a system administrator, mid-level administrator or manager, the add new group window 103 will again be generated by the GUI 70. The operator can enter a new name for the subgroup, change the subgroup's owner, or the subgroup's parent group. However, if the subgroup is an immediate child of the corporate group, the subgroup's parent can not be changed. Once the operator has modified the subgroup and selected the Apply button, the subgroup's corresponding records in the user group table 121, the group policy tables and the group quota table are modified.

To delete a subgroup from the group hierarchy 86, the operator highlights the desired subgroup and selects the delete group toolbar button 92c from the main window 84. Accordingly, the subgroups' corresponding records in the user group table 121, group protocol, site and file type policy tables 129, 130, and 131, and group quota table 132 are deleted. In addition, all of the records in the user policy tables 122, 123, and 124, user quota table 125, and group members table 120 for each user belonging to the deleted group or subgroup are deleted as well.

Returning to FIG. 7B, once users have been added to the user list 88 and subgroups of the corporate group have been added to the group hierarchy 86, system administrators, mid-level administrators, and managers may add users as members to existing groups and subgroups. Consequently, the logic will proceed to a decision block 264 in FIG. 7B where it determines if the user to group toolbar button 91 has been selected. If so, the GUI 70 generates an add user to group window 111 as shown in FIG. 81. The operator selects the name of the user from a user pull-down menu 127 and then selects the subgroup to which the user is to belong from a group pull-down menu 100. It will be appreciated that a manager may only add users to those subgroups for which the manager is the group owner. In addition, in the actual embodiment of the invention described herein, a user may belong to only one group at a time.

When the operator selects the Apply button, a record for the user is added to the group members table 120 as indicated in block 268 of FIG. 7B. The group member record includes the group ID for the subgroup to which the user is being added and the user ID for the user. Corresponding records including the group ID and the user ID are then added for the user to each of the user protocol, site and file type policy tables 122, 123, and 124, respectively, and to the user quota table 125. In this regard, the user inherits all of the policies and quotas of the group to which it has become a member. More specifically, the current access field in each of the records added to the user protocol, site and file type policy tables 122, 123, and 124 is set equal to the current access field in the subgroup's corresponding protocol, site and file type policy records and the current restricted by fields are stored with the group ID of the subgroup of which the user has just become a member. The personal access and personal restricted by fields are left unchanged. With respect to the user quota table 125, the current quota in the added record is set equal to the current quota in the subgroup's group quota record. The personal quota is left unchanged. Next, in a block 270 a record for the user added to the group or subgroup is added to the transmit list 134 containing the user's ID and a replace action flag.

Returning to block 268 in FIG. 7B, after the corresponding records for the user have been added to the appropriate user tables, a record for the user is added to the transmit list 134 including the user's user ID and an add action flag.

Figure 8J:
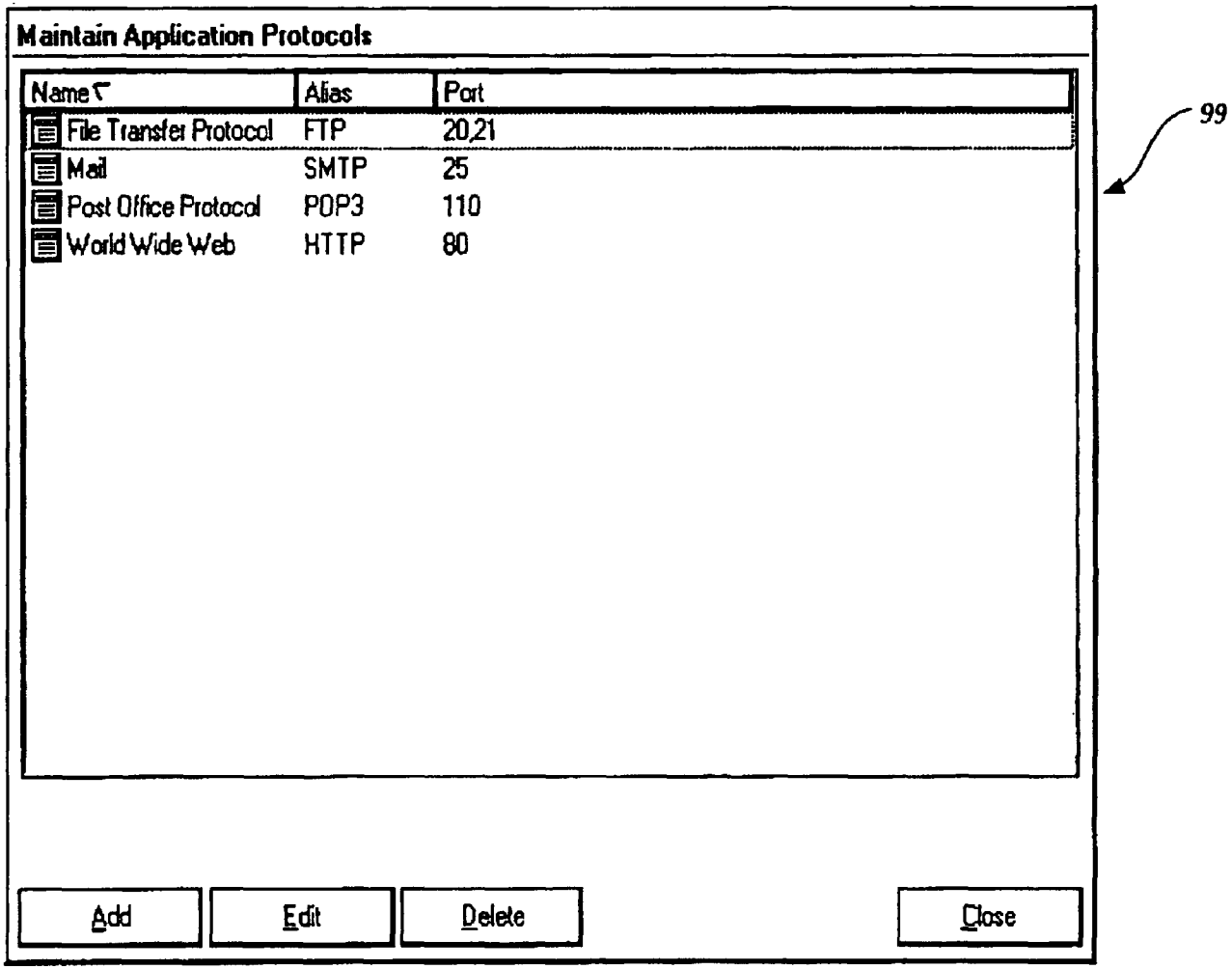
Figure 8K:
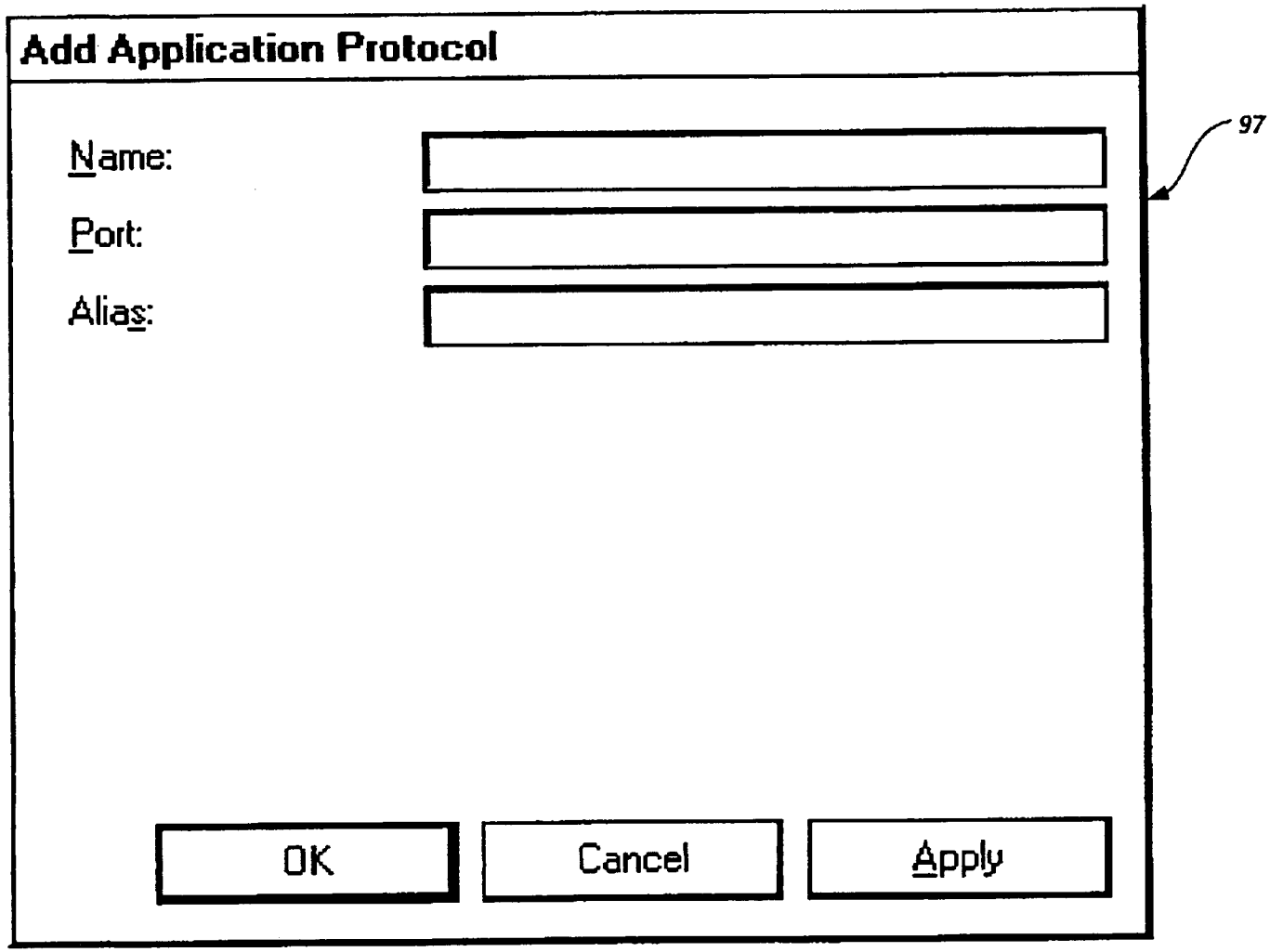

Returning to decision block 264, if the user to group option is not selected, is not available, or has been selected and the user added, the logic will proceed to a decision block 272 where it determines if a protocol add, edit or delete option, i.e., if a protocol toolbar button 98, has been selected in the main window 84. It will be appreciated that before any policies regrading a particular application protocol can be set, the application protocol must first be identified in the database 72. As noted above, only the system administrator is allowed to add, modify or delete application protocols. When the protocol toolbar button 98 is selected, the GUI 70 generates a maintain application protocols window 99 as shown in FIG. 8J. To add an application protocol, the system administrator selects the Add button. In response, the GUI 70 generates an add application protocol window 97 as shown in FIG. 8K. The system administrator inputs the name of the protocol, the port number for the protocol, and the commonly known alias for the protocol and selects the Apply button to transfer this information to the database 72. For example, if the system administrator wants to deny a user access to information transferred using the file transfer protocol, the system administrator would input that name, the alias "FTP," and port numbers 20 and 21.

Returning to block 276 in FIG. 7B, after the system administrator inputs the requested information, a record for the newly added application protocol is added to the protocol table 116 in database 72. The protocol record includes a protocol ID identifying the record itself, the name of the protocol, the protocol alias, and the port number commonly associated with the protocol as inputted by the system administrator.

In the actual embodiment of the present invention described herein, when a protocol is added to the protocol table 116, every group in the group hierarchy 86 and every user in the user list 88 is automatically allowed access to information communicated using that protocol. Therefore, corresponding records for the newly added protocol must be added to the group protocol policy table 129 and the user protocol policy table 122 for each user in the user list 88 and for each group in the group hierarchy 86. The records added for each group and for each user will include the protocol ID identifying the record in the protocol table 116 containing the relevant protocol information. In addition, the current access field in each record is set to allow.

Returning to block 272 in FIG. 7B, the system administrator can also modify and delete previously identified protocols. To edit an existing protocol, the system administrator highlights the desired protocol in the maintain application protocols window 99 and selects the Edit button. The add application protocol window 97 is again displayed. The system administrator inputs the new information pertaining to the protocol, i.e., name, port and alias and selects the edit button. Consequently, the corresponding record for the protocol in the protocol table 116 is modified to contain the new information. However, since the protocol ID field remains the same in the modified record, there is no need to modify the group or user protocol policy tables 129 and 122, respectively.

If the system administrator wishes to delete a protocol from the protocol table 116, and thus remove the protocol from the control of the network management program 80, the system administrator highlights the desired protocol in the maintain application protocol window 99 and selects the delete button. The corresponding record in the protocol table 116 is then deleted and any records in the group protocol policy table 129 and the user protocol policy table 122 containing the protocol ID for the deleted protocol are deleted as well.

After the corresponding records in the protocol table 116 and group and user protocol policy tables 129 and 122, respectively, have been added, deleted or modified as necessary in block 276, a record is added to the transmit list 134 for each user associated with the added, modified or deleted protocol. Each record includes the user's user ID and a replace action flag.

Figure 8L:
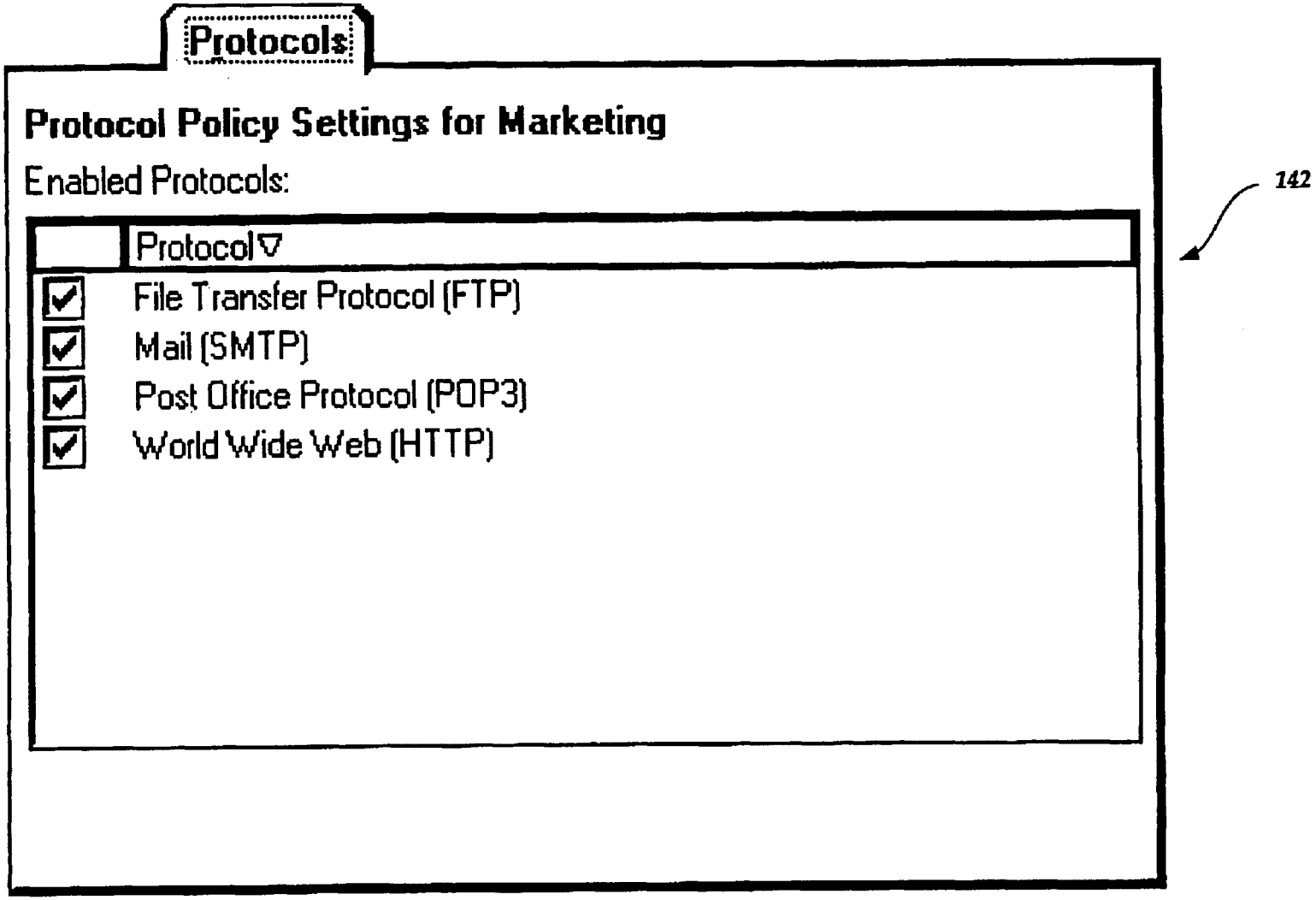
Figure 8M:
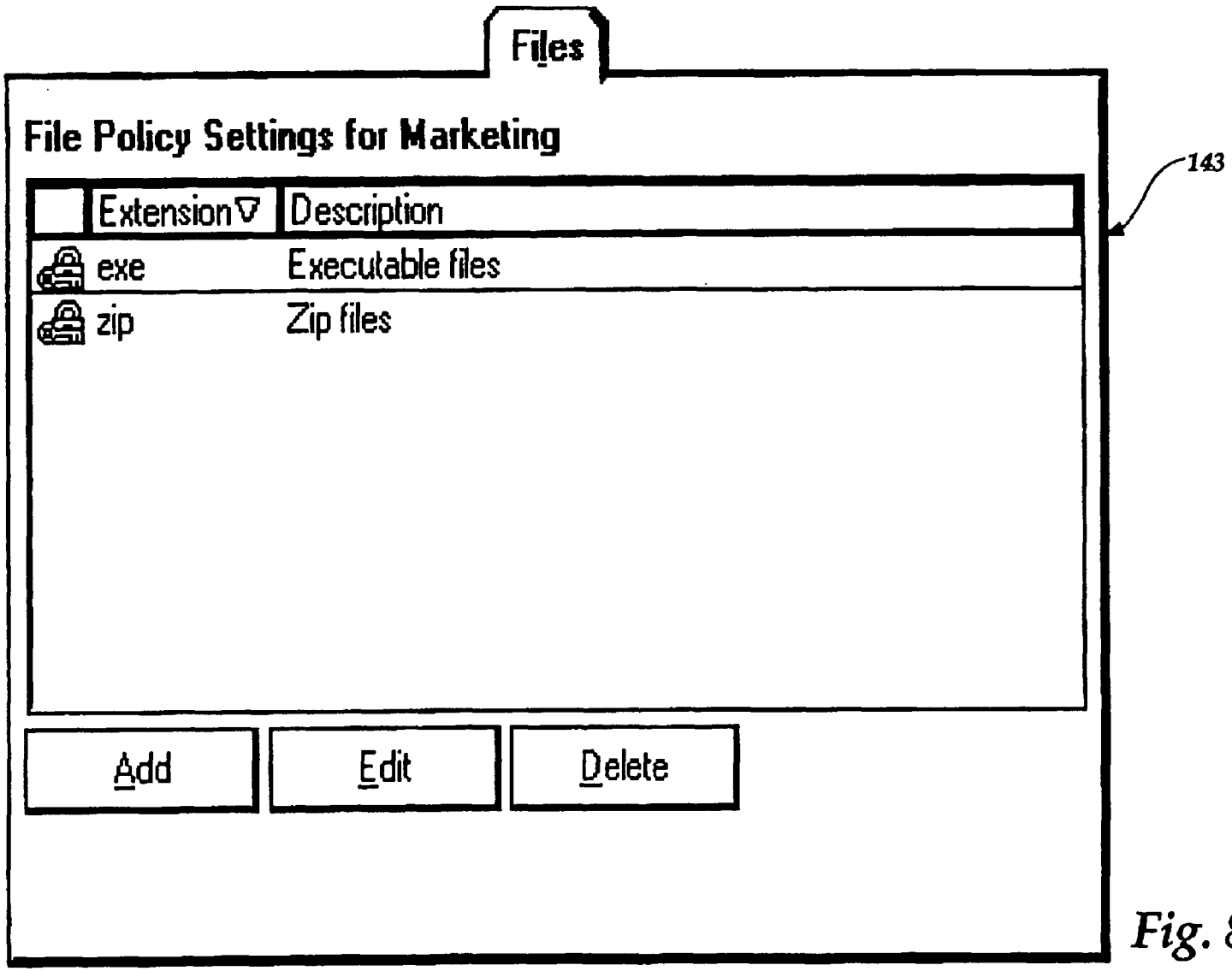
Figure 8N:
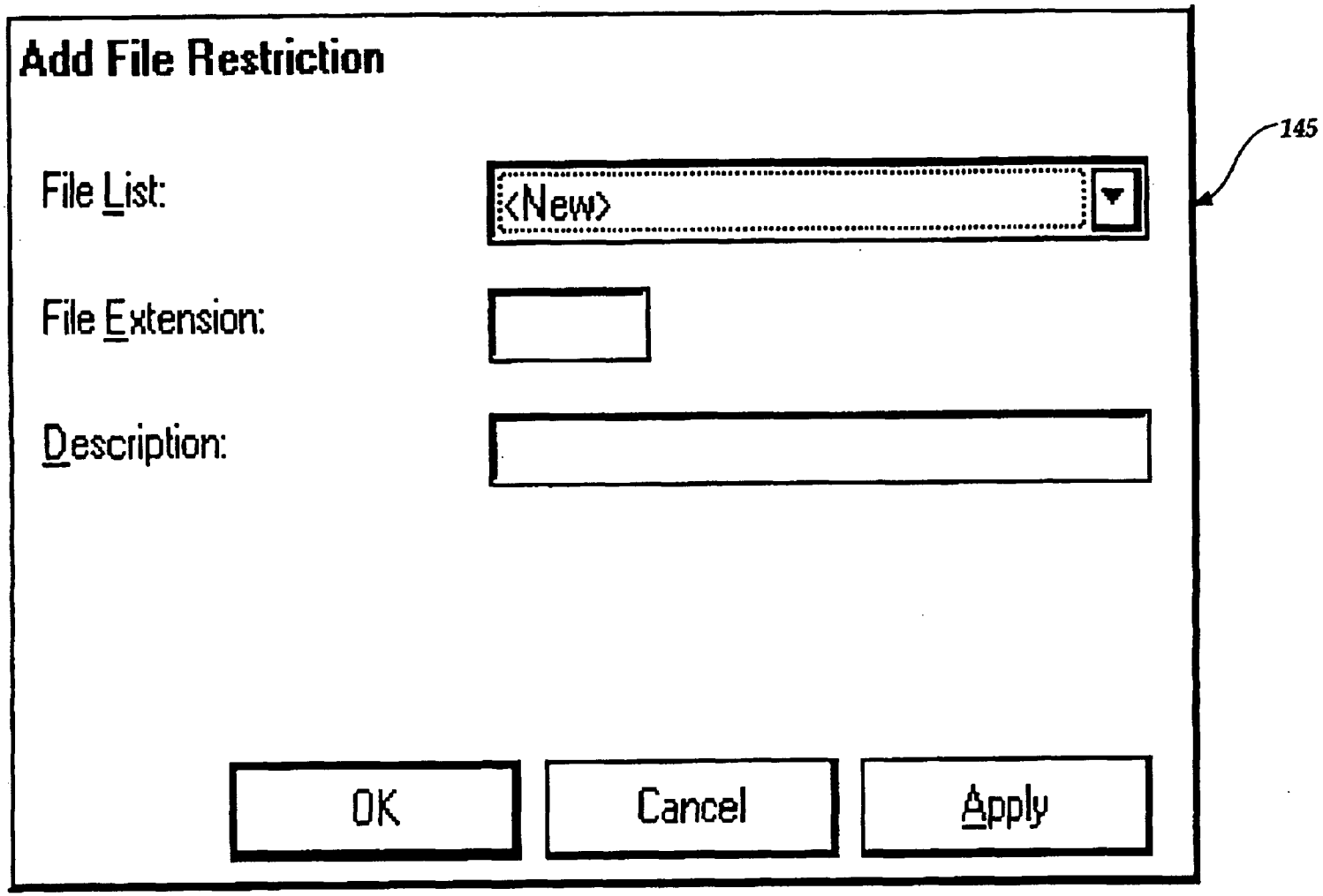
Figure 8O:
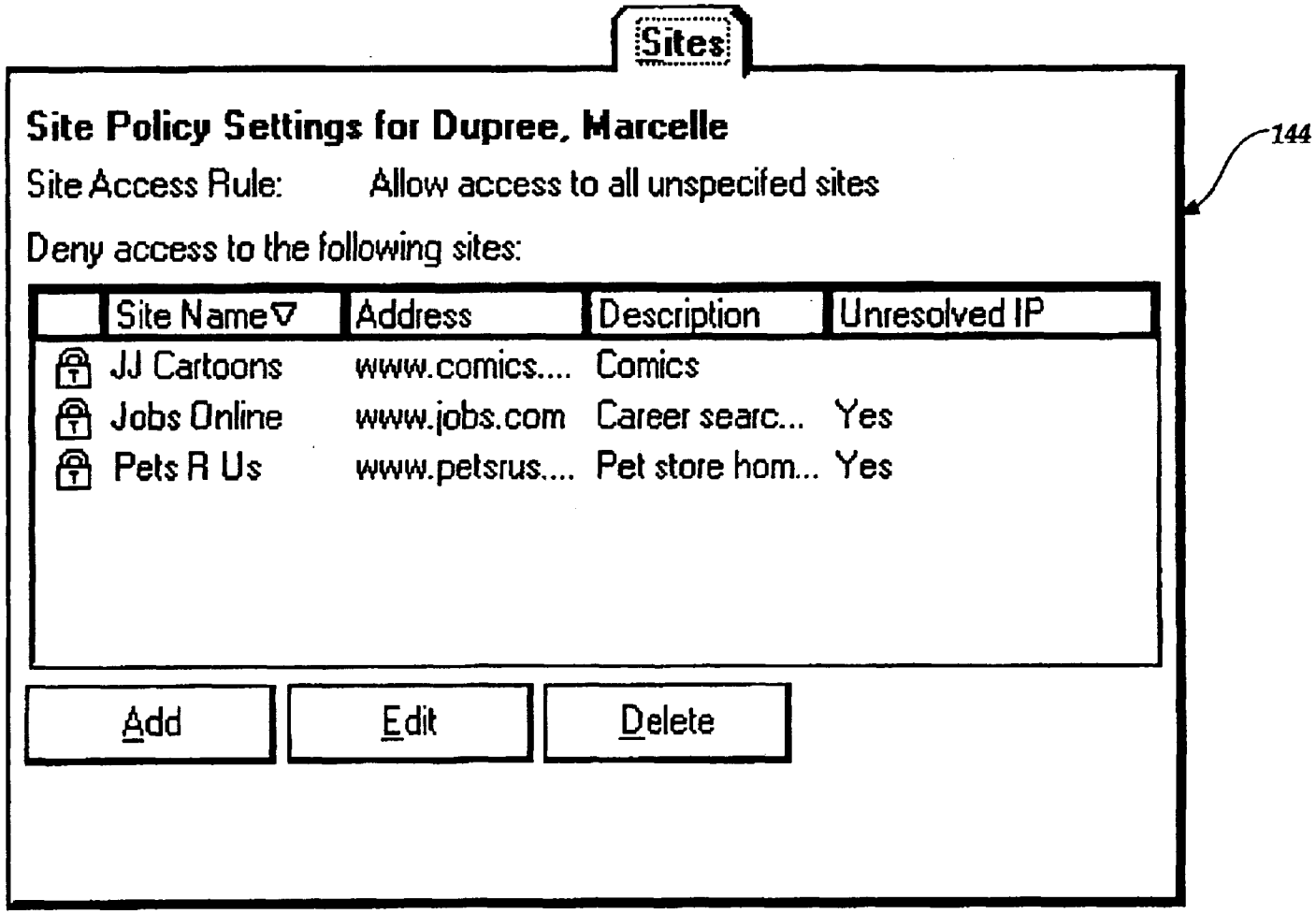

Returning to decision block 272 in FIG. 7B, if the protocol add/edit/delete option is not selected, is not available, or has been selected and an application protocol added, modified or deleted, the logic will proceed from block 272 to a decision block 278, where it determines whether one of the policy options has been selected. As described above, system administrators, mid-level administrators and managers are allowed to set protocol policies, site policies and file extension policies at both the group level and the user level. However, managers can only set policies for those subgroups for which the manager is a group owner and for those users belonging to the subgroups owned by the manager. In addition, only system administrators are permitted to set policies for the corporate group. To select a policy option for a group or user, the operator highlights the desired group in the group hierarchy 86 or desired user in the user list 88, and then selects a desired site policy tab 95, protocol policy tab 93, or file policy tab 81. Depending on which policy is desired to be set by the operator, a protocol policy tab window 142 as shown in FIG. 8L, a file policy tab window 143 as shown in FIG. 8M, or a site policy tab window 144 as shown in FIG. 8O, is generated by the GUI 70 on the display 58 of the operator's administrative computer 54. The operator then sets the desired policy from the displayed window 142, 143 or 144, as indicated in block 280 of FIG. 7B.

Once a policy has been set, the logic then proceeds to a decision block 282 where it determines if the policy was applied broadly against a group in the group hierarchy 86. If so, the corresponding records for the group and its subgroups in the appropriate group policy tables are updated in block 284 so that the policy set for the group is properly inherited by each of the group's subgroups and by each user belonging to the group and any of its subgroups. In addition, the corresponding records for any users belonging to the group and to any of its subgroups are updated in the appropriate user policy tables. The logic implemented by the database 72 to update the group and user policy records such that the group policy is properly inherited by all of the group's subgroups and all of the users belonging to the group and any of its subgroups will be described in more detail below.

Returning to decision block 282, if a policy has not been set for a group, the logic proceeds to a block 286 where it determines if the policy was applied individually against a user. If so, the logic proceeds to a block 288 where the corresponding records for the user in the appropriate user policy tables are updated. Once the records are updated, the logic proceeds to a block 290 and a record for the user is added to the transmit list 134 which includes the user ID and a replace action flag.

Returning to block 280 in FIG. 7B, the setting of group and user protocol policies from the main window 84 will now be described in more detail. If the system administrator, administrator or manager wishes to set a protocol policy for a group, the system administrator highlights the desired group in the group hierarchy 86 and selects the protocol policy tab 93 in the main window 84. The protocol policy tab window 142 is then generated by the GUI 70 as shown in FIG. 8L. The protocol policy tab window 142 includes a list of those protocols already identified by the network management program 80, i.e., those protocols found in the protocols table 116. To allow access to one of the application protocols listed in the protocol policy window 142, the operator selects the corresponding application check box. For example, if the operator wishes to allow access to World Wide Web information that is communicated using HTTP, the operator would select the World Wide Web check box. As will be described in more detail below, the highlighted group and its immediate member users are consequently provided access to information communicated using HTTP. In addition, if any of the group's subgroups and their members have not already personally denied themselves access to the selected application protocol, the subgroup and its member users may also be allowed to access information transferred using the selected protocol.

If the operator wishes to deny the highlighted group access to information transferred using one of the protocols listed in the protocol policy window 142, the operator clears the corresponding application check box. As will be described in more detail below, the highlighted group and its immediate member users are consequently denied access to information transferred using the corresponding application protocol. In addition, any subgroups of the highlighted group and any users belonging to the subgroups are also denied access to the application protocol.

Figure 10A:
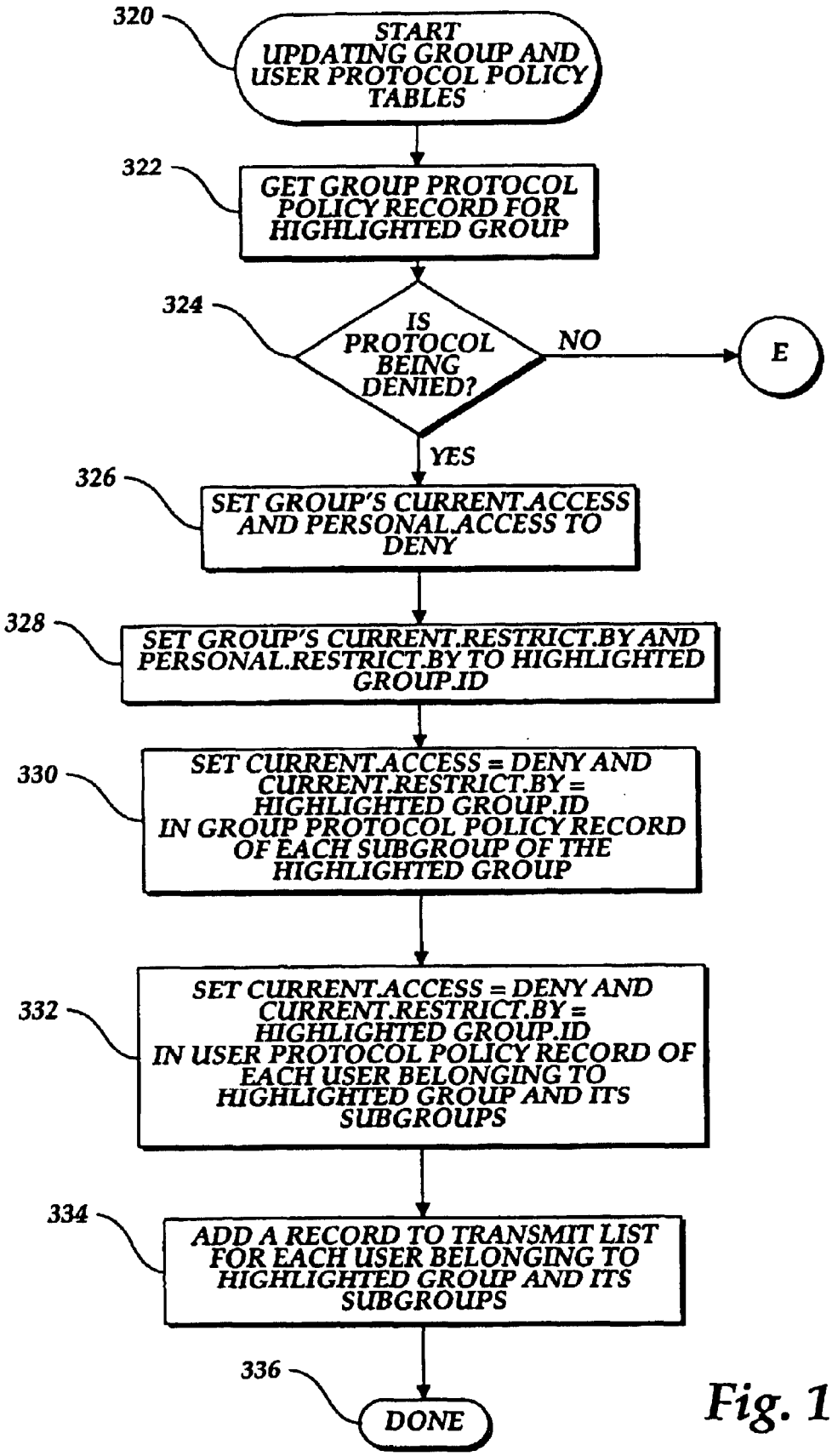
FIGS. 10A and 10B are a flowchart illustrating the logic used to update protocol policy tables stored in the database.

The logic implemented by the database 72 for updating the group and user protocol policy tables in the manner described above is shown in FIGS. 10A and 10B. The logic begins in FIG. 10A in a block 320 and proceeds to a block 322 where the group protocol policy record for the highlighted group and the protocol selected by the operator is retrieved from the group protocol policy table 129. Those of ordinary skill in the relational database arts will recognize that this record is easily retrieved by matching fields in the user group table, in the protocols table 116, and in the group protocol policy table 129. In a decision block 324, the database 72 determines if the operator has chosen to deny the protocol, i.e., the operator has cleared the corresponding check box in the protocol tab window 142. If so, the logic proceeds to a block 326 where the current access field and personal access field are both set to deny in the highlighted group's group protocol policy record. In block 328, the group's current restricted by field and personal restricted by field are set to the highlighted group's group ID.

Next, it is necessary to propagate the protocol deny policy through the group hierarchy 86 to the group's children so that the deny policy is inherited by all of the users belonging to the group, all of the group's subgroups and all of the users belonging to the group's subgroups. In this regard, the logic proceeds from block 328 to a block 330, where the current access field is set to deny in the group protocol policy record of each subgroup of the highlighted group. The current restricted by field in each record is stored with the group ID of the highlighted group.

Similarly, in block 332, the current access field is set to deny in the user protocol policy record of each user belonging to the highlighted group and each user belonging to any of its subgroups. The group ID of the highlighted group is stored in the current restricted by field in each such user protocol policy record as well. In a block 334, a record is added to the transmit list 134 for each user belonging to the highlighted group and any of its subgroups. The record includes the user ID for the user and a replace action flag. The logic then ends in a block 336.

Figure 10B:
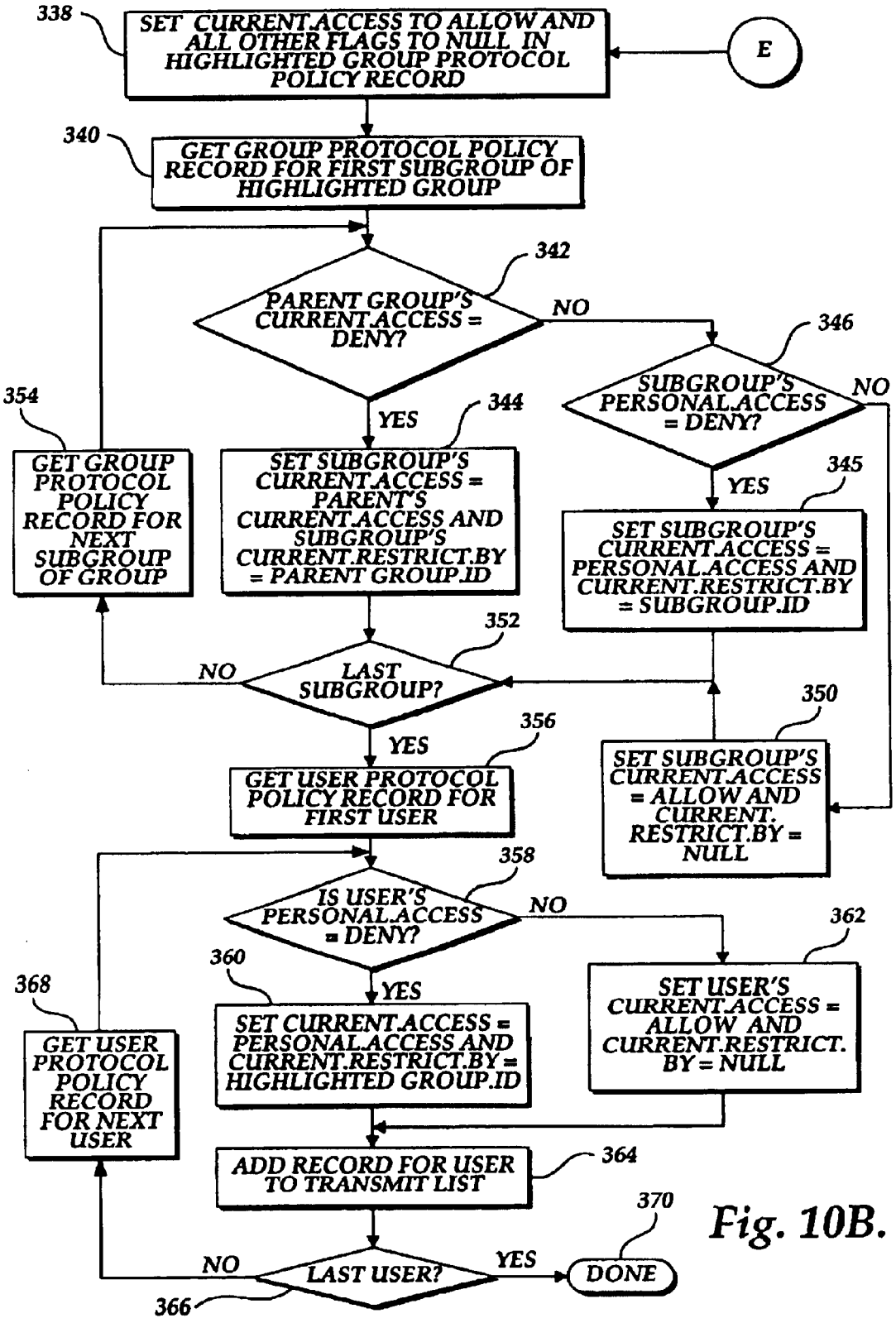

Returning to decision block 324, if the operator has chosen to allow the application protocol, the logic proceeds from decision block 324 to a block 338 in FIG. 10B. In block 338, the current access field in the group protocol policy record for the highlighted group is set to allow, while a null value is stored in the personal access field, the current restricted by field and the personal restricted by field. In contrast to the logic implemented by the database 72 when the protocol is being denied, the policy is only inherited by those users belonging to the group, those subgroups of the group, and those users belonging to those subgroups that do not already have a more restrictive personal protocol policy, i.e., a personal access field already set to deny. Therefore, before the protocol policy for a user or subgroup is set to allow, it must first be determined whether or not the subgroup or user has a more restrictive personal protocol policy.

In this regard, the logic proceeds from block 338 to a block 340 where the group protocol policy record for a first subgroup of the highlighted group that corresponds to the selected protocol is obtained from the group protocol policy table 129. In a decision block 342, the logic determines if the current access field in the corresponding group protocol policy record of the parent group is equal to deny. If so, the subgroup must inherit its parent's more restrictive protocol policy. Therefore, in block 344, the current access field in the subgroup's group policy record is set equal to the current access field in the parent group's group protocol policy record. In addition, the parent's group ID is stored in the current restricted by field in the subgroup's group policy record.

Returning to decision block 342, if the parent group's current access field is not equal to deny, the logic proceeds to a decision block 346 where it determines if the subgroup's personal access field is equal to deny. If so, the subgroup's current access field rolls back to its more restrictive personal protocol policy, i.e., the current access field in the subgroup's group policy record is set equal to its personal access field in a block 348. In addition, the subgroup's group ID is stored in the current restricted by field. In summary, if the subgroup has a personal policy to deny the selected protocol, the subgroup will revert back to its more restrictive personal policy rather than implement a less restrictive allow policy. Since the subgroup's current access field has in fact been determined by the subgroup itself, the subgroup's own group ID is stored in the current restricted by field.

Returning to decision block 346, if the personal access field is not equal to deny, the logic proceeds to a block 350, where database 72 sets the subgroup's current access field to allow and stores a null value in the current restricted by field, which indicates that the subgroup is currently not restricted by any particular group.

Once the current access and current restricted by fields have been set in the subgroup's group policy record, the logic proceeds to a decision block 352 where it determines if the group policy record of the last subgroup of the highlighted group has been updated. If not, the logic proceeds to a block 354 and the group protocol policy record for the next subgroup of the highlighted group is obtained. Blocks 342 through 354 are then repeated for each subgroup of the highlighted group. Consequently, only those subgroups of the highlighted group who do not have an immediate parent group with a current access field equal to deny and who do not have a personal access field equal to deny will inherit the highlighted group's lens restrictive protocol policy, i.e., the policy to allow the selected protocol.

Returning to decision block 352, when the group protocol policy record of the last subgroup has been updated, the logic proceeds to blocks 356 through 370 so that the corresponding user protocol policy record for each user belonging to the highlighted group and to any of its subgroups are updated. More specifically, in block 356, a user protocol policy record for a first user belonging to the highlighted group and any of its subgroups is obtained. In decision block 358, the logic determines if the personal access field in the user protocol policy record is equal to deny. If so, the user will roll back to its more restrictive personal policy to deny the protocol. More specifically, the current access field is set equal to the personal access field in the user protocol policy record in a block 360. In addition, the group ID of the highlighted group is stored in the current restricted by field, indicating that the user's protocol policy is currently being restricted by the highlighted group.

However, if the user does not have a more restrictive protocol policy, the logic proceeds from decision block 358 to a block 362 where the current access field is set equal to allow in the user protocol policy record. In addition, a null value is stored in the current restricted by field.

Once the current access field and current restricted by field have been set in the user protocol policy record, the logic proceeds to a block 364 in which a record for the user is added to the transmit list 134, including the user ID for the user and a replace action flag. Next, the database 72 determines in a decision block 366 if the user protocol policy record for the last user belonging to the highlighted group or any of its subgroups has been updated. If not, the user protocol policy record for a next user is obtained in a block 368. Accordingly, blocks 358 through 368 are repeated for each user belonging to the highlighted group or any of the highlighted group's subgroups so that the current access and personal access fields for each user are appropriately updated. After the user protocol policy record for the last such user has been updated, the logic ends in a block 370.

Returning to FIG. 7B, if the system administrator, mid-level administrator or manager sets a protocol policy for a user individually rather than a group, the logic proceeds through blocks 282 and 286 to a block 288 where the user's record for the selected protocol in the user protocol policy table 122 is updated. If the protocol policy is being set to deny for the user, the current access field and personal access field are set to deny in the user protocol record. However, if the protocol policy for the user is being set to allow, the current access field in the user policy record will only be set to allow if the current access field for the group to which the user belongs is not set to deny. In other words, if the user has inherited a more restrictive protocol policy from its parent group, that policy cannot be individually overridden with a less restrictive protocol policy. Thus, if the current access field for the group to which the user belongs is set to deny, the user's current access field remains set to deny, but its personal access field is set equal to allow.

Once the corresponding record for the user in the user protocol policy table 122 is updated in block 288, the logic proceeds to a block 290 where a record for the user is added to the transmit list 134 also stored in the database 72. The record will include the user ID of the user and a replace action flag.

In addition to setting protocol policies for groups and users, system administrators, mid-level administration and managers are also allowed to set file type policies. More specifically, groups and users can be prevented from downloading certain types of files, such as executable files with an ".exe" extension, or archive files with a ".zip" extension. Returning to the main window 84 shown in FIG. 6, the operator sets file type policies by first highlighting the desired group in the group hierarchy 86 or the desired user in the user list 88, and then selecting the file type tab 91 in the main window 84. In response, the file type tab window 143 as shown in FIG. 8M, is generated by the GUI 70. The file type tab window 143 includes a list of file extensions denied to the corresponding group or user. In order to deny access to a particular file type, the desired file extension must be added to the list of denied file extensions displayed in the window 143. Conversely, to allow access to a particular file type, the desired file extension must be deleted from the list of file extensions displayed in the window 143.

To add a file extension to the list of denied file extensions and thus deny access to files of that type, the operator selects the add button in the file policy tab window 143. In response, the GUI 70 generates an add file restriction window 145 as shown FIG. 8N on the display 58 of the administrative computer 54. The operator inputs the file extension to be denied and a description of the file extension. The operator then selects the apply button to send the inputted information to the database 72.

Returning to FIG. 7B, when the operator sets the file type policy to be applied in block 280 in the manner described above, the logic proceeds to a decision block 282 where it determines if the file type policy was set for a group. If so, the logic proceeds to block 284 where corresponding records for the group and its subgroups in the group file type policy table 131 and corresponding records in the user file type policy table 124 for the users belonging to these groups are updated. The logic implemented by the database 72 to update the group and user file type policy tables is shown in more detail in FIGS. 11A and 11B.

Figure 11A:
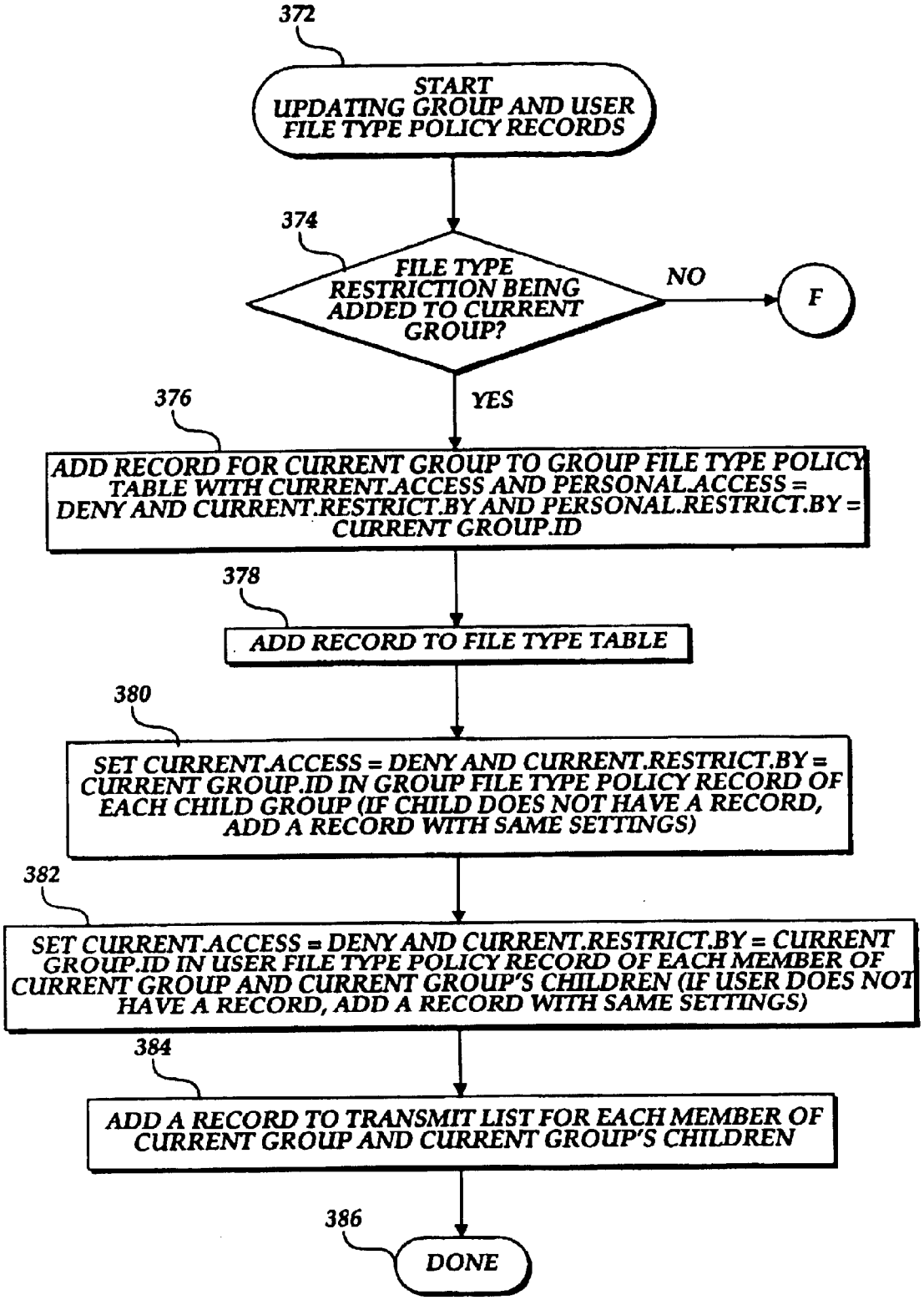
FIGS. 11A and 11B are a flowchart illustrating the logic used to update file type policy tables in the database.

The logic begins in FIG. 11A at a block 372 and proceeds to a decision block 374 where it determines if a file type restriction is being added to the highlighted group by the operator. If so, the logic proceeds to a block 376 where a record for the file extension being denied is added to the file type table 128 if it does not already exist. The record includes a file type ID identifying the record itself, the file extension being denied and a description of the file extension. In block 378, a record for the highlighted group is added to the group file policy table 131. The current access and personal access fields in the newly added record are set to deny and the group ID of the highlighted group is stored in the current restricted by and personal restricted by fields. In addition, the file type ID, which identifies the record in the file type table 128 containing the file extension being denied, is also stored in the newly added record. The result of decision blocks 376 and 378 is to set a file type deny policy for the highlighted group for the newly added file type. However, the file type deny policy for the file extension must then be inherited by all subgroups of the highlighted group, and all users belonging highlighted group and its subgroups.

In this regard, the logic proceeds to a block 380 in which the current access field in the group file type policy record of each subgroup of the highlighted group is set equal to deny and the group ID of the highlighted group is stored in the current restricted by field. However, it is possible that a subgroup does not have a group file extension policy record for the file type being denied. If so, a new record for the subgroup is added to the group file type policy table including the file type ID for the file extension being denied, a current access field set equal to deny and a current restricted by field storing the group ID of the highlighted group.

Once the group file type policy record for each of the subgroups of the highlighted group has been updated or added to reflect the file type deny policy, the user file type policy records for each user belonging to the highlighted group and any of its subgroups are updated in block 382. More specifically, the current access field in the user file type policy record of each such user is set equal to deny and the group ID of the highlighted group is stored in the current restricted by field. However, it is possible that the user does not already have a record in the user file type policy table 124 for the denied file extension. If so, a new record with the same current access and current restricted by fields as described above is added for the user that includes the file type ID identifying the record in the file type table 128 containing the file extension being desired.

Once all the user file type policy records have been updated in block 382, the logic proceeds to a block 384 where a record is added to the transmit list 134 in the database 72 for each user belonging to the highlighted group and any of its subgroups. Each record added to the transmit list includes the user ID of the user and a replace action flag. The logic then ends in block 386.

Figure 11B:
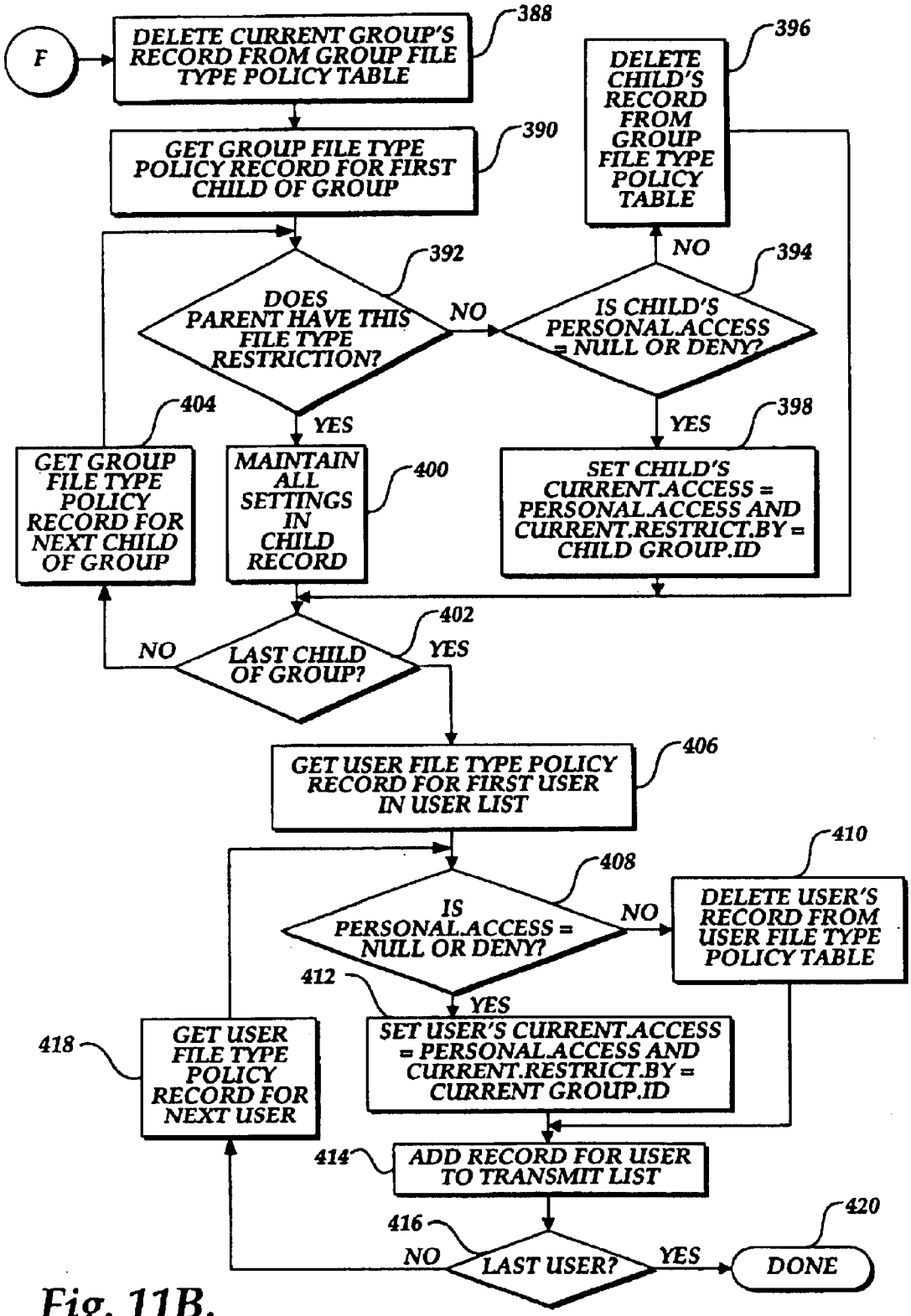

Returning to block 374, if a file type restriction is not being added to the list of file type extensions in the file type tab window 143, i.e., a file extension is being deleted from this list in the file restriction window 143, the logic proceeds to a block 388 in FIG. 11B. In block 388, the highlighted group's group policy record for the file extension being deleted is removed from the group file type policy table 124. It will be appreciated that if the group does not contain a record in the group file type policy table for a particular file extension, that group is not denied access to files having that file extension. In other words, that group is allowed access to files having that file extension.

Just because a group is allowed access to files having a particular file extension, it is not necessarily true that the users belonging to the group or its subgroups are allowed access to files having that particular file extension. More specifically, if any of the subgroups of the highlighted group or if any of the users belonging to the highlighted group and its subgroups have a more restrictive file extension policy for the particular file extension, i.e., a group or user file type policy record in which the personal access field is equal to deny, the corresponding file type policy record for the group or user will not be deleted, and the file type deny policy for that user or group will remain.

In this regard, the logic proceeds from block 388 to a block 390 in which the group file type policy record for the particular file extension is obtained for a first subgroup of the highlighted group from the group file type policy table. In a decision block 392, the database 72 determines if the parent of the subgroup has denied access to this file extension, i.e., if the parent group has a group file type policy record for the file extension being denied in the group file type policy table 131. If so, the subgroup has already inherited the more restrictive file type deny policy of its parent group. Therefore, if the result of decision block 392 is positive, the current access and personal access fields and current restricted by and personal restricted by fields in the subgroup's group file type policy record are left unchanged.

On the other hand, if the parent group does not restrict this file type, the logic proceeds to a decision block 394 where the database 72 determines if the personal access field in the group file type policy record for the subgroup is set to either null or deny. If so, the subgroup's current access field is rolled back to its personal access field in block 398. In addition, the group ID of the subgroup is stored in the current restricted by field. However, if the subgroup's personal access field is not set to null or deny, the logic proceeds to a block 396 where the subgroup's group file type policy record for the selected file extension is deleted from the group file type policy table 131.

Once the group file type policy record for the first subgroup of the group has been processed as discussed above, the logic proceeds to a decision block 402 where it determines if the group file type policy record for the last subgroup of the highlighted group has been processed. If not, the group file type policy record for the next subgroup of the highlighted group is obtained in a block 404. Blocks 392 through 404 are repeated for each subgroup of the highlighted group.

When the last subgroup of the highlighted group is processed, the logic proceeds from decision block 402 to blocks 406 through 418 where the corresponding user file type policy record for each user belong to the highlighted group and any of its subgroups is updated. In this regard, the user file type policy record for the selected file extension is obtained for a first user belonging to the highlighted group or any of its subgroups. In a decision block 408, the logic determines if the personal access field in the record is equal to null or deny. If so, the current access field setting is set equal to the personal access field in a block 412. In addition, the group ID of the highlighted group is stored in the current restricted by field. However, if the personal access field is not equal to null or deny, the user file type policy record is deleted in a block 410 from the user file type policy table 124.

Once the user file type policy record has been updated or deleted as described above, the logic proceeds to a block 414 where a record for the user is added to the transmit list 134, which includes the user's user ID and a replace action flag. Finally, the database 72 determines in a decision block 416 if the user file type policy record for last user belonging to the highlighted group and any of its subgroups has been processed. If not, the user file type policy record for the next user is obtained. Blocks 408 through 418 are then repeated for each user belonging to the highlighted group and any of its subgroups. When the record for the last user is finally processed, the logic ends in a block 420.

Returning to FIG. 7B, if the operator sets a file type policy against a user individually as opposed to a group, the logic proceeds through decision block 286 to block 288 where the corresponding record for the user is updated in the user file type policy table 124. It will be appreciated that, if a file extension restriction is being added for a user, i.e., access to a particular file type is being denied, the current access field in the user's file type policy record for that file extension is set to deny and a null value is stored in the current restricted by field. If a user file type record does not exist for the user and for the selected file type, a record with the same fields just described is stored in the user file type policy table 124. If a file type restriction on a user is being removed, the corresponding user file type policy record will be deleted if the group to which the user belongs does not have a record in the group file type policy table 131 corresponding to that file extension. Otherwise, the current access field in the user protocol policy remains denied, but the personal access field for the user will be set to allow.

Once the user file type policy record for the user has been updated or deleted from the user file type policy table 124 in block 288, a record for the user is added to the transmit list 134 including the user's user ID and a replace action flag in block 288.

Figure 8P:
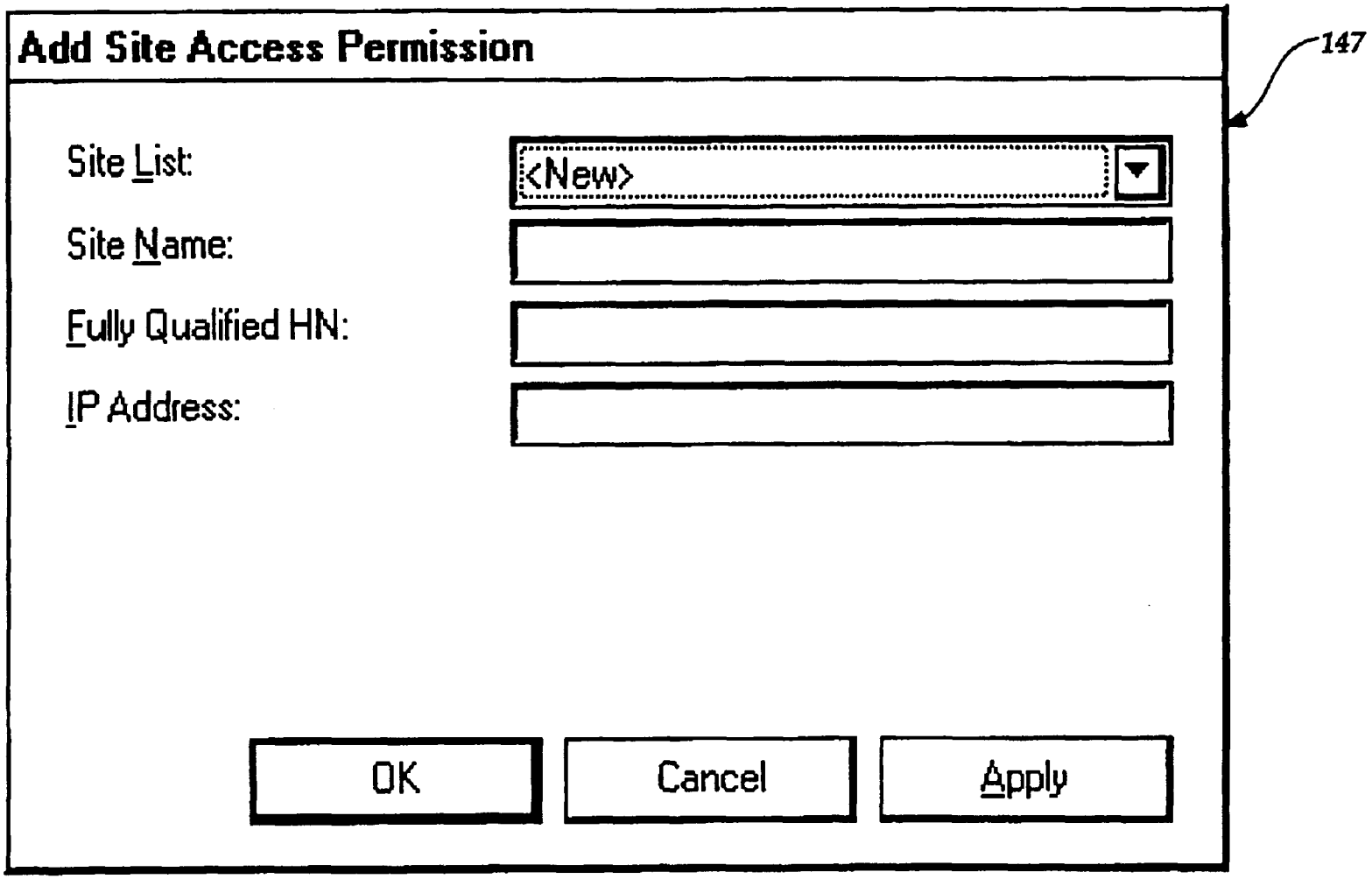

Returning to FIG. 7B, system administrators, mid-level administrators, and managers can also set site policies in addition to protocol and file type policies. In this regard, the operator highlights the desired group in the group hierarchy 86 or the desired user in the user list 88, and selects the site policy tab 95. In response, a site policy tab window 145 is generated by the GUI 70 as shown in FIG. 8O. From the site policy window 145, the operator can add, edit, or delete site policies for the highlighted group or user. In the actual embodiment of the present invention described herein, the operator can set site policy for groups and users in one of two ways: (1) allow access to all sites with the exception of specified sites; or (2) deny access to all sites with the exception of specified sites. Accordingly, if the site access rule is to allow access to all sites with the exception of specified sites, a list of denied sites is displayed in site policy tab window 145. Conversely, if the site access rule is to deny access to all sites except to specified sites, a list of allowed sites will be displayed in the site policy tab window 145. To add to the list of denied sites or allowed sites, whichever the case may be, the operator selects the Add button in the site policy tab window 145. In response, the GUI 70 generates an add site access permission window 147 as shown in FIG. 8P. The operator then inputs the name of the site being denied or allowed, and either the fully qualified domain name of the site, e.g., www.jobs.com, or the IP address of the site.

Figure 12:
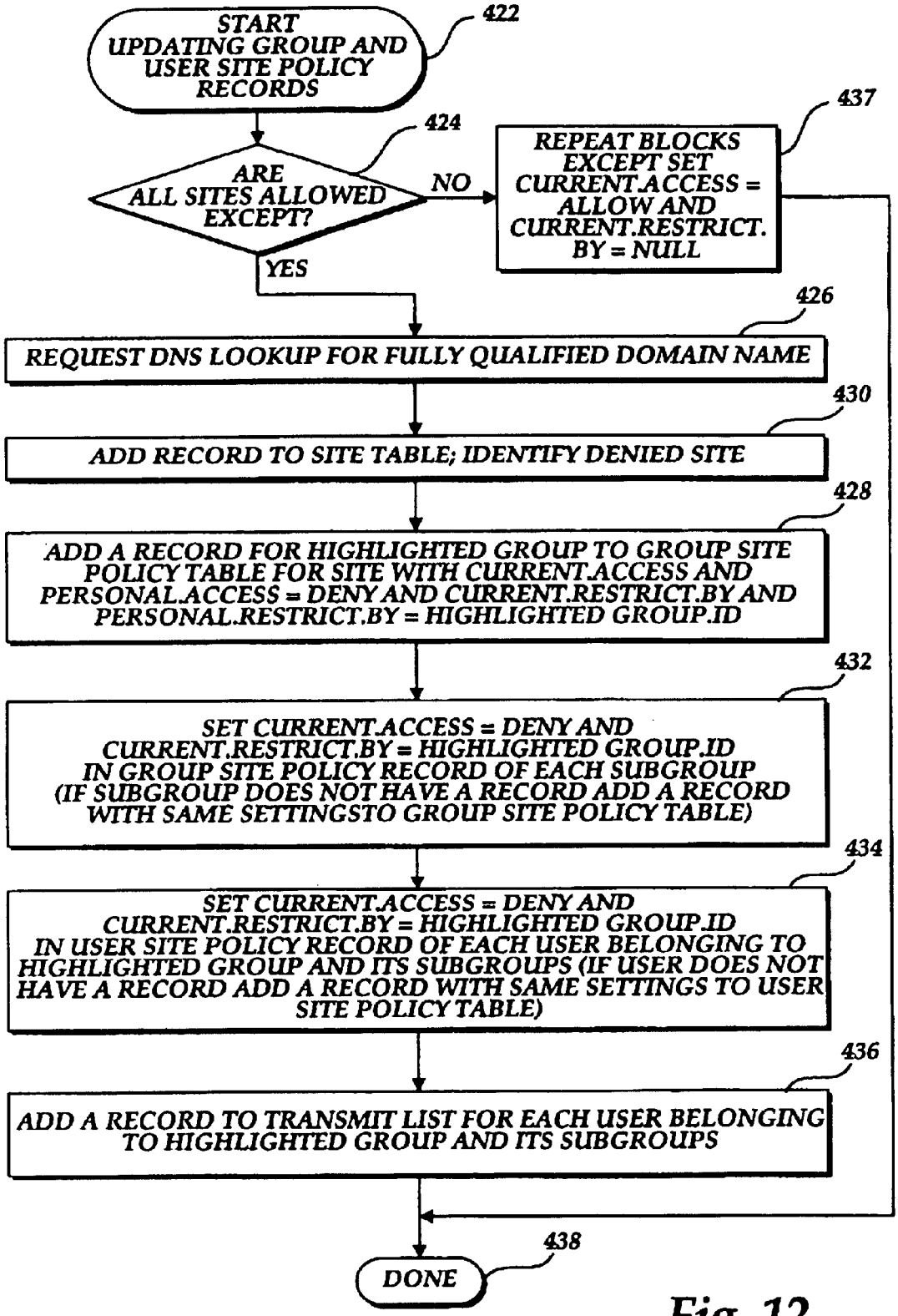
FIG. 12 is a flowchart illustrating the logic used to update site policy tables in the database.

Upon selection of the Apply button, the information inputted by the operator is transmitted to the database 72 by the GUI 70 in order to update the group and user site policy tables 130 and 123, respectively. In this regard, if the operator has set a site policy for a group rather than a user, the logic proceeds from a decision block 282 in FIG. 7B to a block 284 where the corresponding records in the group and user site policy tables are updated by the database 72. The logic implemented by the database 72 to update the group and user site policy records is shown in more detail in FIG. 12. The logic begins in FIG. 12 in a block 422 and proceeds to a decision block 424 where it determines if the site access rule is allow all sites except. If so, the logic proceeds to a block 426 where the database 72 uses a domain name server (DNS) look-up to resolve the inputted fully qualified domain name to one or more IP addresses. Those or ordinary skill in the art will appreciate that the DNS look-up is performed by a remote domain name server located on the Internet 40. In block 428, a record is added to the site table 126 including a site ID identifying the record itself, the inputted domain name, and the inputted site name. In addition, a record is added to the site IP address table 127 for each IP address to which the fully qualified domain name is resolved. Hence, each record added to the site IP address table 127 includes the site ID indexing the site table 126 and the resolved IP address. In block 430, a record for the highlighted group is added to the group site policy table 130. The record includes a site flag indicating that the site access rule is to allow all except, the site ID identifying the record for the denied site in the site table 126, current access and personal access fields equal to deny, and current restricted by and personal restricted by fields storing the group ID of the highlighted group.

Once the group site policy record for the highlighted group has been updated, the group site policy record of each subgroup of the highlighted group and the user site policy record for each user belonging to these groups must be updated so that the subgroups and users appropriately inherit the site policy of the highlighted group. Thus, in a block 432, the current access field in the corresponding group site policy record of each subgroup of the highlighted group is set equal to deny and the group ID of the highlighted group is stored in the current restricted by field. However, it is possible that the subgroup may not already have a record in the group site policy table 130. If so, a record having the same current access and current restricted by fields as described above is added to the group site policy table for the subgroup.

Similarly, in a block 434, the current access field is set to deny in the user site policy record of each user belonging to the highlighted group and each user belonging to any of the highlighted group's children. In addition, the group ID of the highlighted group is stored in the current restricted by field in the user site policy record of each such user as well. If the user does not have a corresponding record in the user site policy table, it will be appreciated that a record having the same fields noted above will be added to the user site policy table 123. Finally, in a block 436 a record for each user belonging to the highlighted group and any of its group's subgroups is added to the transmit list 134. The record includes the user ID of the user and a replace action flag.

Returning to decision block 424, if the site access rule is to deny all sites except certain specified sites, the logic proceeds from decision block 424 to a block 437. It will be appreciated that if the site access rule is to deny all sites except for certain specified sites, then the sites added by the operator identify those sites to which the highlighted group is allowed access. The logic implemented by the database 72 to update the corresponding group and user site policy records is essentially the same as that implemented to deny access to certain sites. Consequently, blocks 428 through 436 are merely repeated except that the current access field in each newly added record is set to allow and a null value is stored in the current restricted by field. When all of the corresponding group and user site policy records have been updated, the logic ends in a block 438.

In addition to adding site policies for a group, the operator is allowed to delete existing site policies and edit existing site policies. If the operator selects the Edit button in the site policy window 145, the corresponding group site policy record for the highlighted group is merely updated with the new information. If a particular site policy is deleted, i.e., the operator highlights the desired site name in the list of sites and selects the Delete button, the corresponding group site policy record will be deleted from the group site policy table 130.

Returning to FIG. 7B, if the operator sets a site policy for a user rather than a group, the logic proceeds through decision block 286 to a block 288 where the corresponding record in the user site policy table for the user is updated with the new site policy. Once the corresponding record for the user is updated in the user site policy table, the logic proceeds to a block 290 where a record for the user is added to the transmit list 134 including the user ID for the user and a replace action flag.

Figure 8Q:
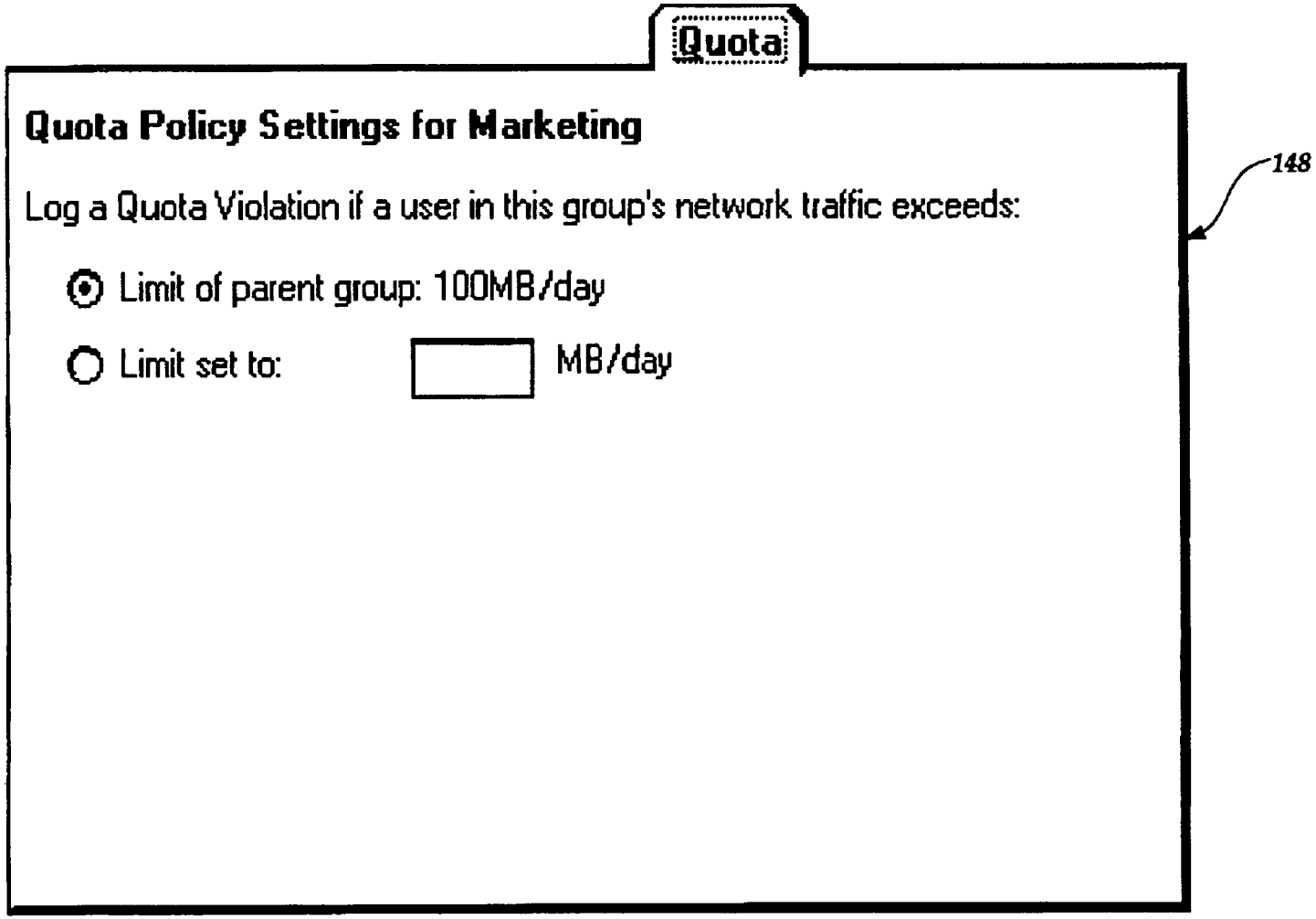

Returning to decision block 278, if a policy option is not selected, is not available, or has been selected and the corresponding options chosen, the logic will proceed to a decision block 292 in FIG. 7C. In decision block 292, the logic determines if a quota option has been selected. The operator selects the quota option by highlighting the group in the group hierarchy 86 or a user in the user list 88 for which the operator desires to set a data traffic quota. To set a data traffic quota, the operator highlights the desired group in the group hierarchy 86 or the desired user in the user list 88 and selects the quota tab 79 from the main window 84. In response, the GUI 70 generates a quota policy window 148 as shown in FIG. 8Q. The operator inputs set a megabyte limit on the amount of information data group or user can transmit or receive in any given day. Returning to FIG. 7C, if the operator sets such a quota policy for a group, the logic proceeds through a decision block 296 to a block 298, where the corresponding records in the group and user quota tables 132 and 125 are updated by the database 72.

Figure 13A:
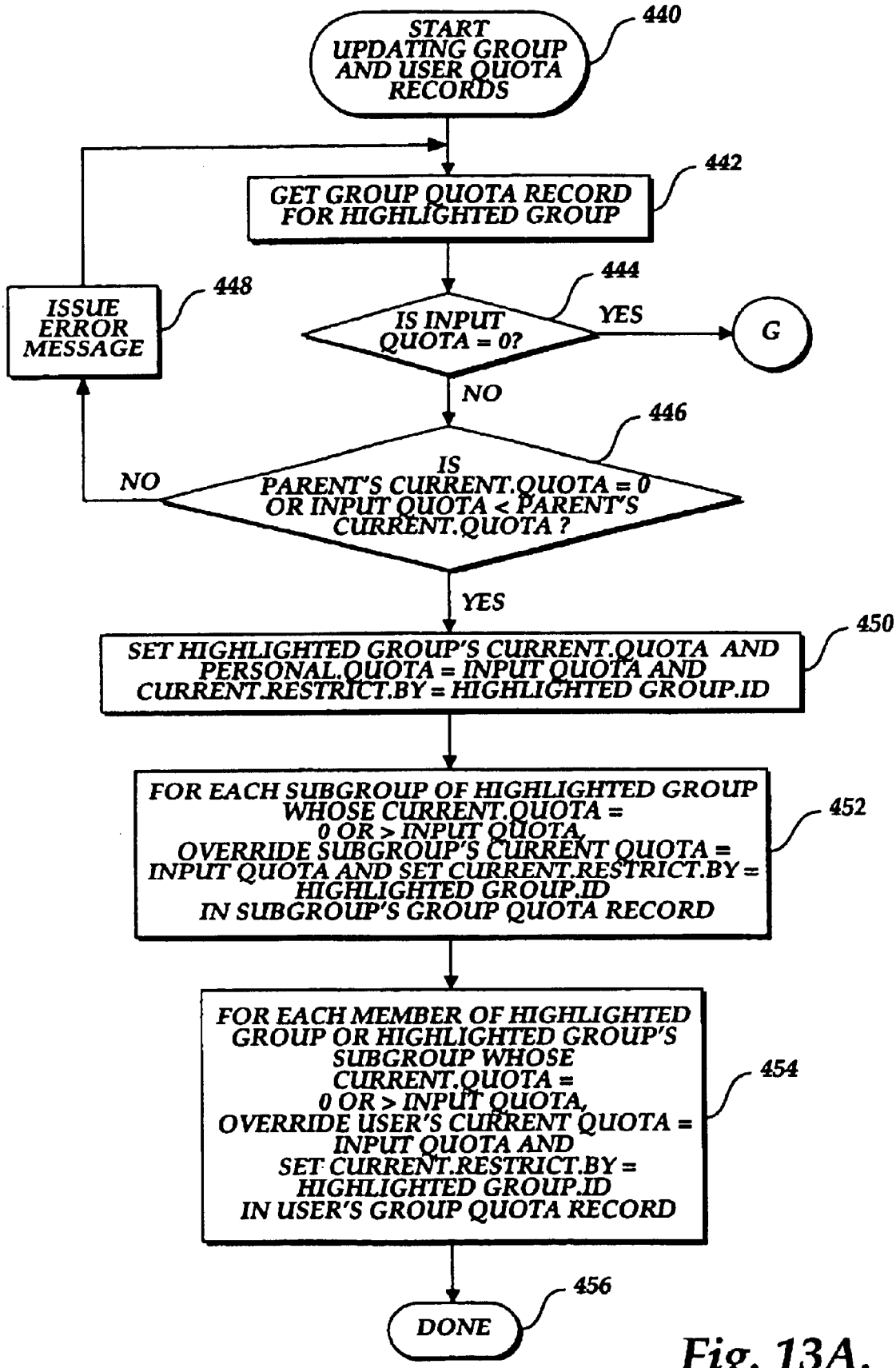
FIGS. 13A–13C are a flowchart illustrating the logic used to update quota tables in the database.
Figure 13B:
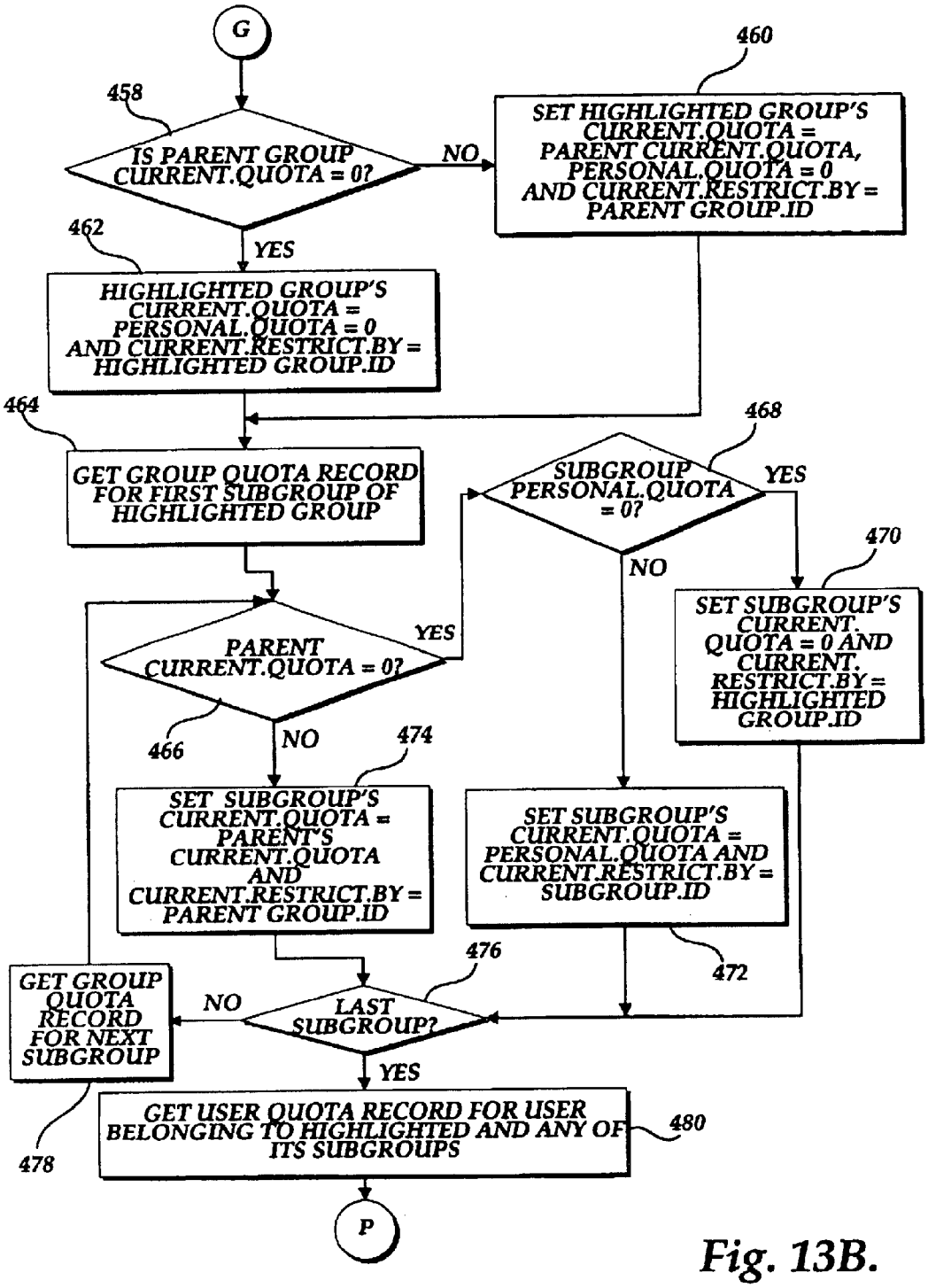
Figure 13C:
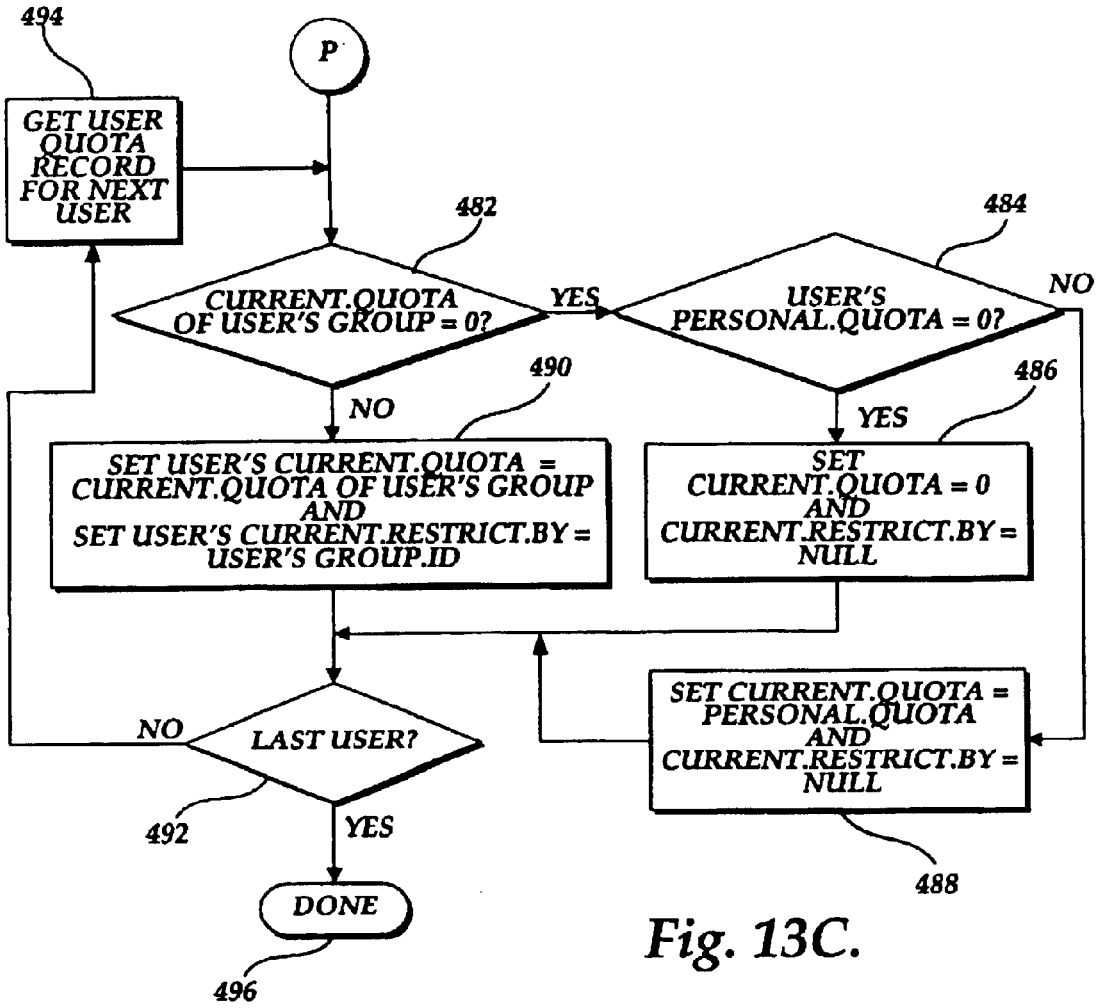

The logic implemented by the database 72 to update the group and user quota tables 132 and 125, respectively with the newly defined quota for the highlighted group is shown in more detail in FIGS. 13A and 13B. The logic begins in FIG. 13A in a block 440 and proceeds to a block 442 where the corresponding group quota record for the highlighted group is obtained from the group quota policy table 132. In a decision block 444, the logic determines if the quota input by the operator is equal to zero. If not, the logic proceeds to a decision block 446, where it determines if either the parent group's current quota is set equal to zero or if the quota inputted by the operator is less than the parent's current quota. If neither of these conditions is met, the logic proceeds to a block 448 and an error message is issued by the GUI 70. The logic returns to block 442, and blocks 442 through 446 are repeated until the operator enters an acceptable quota. Consequently, if the inputted quota is less than the parent's current quota, or if the parent's current quota is equal to zero, the logic proceeds to a block 450. In block 450, the current group's current quota and personal quota are set equal to the inputted quota and the group ID of the highlighted group is stored in the current restricted by field in the group quota record of the highlighted group. The quota set for the highlighted group is inherited by the users of the highlighted group, the subgroups of the highlighted group, and the users belonging to any of the subgroups of the highlighted group. However, as will be described below, such users and groups will only inherit the inputted quota if the inputted quota is less than their current quota or if their current quota equals zero.

In this regard, the logic proceeds to a block 452, where for each subgroup of the highlighted group whose current quota equals zero or whose current quota is greater than the inputted quota, the current quota of the subgroup will be overridden with the input quota in the subgroup's group quota record. In addition, the group ID of the highlighted group is stored in the current restricted by field in each subgroup's group quota record. In block 454, for each user belonging to the highlighted group or any of its subgroups whose current quota equals zero or whose current quota is greater than the inputted quota, the current quota in the user's user quota record is overridden with the input quota and the group ID of the highlighted ground is stored in the current restricted by field. The logic then ends in a block 456. It will be appreciated that, when a quota policy is set for a user, a record is not added to the transmit list 134 for the user because quota policies are not sent as rules to the filter engine 78.

Returning to decision block 444, if the quota inputted by the operator is equal to zero, whether or not the highlighted group's current quota can be zeroed out depends upon the current quota for the parent group of the highlighted group. In this regard, the logic proceeds from decision block 444 to a decision block 458 in FIG. 13B. In decision block 458, database 72 determines if the parent group's current quota is equal to zero. It will be appreciated by those of ordinary skill in the art that this is determined by merely locating the parent group's group quota record in group quota table 132 and examining the value in the current quota field of that record. If the result of decision block 458 is negative, i.e., the current quota for the parent group is greater than zero, the logic proceeds to a block 460 where the highlighted group's current quota is set equal to its parent's current quota such that the highlighted group inherits its parent group's current quota. However, the highlighted group's personal quota is set to zero and the group ID of the parent group is stored in the highlighted group's current restricted by field so that if the parent's restriction on the highlighted group's current quota is ever removed, the current quota for the highlighted group rolls back to its personal quota.

However, if the result of decision block 458 is positive, the logic proceeds to a block 462 where the highlighted group's current quota and personal quota are set to zero. It will be appreciated that since the parent group's current quota has already been set to zero, the highlighted group's current quota and personal quota can be freely set to zero as well. In addition, the highlighted group ID of the highlighted is stored in the group's own current restricted by field.

Once the current quota and personal quota for the highlighted group have been set, the current and personal quotas for all of the highlighted group's subgroups must be updated as well. In this regard, the logic proceeds to a block 464 where the group quota record for a first subgroup of the highlighted group is obtained from the group quota table 132. In a decision block 466, the logic determines if the current quota of the parent's group quota policy record is equal to zero. If so, it may be possible to set the subgroup's current quota to zero. Hence, the logic proceeds to decision block 468 where the logic determines if the subgroup's personal quota is equal to zero. If so, the subgroup's current quota is set equal to zero in block 470. In addition, the group ID of the highlighted group is stored in the current restricted by field of the subgroup's group quota policy record.

On the other hand, if the subgroup's personal quota is not equal to zero, then its current quota rolls back in block 472 to the personal quota previously set for the subgroup. In addition, the group ID of the subgroup is stored in the current restricted by field of the subgroup's group quota policy record indicating that the subgroup is restricting itself to its current quota.

Returning to decision block 466, if the subgroup's parent group has a current quota that is not equal to zero, then the current quota is set equal to its parent's current quota in block 474. In addition, the group ID of the parent group is stored in the current restricted by field in the subgroup's group quota record.

Once the group quota record for the first subgroup of the highlighted group is processed, the logic proceeds to a decision block 476 where the database 72 determines if the group quota policy record for the last subgroup of the highlighted group has been updated. If not, the group quota record for the next subgroup of the highlighted group is obtained in block 478. Blocks 466 through 478 are then repeated for each subgroup of the highlighted group. When the group quota policy record of the last subgroup is updated, the logic proceeds to blocks 480 through 494 so that the user quota records for each user belonging to the highlighted group and any of its subgroups are updated in accordance with the newly inputted quota which is equal to zero.

In this regard, a user quota record for a first user belonging to the highlighted group or any of its subgroups is obtained from the use quota table 125 of the database 72. In a decision block 482, the logic determines if the current quota of the group to which the user belongs is equal to zero. If so, the logic proceeds to a decision block 484 where it determines if the user's personal quota is equal to zero. If the result of decision block 484 is positive, the current quota in the user's user quota policy record is set equal to zero and a null value is stored in the current restricted by field in a block 486. However, if the user's personal quota has not already been set to zero, the logic proceeds from decision block 484 to a block 488 where the user's current quota rolls back to its personal quota and as null value is stored in the current restricted by field.

Returning to decision block 482, if the current quota of the group to which the user belongs is not equal to zero, the logic proceeds from decision block 482 to a block 490 in which the user's current quota is set equal to the current quota of the group to which the user belongs and the group ID of the group to which the user belongs is stored in the user's current restricted by field.

Once the user quota record for the first user belonging to the highlighted group and any of its subgroups is updated as described above, the logic proceeds to a decision block 492 where it determines if the user quota record for the last user belonging to the highlighted group or any of its subgroups has been updated. If not, a user quota record for a next user belonging to the highlighted group and any of its subgroups is obtained in a block 494. Blocks 482 through 494 are then repeated to update the user quota record of each user belonging to the highlighted group and its subgroups. When the last user is processed, the result of decision block 492 is positive, and the logic ends in a block 496.

Returning to FIG. 7C, if the system administrator, mid-level administrator, or manager has set a quota policy for a user individually rather than a group, the logic proceeds through a decision block 300 to a block 302 where the corresponding record for the user is updated in the user quota table 125. It will be appreciated that the current quota is set equal to the quota inputted by the operator as long as the inputted quota is less than the current quota of the group to which the user belongs or as long as the current quota of the group to which the user belongs is equal to zero. However, if the inputted quota itself is equal to zero, the user's current quota will be set to zero only if the current quota of the group to which the user belongs is set equal to zero. In that case, both the user's current quota and personal quota will be set equal to zero.

Returning to decision block 292, if the quota option is not selected, is not available, or has been selected and the desired quota input by the operator and applied against the desired groups and users, the logic will proceed to a decision block 304, where it determines if the operator has exited the main window 84 or selected a send user rules option from the File pull down menu 83 in the main window 84. If not, the logic returns to block 222 in FIG. 7A, and blocks 222 through 304 are repeated so that the operator may select more options. However, if the result of decision block 304 is positive, the logic proceeds to a block 306 where a user policy table 136 is built by the database 72. As will be appreciated from the discussion below, the user policy table built by the database 72 is a collection of all the various protocol policies, site policies, and file type policies that have been defined for each user in the user list 88. Once constructed, the user policy table is read by the filter executive 76 of the network access program 80. The filter executive optimizes the user policies found in the table to create a set of rules for each user that is used by the filter engine 78 to filter IP packet traffic passing through the access server 50. Which IP packets are allowed to pass through the filter engine 78 and which IP packets are logged are determined by the user rules created by the filter executive 76 using the user policy table 136.

Figure 14:
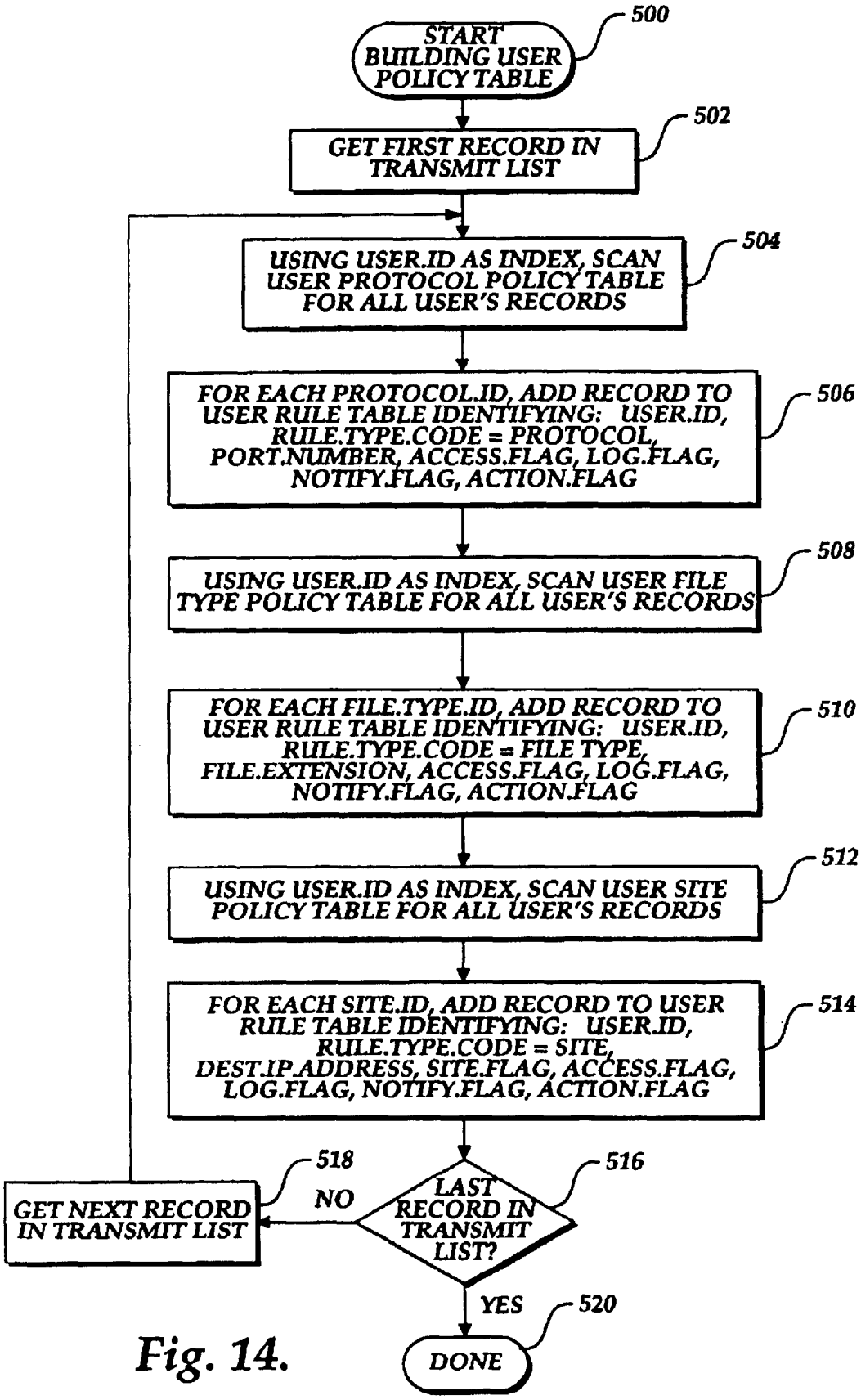
FIG. 14 is a flowchart illustrating the logic used to build a user policy table in the database.

The logic implemented by the database 72 for building the user policy table 136 is shown in more detail in FIG. 14. The logic begins in a block 500 and proceeds to a block 502 where a first record is obtained from the transmit list 134. In a block 504, using the user ID from the transmit list record as an index, the user protocol policy table 122 is scanned for all records having the user ID. In a block 506, a record is added to the user policy table 136 for each different user protocol policy record identified. Each record added to the user policy table includes the user ID, a rule type code identifying the present rule type as a protocol rule, the port number for the protocol, and the access flag for the protocol, i.e., either allow or deny as obtained from the protocol table 116. In addition, the record added to the user policy table includes the action flag as set in the corresponding transmit list record, i.e., either add, replace, or delete. Consequently, when the filter engine 78 ultimately receives the rules as prepared by the filter executive 76 from the user policy table 136, the filter engine will either add the user protocol rule, delete the corresponding user protocol rule, or replace the existing user protocol rule with the more current user protocol rule. In addition to the fields and flags described above, a log flag and a notify flag are included in the record added to the user policy table 136. The log flag will be set to the same value as the log-on-off flag set in the corporate default table 110 while the notify flag will be set equal to the same value as the notify flag in the corporate default table 110.

In a block 508, the user file type policy table 124 is also scanned, using the user ID, for all of the user's file type policy records in the user file type policy table 124. In a block 510, a record is added to the user policy table for each file extension denied to that user. The record includes the user ID, a rule type code identifying the present rule as a file type rule, the file extension being denied, and the access flag, which necessarily is set to deny. In addition, the record includes the action flag from the corresponding transmit list record, the log flag and the notify flag.

In a block 512, the user site policy table 123 is scanned using the user ID from the transmit list record as an index for all of the user's site policy records. In a block 514, a record is added to the user policy table 136 for each site for which the user has a user policy record. Each record includes the user ID, a rule type code identifying the rule as a site rule, and the IP address, site flag, and the access flag as obtained from the site table 126 and the site IP address table 127. In addition, the record includes the log flag and notify flag, and the action flag as found in the transmit list record.

Once the user protocol, site and file type policy tables 122, 123, and 124 have been scanned and the corresponding records added to the user policy table 136 for the user identified in the first record from the transmit list 134, the logic proceeds to a decision block 516 where it determines if the last record in the transmit list has been obtained. If not, the next record in the transmit list 134 is obtained in a block 518 and blocks 504 through 516 are repeated for the next record in the transmit list. Accordingly, blocks 504 through 518 are repeated for each record in the transmit list. By the time the end of the transmit list is reached, a record for each protocol policy, file type policy, and site policy is added to the user policy table 136 for each user that has been added or deleted or that has had a policy change occur since the last time the user policy table 136 was built.

Returning to FIG. 7C, once the user policy table 136 is fully constructed as described above, the logic proceeds to a block 308 where a user policy table transmit flag is set. It will be appreciated that, as soon as the user policy transmit flag is set, the filter executive 76 reads the user policy table 136 and begins optimizing the policies into rules as will be described in more detail below. After the user policy table transmit flag is set, a user mapping transmit flag is set in block 310. It will be appreciated that, once this flag is set, the filter executive 76 will read the user mapping table 138 as well. The logic then ends in a block 312.

Optimization and Definition of User Rules

Figure 15A:
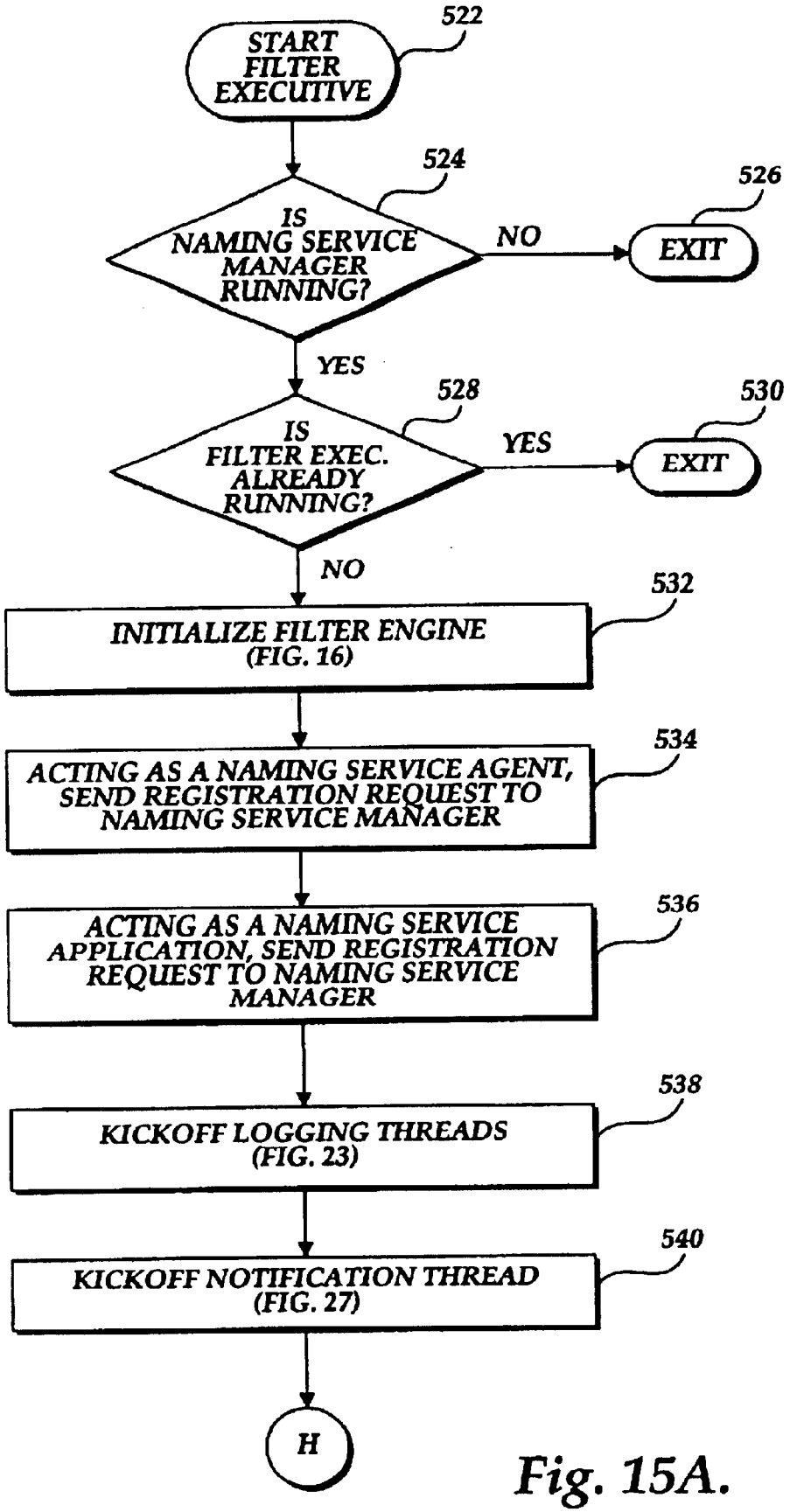
FIGS. 15A through 15C are a flowchart illustrating the logic used by a filter executive component of the network management program to process and optimize the vital, mapping and policy information stored in the database.

As noted above, once the database 72 has constructed the user policy table 136, the filter executive 76 reads the user policy table 136 and optimizes the user policies into a set of rules for each user that it then transmits to the filter engine 78. The logic implemented by the filter executive 76 to construct the rules is shown in more detail in FIGS. 15A, 15B, and 15C. The logic begins in FIG. 15A in a block 522 and proceeds to a block 524 where it determines if the naming service manager 74 is running. If not, the filter executive 76 cannot perform its duties so the logic exits in a block 526. If the naming service manager 74 is running, the logic proceeds to a decision block 528 where it determines if another copy of the filter executive 76 is already running. If so, the current copy of the filter executive is unnecessary and the logic exits in a block 530. Otherwise, the logic proceeds to a block 532 in which the filter executive initiates initializing of the filter engine 78.

Figure 16:
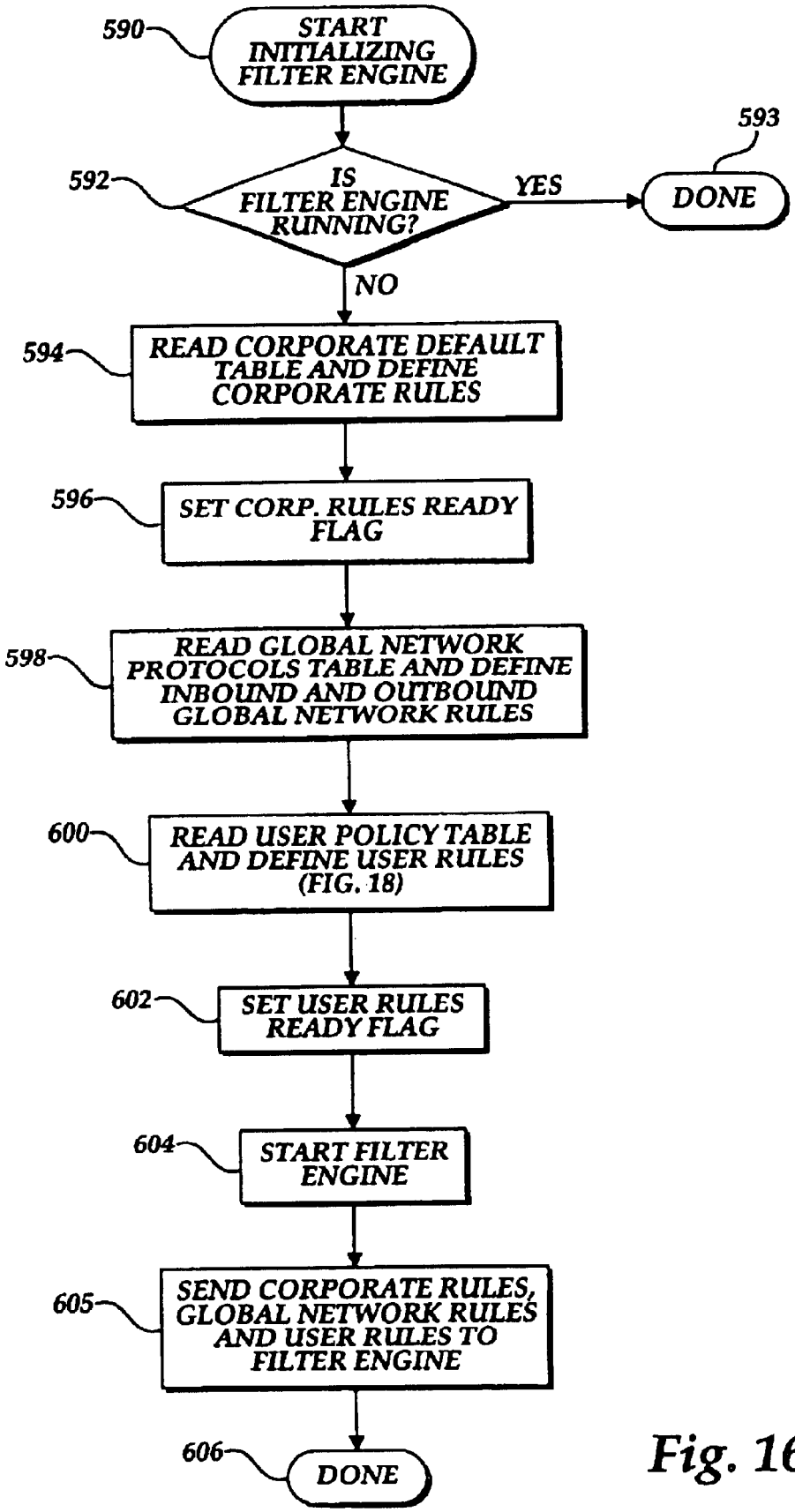
FIG. 16 is a flowchart illustrating the logic used by the filter executive to initialize a filter engine component of the network management program.
Figure 17:
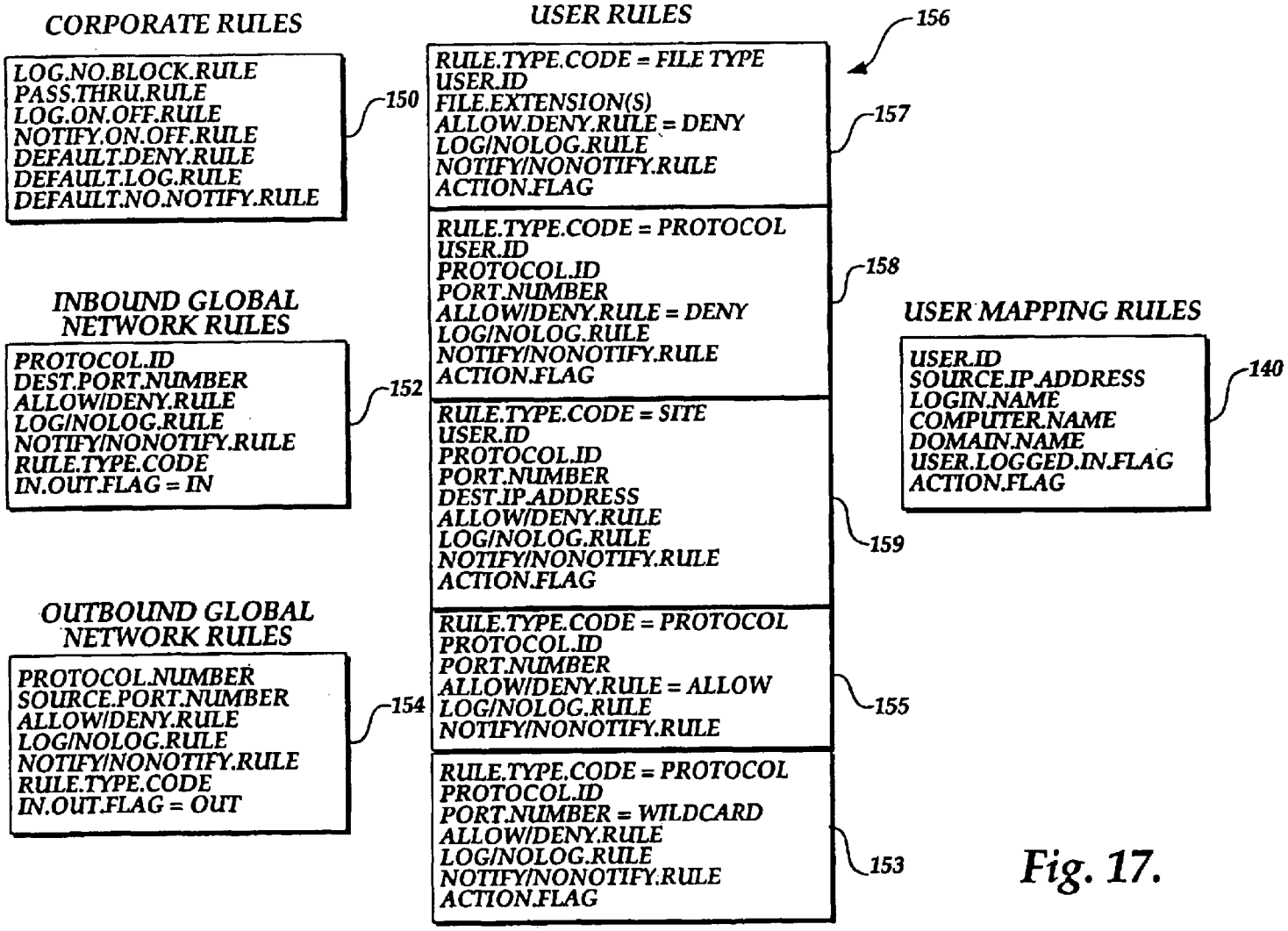
FIG. 17 is a block diagram illustrating a plurality of rule sets defined by the filter executive of the network management program based on the policy information stored in the database.

The logic implemented by the filter executive 76 to initialize the filter engine 78 is more clearly depicted in FIG. 16. The logic begins in a block 590 and proceeds to a block 592 where it determines if the filter engine 78 is already running. If so, the logic ends in a block 594. Otherwise, the logic proceeds to a block 594 where the filter executive 76 reads the corporate default table 110 and defines a corporate rules set 150 as shown in FIG. 17. More specifically, the filter executive 76 defines a pass through rule equal to the pass through flag, a log-no-block rule equal to the log-no-block flag, a log-on-off rule equal to the log-on-off flag, and a notify-on-off rule equal to the notify flag of the corporate default table 110 and stores these rules in the corporate rules set 150. In addition, the filter executive 76 define a set of default rules that the filter engine 78 uses to filter an IP packet if the packet fails to match any other defined rule. More specifically, the filter executive 76 defines and adds to the corporate rules set 150 a default deny rule, a default log rule and default no notify rule. Those of ordinary skill in the art will appreciate that the default rules may be set to any value, i.e., allow/deny, log/no log, notify/no notify, deemed suitable. Once the corporate rules set 150 is defined in block 594, a corporate rules ready flag is set in block 596 to announce to the database 72 that the corporate rules have been processed.

In a block 598, the filter executive 76 reads the global network protocols table 112 and defines a set of inbound global network protocol rules 152 and a set of outbound global network protocol rules 154 as shown in FIG. 17. The inbound global network protocol rules set 152 includes a record corresponding to each record of the global network protocols table 112 as stored in the database 72 except that each record in the inbound global network protocol rules set includes an in/out flag set equal to "in." Each record retains a protocol number field, the port number field (however, the port number field is referred to as a destination port number since this is an inbound set of rules), an access/deny rule equal to the value of the access flag in the corresponding record, a log/no log rule equal to the value of the log flag in the corresponding record, a notify/no notify rule equal to the notify flag in the corresponding record, and a rule type code indicating that the rule is a protocol type rule.

The set of outbound global network protocol rules 154 is defined in a similar manner, except that the in/out flag is set to "out" in each record, and the port number is referred to as a source port number.

Figure 18:
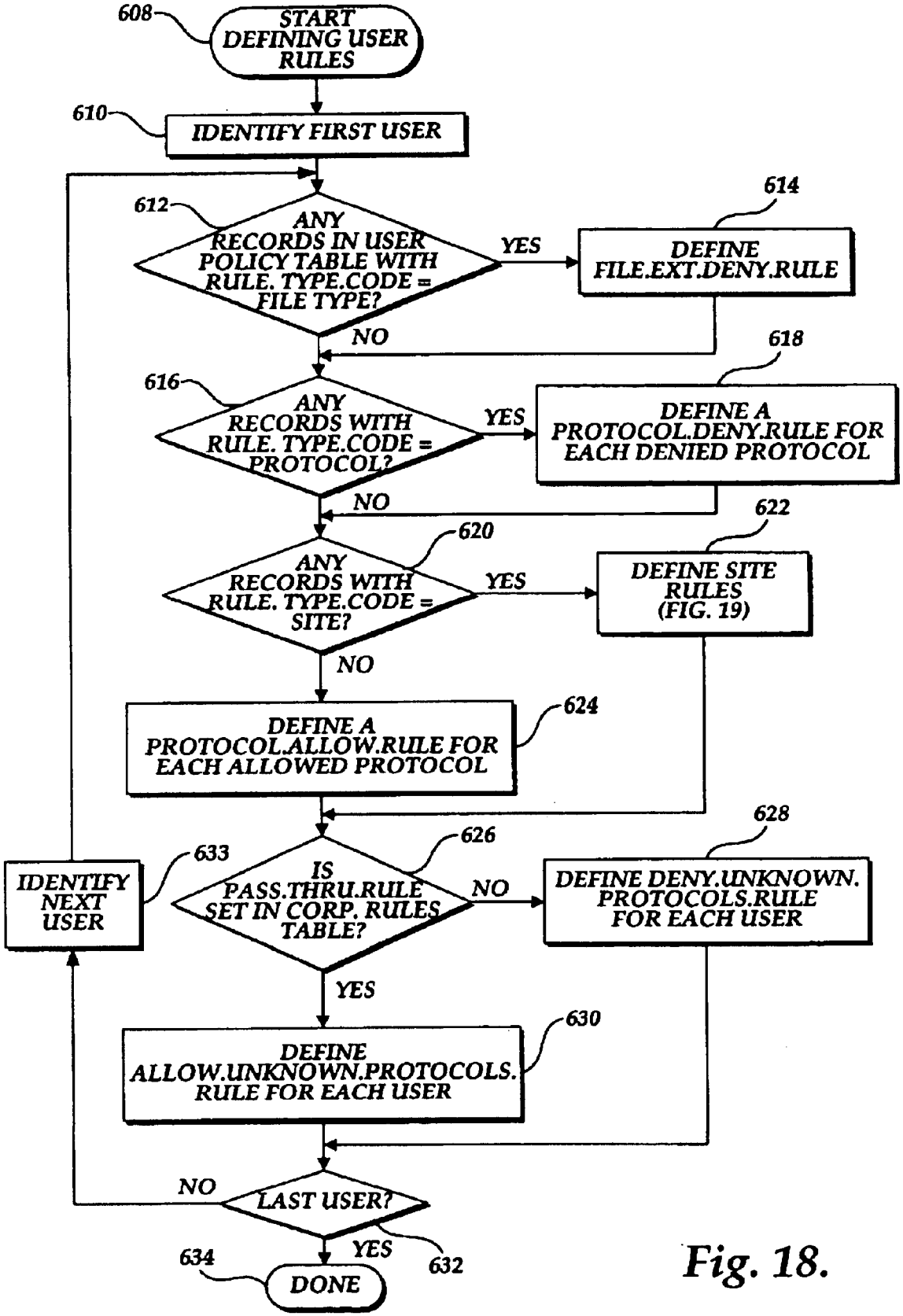
FIG. 18 is a flowchart illustrating the logic used to define a set of rules, including corporate rules, global network protocol rules, user rules and timer rules, for each user of a computer connected to the LAN shown in FIG. 2.

Once the inbound and outbound global network protocol rule sets 152 and 154 have been defined in block 598, the logic proceeds to a block 600 where the filter executive 76 reads the user policy table 136 from the database 72 and defines a set of user rules 156 to be transmitted to the filter engine 78. The user rules set 156 defined by the filter engine 78 is shown in FIG. 17. The logic implemented by the filter executive 76 to define the user rules set 156 is shown in more detail in FIG. 18. The logic begins in a block 608 and proceeds to a block 610 where a first user for which rules are to be defined is identified. It will be appreciated that the first user may be identified as that corresponding to the user ID in the first record in the user policy table 136. In a decision block 612, the logic determines if there are any records in the user policy table for the identified user in which the rule type code indicates a file type rule. If so, the logic proceeds to a block 614 where a file extension deny rule 157 is defined in the user rules set 156. The file extension deny rule 157 is a record in the user rules set 156 that includes the user ID, the rule type code, an allow/deny rule set equal to deny, a log/no log rule set equal to the value of the log-on-off rule in the corporate rules set 150, and a notify/no notify rule set equal to the notify-on-off rule in the corporate rules set 150. In addition, the file type deny rule added to the user rules set 156 includes a file extension(s) field listing all of the file extensions denied to that user.

Returning to FIG. 18, if no records are found in the user policy table with a file type rule type code or if such records are found and the file extension deny rule 157 are defined, the logic proceeds to a decision block 616 where it determines if there are any records in the user policy table 136 for the user having a protocol rule type code. If so, the logic proceeds to a block 618 where a protocol deny rule 158 is defined for each protocol denied to that user and is added to the user rules set 156. Consequently, for each record in the user policy table 136 for the user having a protocol rule type code, a corresponding protocol deny rule 158 is added to the user rules set 156 following the file type deny rule. Each such rule includes the user ID, a protocol rule type code, the protocol ID as found in the corresponding user policy record, the port number found in the corresponding user policy record, a log/no log rule equal to the log flag in the corresponding user policy record, and a notify/no notify rule equal to the notify flag in the corresponding user policy record. In addition, the allow/deny rule for the protocol is necessarily set to deny. As will be discussed in more detail below, any protocol allow rules are set only after the site rules have been set.

If the user policy table 136 does not contain any records with a protocol rule type code or if the user policy table does include such records and a protocol deny rule 158 is set for each protocol having an access flag equal to deny, the logic proceeds to a decision block 620 where it determines if there are any records in the user policy table 136 with a site rule type code. If so, the logic proceeds to a block 622 and the site rules 159 for the user are defined.

Figure 19:
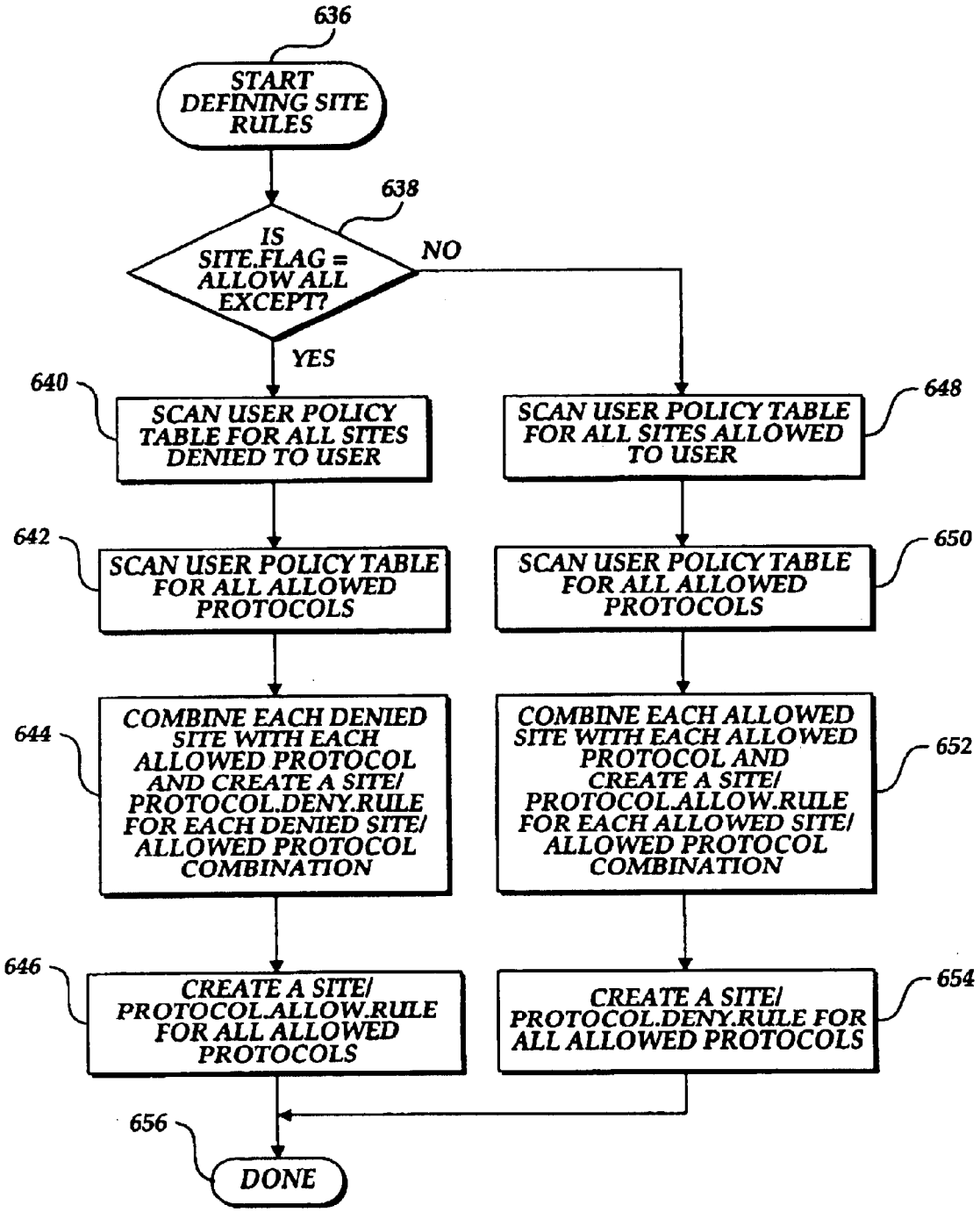
FIG. 19 is a flowchart illustrating the logic used to define a set of site rules for each user of a computer connected to the LAN shown in FIG. 2.

The logic for defining site rules 159 for the user is shown in more detail in FIG. 19. The logic beings in a block 636 and proceeds to a decision block 638 where it determines if the site flag in the first record found in the user policy table 136 has been set to allow all except. It will be appreciated, that if the site flag is set to allow all except in the first such record that the site flag will also be set to allow all except in every other record in the user policy table having a site rule type code. If the result of decision block 638 is positive, the logic proceeds to a block 640. In block 640, the filter executive 76 scans the user policy table 136 for all sites that are denied to the user. More specifically, the filter executive 76 scans the user policy table 136 to obtain each record for the user having a site rule type code in order to obtain the IP address of each site to be denied. In block 642, the filter executive 76 then scans the user policy table 136 for all protocols the user is allowed to access. More specifically, the filter executive scans the user policy table 136 for all records having a protocol rule type code and an access flag set equal to allow. In block 644, the denied sites are combined with the allowed protocols to define a site/protocol deny rule. More specifically, each denied site record found in block 640 is combined with each allowed protocol record for the user found in block 642 to create a combined rule that not only denies access to a particular site, but also prevents access to that site using any of the protocols that would otherwise be allowed. The effect is to block all access via the known protocols to the site by the user. For example, if the POP3 electronic mail protocol is otherwise allowed for the user, the user would still not be able to send any electronic mail to the denied site using the POP3 protocol.

Referring now to FIG. 17, a combined site/protocol deny rule is defined for each site/allowed protocol combination by combining each denied site record found in block 640 with each allowed protocol record found in block 642. Accordingly, for each of these combinations, a denied site/protocol deny rule is added to the user rule set 156 that includes the user ID, a site rule type code, the protocol ID of the allowed protocol, the port number of the allowed protocol, the IP address of the denied site (referred to as a destination IP address), an allow/deny rule set to deny, a log/no log rule set equal to the log flag in the corresponding site rule type record for the user, and a notify/no notify rule equal to the notify flag in the corresponding site rule type record.

In block 646, a site/protocol allow rule is then defined for each allowed protocol for all other sites that are denied. Hence, for each allowed protocol found in block 642, a site combined protocol allow rule is added to the user rule set 156 that includes the user ID, the site rule type code, the protocol ID identifying the allowed protocol, the port number of the allowed protocol, a wildcard or "don't care" IP address, and an allow/deny rule set to allow, a log/no log rule equal to the log flag in the corresponding allowed protocol record, and a notify/no notify rule equal to the notify flag in the corresponding allowed protocol record. Once a site/protocol allow rule has been defined for all allowed protocols and all unidentified, and hence, allowed sites, the logic ends in a block 656.

Returning to block 638, if the site flag is not set to allow all accept, and rather, is set to deny all sites except, the logic proceeds from decision block 638 to a block 648. In block 648, the filter executive 76 scans the user policy table 136 for all sites to which the user is allowed access. More specifically, the user policy table 136 is scanned for all records of the user having a site rule type code. In a block 650, the filter executive scans the user policy table 136 for all protocols to which the user is allowed access. More specifically, the user policy table 136 is scanned for all records of the user having a protocol rule type code and access flag set to allow. In a block 652, the records found in block 648 are combined for the records found in block 650 to define a combined site/protocol allow rule for each allowed site/allowed protocol combination. As shown in FIG. 17, each defined site/protocol allow rule includes a user ID, a site rule type code, a protocol ID, the port number of the allowed protocol, the IP address of the allowed site, an allow/deny rule set to allow, a log/no log rule equal to the log flag in the corresponding site rule type record, and a notify/no notify rule equal to the notify flag in the corresponding user policy record. The result of combining each allowed site with each allowed protocol is that a site/protocol allow rule is defined that allows access to the specified site with any of the allowed protocols.

Once the site/protocol allow rules are defined, the logic proceeds to a block 654 where a combined site/protocol deny rule is set for any site not specifically defined to be allowed. In other words, access to any unspecified site is denied for the known protocols to which the user is allowed access. Hence, in block 654, a site/protocol deny rule is added to the user rule set 156 for the user for each allowed protocol found in block 650. The site protocol deny rule includes a user ID, a site rule type code, a protocol ID, the port number of the allowed protocol, a wildcard or "don't care" IP address, an allow/deny rule set to deny, a log/no log rule equal to the log flag in the corresponding user policy record for the allowed protocol, and a notify/no notify rule equal to the notify flag in the corresponding user policy record for the allowed protocol. Once a site/protocol deny rule has been set for each allowed protocol found in block 650, the logic proceeds from block 654 and ends in block 656.

Returning to FIG. 18, once the site rules 159 have been defined, the logic proceeds from a block 622 directly to a block 626, skipping block 624. However, if no records with a site rule type code were found in the user policy table 136 in decision block 620, the logic proceeds to block 624 so that a protocol allow rule 155 can be defined for each protocol to which the user is allowed access. It will be appreciated that since no site records were found in the user policy table 136, the protocol allow rules 155 need not be qualified with specified sites as just described. As shown in FIG. 17, each protocol allow rule 155 in the user rule set 156 includes a user ID, a protocol rule type code, a protocol ID, a port number, an allow/deny rule set to allow, a log/no log rule equal to the log flag in the corresponding user policy record for the protocol and a notify/no notify rule equal to the notify flag in the corresponding user policy record for the protocol. It will be appreciated that any records in the user policy table 136 for the user having a protocol rule type code and a deny access flag were previously processed and their corresponding protocol deny rules 158 previously added to the user rule set in block 618.

Once the appropriate site rules and protocol rules have been defined, the logic proceeds to blocks 626 through 630 in order to set default rules 153 for unknown protocols, i.e., protocols that were never defined by the network access program 80 in any one of the ways described above. In this regard, the logic proceeds to a decision block 626 where it determines if the log-no-block rule has been set to "on" in the corporate rule table 150. If not, the corporate rule is to deny all users access to any unknown protocols. Consequently, in a block 628, a deny unknown protocols rule is defined for each user having a record in the user policy table. As shown in FIG. 17, each deny unknown protocols rule includes a user ID, a protocol rule type code, a protocol ID set to a null value, a wildcard or "don't care" IP address, a wildcard or "don't care" port number, an allow/deny rule set to deny, a log/no log rule equal to the log-on-off rule in the corporate rules table 150 and a notify/no notify rule equal to the notify-on-off rule in the corporate rules table 150.

On the other hand, if the log-no-block rule is set equal to on in the corporate rules table 150, the logic proceeds from decision block 626 to a block 630 where an allow unknown protocols rule is defined for each user having a record in the user policy table 136. Each allow unknown protocols rule includes the same fields as a deny unknown protocols rule except that the allow/deny rule is set equal to allow rather than deny.

Once the unknown protocol rules 153 have been defined as described above, the logic proceeds to a decision block 632 where it determines if the last user having any records in the user policy table 136 has been processed. If not, the logic proceeds to a block 633 where a next user having records in the user policy table 136 is identified. Block 612 through 632 are then repeated for each user having records in the user policy table 136. When the last user is processed, and the result of decision block 630 is positive, then a complete user rule set 156 has been defined by the filter executive 76. Consequently, the logic of FIG. 18 ends in block 634 and the logic of FIG. 16 regarding initialization of the filter engine is resumed at a block 602. In block 602, the user rules ready flag is set in order to announce to the database that the user rules have been processed. In a block 604, the filter executive 76 starts the filter engine 78. Next, in a block 605, the filter executive 76 sends the corporate rules 150, the inbound and outbound global network protocol rules 152 and 54 and the user rules 156 to the filter engine 78. The logic for initializing the filter engine then ends in a block 606.

Returning to FIG. 15A, once the filter engine 78 has been initialized by the filter executive 76, the logic proceeds from block 532 to a block 534. In block 534, the filter executive 76, acting as an agent for the naming service manager 74, sends a registration request to the naming service manager 74. As will be described in more detail below, once the filter executive 76 is registered as a naming service agent with the naming service manager 74, the filter executive 76 is capable of sending the static user mapping table 138 to the naming service manager 74 for further processing. As will be described in more detail below, the filter executive 76 will be registered as a static source of mapping information with the naming service manager 74. In a block 536, the filter executive 76, acting as a naming service application rather than a naming service agent, sends a registration request to the naming service manager 74. Once the filter executive 76 is registered with the naming service manager 74 as an application, the filter executive 76 receives updated mapping information from the naming service manager 74. Consequently, the filter executive 76 can provide the filter engine 78 with the most current computer-to-user and computer-to-IP address mappings as the filter engine 78 filters IP packets using the user rules 156.

Figure 23:
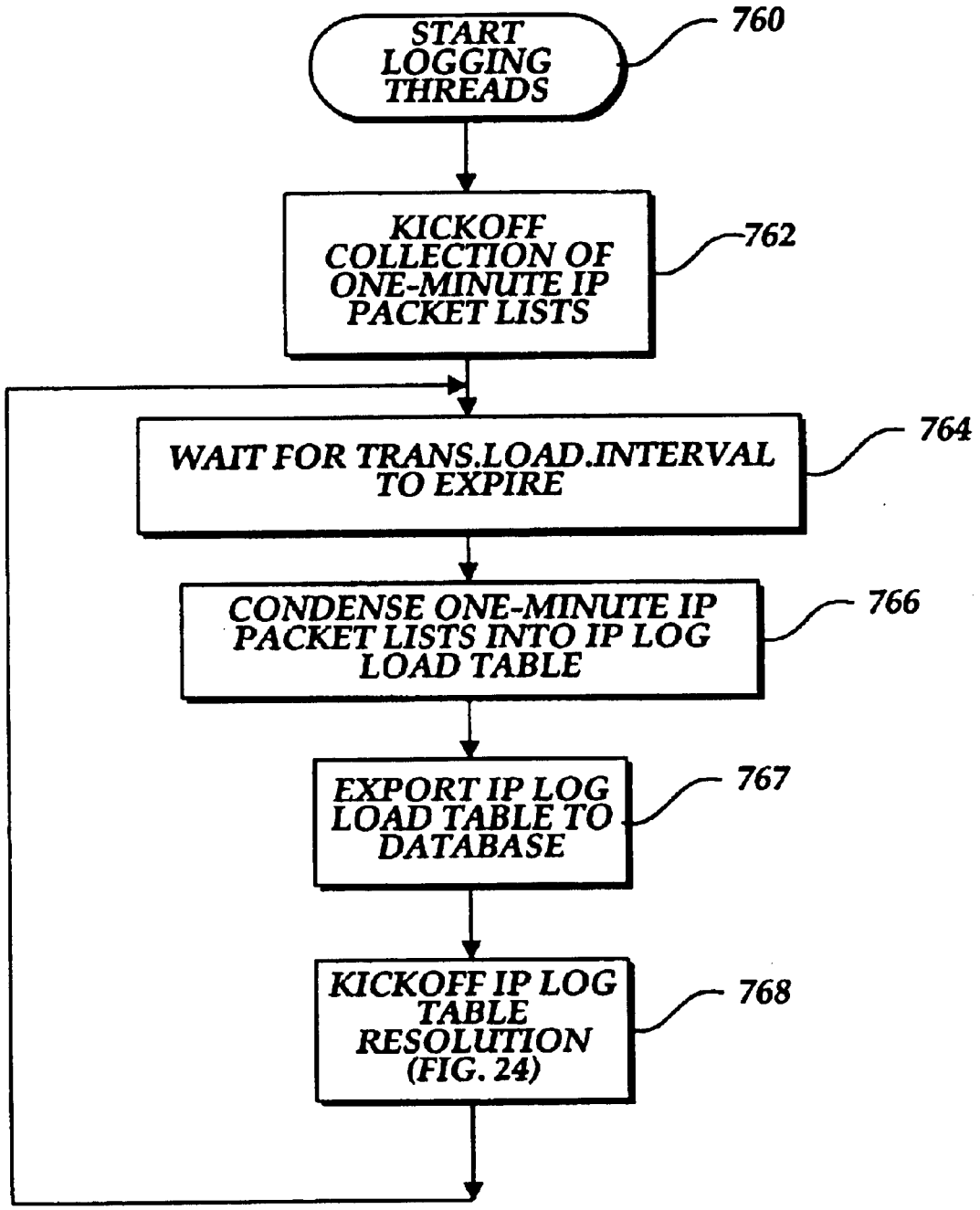
FIG. 23 is a flowchart illustrating the logic used to log IP packets communicated between the Internet shown in FIG. 1 and the LAN shown in FIG. 2 into a log table.

After sending an application registration request to the naming service manager in blocks 534 and 536, respectively, the filter executive 76 kicks off a logging thread to be implemented by the filter engine 78 to log IP packet traffic passing through it. The logic implemented by the filter engine to log the IP packet traffic is shown in more detail in FIG. 23. However, a detailed description of FIG. 23 shall be deferred until after the filter engine 78 has been fully described in order to place the discussion of the logging threads implemented by the filter executive 76 in the proper context.

After kicking off the logging threads in block 538, the filter executive 76 also kicks off a notification thread that is implemented by the filter executive 76 to alert users when their request to access a site has been denied. The logic implemented by the filter executive 76 to notify users of certain actions taken by it is shown in more detail in FIG. 26. However, a discussion of FIG. 26 will be deferred until the filter executive 76 has been fully described in order to place the discussion of the notification thread in the proper context.

After the filter executive 76 kicks off the notification thread to notify users of its actions, the logic proceeds to a block 542 in which the filter executive 76 waits for a predetermined time interval before taking any further action. In the exemplary embodiment of the present invention described herein, the predetermined time interval implemented by the filter executive 76 is fifteen seconds. After expiration of the fifteen-second time interval, the filter executive 76 checks the database 72 for any changes to the corporate default table 110, the global network protocols table 112, the user policy table 136, the user mapping table 138 and the time schedule table 114. If any changes have been made to any of these tables, corresponding rules are defined by the filter executive 76 and then made available to the filter engine 78.

In this regard, once the predetermined time interval expires, the logic proceeds to a block 544 where the filter executive 76 reads the corporate default table 110 from the database 72. In a decision block 546, the logic determines if any of the corporate defaults have changed since the filter executive 76 last read the corporate default table. More specifically, the filter executive looks for any differences between the current rules in the corporate rules set 150 and the information just read from the database's 72 corporate default table 110. If there are any changes, the logic proceeds to a block 548 where the filter executive 76 defines the corporate rules. As discussed above in connection with initializing the filter engine 78, the corporate rules set 150 is defined by setting the log-no-block rule, the log-on-off rule, and the notify-on-off rule equal to their corresponding values in the corporate default table 110. Once defined, the corporate rules ready flag is set in a block 550 and the corporate rules 150 are sent to the filter engine 78 in a block 551.

If the corporate defaults have not been updated or if they have been updated and the corresponding corporate rules defined, the logic proceeds to a decision block 552 where it determines if the global network rules table transmit flag has been set by the database 72. If so, the logic proceeds to a block 554 where the filter executive 76 reads the global network protocols table 112 and defines a set of inbound global network rules 152 and a set of outbound global network rules 154 as described above. When completed, the global network rules ready flag is set in a block 556 and the inbound and outbound global network rules 152 and 154 are sent to the filter engine 78 in a block 557.

If the global network rules table transmit flag has not been set, or if it has been set and the corresponding inbound and outbound global network rules 152 and 154 defined, the logic proceeds to a block 558 where it determines if the user policy table transmit flag has been set by in the database 72. If so, the logic proceeds to a block 560 where the filter executive 76 reads the user policy table 136 and defines the user rules set 156. It will be appreciated that the user rules set 156 is defined as described above and as shown in FIGS. 18 and 19. Once the user rules set 156 is defined, the logic proceeds to a block 562 and the user rules ready flag is set, followed by the user rules set 156 being sent to the filter engine 78 in a block 563.

If the user policy transmit flag has not been set, or if it has been set and the user rules defined, the logic proceeds to a decision block 564 where it determines if the user mapping flag has been set by the database 72. If so, the filter executive 76, acting as a naming service agent, sends the static user mapping table 138 to the naming service manager 74 in a block 566. As will be described in more detail below, the naming service manager 74 updates the mapping information maintained by it in a host mapping table 178 with the mapping information in the user mapping table 138. The naming service manager 74 then returns updated mapping information to the filter executive 76. A user mapping rules table 140 stored by the filter engine 78 as shown in FIG. 17 is then updated with the updated mapping information provided by the naming service manager 76 as users log into and out of computers connected to the LAN 44 and as IP addresses of computers connected to the LAN change.

If the user mapping flag has not been set, or if it has been set and the static user mapping table 138 has already been sent to the naming service manager 74, the logic proceeds to a decision block 568 where it determines if the time schedule transmit flag has been set by the database 72. If so, it may be necessary for the filter executive 76 to prepare a set of timing rules that will be used by the filter engine 78 to deny access to certain protocols during specified time periods. As will be described in more detail below, the timer rules are essentially inbound and outbound global network protocol rules added to the inbound and outbound global network protocols tables 152 and 154 during scheduled times.

In the actual embodiment of the present invention described herein, the filter executive 76 defines timer rules only periodically, preferably once every hour. Hence, if the time schedule transmit flag has been set by the database 72, the logic then determines in a block 570 if it has been an hour since the timer rules were last defined. If not, no new timer rules will be defined and the logic returns. On the other hand, if it has been an hour since the timer rules were last defined, the logic proceeds to a block 572 where the filter executive 76 reads the time schedule table 114 from the database 72 and defines a set of timer rules, which are then sent to the filter engine 78.

Figure 20:
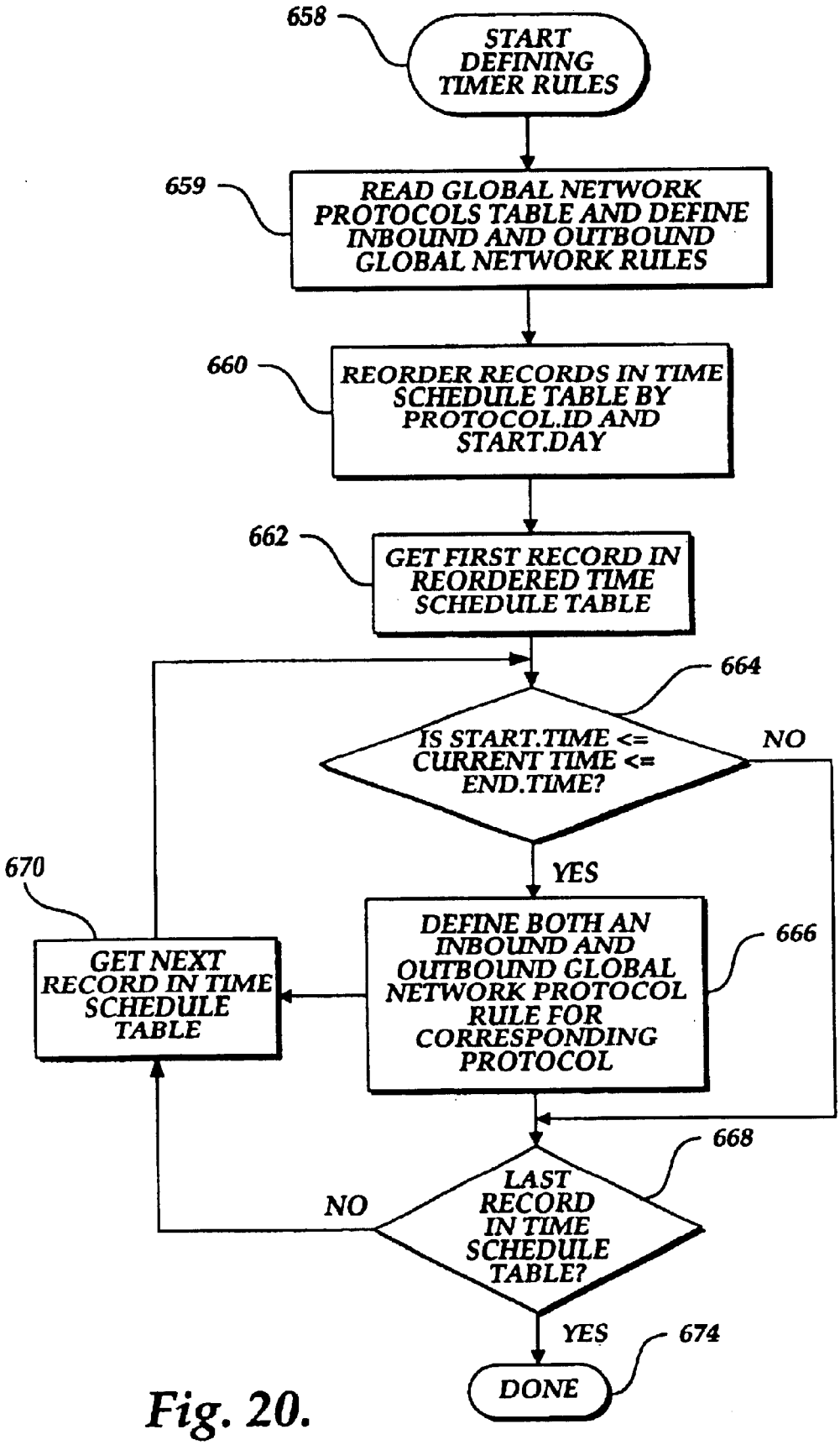
FIG. 20 is a flowchart illustrating the logic used to define a set of timer rules for each user connected to the LAN shown in FIG. 2.

The logic implemented by the filter executive 76 to define the timer rules is shown in more detail in FIG. 20. The logic begins in FIG. 20 in a block 658 and proceeds to a block 659 where the filter executive 76 reads the global network protocols table 112 and defines a set of inbound global network protocol rules 152 and a set of outbound global network protocol rules 154 as described above. Next, in block 660, the filter executive organizes the records in the time schedule 114 into groups according to protocol ID and then into subgroups according to start day. In block 662, the first record in the reorganized time schedule table 114 is obtained. In a decision block 664, the logic determines if the current time is anywhere between the start time and the end time as found in the first record. If so, the filter executive 76 defines both an inbound and an outbound global network protocol rule for the corresponding protocol and adds the inbound and outbound rules to the inbound and outbound global network protocol rules sets 152 and 154, respectively, in a block 666. The logic then proceeds to a decision block 668 where it determines if the last record in the time schedule table 114 has been processed.

Returning to decision block 664, if the current time is not between the start time and the end time found in the first record of the time schedule table 114, the logic skips block 666 and proceeds directly to decision block 668. If the result of decision block 668 is negative, the next record in the time schedule table 114 is obtained and blocks 664 through 668 are repeated for the next record. Block 664 through 668 are then repeated for each record in the time schedule table so that a "timer rule," i.e., an inbound global network protocol rule and an outbound global network protocol rule are added to the global network protocol rules sets 152 and 154, respectively, for each time schedule record in which the current time is between the start time and end time stored in the record. The logic then ends in a block 674.

Returning to FIG. 15B, once the timer rules have been defined, the logic proceeds to a block 574 where the timer rules ready flag is set. The filter executive 76 then sends the inbound and outbound global network protocol rules 152 and 154 including the "timer rules" to the filter engine 78 in a block 575. The logic then proceeds to a block 576 where all of the ready flags are cleared. Next, in a decision block 578 in FIG. 15C, the logic determines if an IP log load table 160 as shown in FIG. 25A has been exported to the database 72. As will be discussed in more detail below in connection with FIG. 24, as the filter engine 78 logs IP packets, an IP log load table 160 is created and periodically exported from the filter engine 78 to the database 72. The IP log load table 160 includes the IP addresses of every logged packet. Hence, when the filter executive 76 determines that the IP log load table 160 has been exported to the database 72, the filter executive 76 kicks off an IP resolution routine in a block 580. Consequently, the database 72 initiates a DNS query for each domain name stored in the IP log load table 160 to determine the IP address corresponding to that domain name, and stores that domain name in the IP log load table 160. Consequently, if any IP addresses have changed since the IP log load table was last exported to the database 72, the IP log table 160 is updated with the new IP addresses.

If the IP log load table 160 has not been exported to the database 72, or after the filter executive 76 kicks off IP address resolution of logged computer or host names, the logic proceeds to a decision block 582 where it determines if a predefined DNS validation timer has expired. If so, the logic proceeds to a block 584 where the filter executive 76 kicks off DNS validation of logged IP addresses. Again, as will be described in more detail below, a log of all packets passing through the filter engine 78 is kept if logging has been enabled. Consequently, the database 72 initiates a DNS query for each IP address stored in the IP log load table 160 to determine if the IP address's corresponding domain name has changed. In the actual embodiment of the present invention described herein, the DNA validation is performed once very twenty-four hours. Thus, if a web site changes its IP address within the last 24-hour period, its current IP address is found and referenced in the site table 126 and the site IP address table 127.

Figure 27:
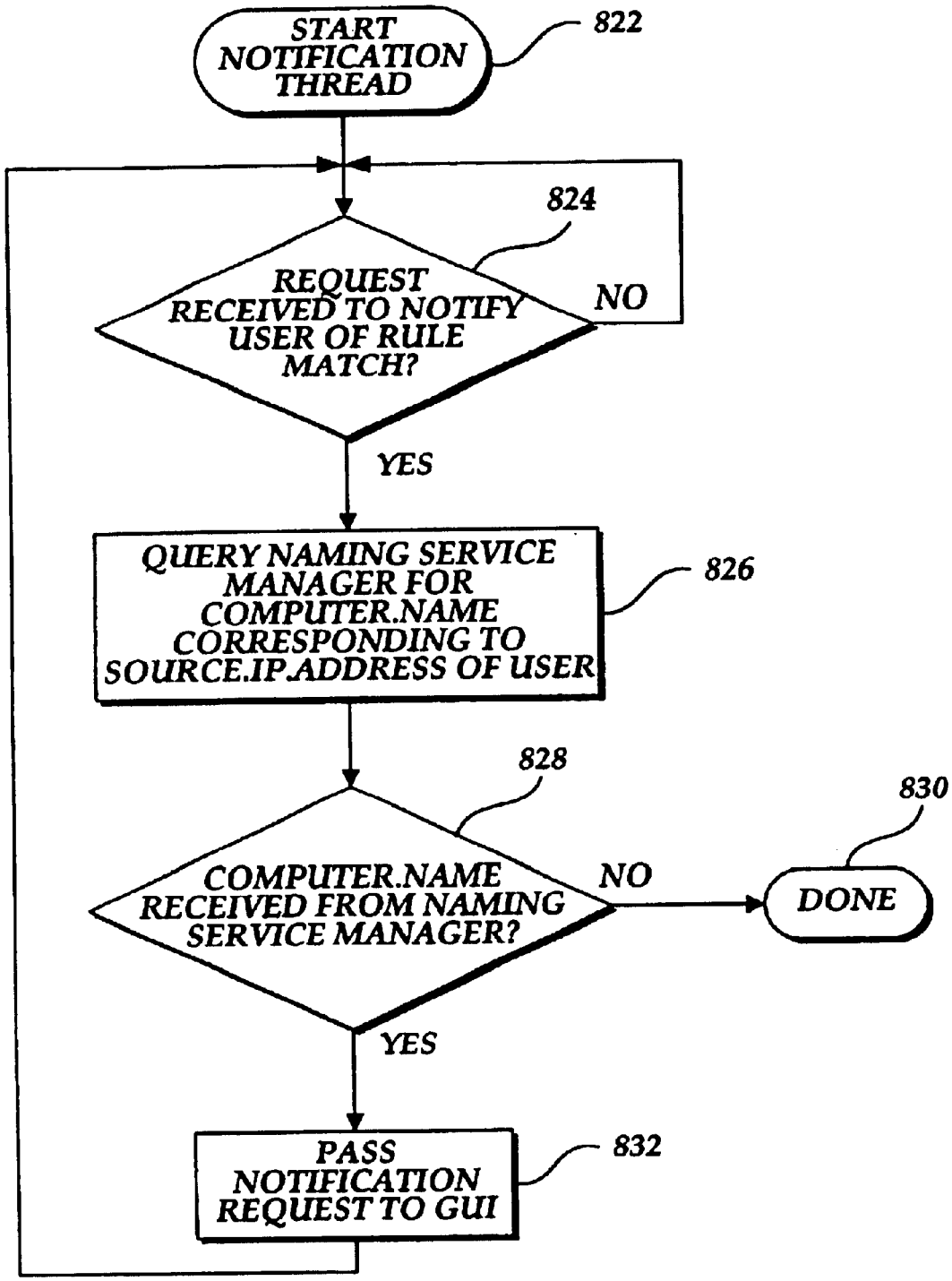
FIG. 27 is a flowchart illustrating the logic used to notify users of the computers connected to the LAN shown in FIG. 2 of actions taken by the filter engine.

After kicking off the DNS validation in block 584, the filter executive 76 kicks off a quota calculation routine in a block 586 in order to determine if the quotas applied against any of the groups or users have been exceeded. The logic implemented by the database 72 to perform these quota calculations is shown in more detail in FIG. 27. However, a detailed discussion of FIG. 27 will be deferred until the filter engine and its logging features are more fully described herein.

Figure 15B:
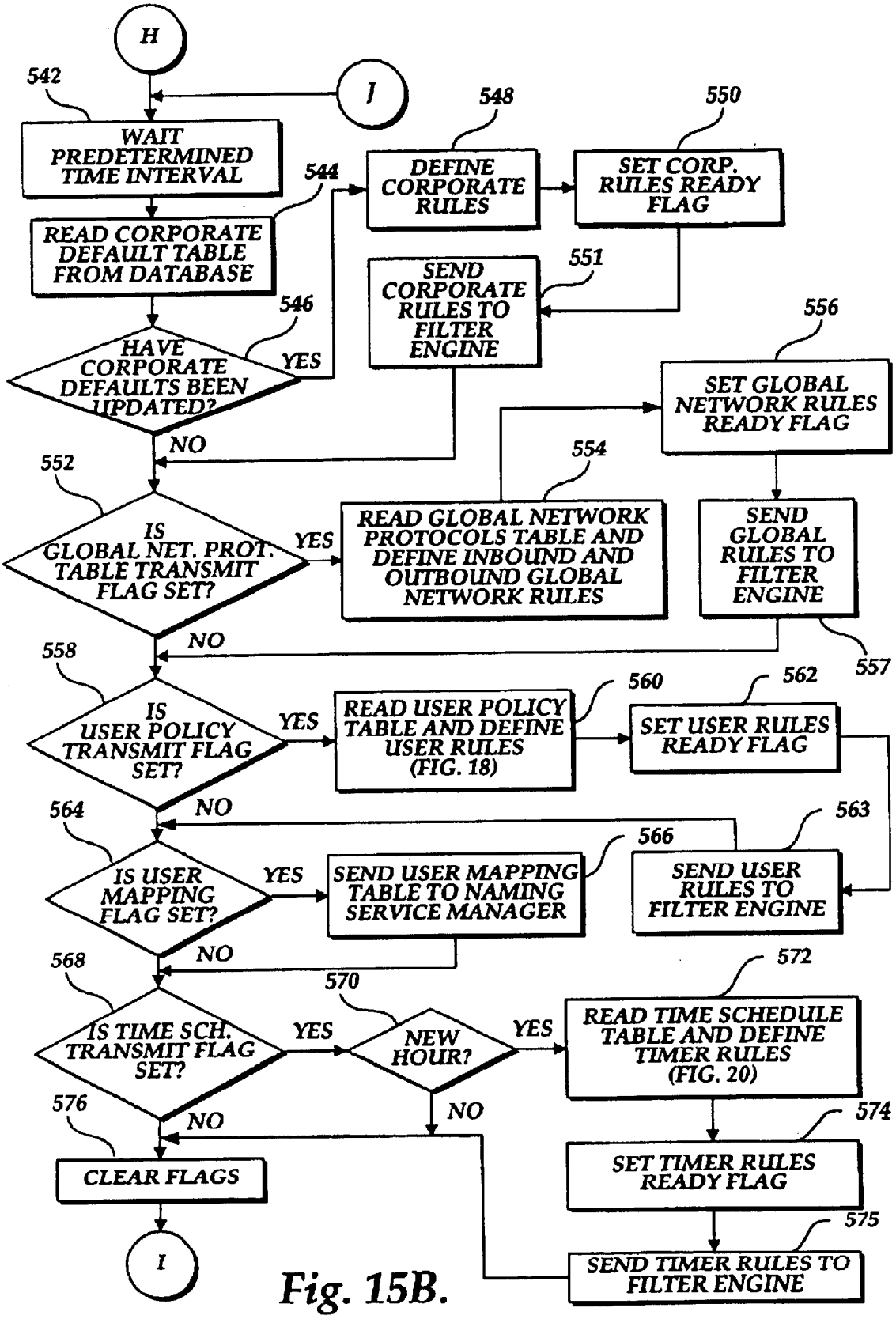
Figure 15C:
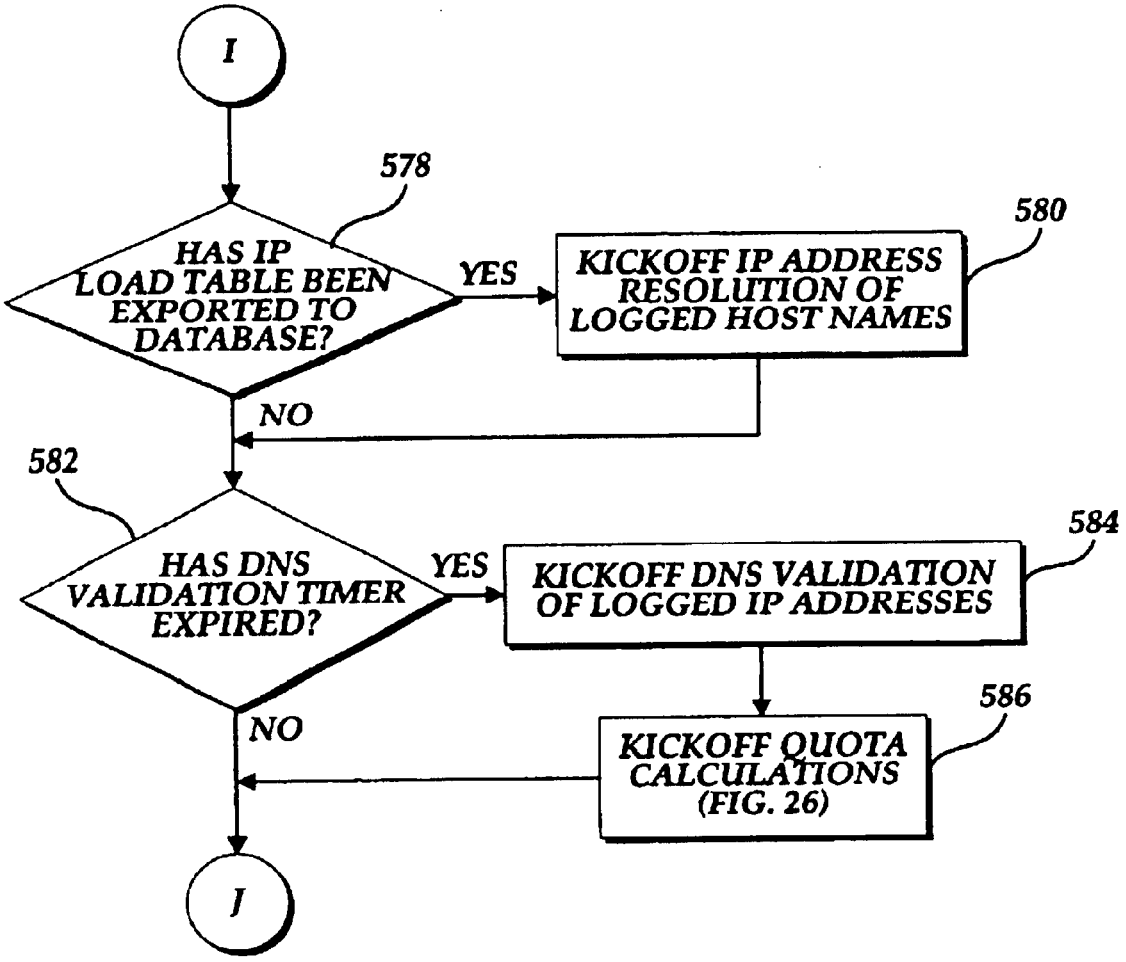

If the DNS validation timer has not expired, or if it has expired and the filter execution 76 has kicked off DNS validation and quota calculations, the logic returns to block 542 in FIG. 15B where the filter executive 76 waits for another predetermined time interval before checking the database 72 for any more changes. Consequently, in the exemplary embodiment of the present invention described herein, blocks 542 through 586 are repeated every fifteen seconds. In other words, new corporate rules 150, global network protocol rules 152 and 154, and user rules 156 are updated and a user mapping table 138 is sent to the naming service manager 74 every 15 seconds. It will be appreciated that, as the corporate rules, global network protocol rules, user rules, and timer rules are updated, and their corresponding flags set, the filter engine 78 will be notified that the rules are ready to be read by the filter engine 78.

Filtering IP Packets

It will be appreciated, that as the filter executive 76 sets the various rule ready flags, the filter engine 78 is notified that a new user rules set 156, inbound global network rules set 152 and outbound global network rules set 154 are ready. The filter engine 78 will read the rules sets and, depending on the action flag for each rule, either add the rule to the filter engine's rules sets, replace the rule from the filter engine's rules set or delete the rule entirely from the filter engine's rules sets. It will be appreciated that the filter engine's rule sets take the same form as the rules sets shown in FIG. 17. The filter engine 78 then uses the constantly updated rules to filter any IP packets passing through the network server 50. The logic implemented by the filter engine 78 is shown in more detail in FIG. 21.

Figure 21:
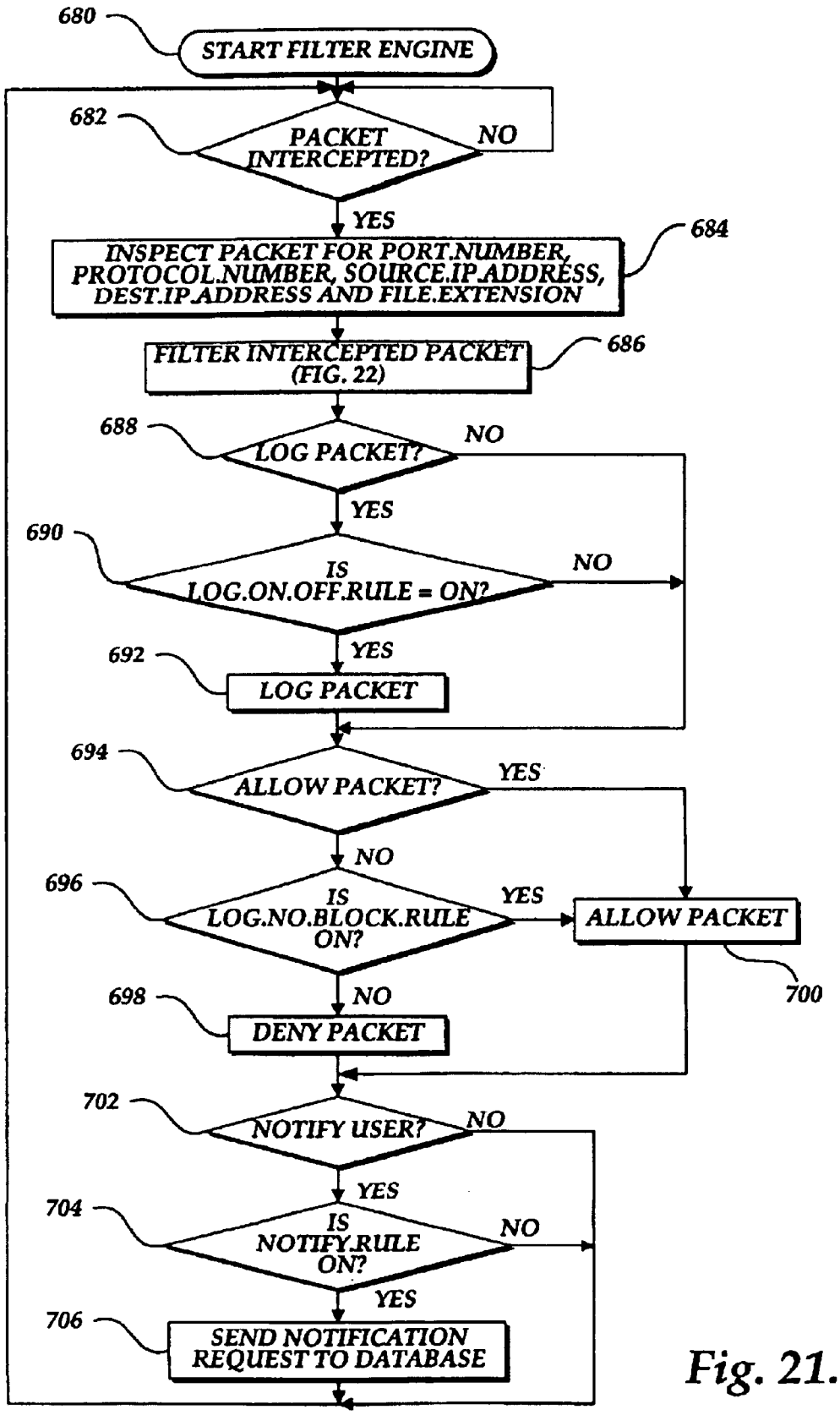
FIG. 21 is a flowchart illustrating the logic used by the filter engine component of the network management program to process Internet protocol (IP) packets communicated between the Internet shown in FIG. 1 and the LAN shown in FIG. 2.

The logic in FIG. 21 begins in a block 680 and proceeds to a decision block 682 where it determines if the filter engine has intercepted an IP packet. It will be appreciated, that the network server 50, and thus the filter engine 78 will receive both outbound IP packets from the LAN 44 to the Internet 40 and inbound IP packets from the Internet 40 to the LAN 44. If an IP packet has not been intercepted by the filter engine 78, the logic merely repeats decision block 682 until an IP packet is intercepted.

Once intercepted, the IP packet is inspected for its source IP address, i.e., the IP address of the computer sending the packet, and its destination IP address, i.e., the computer to which the packet is being sent. In addition, the IP packet is inspected for a port number in order to identify the application protocol being used to send the IP packet. In block 686, the intercepted IP packet is then filtered by the filter engine 78 to determine whether or not the packet should be allowed to pass through the filter engine 78 and/or be logged by the filter engine 78. In addition, the IP packet is filtered to determine whether or not the user should be notified of such action.

Figure 22:
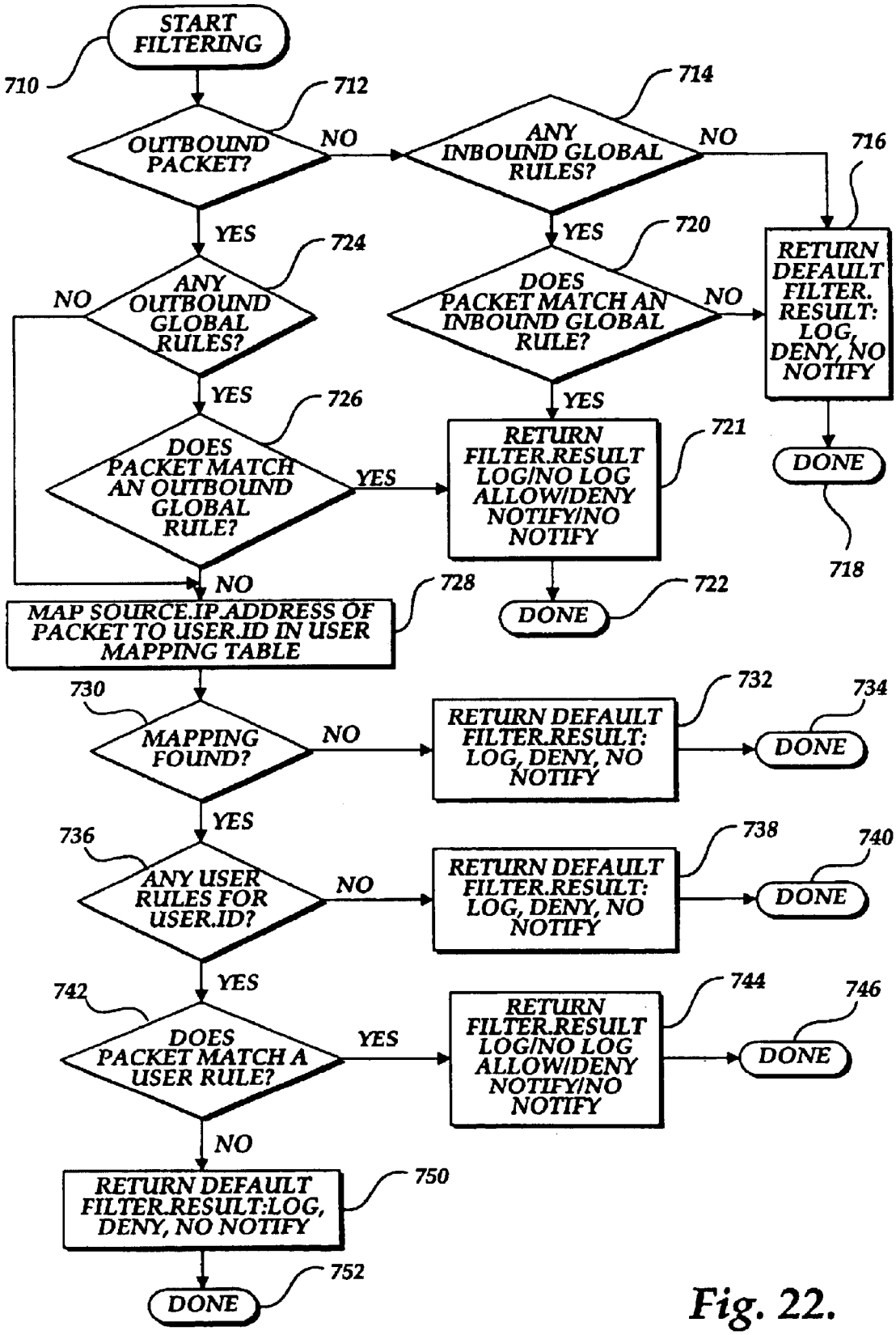
FIG. 22 is a flowchart illustrating the logic used by the filter engine to filter IP packets communicated between the Internet shown in FIG. 1 and the LAN shown in FIG. 2 in accordance with the rules defined by the filter executive.

The logic implemented by the filter engine 78 to filter an intercepted IP packet is shown in more detail in FIG. 22. The logic begins in a block 710 and proceeds to a decision block 712 where it determines if the intercepted IP packet is an outbound IP packet, i.e., an IP packet being sent from the LAN 44 to the Internet 40. If not, the IP packet is necessarily an IP inbound packet. Therefore, the logic proceeds to a decision block 714 where the logic determines if the filter engine 78 has any inbound global network protocol rules 152. If not, the logic merely returns the result of a default filter rule in a block 716, i.e., the inbound packet is to be logged but denied passage to its intended destination in the LAN 44 and the user is not to be notified. The logic then ends in 718.

However, if the filter engine 78 does have a set of inbound global network protocol rules 152, the logic proceeds from decision block 714 to a decision block 720. In decision block 720 the logic determines of the IP packet matches one of the inbound global network protocol rules. More specifically, the port number found in the inbound IP packet is compared to the destination port number in each of the inbound global network protocol rules 152. If a match is found between the IP packet's port number and the destination port number in any one of the inbound global protocol rules 152, the result of decision block 720 is positive and the logic proceeds to a block 721 in which the result of the matching inbound global network protocol rule is returned. More specifically, the value of the inbound global network protocol log/no log rule, allow/deny rule and notify/no notify rule are returned. The logic then ends in block 722. It will be appreciated from the foregoing discussion that any inbound IP packets coming from the Internet 40 are only filtered against the inbound global network protocol rules 152 in the actual embodiment of the present invention described herein. They are not filtered against any of the remaining rules. On the other hand, if the IP packet does not match an inbound global network protocol rule, the result of the default rule is returned in block 716.

Returning to decision block 712, if the intercepted IP packet is an outbound IP packet, the logic proceeds to a decision block 724 where it determines if the filter engine 78 has any outbound global network protocol rules 154. If so, the logic then determines in a decision 726 if the outbound IP packet matches any of the outbound global network protocol rules 154. More specifically, the port number found in the outbound packet is compared to the source port number of each of the outbound global network protocol rules 154. If a match between the port numbers is found, then the result of the matching global network protocol rule is returned in a block 721, i.e., the results of the outbound global network protocol log/no log rule, notify/no notify rule, and the allow/deny rule are returned. The logic then ends in block 722, and no further filtering of the outbound IP packet is performed.

On the other hand, if the filter engine 78 does not have any outbound global network protocol rules 154 or if the outbound IP packet does not match one of the outbound global network protocol rules 154, the logic proceeds to a block 728 where the filter engine 78 maps the source IP address of the outbound packet to a user ID in the user mapping table 138. More specifically, the filter engine 78 scans the user mapping rules table 140 for a record containing a source IP address matching the source IP address of the outbound IP packet. In a decision block 730, the filter engine 78 determines if such a record has been found. If so, the filter engine 78 determines if the user rules set 156 contains any rules corresponding to the mapped user ID in a decision block 736. However, if a record in the user mapping rules table 140 having the source IP address of the data packet and the mapped user ID is not found, or if the user rules set 156 does not contain any rules for the mapped user ID, the result of a default rule is returned in either a block 732 or a block 738, respectively. More specifically, the result is to log, but deny the outbound IP packet and to not notify the user of the action taken. Filtering of the outbound packet is then completed and the logic ends in either block 734 or 740.

If a mapping between the source IP address of the outbound IP packet and the user ID is found and if the user rules set 156 includes rules for the mapped user ID, the logic proceeds to blocks 742 through 752 where the outbound IP packet is filtered against the user rules 156 corresponding to the user ID. In this regard, the filter engine determines in a decision block 742 if the IP packet matches any of the rules in the user rules set 156. To make this determination, the filter engine 78 compares the outbound IP packet to each rule in the user rules set 156 until a match is found. Accordingly, the outbound IP packet is compared against each of the rules for the user found in the user rule 156 in the order that the user rules appear in the user rules set 156. Therefore, the IP packet will be compared against the file type deny rule 157 for the user, followed by the protocol deny rules 158, the site rules 159, the protocol allow rules 155, and the unknown protocol rules 153 for the user. Those of ordinary skill in the art will recognize, however, that the order in which the user rules appear in the user rules set 156 depends on the order in which created by the filter executive 76, and the order may vary without departing from the scope of the present invention. With respect to the file type deny rule 157 for the user, if a file extension is found in the outbound IP packet, the file extension will be compared against those file extensions listed in the file type deny rule 157. If there is a match, the packet will not be compared to any of the subsequent rules in the user rules set 156. Rather, the result of the user's filter type deny rule 157 is returned in a block 744, i.e., the value of the allow/deny rule, log/no log rule, and notify/no notify rule of the filter type deny rule 157, are returned and the logic then ends in block 746.

If the user does not have a file type rule 157 or if there is not a match between the outbound IP packet and the file type deny rule 157, the outbound IP packet is compared against the user's protocol deny rules 158. More specifically, the port number found in the outbound IP packet is compared to the port number in each of the user's protocol deny rules 158 until a match is found. If a match is found, the packet is not filtered against any of the remaining rules for the user. Rather, the result of the protocol deny rule, i.e., the result of the allow/deny rule, log/no log rule, and notify/no notify rule, are returned in blocks 744 and the logic ends in 746.

If not match to a protocol deny rule 158 is found, the outbound IP packet is compared against the site rules 159 for the user. More specifically, the port number and destination IP address found in the IP packet are compared to the port number and destination IP address in each of the site rules 159 for the user. Again, if a match is found, the result of the allow/deny rule, the log/no log rule, and the notify/no notify rule for the site are returned in block 744 and the logic ends in 746.

However, it is possible that the IP packet does not match any of the site rules 159. If so, the packet is compared against the user's protocol allow rules 155, i.e., the port number from the IP packet are compared to the port number of each protocol allow rule 155. If a match is found, the results of the log/no log rule, allow/deny rule and notify/no notify rule are returned in block 744 and the logic ends in 746.

If the IP packet has run the gauntlet of the file type deny rules 157, protocol deny rules 158, site rules 159 and protocol allow rules 155, and a match has not yet been found, the IP packet is finally filtered against the unknown protocol rules 153 for the user. If a match is found, the result of the unknown protocol rules 153, i.e., the results of the log/no log rule, allow/deny rule and notify/no notify rule, is returned in block 744 and the logic ends in block 746.

Finally, if the IP packet does not match any of the rules defined above, the logic proceeds to a block 750 and the result of the default filter rule is returned, i.e., the packet is to be denied, but logged and the user is not to be notified. The logic then ends in block 752.

Once the intercepted IP packet has been filtered as described above, and a log/no log, allow/deny and notify/no notify result returned from the filtering process, the logic proceeds from block 686 in FIG. 21 to a decision block 688. In decision block 688, the logic determines if the IP packet is to be logged. In other words, the logic determines if the filtering process returned a log result. If so, the logic determines in a block 690 if the corporate log-on-off rule has been set to on. If so, the IP packet is stored in a logging buffer in the filter engine 78 in block 692. However, if the filter result was to not log the IP packet, or if the corporate rule is to not log the IP packet, the logic skips block 692 and proceeds directly to a decision block 694.

In decision block 694, the logic determines if the IP packet is to be allowed to pas to its intended destination. More specifically, the logic determines if the filter result was to allow or deny the IP packet. If the IP packet is denied, the logic determines in decision block 696 if the corporate log-no-block rule is on. If so, the IP packet is allowed to pass to its intended destination in block 700 because the corporate rule is to simulate the blocking rules only. However, if the result of the filtering process was to deny the IP packet, and if the corporate rule is to enable blocking of all IP packets, the IP packet is denied and discarded in a block 698 and is not allowed to pass to its intended destination.

Once it has been determined whether the packet should be logged and/or discarded, the logic proceeds to a decision block 702 where it determines if the user should be notified of the action taken by the filter engine 78 with respect to the IP packet. More specifically, the logic determines of the filter result was to notify or not notify the user. If the filter result was to notify the user, the logic determines in a decision block 704 if the corporate notify rule is set to on. If so, the filter engine 78 issues a notification request in block 706. However, if the filter result was to not notify the user or if the corporate rule for notifying the user is set to off, a notification request is not issued by the filter engine 78.

Once the IP packet has been filtered, and the appropriate action for the IP packet taken by the filter engine 78, the logic returns to decision block 682 and awaits interception of another IP packet. Blocks 682 through 706 are then repeated for each IP packet intercepted by the filter engine 78. Those of ordinary skill in the art will appreciate that as each IP packet intercepted by the filter engine 78 is processed, the filter engine 78 will either log or not log the IP packet, discard or pass the IP packet to its intended destination, and notify or not notify the user of the action taken by the filter engine 78 depending on the policies as originally set by the system administrator, administrator or manager using the GUI 70. As will be discussed in more detail below, the logged, intercepted IP packets are organized into tables in the database 72 so that system administrators, administrators and managers can maintain and review outbound requests made by users of the LAN 44 for information and services located on the Internet.

Logging Functions

As noted above, the filter executive 76 kicks off the series of logging threads, which are fed raw logged data by the filter engine 78. The logic used by the filter executive 76 to implement these logging threads is shown in more detail in FIG. 23. The logic begins in a block 760 and proceeds to a block 762 where the filter executive 76 kicks off the collection of a series of one-minute lists of logged IP packets. More specifically, the filter executive 76 begins collecting logged IP packets into lists in one minute intervals. During each one-minute interval, the filter executive 76 collects all logged IP packets in a temporary buffer. As the database 72 continues collecting the one-minute lists of IP packets, the filter executive 76 also waits for the transaction load interval as set in the corporate defaults table 110 to expire in block 764. Upon expiration, the filter executive 76 condenses all of the one-minute lists it has collected during the transaction load interval into the IP log load table 160 that is shown in more detail in FIG. 25A. More specifically, for each IP packet collected, the filter executive 76 stores a record in the IP log load table 160 including the start time of the transaction, the user ID for the user who sent the IP packet or was to receive the packet, the source IP address of the IP packet, the destination IP address of the IP packet, the port number stored in the IP packet, the bytes of data being transferred in by the IP packet if it was an inbound IP packet, the bytes of data being transferred out by the IP packet, if the packet was an outbound IP packet, the filter result (i.e., log/no log, allow/deny, notify no notify), and the access flag.

Once all of the one-minute lists of IP packets have been condensed into the IP log load table 160, the filter executive 76 exports the IP log load table to the database 72 in a block 771 and kicks off a routine to resolve the IP log load table 160 in a block 768. The logic then returns to block 764 and waits for the expiration of the transaction load interval.

Figure 24:
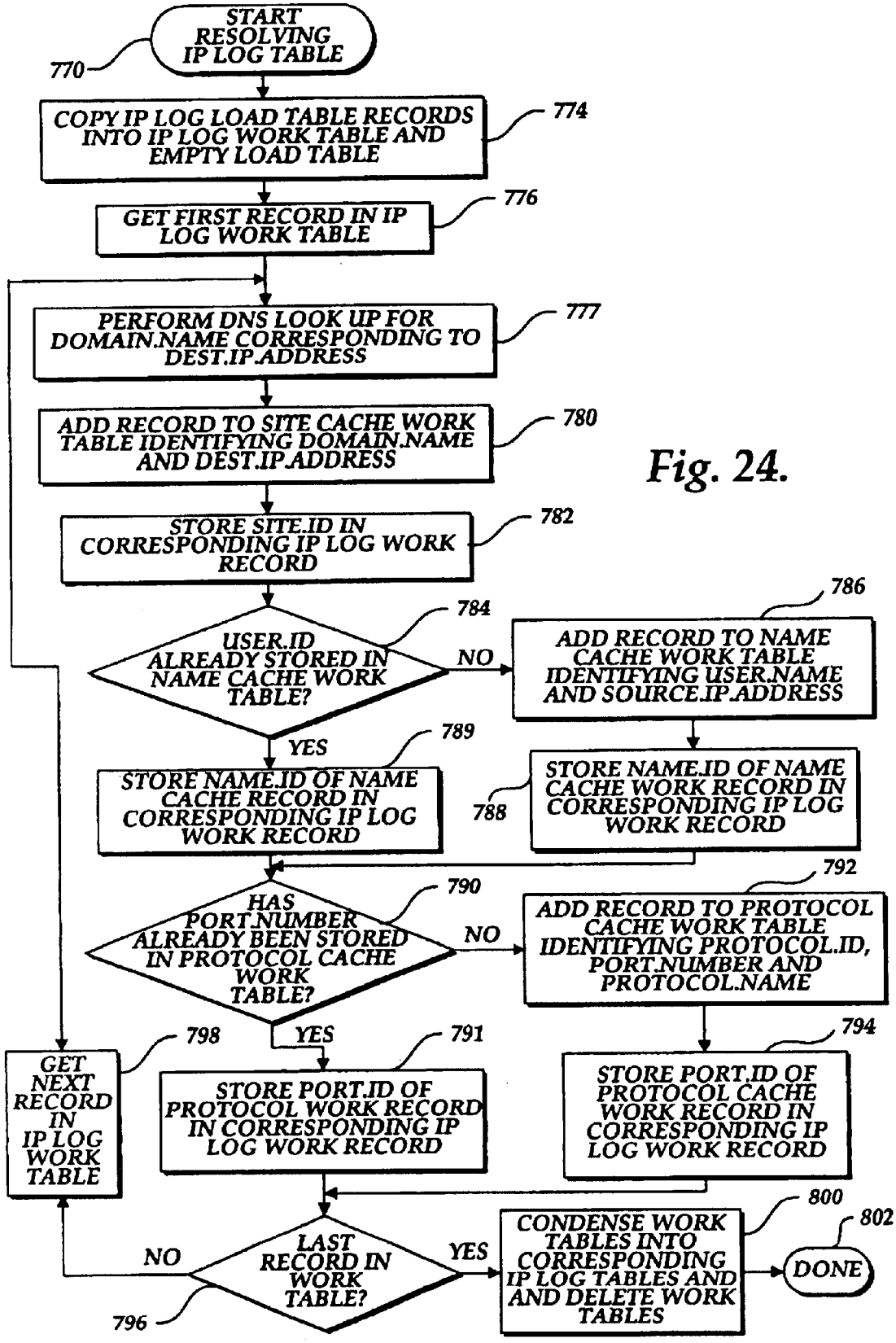
FIG. 24 is a flowchart illustrating the logic used to resolve the log table formed in accordance with FIG. 23.
Figure 25A:
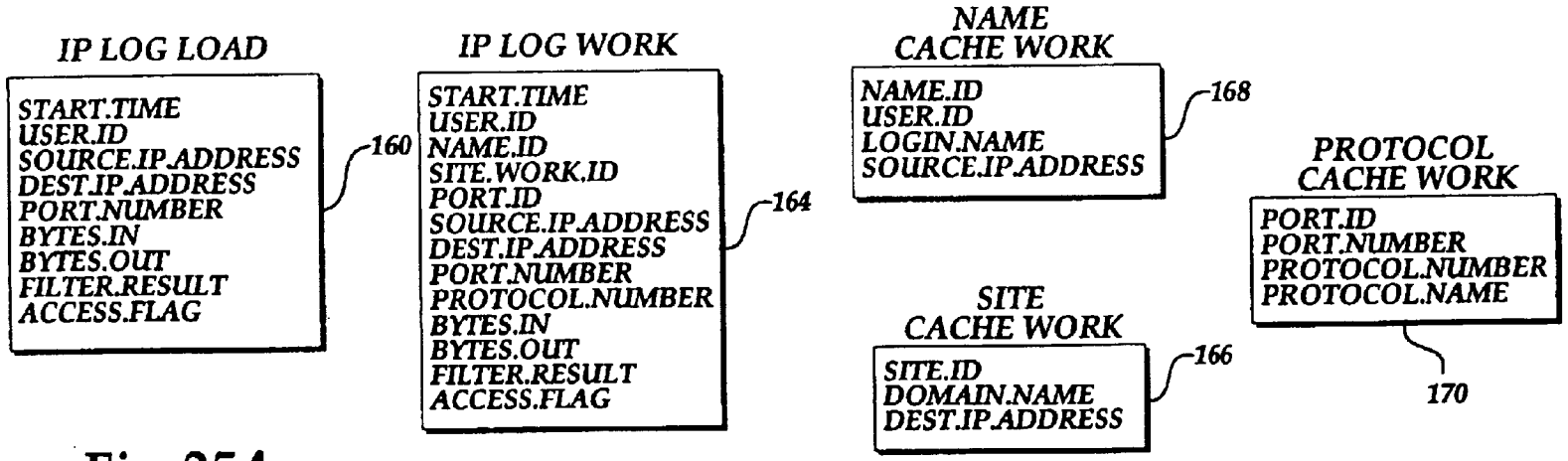
FIGS. 25A and 25B are block diagrams illustrating a plurality of tables stored by the database for organizing logging information.
Figure 25B:
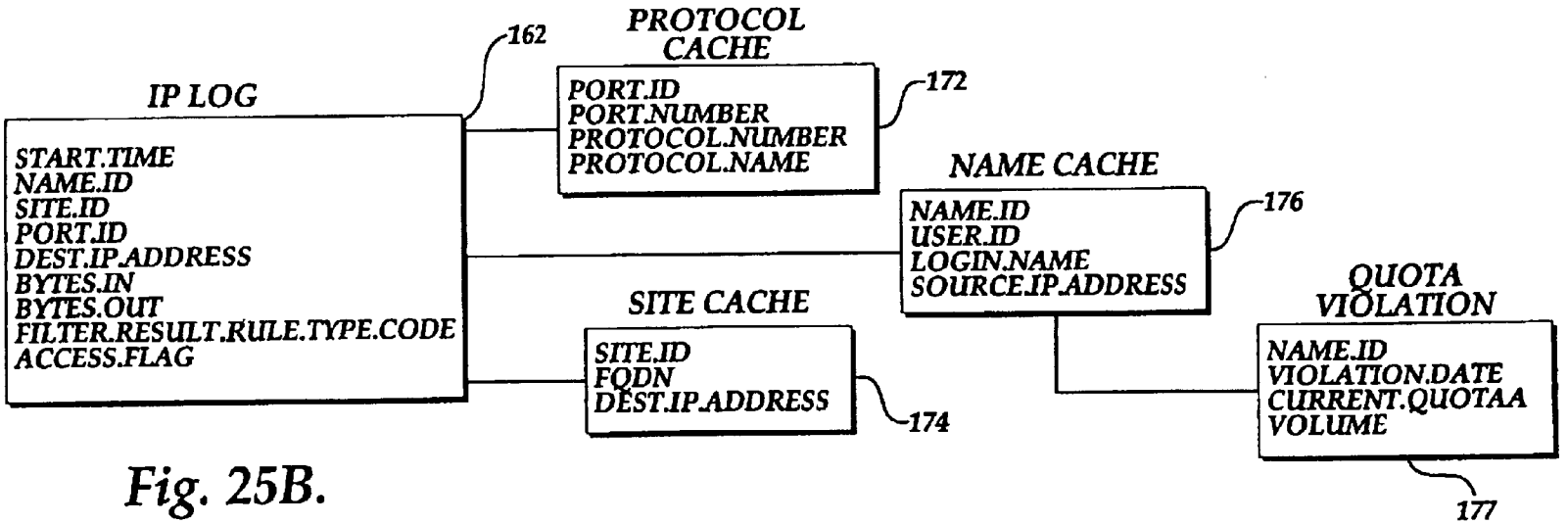

The logic implemented by the filter executive 76 database to resolve the IP log load table 160 into an IP log table 162 is shown in more detail in FIG. 24. The logic begins in a block 770 and proceeds to a decision block 772 where the logic determines if the load table transmit flag has been set. If not, the logic merely repeats block 772 until the load table transmit flag has been set by the filter engine 78. At that time, the IP log load table 160 is copied into an IP log work table 164 in the database 72 in a block 774. The IP log load table 160 is then emptied so that it can be filled again by the logging threads implemented by the filter engine 78.

In a block 776, the first record in the IP log work table 164 is obtained. In a block 776, the filter executive 76 performs a DNS lookup for a domain name corresponding to the destination IP address of the logged packet. In a block 78, a record is added to a site cache work table 166 for the site specified in the IP log work table record. The record includes a site ID identifying the record in the site cache work table 166, the domain name for the site and the destination IP address of the site. In a block 782, the site ID for the newly added record to the site cache work table 166 is added to the corresponding IP log work record for the logged packet.

The logic then proceeds to a decision block 784 where it determines if the user ID in the IP log work record has already been stored in a name cache table 176. If the user ID has already been stored in the name cache work table 168, then the user corresponding to the user ID has already attempted to transmit an IP packet and that IP packet has already been logged. If this is not the case, however, a record is added to the name cache work table 168. The record includes a name ID identifying the record being added, the user ID, the user's login name as retrieved from the user's record in the users table 118 using the user ID, and the source IP address of the IP packet, which would be the IP address of the computer to which the user is logged in and from which the user sent the packet. In a block 788, the name ID of the record just added to the name cache work table 166 is stored in the corresponding IP log work record. However, if in decision block 784, the user ID in the IP log work record has not already been stored in the name cache table 176, the name ID from the user's corresponding record in the name cache table 176 is stored in the IP log work record in a block 789.

If the user ID has already been stored in the name cache work table or if the appropriate name ID record has been stored in the corresponding IP log work record the logic proceeds to a decision block 790 where it determines if the port number in the IP log work record has already been stored in a protocol cache table 172. If not, an IP packet has not been logged that has used this particular port and, hence, protocol. Thus, in a block 792, a record is added to the protocol cache work table 170 that includes a port ID identifying the newly added record and the port number and protocol name for the protocol. In a block 794, the name ID of the record just added to the protocol cache work table 170 is stored in the corresponding IP log work record. However, if in decision block 790, the port number in the IP log work record has already been stored in the protocol cache table 172, the port ID from the protocol's corresponding record in the protocol cache table 170 is stored in the IP log work record in a block 791.

Once the IP log work record has been processed as described above, the logic proceeds to a decision block 796 where it determines if the last record in the IP log work table 164 has been processed. If not, the next record in the IP log work table 164 is obtained in a block 798 and blocks 776 through 796 are repeated for the next record. It follows that block 776 through 798 are then repeated for each record in the IP log work table 164. When the last record is processed, the logic proceeds to a block 800 where the IP log work table 164, name cache work table 168, site cache work table 166 and protocol cache work table 170 are condensed into a corresponding IP log table 162, protocol cache table 172, site cache table 174 and name cache table 176, respectively. The records in each of the work tables are then deleted. The logic then ends in a block 802.

It will be recognized by those of ordinary skill in the database arts that once the IP log and cache tables have been generated as described above, that these tables will become available for various other database functions including database management and database reporting functions. In the actual embodiment of the present invention described herein, the system administrator, mid-level administrator or manager has the option of preparing various reports using the IP log and cache tables. To do so, the operator selects the reporting option toolbar button 71 in the main window 84. However, the reporting options will not be described in detail herein because they are conventional and a discussion of them is not necessary in order to disclose an illustrative embodiment of practicing the invention.

Once the IP log 162 has been created, the database 72 is capable of calculating quota violations. As noted above, with respect to the filter executive 76, one of the functions of the filter executive 76 is to kick off a quota violation calculation at the expiration of a predetermined time interval. In the actual embodiment of the present invention described herein, the predetermined time interval is twenty-four hours. Therefore, the database 72 calculates quota violations once a day. The logic implemented by the database to calculate a quota violation is shown in more detail in FIG. 26.

Figure 26:
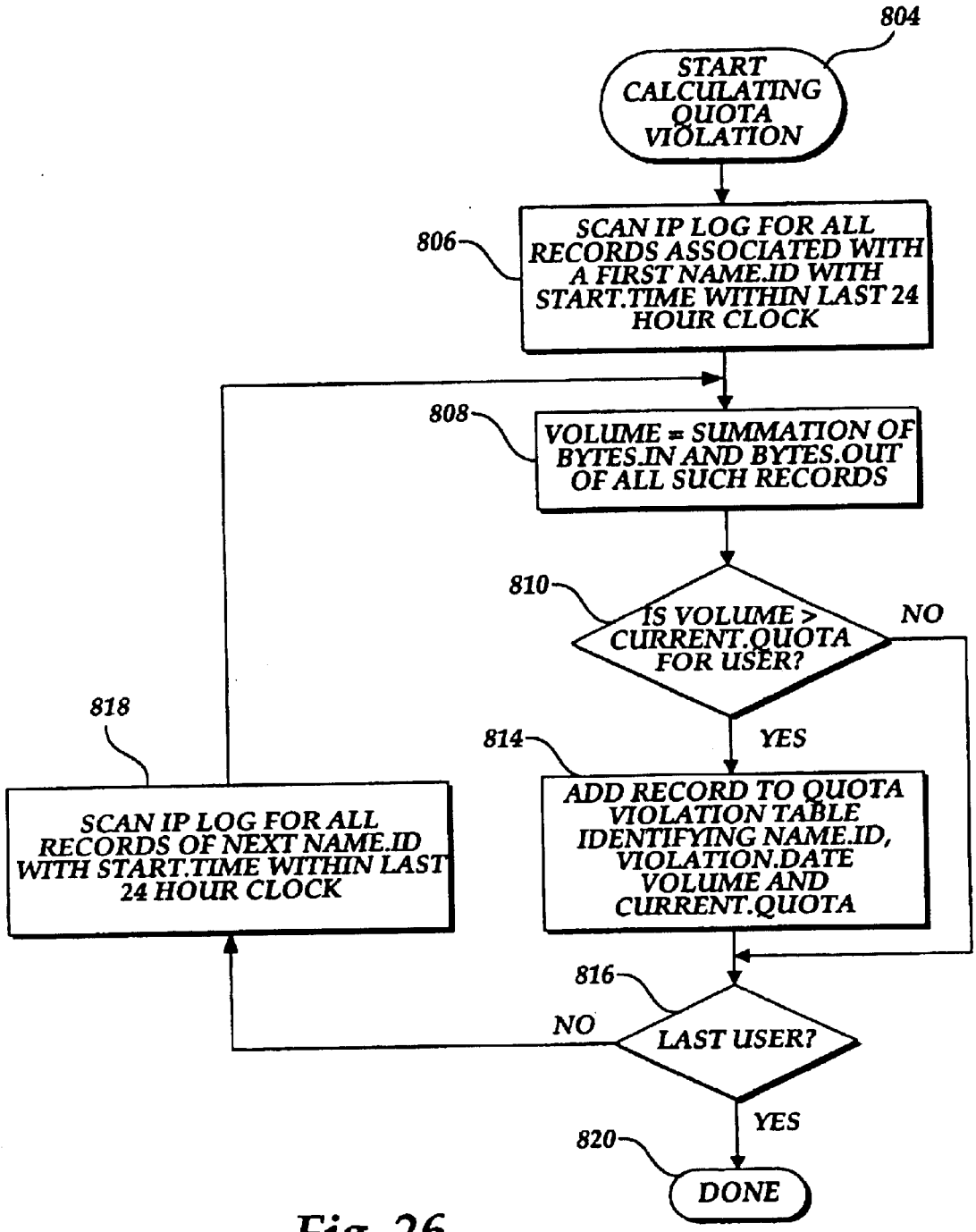
FIG. 26 is a flowchart illustrating the logic used to calculate quota violations based on the amount of data communicated between the Internet shown in FIG. 1 and the LAN shown in FIG. 2.

The logic begins in FIG. 26 in a block 804 and proceeds to a block 806. In block 806, the database 72 scans the IP log table 162 for all records associated with a first name ID, i.e., a first user, that have a start time that falls within the last twenty-four hour period. In a block 808, the total volume of both inbound and outbound IP packet traffic from the corresponding user is calculated as the summation of values stored in the bytes in and bytes out fields of all such records. In a decision block 810, the logic determines if the total volume calculated is greater than the current quota for that user as stored in the user quota table 125. It will be appreciated that the current quota for the user is located in the user quota table by using the name ID for the user in the IP log table 162 as an index into the name cache table 166 to identify the user ID corresponding to that name ID. The user ID is then used as an index into the user quota table to find the record for the user containing the current quota. If the calculated volume is not greater than the current quota then a violation has not occurred and the logic merely proceeds to a decision block 816 where it determines if the last user in the IP log table 162 has been processed. However, if the calculated volume is greater than the current quota for the user a record is added to a quota violation table 186 that includes that name ID for the user, the date of the violation, the current quota for the user and the volume calculated.

The logic then proceeds to the decision block 816 where it determines if the last user in the IP log table 162 has been processed. If not, the database scans the IP log table 162 for all records associated with a next name ID (i.e., all records associated with a next user) that have a start time that falls within the last twenty-four hour period. Block 808 through 818 are then repeated for each user having any records in the IP log table 162. Consequently, a record will be added to a quota violation table 168 stored in the database 72 for every user having a quota violation. The logic then ends in a block 820.

As also noted above with respect to the filter executive 76, one of the functions performed by the filter executive 76 is to kick off a notification thread. The notification thread logic implemented is shown in more detail in FIG. 27. The logic begins in a block 822 and proceeds a block 824 where it determines if a request has been received from the filter engine 78 to notify the corresponding user of a user rule match. If such a request has not been received, the logic merely repeats block 824 until such a request has been received. If a notification request is received from the filter engine 78, a query is sent to the naming service manager 74 for the computer name corresponding to the source IP address of the user. As will be described in more detail below, the naming service manager 74 maintains a host mapping table 178 that keeps track of current mapping information. If the naming service manager 74 has the mapping information requested by the filter executive 76, it will return the computer name to the filter executive 76. Therefore, in a decision block 828, the logic determines whether a computer name has been received from the naming service manager 74. If not, there is no current mapping information for the user to a computer and a notification message cannot be sent. Accordingly, the logic ends in a block 830. However, if the naming service manager 74 returns a computer name for the user, the filter executive 76 passes the notification request to the GUI 70. The GUI 70 then generates an appropriate message. The logic then returns to block 824 and blocks 824 through 832 are repeated for each notification request received from the filter engine 78.

Updating Network Mapping Information

Now that the GUI 70, the rules and logging database 72, filter executive 76 and filter engine 78 have been more fully described, the naming service manager 74 will be described in more detail. However, it will be appreciated that the naming service manager 74 is also disclosed in commonly assigned U.S. patent application Ser. No. 08/826,598, entitled METHOD AND APPARATUS FOR RESOLVING NETWORK USERS TO NETWORK COMPUTERS, filed Apr. 3, 1997, to Abraham et al, the disclosure and drawings of which are specifically incorporated herein by reference.

As discussed above, the filter executive 76, acting as a naming service agent, periodically sends the naming service manager 74 the static user mapping table 138. The naming service manager 74 updates its host mapping table 138 with the mapping information and returns the updated mapping information to the filter executive 76. Acting as a naming service application, the filter executive 76 further processes the updating mapping information from the user mapping table 138 and sends it to the filter engine 78. More specifically, the naming service manager 74 informs the filter executive that users of the computers interconnected to form the LAN 44 have either logged into or logged out of a particular computer. The filter executive 76 then sends this information to the filter engine 78 so that the filter engine filters incoming and outgoing IP traffic using the most current mapping information. Therefore, the filter engine 78 will be notified immediately if a user of the LAN 44 logs into or out of the LAN and will begin or cease filtering IP packets accordingly. In addition, if the IP address of a computer currently being utilized by the user changes, the filter engine 78 will filter IP packets based on the new IP address rather than the old, outdated IP address.

As shown in FIG. 4, the naming service manager 74 receives mapping information from the filter executive 76 in its role as a naming service agent. In this regard, the filter executive 76 is referred to as a static source of mapping information because computer-to-user mappings are statically assigned by system administrators and mid-level administrators and maintained in the static user mapping table 138 as described above. The filter executive 76 periodically sends the naming service manager 74 the user mapping table 138 in the form of a transaction container 184 that will be described in more detail below. Each record of the static user mapping table 138 will comprise a login update transaction record 183 in the transaction container 184 including the user ID, the login name for the user, the name of the computer to which the user is assigned and the IP address of the computer to which the user is assigned.

The naming service manager 74 may also receive mapping information from either the domain controller agent 75 or the host agent 77 located on the domain controller server 60. As noted above, the domain controller agent 75 gathers dynamic user login and logout information, i.e., updated computer-to-user mappings and transmits that information to the naming service manager 74. The host agent 75, on the other hand, gathers IP address updates, i.e., updated IP address-to-computer mappings, and provides this information to the naming service manager 74. Since both the domain controller agent 75 and the host agent 77 provide dynamic or changeable mapping information, both such agents are referred to as dynamic sources of naming information.

Figure 28A:
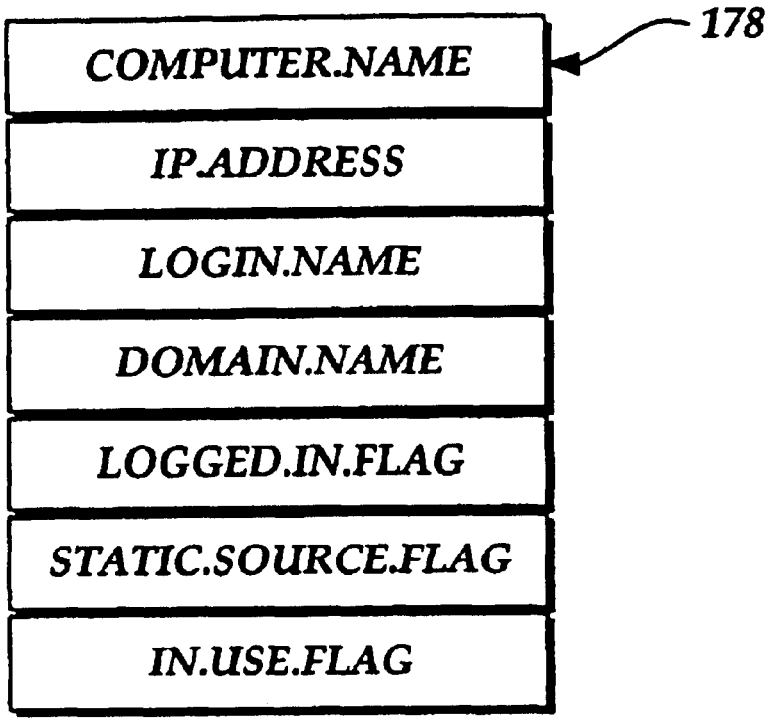
FIG. 28A is a block diagram illustrating a host mapping table used by the naming service manager to maintain naming service information in accordance with the present invention.

The mapping information gathered by the naming service agents, i.e., filter executive 76 and domain controller agent 75 or host agent 77, and provided to the naming service manager 74, is maintained by the naming service manager 74 in a host mapping table 178. The host mapping table 178 is shown in more detail and in FIG. 28A. The host mapping table 178 consists of a plurality of records containing mapping information for each computer connected to the LAN 44. More specifically, each record includes a field for storing the computer name, the IP address assigned to that computer name, the login name of the user currently utilizing the computer and the fully qualified domain name for the computer. In addition, the record includes a logged in flag, which when set, indicates that the user identified in the record by login name is logged in to the computer identified in the record. In addition, a static source flag is provided, which when set, indicates that the mapping information contained in the record was provided to the naming service manager 74 by a static source for such information, i.e., the filter executive 76. If not set, the static source flag indicates that the mapping information contained in the record was provided by a dynamic source, i.e., a naming service agent that provides dynamic or changeable naming service information such as domain controller agent 75 or host agent 77. Finally, each record contains an in use flag, which when set, indicates that the record is an active record, and thus may be served to the filter executive 76.

Figure 28B:
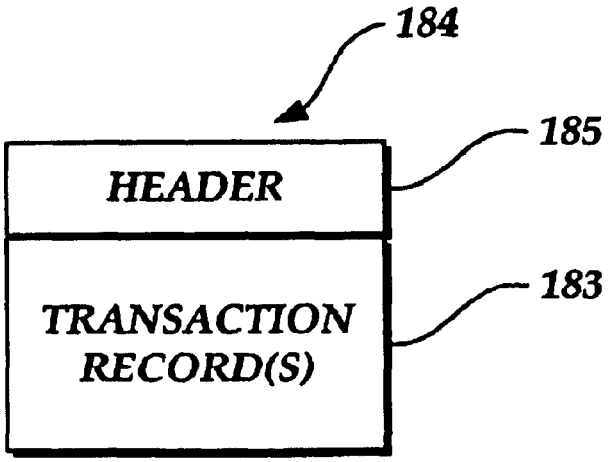
FIG. 28B is a block diagram of a transaction container which stores the mapping information as it is communicated between the naming service agent, the naming service manager, and the naming service application.

The naming service manager 74 receives mapping information from the filter executive 76 and either the domain controller agent 76 or host agent 77 and returns updated mapping information to the filter executive 76 acting as an application in the form of a transaction container 184 shown in FIG. 28B. The transaction container 184 includes a header 185 followed by zero or more transaction records 183. The header 185 identifies the type of transaction being performed. For example, if the transaction container 55 contains updated mapping information for the host mapping table 178, the header will identify the transaction container 184 as an update container and the header will be followed by a plurality of transaction records 183 containing the updated mapping information. Each transaction record 183 is further identified as a user login update record, a user logout update record, a current address update record, or a prior address update record depending on the updated mapping information the transaction record contains. The last transaction record 183 in the transaction container 184 is an empty record and indicates the completion of transaction records in the transaction container 184.

In some instances, the transaction container 184 may contain information other than updated mapping information. More specifically, the transaction container 184 may contain a request from either a naming service agent 75 or 77, or the filter executive 76 to register as an agent or application with the naming service manager 74. In such cases, the header 185 of the transaction container 184 identifies the transaction container as a naming service agent or application registration container, whichever the case may be. However, the transaction container 184 does not contain any transaction records 183. As will be described in more detail below, when the naming service manager 74 receives a registration container from either agent 75 or 77, or the filter executive 76, the naming service manager 74 opens communication with the agent or the filter executive 76 and begins accepting transaction containers 184 from the agents 75 or 77 and communicating transaction containers 184 to the filter executive 76.

Similarly transaction containers 184 may contain requests from either naming service agent 75 or 77, or the filter executive to unregister and close communications with the naming service manager 74. In such cases, the header 185 of the container 184 identifies the transaction container as an unregistration container, but the transaction container does not contain any transaction records 183.

Finally, a host agent 77, a domain controller agent 75, or the filter executive 76 may query the naming service manager 74 for mapping information regarding a particular network user or network computer. Consequently, the agent or filter executive will send the naming service manager 74 a transaction container 184 identified in the header 185 as a query container. In addition, the header 185 contains the login name of the user for whom the agent or the filter executive 76 is seeking mapping information or the IP address or computer name of a computer for which the agent or filter executive 76 is seeking mapping information. As will be described in more detail below, the naming service manager 74 will return the corresponding mapping information found in the host mapping table 178. The query container does not contain any transaction records.

Figure 29A:
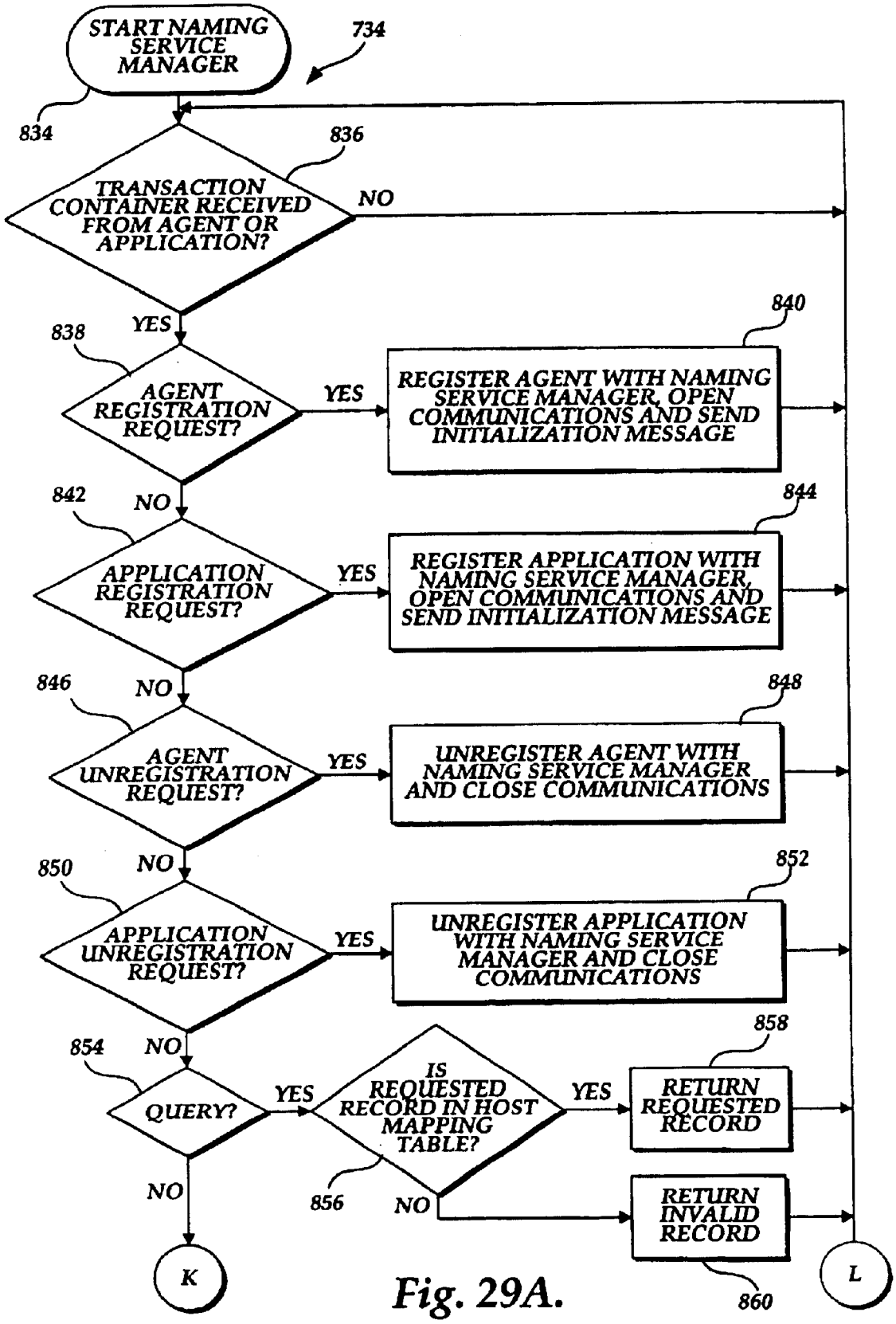
FIGS. 29A and 29B are a flow chart illustrating the logic used by the naming service manager to collect, maintain and serve mapping information in accordance with the present invention.
Figure 29B:
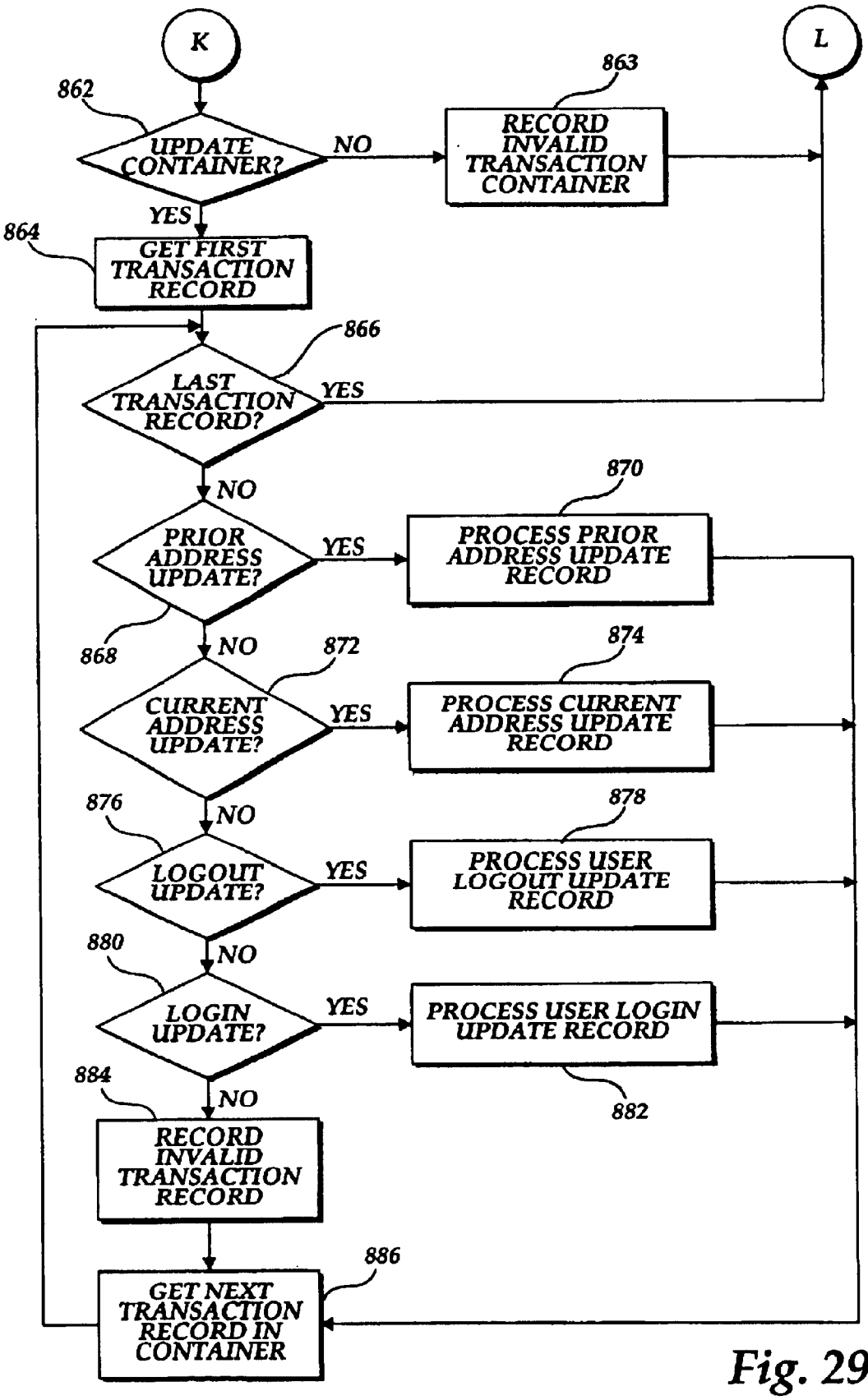

The logic implemented by the naming service manager 74 to process transaction containers 184 received from naming service agents and to send transaction containers 184 containing mapping information to the filter executive 76 is shown in FIGS. 29A and 29B. The logic begins in FIG. 29A in a block 834 and proceeds to a block 836 where the logic determines if a transaction container 184 has been received from one of the naming service agents, i.e., the filter executive 76, acting as an agent, or the domain controller agent 75 or the host agent 77, whichever the case may be. If the result of decision block 836 is negative, block 836 is merely repeated until a transaction container 184 is received by the naming service manager 74. Once a transaction container 184 is received, the logic proceeds to a decision block 838 where it determines if the transaction container 184 contains a registration request from a naming service agent. If so, the logic proceeds to a block 840 where the naming service manager 74 opens communications with the requesting naming service agent, sends the naming service agent an initialization message in the form of a transaction container 184 and registers the naming service agent as a source of mapping information. It will be appreciated that the filter executive 76 is registered as a static source of information, while the domain controller agent 75 and host agent 77 are registered with the naming service manager as dynamic sources of mapping information.

Figure 30:
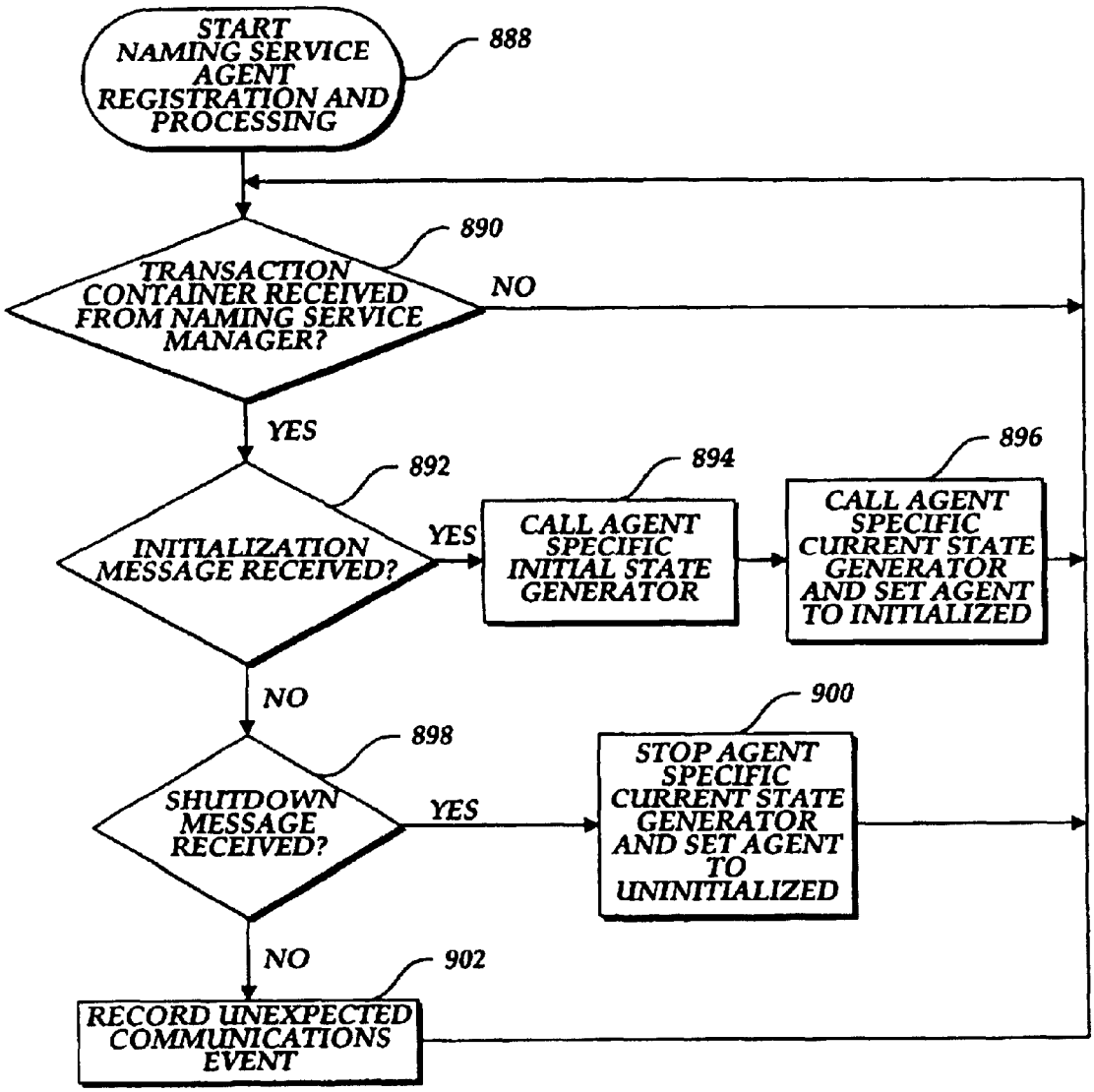
FIG. 30 is a flow chart illustrating the logic used by a naming service agent to gather mapping information regarding the computers connected to the LAN shown in FIG. 2.

FIG. 30 depicts the logic implemented by the domain controller agent 75 or host agent 77 once it sends a registration request to the naming service manager 74. The logic begins in FIG. 30 in a block 888 and proceeds to a decision block 890 where the naming service agent determines if a transaction container 184 has been received from the naming service manager 74. If no such transaction container has been received, decision block 890 is merely repeated by the naming service agent until a transaction container 184 is received from the naming service manager 74. When this occurs, the logic proceeds to a decision block 892 where the naming service agent determines if the transaction container 184 contains an initialization message from the naming service manager 74. If so, the naming service agent implements an initial state generator to begin gathering mapping information regarding the computers connected to the LAN 44 in a block 894.

Once the specific agent initial state generator has been called, a current state generator for the naming service agent is called and the naming service agent is set to an initialized state in a block 896. The logic then returns to decision block 890 where the naming service agent waits for another transaction container 184 from the naming service manager 74.

The initial state generator and the current state generator called in blocks 276 and 278, respectively, depend on the specific naming service agent, i.e., domain controller agent 75 or host agent 77. Although only a domain controller agent 75 and a host agent 77 are described herein, those of ordinary skill in the art will recognize that many other types of agents may be employed by the present invention, and that the domain controller agent 75 and host controller agent 77 are merely illustrative examples of such naming service agents. The initial and current state generators for the domain controller agent 75 and the host agent 77 will be described in more detail below.

Figure 31:
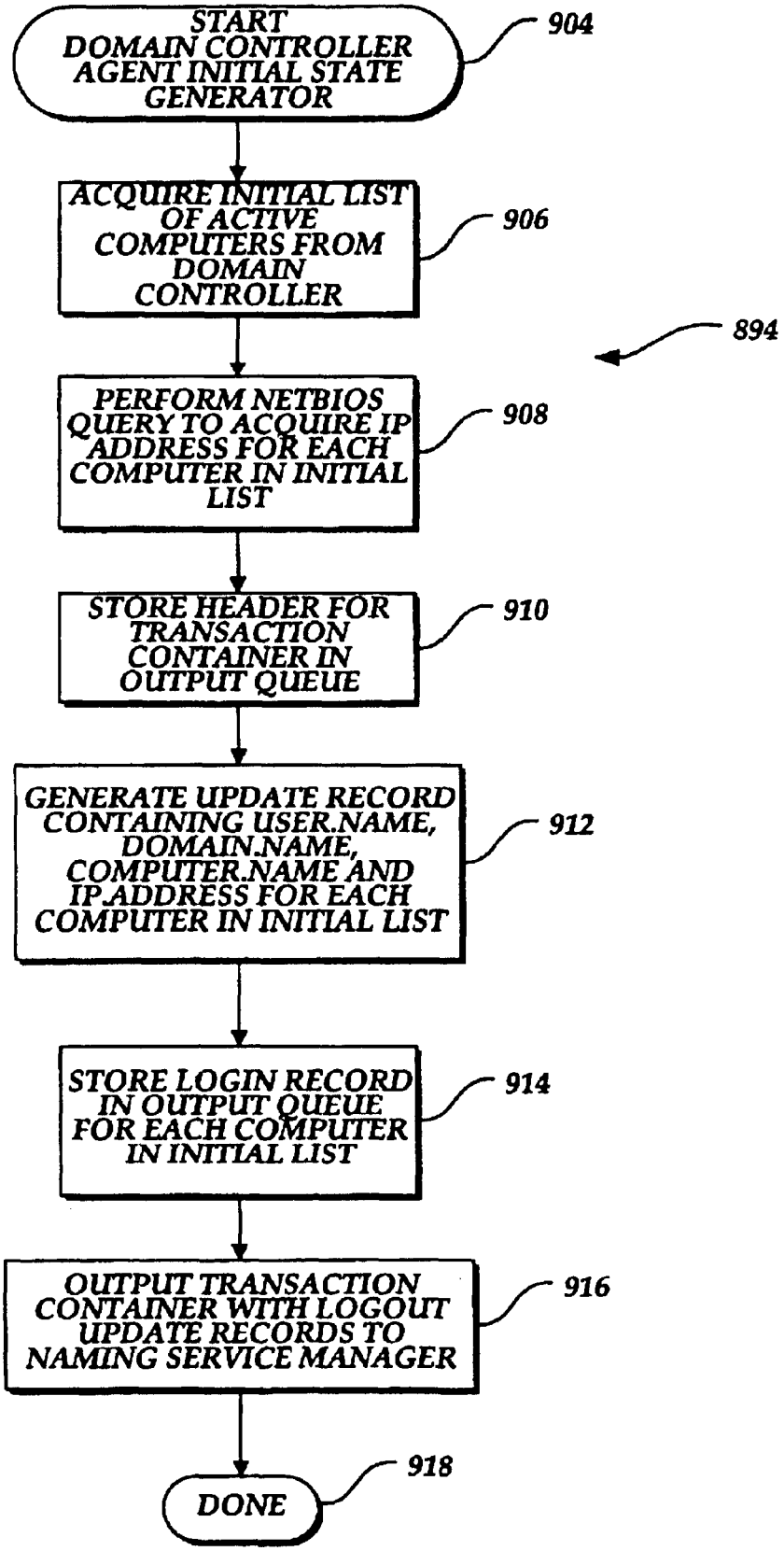
FIG. 31 is a flow chart illustrating the logic used by a first specific naming service agent upon initialization to process mapping information indicating that a user has logged into or out of a computer connected to the LAN shown in FIG. 2.

FIG. 31 illustrates the logic used by the initial state generator for the domain controller agent 75. The logic begins in a block 904 and proceeds to a block 906 where the domain controller agent acquires an initial list of computers that are in active session with the LAN 44 and into which a user is logged, from the domain controller server 60. In a block 908, the domain controller agent 75 performs a NETBIOS query to acquire the IP address for each computer in the initial list. Those of ordinary skill in the art will recognize that NETBIOS is an application program interface used to provide other application programs with computer-to-IP address assignments and with a uniform set of commands for requesting lower level network services required to conduct sessions between computers connected to the LAN 44 so that the computers may transmit data back and forth via the LAN 44.

Once the IP address for each computer identified in the initial list is acquired from the NETBIOS application program interface, the domain controller agent 75 begins preparing a transaction container 184 to be transmitted to the naming service manager 74. In this regard, the domain controller agent 75 stores a header 185 for the transaction container 184 in an output queue that identifies the transaction container 184 as an update transaction container in block 910. In a block 912, the domain controller agent 75 generates a transaction record for each computer in the initial list. Each transaction record is identified as a login update record and includes the domain name, computer name and IP address for the computer, as well as the login name of the user currently utilizing the computer. Each of the login transaction records are then stored in an output queue along with the transaction container header in a block 914. In a block 916, the output queue outputs the transaction container 184 to the naming service manager 74. The logic then ends in a block 918. As will be described in more detail below, upon receipt of the transaction container 184, the naming service manager 74 will update the host mapping table 178 with the mapping information stored in the login update records, and provide updated mapping information from the host mapping table 178 to the filter executive 76 acting as a naming service application.

Figure 32:
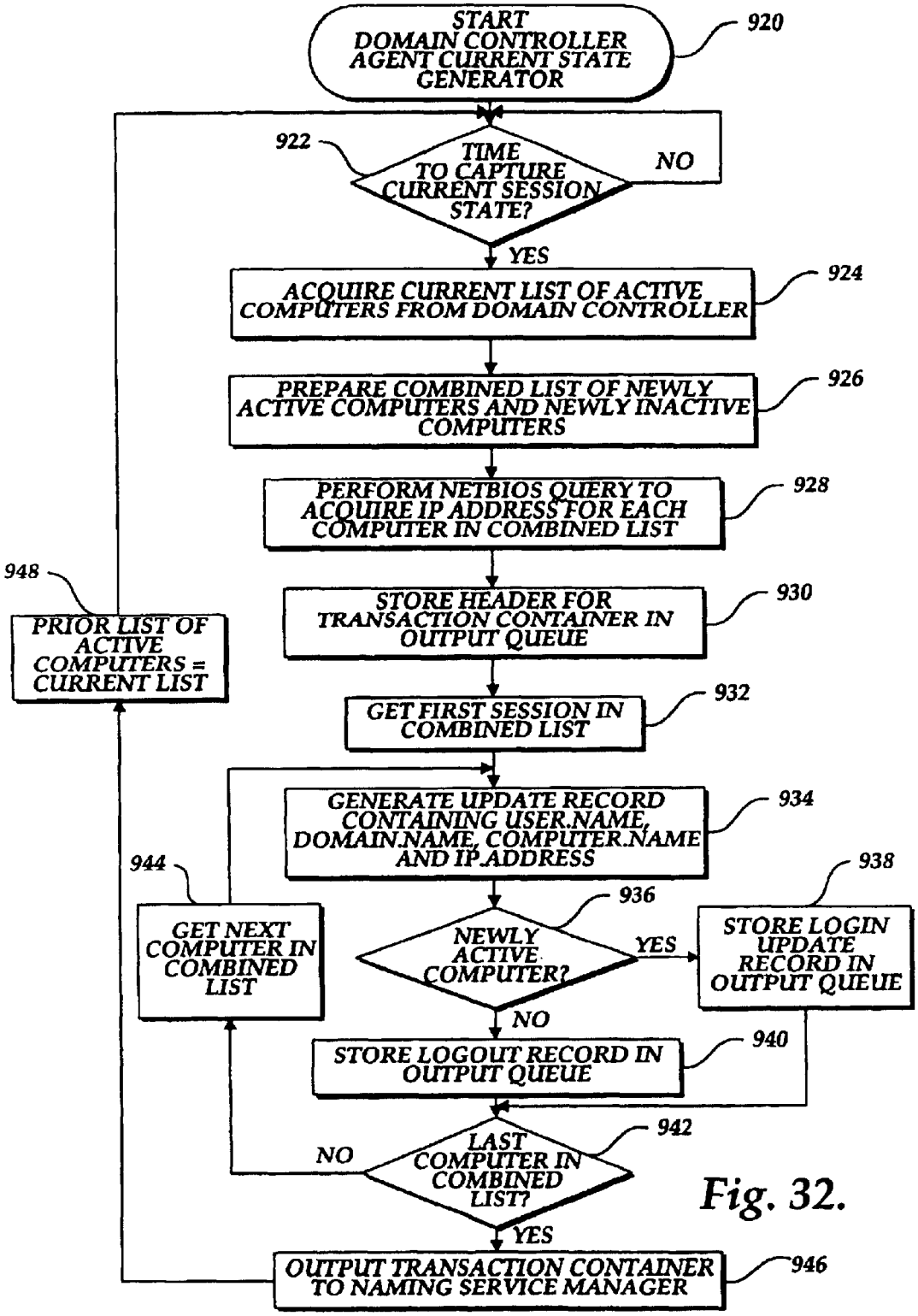
FIG. 32 is a flow chart illustrating the logic used by the first specific agent after initialization to process mapping information indicating that a user has logged into or out of a computer connected to the LAN shown in FIG. 2.

The logic implemented by the current state generator for the domain controller agent 75 is shown in FIG. 32. The logic begins in a block 920 and proceeds to a decision block 186 where the domain controller agent 75 determines if it is time to capture the current session state of the computers connected to the LAN 44. Those of ordinary skill in the art will recognize that the domain controller agent 75 will periodically capture the current session state of the LAN 44 and that the time period for doing so is variable. If the result of decision block 186 is negative, decision block 186 is merely repeated until such time has arrived. When the time has arrived, the logic proceeds to a block 924 where the domain controller agent 75 acquires a current list of computers that are in active session with the LAN 44 and into which users are logged from the domain controller server 60. In a block 926, the domain controller agent 75 prepares a combined list identifying both newly active and newly inactive computers by comparing the current list of active computers to a prior list of active computers.

Those of ordinary skill in the art will appreciate that during the first iteration of the current state generator, the prior list of active computers is actually the initial list of active computers obtained by the initial state generator for the domain controller agent 75. In subsequent iterations of the current state generator, the prior list of active computers is actually the list of active and logged into computers obtained by the domain controller agent 75 in the prior iteration of the current state generator. By comparing the current list of active computers to the prior list of active computers, the domain controller agent 75 identifies which computers have established an active session with the LAN 44, i.e., which computers have been logged into by a user, and which computers have been logged out of by a user, since the last session state was captured. More specifically, if a computer is present in the current list of active computers, but is not present in the prior list of active computers, the computer is identified in the combined list as newly active. Similarly, if a computer is present in the prior list of active computers, but is not present in the current list, the computer has ended its session with the LAN 44 since the last session was captured, and is thus is identified as a newly inactive computer in the combined list.

After the combined list is prepared in block 926, the domain controller agent 75 performs a NETBIOS query to acquire the IP address for each computer identified in the combined list in a block 928. In a block 930, the domain controller agent 75 begins preparation of the transaction container 184 to be sent to the naming service manager 74 by storing a header 185 identifying the transaction container as an update container in the domain controller agent's output queue. The domain controller agent 75 then processes the combined list in order to add transaction records 183 to the transaction container 184.

In this regard, the domain controller agent 75 obtains the first computer identified in the combined list in a block 932. In a block 934, the domain controller agent 75 generates a transaction record 183 containing the domain name, computer name, and IP address of the computer as well as the login name of the user assigned to the computer. In a decision block 936, the domain controller agent 75 determines if computer is a newly active computer. If so, the domain controller agent 75 identifies the transaction record 183 as a login update record and stores the login update record in output queue in a block 938. Otherwise, the domain controller agent 75 identifies the transaction record 183 as a logout update record and then stores the logout update record in output queue in a block 940. Ultimately, the logic proceeds to a decision block 940 where the domain controller agent 75 determines if the last computer in the combined list has been processed. If not, the next computer in the combined list is obtained in a block 944 and blocks 934–946 are repeated for each computer in the combined list so that either a login transaction record or a logout transaction record is stored in the transaction container 184, and hence in the output queue of the domain controller agent 75.

When the last computer in the combined list has been processed, the output queue outputs the transaction container 184 to the naming service manager 74 in a block 946. Next, the current list of active computers acquired in block 924 is stored as the prior list of active computers in a block 948 and the logic returns to decision block 186 where the domain controller agent 75 waits to capture the next current session state. Blocks 186–948 are then repeated by the domain controller agent 66 for each current session state captured. Consequently, the domain controller agent 66 will continue generating and sending transaction containers 184 containing login and logout update records to the naming service manager 74 for further processing as each new session state is captured.

Figure 33:
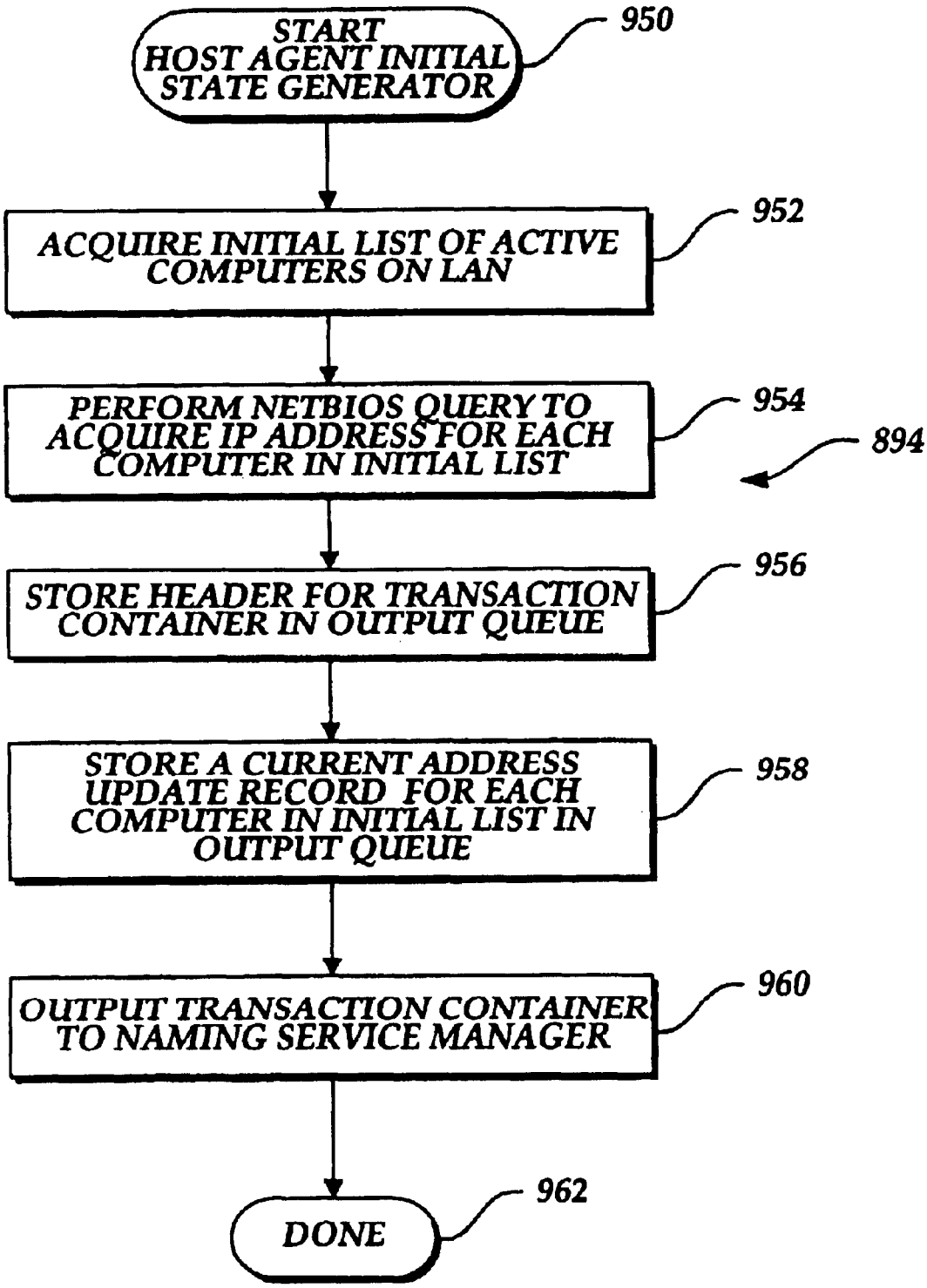
FIG. 33 is a flow chart illustrating the logic used by a second specific naming service agent upon initialization to process mapping information indicating that an IP address for a computer connected to the LAN shown in FIG. 2 has changed.

As noted above, a host agent 77 is employed in some embodiments of the present invention rather than the domain controller agent 75. Specifically, the host agent 75 is employed when changes to computer-to-user mapping are prevented, but changes in IP address-to-computer assignments are allowed. In this regard, the host agent 77 gathers IP address updates. The logic implemented by the initial state generator for the host agent 77 is shown in more detail in FIG. 33. The logic begins in a block 950 and proceeds to a block 952 where the host agent 77 acquires an initial list of computers in active session with the LAN 44 (but not necessarily logged into by a user) from the domain controller server 60. It will be appreciated by those of ordinary skill in the art that the initial list acquired by the initial state generator for the host agent 77 will be very similar to the initial list acquired by the initial state generator for the domain controller agent 75, since both agents are acquiring information from the domain controller server 60. Hence, it follows that if the host agent 77 was located on the network server 30 or another server connected to the LAN 44, the initial list acquired by the host agent might be somewhat different.

Once an initial list is acquired by the host agent 77, the host agent 77 performs a NETBIOS query in a block 954 to acquire the IP address for each computer identified in the initial list. In a block 956, the host agent 77 stores a header for the transaction container 184 to be sent by the host agent 77 to the naming service manager 74 in an output queue of the host agent 77. Next, in a block 958, the host agent 77 generates a transaction record 183 for each computer identified in the initial list and stores each such record in the output queue following the header of the transaction container 184. Each transaction record 183 generated and stored by the host agent 77 is identified as a current address update record since each IP address returned by the NETBIOS query is treated as a new address for its associated computer. In a block 960, the output queue of the host agent 77 outputs the transaction container 184 including the header generated in block 325, the current address transaction records, and a last transaction record 183 signaling the end of the container, to the naming service manager 74 The transaction container 184 will also include a last transaction record that identifies the end of the transaction container. The logic then ends in a block 962.

Figure 34A:
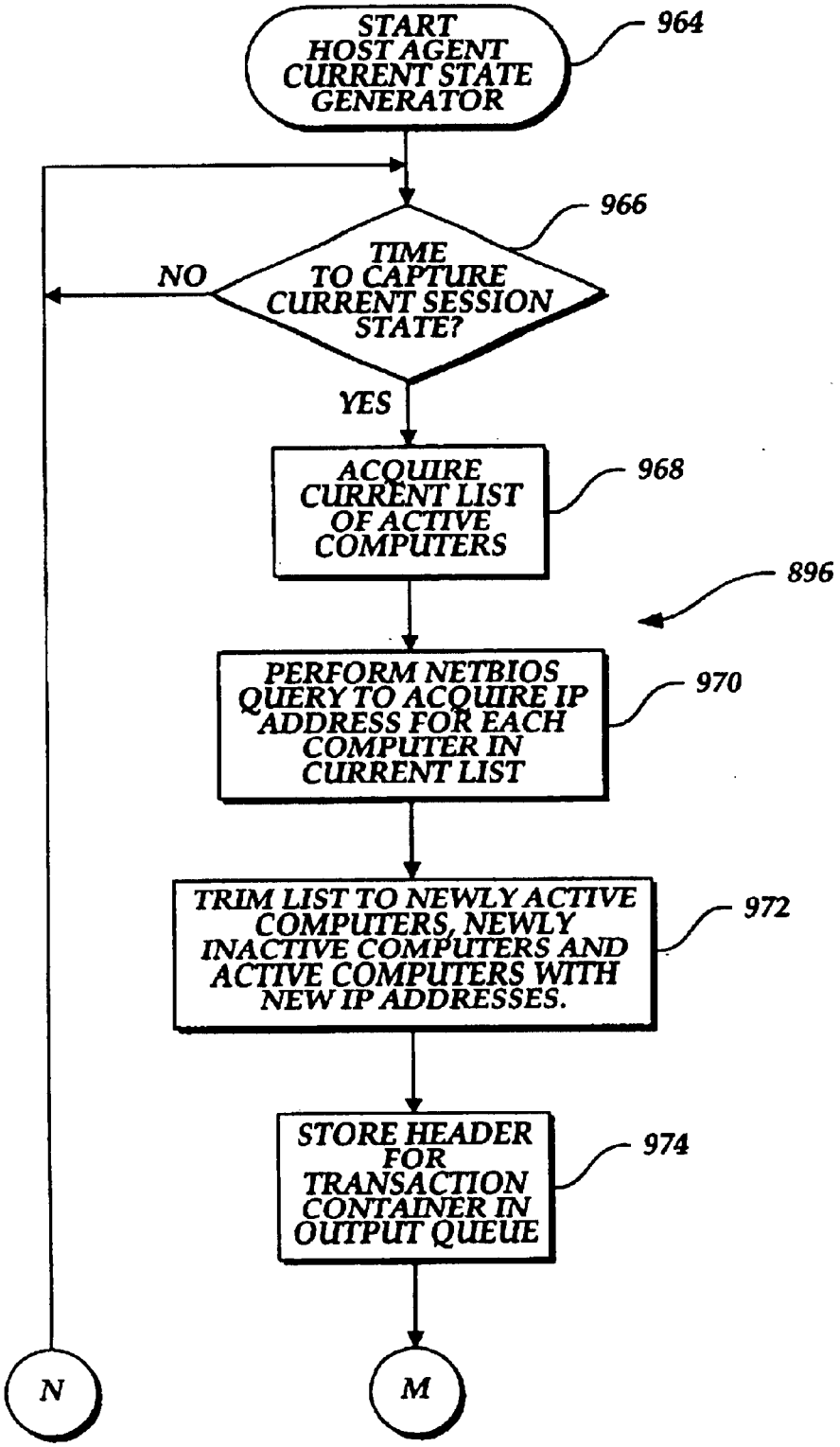
FIGS. 34A and 34B are a flow chart illustrating the logic used by the second specific agent after initialization to process mapping information indicating that an IP address for a computer connected to the LAN has changed.
Figure 34B:
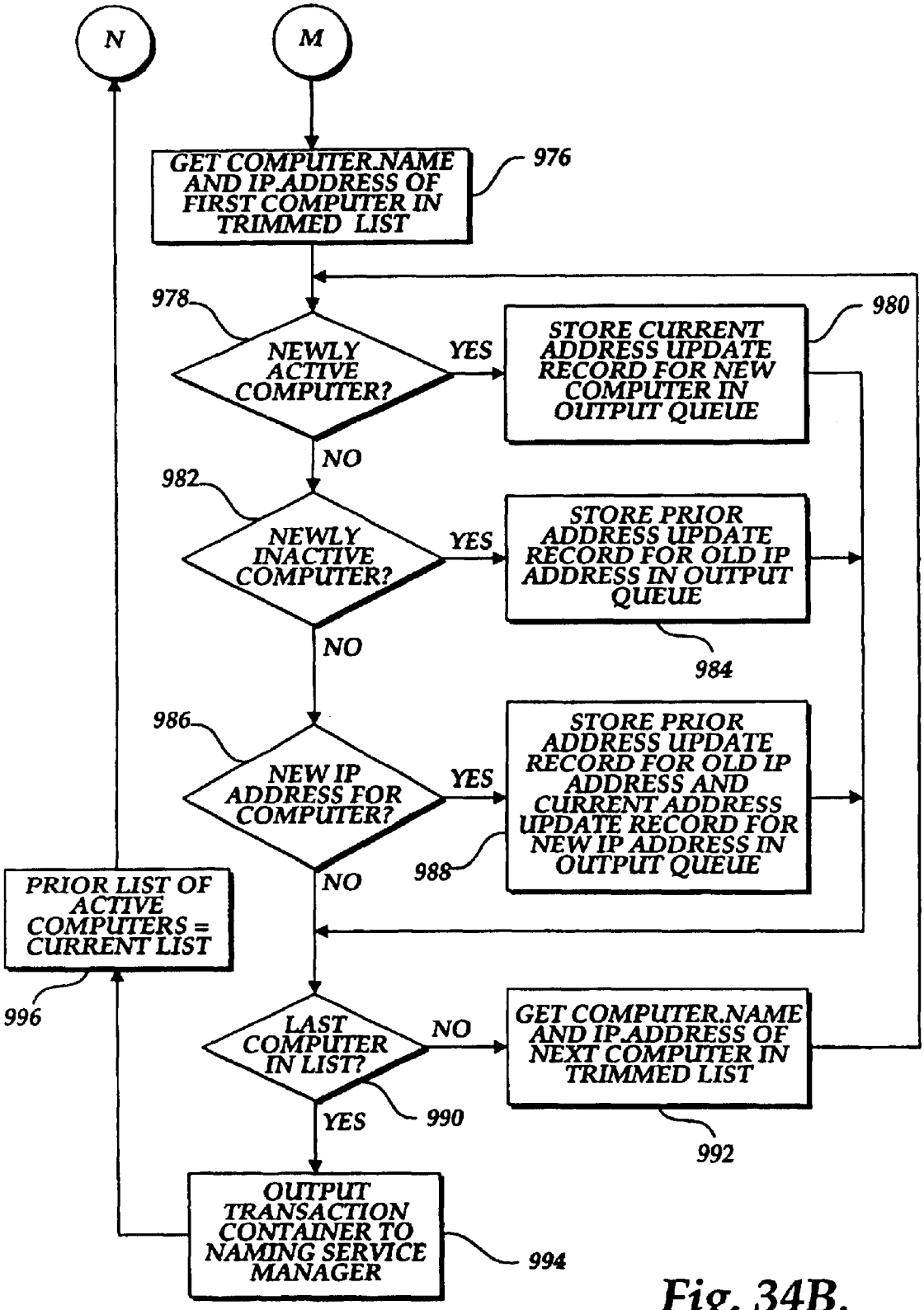

As noted above, after the initial state generator for the host agent 77 is called, the current state generator for the host agent 77 is called. The logic implemented by the current state generator for the host agent 77 is shown in more detail in FIGS. 34A and 34B. The logic begins in FIG. 34A in a block 964 and proceeds to a decision block 966 where it determines if it is time to capture the current session state of the computers connected to the LAN 44. If not, decision block 966 is repeated until such time arrives. When the time arrives to capture the current session state, the logic proceeds from decision block 966 to a block 968 where the host agent 77 acquires a current list of active computers connected to the LAN 44. In a block 970, the host agent 77 performs a NETBIOS query to acquire the IP address for each computer identified in the current list. In a block 972, the host agent 77 prepares a trimmed list identifying newly active computers, newly inactive computers, and active computers with new IP addresses. The trimmed list is prepared by comparing the current list of active computers obtained in block 968 with a prior list of active computers. Those of ordinary skill in the art will appreciate that during the first iteration of the current state generator, the prior list of active computers is actually the initial list obtained by the initial state generator for the host agent 77, and that in subsequent iterations of the current state generator, the prior list of active computers is actually the list of active computers obtained by the host agent 77 in the prior iteration of the current state generator. Newly active computers appear only in the current list, while newly inactivated computers appear only in the prior list. Computers with new IP addresses appear in both lists, but the IP addresses associated with those computer names are different.

Once the trimmed list is prepared by the current state generator of the host agent 77 in block 972, the host agent 77 stores a header 185 for the transaction container 184, identifying the transaction container as an update transaction container in the host agent's output queue in a block 974. Next, in a block 976 shown in FIG. 34B, the host agent 77 obtains the next computer in the trimmed list. In a decision block 978, the host agent 77 determines if the computer is a newly active computer. If so, the host agent 77 generates and stores a transaction record 183 containing the mapping information for the newly activated computer in the output queue following the header 185 of the transaction container 184 in a block 980. The transaction record 183 is identified as a current address update and includes the computer name and IP address of the newly activated computer.

Returning to decision block 978, if the computer identified in the trimmed list is not a newly active computer, the logic proceeds to a decision block 982 where the host agent 77 determines if the computer is newly inactive computer, i.e., if the computer has ended its active session with the LAN 44 since the last capture of the current session state. If so, the host agent 77 generates and stores a transaction record 183 in the output queue containing the mapping information of the newly inactive computer. The transaction record 183 is identified as a prior address update and includes the old IP address for the computer and the computer name of the computer.

Returning to decisions block 982, if the computer being processed is not newly active or newly inactive, the logic proceeds to a decision block 986 where the host agent 77 determines if a new IP address for the computer has been assigned. If so, the host agent 77 generates and stores two different transaction records 183 in the output queue in a block 988. The first transaction record 183 is identified as a prior address update and contains the former IP address for the computer, its computer name and domain name, and the login name of any user assigned to the computer. The second transaction record 183 is identified as a current address update and contains the new IP address of the computer and its computer name.

Returning to decision block 986, if the computer does not have a new IP address, or if transaction record 183 for the computer has already been generated and stored in the output queue as described above, the logic proceeds to a decision block 990 and the host agent 77 determines if the last computer in the trimmed list has been processed. If not, the next computer in the trimmed list is obtained in a block 249 and the logic returns to decision block 978 so that the next computer can be processed. However, if the last computer in the trimmed list has been processed, the logic will proceed from decision block 990 to a block 994 where the output queue of the host agent 77 outputs the transaction container 184 containing the header and transaction records stored in the output queue along with an empty transaction record indicating the end of the transaction container 184 to the naming service manager 74. In a block 996, the current session list is stored as the prior session list, and the logic returns to decision block 966 in FIG. 34A so that the host agent 77 can determine if it is time once again to capture the current session state. Blocks 966–996 are then repeated by the host agent 77 for each current session state captured. Consequently, the host agent 77 will continue generating and sending transaction containers 184 containing current and prior address update records in the naming service manager 74 for further processing as each new session state is captured.

Returning to FIG. 30, once the specific initial and current state generators for the naming service agent have been called in blocks 894 and 896, the logic returns to a decision block 890 where the naming service agent waits for another transaction container 184 from the naming service manager 74. If a transaction container 184 is received that does not include an initialization message from the naming service manager 74, the logic proceeds from a decision block 892 to a decision block 898 where the logic determines if the transaction container 184 received by the naming service agent contains a shutdown message. If so, the naming service agent stops its current state generator and sets itself to an uninitialized state in a block 900. The logic then returns to decision block 890 and the naming service agent waits for another transaction container 184. However, if a transaction container 184 is received by the naming service agent does not contain either an initialization message or a shutdown message, the logic will proceed through decision blocks 892 and 898, to a block 902 where an unexpected communications event is recorded by the naming service agent. After recording the unexpected communications event, the naming service agent waits for another transaction container 184 in decision block 890.

It will be appreciated that logic implemented by the filter executive 76, when acting as a naming agent, is similar to that describe above in connection with FIG. 30 except that after receipt of an initialization message, the filter executive 76 merely sets itself to initialized and sends the static user mapping table 138 in the form of a transaction container 184 to the naming service manager 74. Similarly, upon receipt of a shutdown message form the naming service manager, the filter executive 76 disables any such transaction container 184 transmission and sets itself to uninitialized.

Returning to block 840 in FIG. 29A, once the naming service manager 74 completes its registration of the naming service agent, i.e., the filter executive 76, domain controller agent 75 or host agent 77, so that the naming service agent can begin gathering mapping information and communicating mapping information to the naming service manager 74, the logic returns to decision block 836 where the naming service manager waits for another transaction container 184 from the filter executive 76, or the domain controller agent 75 or host agent 77, whichever the case may be. Returning to decision block 838, if a transaction container 184 is received but does not contain a naming service agent registration request, the logic determines in a decision block 842 if the transaction container 184 contains a naming service application registration request. If so, the logic proceeds to a block 844 where the naming service manager 74 opens communications with the filter executive 76, sends a transaction container 184 containing an initialization message to the filter executive 76, and registers the filter executive 76.

Figure 35:
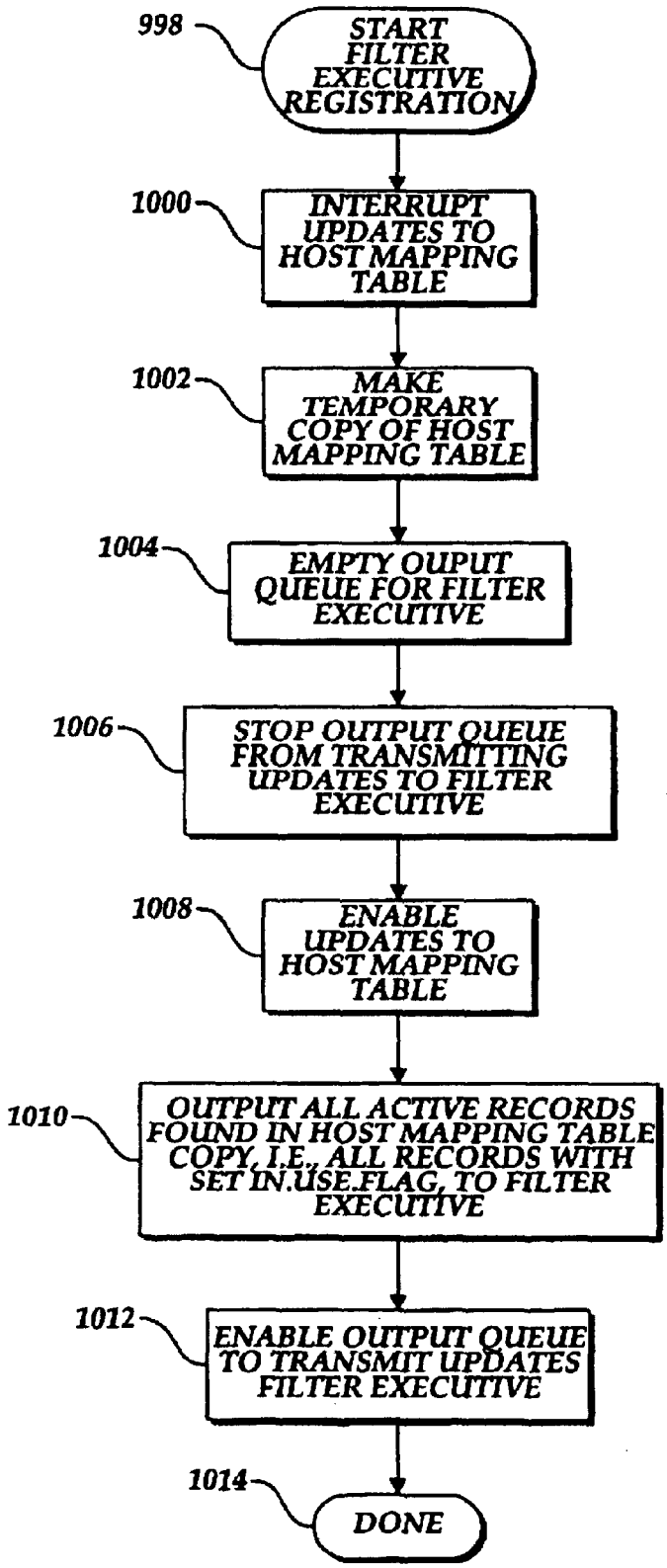
FIG. 35 is a flow chart illustrating the logic used by a naming service application to register with the naming service manager.

The logic implemented by the naming service manager 74 to register the filter executive 76 acting as a naming service application is shown in more detail in FIG. 35. It will be appreciated by those of ordinary skill in the art that the naming service manager 74 may have begun collecting and maintaining mapping information before it received a registration request from the filter executive 76. Consequently, upon registration, it is necessary that the naming service manager 74 send any mapping information it has already collected and stored in the host mapping table 178 to the filter executive 76. In this regard, the logic begins in FIG. 35 in a block 998 and proceeds to a block 1000 where the naming service manager 74 interrupts any updates to the host mapping table 178. In a block 1002, the naming service manager 74 makes a temporary copy of the host mapping table 178. In blocks 1004 and 1006, respectively, the naming service manager 74 empties its output queue of any transaction records 183 and stops the output queue from transmitting any transaction containers 184 to the filter executive 76. Next, in a block 1008, the naming service manager 74 re-enables updates to the host mapping table 178. In a block 1010 the naming service manager 74 outputs a transaction container 184 containing all active records found in the temporary copy of the host mapping table to the filter executive 76. More specifically, the naming service manager 74 outputs a transaction container 184 including a header 185 and all records in the temporary copy of the host mapping table having an in-use flag that is set. Finally, in a block 1012, the naming service manager 74 once again enables the output queue to output transaction containers 184 to the filter executive 76. The logic then ends in a block 1014.

Figure 36:
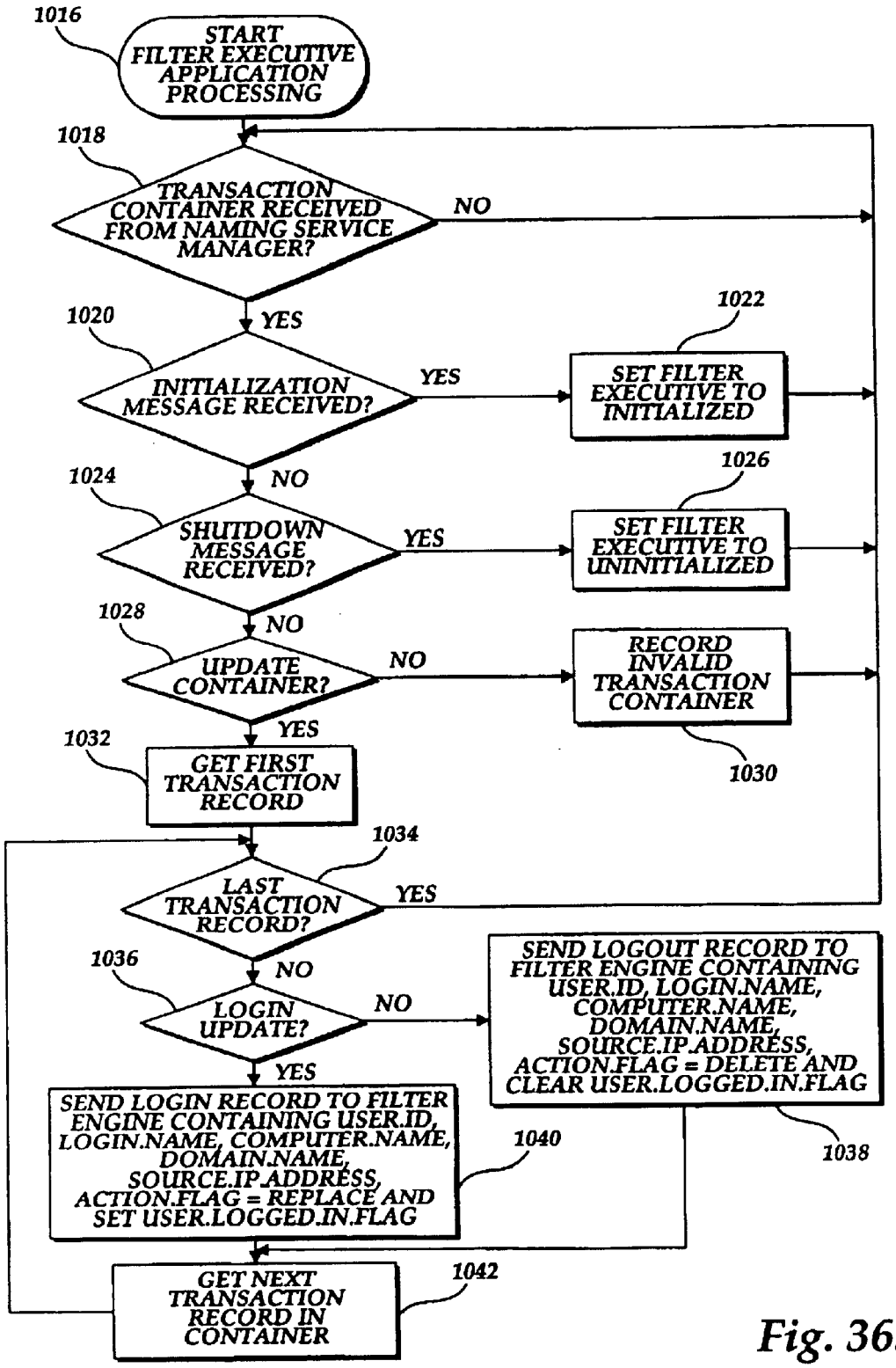
FIG. 36 is a flow chart illustrating the logic used by the naming service application to process mapping information served by the naming service manager.

Returning to block 844 in FIG. 29A, once the naming service manager 74 has registered the filter executive 76 as described above and opened communications with the filter executive 76, the naming service manager 74 can begin transmitting transaction containers 184 to the filter executive 76 on a regular basis. The logic implemented by filter executive 76 to process transaction containers 184 is shown in more detail in FIG. 36. The logic begins in FIG. 36 in a block 1016 and proceeds to a decision block 1018 where it determines if the filter executive 76 has received a transaction container 184 from the naming service manager 74. If not, decision block 1018 is merely repeated until a transaction container 184 is received. When this occurs, the logic proceeds to a decision block 1020 where the filter executive 76 determines if the transaction container 184 contains an initialization message from the naming service manager 74. If so, the filter executive 76 sets itself to initialized in a block 1022. The logic then returns to decision block 1018 where the filter executive 76 waits for another transaction container 184 from the naming service manager 74.

Returning to decision block 1020, if the transaction container 184 received from the naming service manager 74 does not contain an initialization message, the logic proceeds to a decision block 1024 where it determines if the transaction container 184 contains a shutdown message from the naming service manager. If so, the filter executive 76 sets itself to uninitialize and ceases communicating mapping information to the naming service manager 74 in a block 1026. The logic then returns to decision block 1018 where the filter executive 76 waits for another transaction container 184 from the naming service manager 74.

Returning to decision block 1024, if the received transaction container 184 contains neither an initialization message nor a shutdown message, the logic proceeds to a decision block 1028 where it determines if the transaction container 184 is an update container. If not, the filter executive 76 records an invalid transaction container event in a block 1030 and returns to decision block 1018 to wait for another transaction container 184. However, if the received transaction container 184 is an update container, the logic proceeds to a block 1032 and the first transaction record 183 in the transaction container 184 is obtained. In a decision block 1034, the logic determines if the transaction record 183 is the last transaction record in the transaction container. If so, the logic returns to decision block 1018 and the filter executive 76 waits for another transaction container 184. If the transaction record 183 is not the last transaction record in the transaction container 184, the logic determines in a decision block 1036 if the transaction record is a login update record. If so, a user has logged into a computer connected to the LAN 44 and the user mapping rules table 140 stored by the filter engine 78 must be updated so that the filter engine 78 can begin filtering IP packets associated with that user. In this regard, the filter executive 76 generates and sends a login update record to the filter engine containing the user ID and the login name of the user and the source IP address, computer name and domain name of the computer as found in the transaction record 183. In addition, the login update record sent to the filter engine includes a replace action flag and a set user logged in flag.

However, if the transaction record 183 from the received transaction container 184 is a logout update record rather than a login update record, the filter executive 76 prepares and sends a logout record to the filter engine in a block 1038. The logout record contains the user ID and login name of the user, the source IP address, computer name and domain name of the computer and a delete action flag. In addition, the user logged in flag of the logout record is cleared.

After the filter executive 76 sends the appropriate login or logout record to the filter engine 78, the login proceeds to a block 1042 where the filter executive 76 obtains the next transaction record in the transaction container 184 received from the naming service manager 74. Blocks 1034 through 1042 are then repeated for each transaction record 183 in the received transaction container 184. It will be appreciated that as the filter engine 78 updates its user mapping rules table 140 in accordance with the login and logout records received from the filter executive 76, the filter engine 78 will begin or cease filtering IP packets according to the new computer-to-user mapping or IP address-to-computer mapping accordingly.

Returning to block 844 in FIG. 29A, once the naming service manager 74 registers the filter executive 76 as a naming service application and opens communications with the filter executive 76 so that it can receive and process transaction containers 184, the logic returns to decision block 836 and the naming service manager 74 waits for another transaction container 184.

Returning to decision block 842, if the received transaction container 184 does not contain either an agent registration request or an application registration request, the logic proceeds to a decision block 846 where it determines if the transaction container 184 contains a naming service agent unregistration request. If so, the naming service agent making the request, i.e., the filter executive 76 or the domain controller agent 75 or host agent 77, whichever the case may be, no longer wishes to gather and communicate mapping information for the naming service manager 74. Accordingly, the naming service manager 74 unregisters and closes communications with the naming service agent in a block 848. The logic then returns to decision block 836 and the naming service manager 74 waits for another transaction container 184.

Returning to decision block 846, if the received transaction container 184 does not contain either an agent registration request, an application registration request, or an agent unregistration request, the logic proceeds to a decision block 850 where it determines if the transaction container 184 contains a naming service application unregistration request, i.e., a request to unregister from the filter executive 76. If so, the filter executive 76 no longer wishes to receive mapping information from the naming service manager 74. Accordingly, the naming service manager 74 unregisters and closes communications with the filter executive 76 in a block 848. The logic then returns to decision block 836 and the naming service manager 74 waits for another transaction container 184.

Returning to decision block 850, if the received transaction container 184 does not contain an agent registration request, an application registration request, an agent unregistration request, or an application unregistration request, the logic proceeds to a decision block 854 where it determines if the transaction container 184 contains a query from a naming service agent or the filter executive 76 for mapping information. If so, the logic proceeds to a decision block 856 where it determines if the host mapping table 178 maintained by the naming service manager 74 contains a record having the mapping information requested. For example, if the filter executive 76 is seeking mapping information for a particular user, i.e., the computer name, domain name and IP address assigned to a particular user, the naming service manager 74 determines in a decision block 856 if the host mapping table 178 includes a record having the same login name as the login name provided by the querying application or agent in the header 185 of the transaction container 184. If so, the naming service manager 74 returns the record to the filter executive 76 in a block 858. Similarly, if the filter executive 76 is seeking mapping information for a particular computer, the naming service manager 74 determines in decision block 856 if the host mapping table 178 includes a record having the same computer address or IP address provided by the querying application or agent in the header 185 of the transaction container 184. If so, the naming service manager 74 returns the record to the filter executive in block 858. However, if no such record is found in the host mapping table 178 in either case, the naming service manager 74 returns an invalid record to the requesting agent or filter executive in a block 860. The logic then returns to decision block 836 and the naming service manager 74 waits for another transaction container 184.

Returning to decision block 854, if the received transaction container 184 does not contain a query, registration request or unregistration request, the naming service manager 74 determines if the transaction container 184 is an update container. If not, the naming service manager records that an invalid transaction container 184 has been received in a block 131 since the received container does not contain any registration or unregistration requests, queries or updates. The logic then returns to decision block 836 in FIG. 29A, and the naming service manager 74 waits for another transaction container 184.

On the other hand, if the transaction container 184 received by the naming service manager 74 is an update container, the first transaction record 183 in the container is obtained by the naming service manager 74 in a block 864. In a decision block 866, the naming service manager 74 determines if the record is the last record in the transaction container 184. If so, processing of the transaction container 184 is complete, and the logic returns to decision block 836 in FIG. 29A. Otherwise, the logic proceeds to a decision block 868 and the naming service manager determines if the transaction record is a prior address update record. If so, the logic proceeds to a block 870 where the naming service manager 74 processes the prior address update record. The prior address update record contains an old IP address and a computer name, but the domain name and login name in the prior address update record are not necessarily valid.

Figure 37:
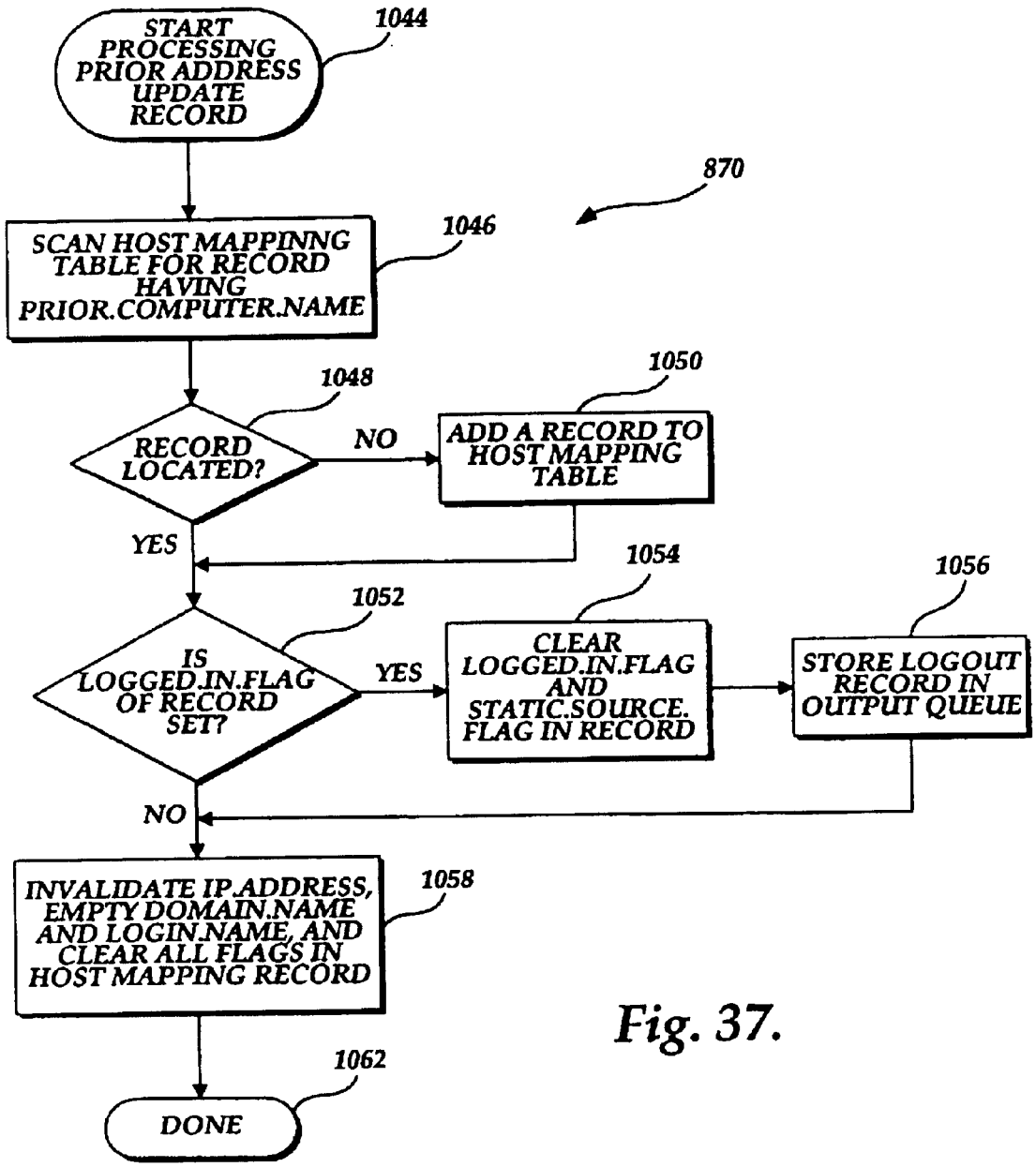
FIG. 37 is a flow chart illustrating the logic used by the naming service manager to process mapping information indicating that an IP address for a computer connected to the LAN shown in FIG. 2 has become obsolete.

The logic used by the naming service manager 74 to process a prior address update record is shown in more detail in FIG. 37. The logic begins in a block 1044 and proceeds to a block 1046 in which the naming service manager 74 scans the host mapping table 178 for a record having the prior computer name identified in the prior address update transaction record. In decision block 1048, the logic determines if a record in the host mapping table 178 with the same computer name was found. If not, a record is added to the host mapping table 178 including the prior computer name and an invalid IP address in a block 1050. The logged in flag, static source flag and in use flag are cleared in the newly added record. After a record having the prior computer name identified in the prior address update record is found in the host mapping table 178, or after a record is added to the host mapping table 178, if no such record is already found, the logic proceeds to a decision block 1052 in which the naming service manager 74 determines if the logged in flag in the host mapping record just added to or found in the host mapping table 178 is set. In other words, the naming service manager 74 determines if a user is logged into the computer identified by the record from the host mapping table 178.

It will be appreciated that if a prior address update transaction record is received by the naming service manager 74, the naming service manager 74 must update the host mapping table 178 to reflect that the IP address for a computer connected to the LAN 44 has gone out of scope, i.e., that for one reason or another, the computer is no longer associated with the IP address found in the prior address update record. However, if the host mapping table 178 indicates that a user is logged into the computer assigned to the prior IP address, the user must be logged out of the computer at the prior IP address before the mapped record in the host mapping table 178 can be updated. Accordingly, if the result of decision block 1052 is positive, the naming service manager 74 clears the logged in flag and the static source flag in the located record of the host mapping table in a block 1054. In a block 1056, the naming service manager generates and stores a transaction record in the naming service manager output queue that is identified as a logout update record. The logout update record includes the computer name, domain name and IP address of the computer identified in the host mapping record as well as the login name of the user.

Returning to decision block 1052, if the logged in flag in the retrieved host mapping record is not set, or if it was set and the appropriate logout transaction record generated, the logic proceeds from decision block 1052 to a block 1058. In block 1058, the naming service manager 74 updates the host mapping table 178 to properly reflect that the IP address for the computer has gone out of scope. More specifically, an invalid IP address is stored in the IP address field of the retrieved host mapping record, while the domain name and login name fields are emptied. In addition, the logged in, static source and in use flags are cleared. The logic then ends in a block 1062.

It will be appreciated that as transaction records 183 are added to the naming service manager's output queue, the output queue will output the transaction records 183 in the form of a transaction container 184 to the filter executive 76. In the illustrated embodiment of the present invention, filter executive 76 has registered for only login and logout updates, the output queue of the naming service manager will send transaction containers 184 containing only login and logout update records to the filter executive 76.

Returning to block 870 in FIG. 29B, after the prior address update transaction record has been processed, the logic skips blocks 872–884 and proceeds to a block 886, where the naming service manager 74 obtains the next transaction in the received transaction container 184. The logic then returns to decision block 868 so that the next transaction record can be processed. However, if the transaction record is not a prior address update record, the logic proceeds from decision block 868 to a decision block 872 where the naming service manager 74 determines if the transaction record is a current address update record. If so, the naming service manager 74 processes the current address update record in a block 874. The logic implemented by the naming service manager 74 to process the current address update record is shown in more detail in FIG. 38.

It will be appreciated that when a current address update record is received by the naming service manager 74, the host mapping table 178 must be updated to reflect that a new IP address has been assigned to a computer connected to the LAN 44. Accordingly, the current address update record contains the computer name of the computer and the new or current IP address that has been assigned to the computer. The other fields in the current address update record may contain data, but that data is not necessarily valid.

Figure 38:
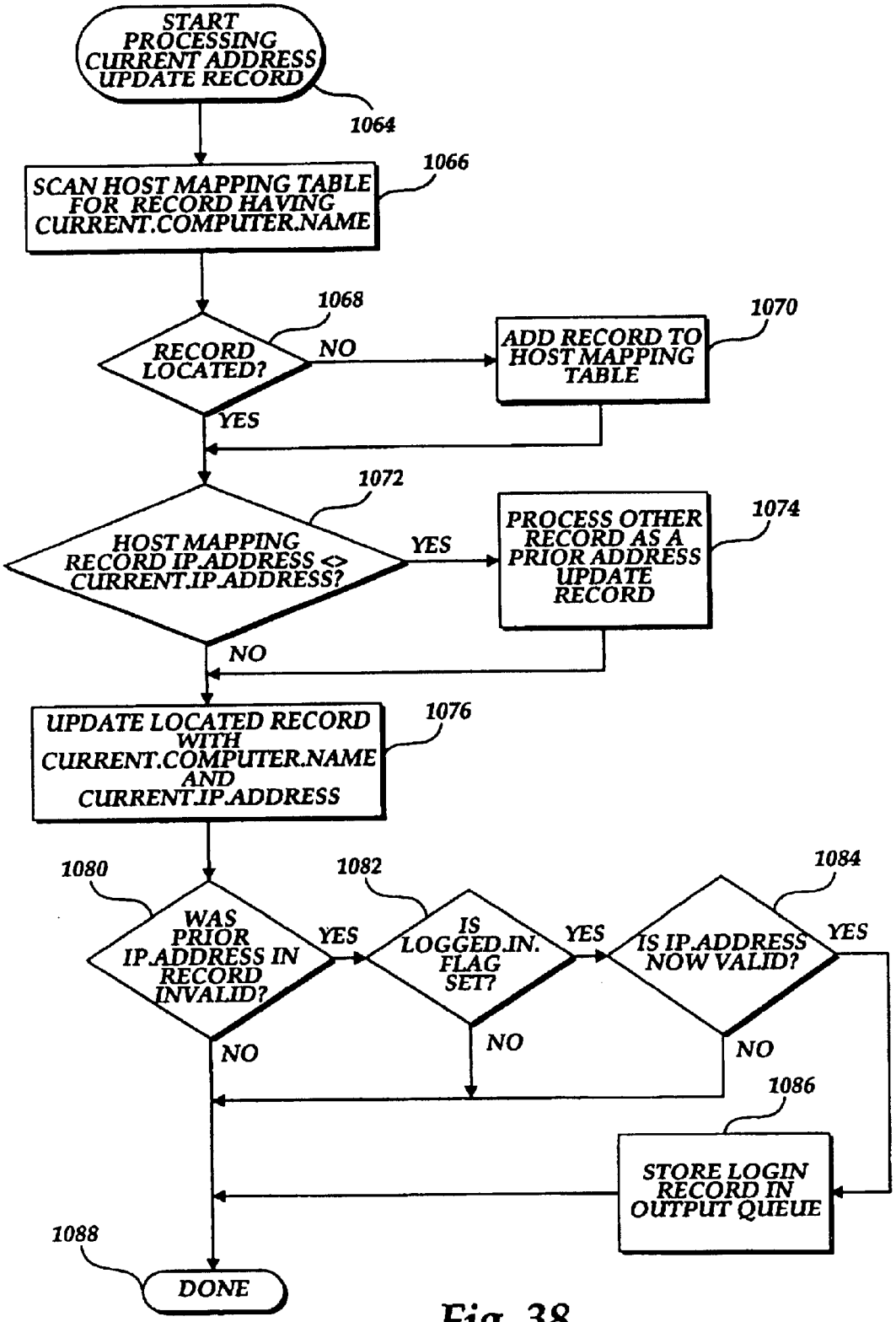
FIG. 38 is a flow chart illustrating the logic used by the naming service manager to process mapping information indicating that a new IP address has been assigned to a computer connected to the LAN shown in FIG. 2.

In this regard, the logic begins in FIG. 38 in a block 1064 and proceeds to a block 1066 where the naming service manager 74 scans the host mapping table 178 for a record having the same computer name as the current computer name identified in the current address update record. In a decision block 1068 where naming service manager 74 determines if such a record has been found in the host mapping table 178. If not, the naming service manager 74 adds a record to the host mapping table 178 with the current computer name identified in the current address update record and an invalid IP address in a block 1070. In addition, all the flags in the record added to the host mapping table 178 are cleared.

If a host mapping record in the host mapping table 178 containing the current computer name is located, or if no such record is found, but a record has been added, the logic proceeds to a decision block 1072. In decision block 1074, the naming service manager 74 determines if the host mapping record contains a valid IP address other than the current IP address specified in the current address update record. In other words, the naming service manager 74 determines if the computer specified in the host mapping record had a different prior IP address. If so, that assignment must be removed so that the IP address may be assigned to the computer identified in the current address update record. Consequently, the other record in the host mapping table 178 having the current IP address specified in the current address update record is processed as a prior address update record in a block 1076. As a result of processing a record as a prior address update record in accordance with the logic shown in FIG. 37, the IP address found in the host mapping record will be invalidated, thus making the current IP address freely available.

Returning to decision block 1072, if there is not another record in the host mapping table 178 having the current IP address, or if such a record exists and has been processed appropriately, the logic proceeds to a block 1076 in which the naming service manager 74 updates the host mapping record identified in the host mapping table 178 having the current computer name. More specifically, the current computer name and current UP address specified in the current address update record are stored in the appropriate fields in the identified host mapping record.

Once the host mapping table 178 has been updated with the current IP address as described above, the naming service manager 74 determines in a block 1080 if the IP address in the retrieved host mapping record was an invalid address prior to the update. If not, no further processing is necessary and the logic ends in a block 1088. However, if the prior IP address was invalid, the change to the current IP address may signify that a user has logged in, but generation of a login update record has been deferred until a valid IP address has been assigned. In this regard, the logic proceeds from decision block 1080 to a decision block 1082 where the naming service manager 74 determines if the logged in flag in the identified host mapping record is set. If not, a user has not logged into the identified computer so a login record is not necessary. Consequently, the logic merely ends in block 1088. However, if the logged in flag in the host mapping record is set, a user has logged in and thus, it may be necessary to output a login record. Accordingly, the logic determines in a block 1084 if the IP address in the host mapping record is now a valid IP address, i.e., the IP address in the host mapping record has changed from an invalid address to a valid address. If not, the IP address is still invalid, and a login update record in not required. However, if the IP address is now a valid one, the logic proceeds to a block 1086 where it generates and stores a transaction record 183 in the naming service manager's output queue. The transaction record is identified as a login record and contains the computer name, IP address, domain name and login name found in the host mapping record. The logic then ends in a block 1088.

Returning to FIG. 29B, once the current address update record has been processed in block 874, the naming service manager obtains the next transaction in the transaction container 184 received in block 886 so that the naming service manager 74 can process the next transaction record.

Figure 39:
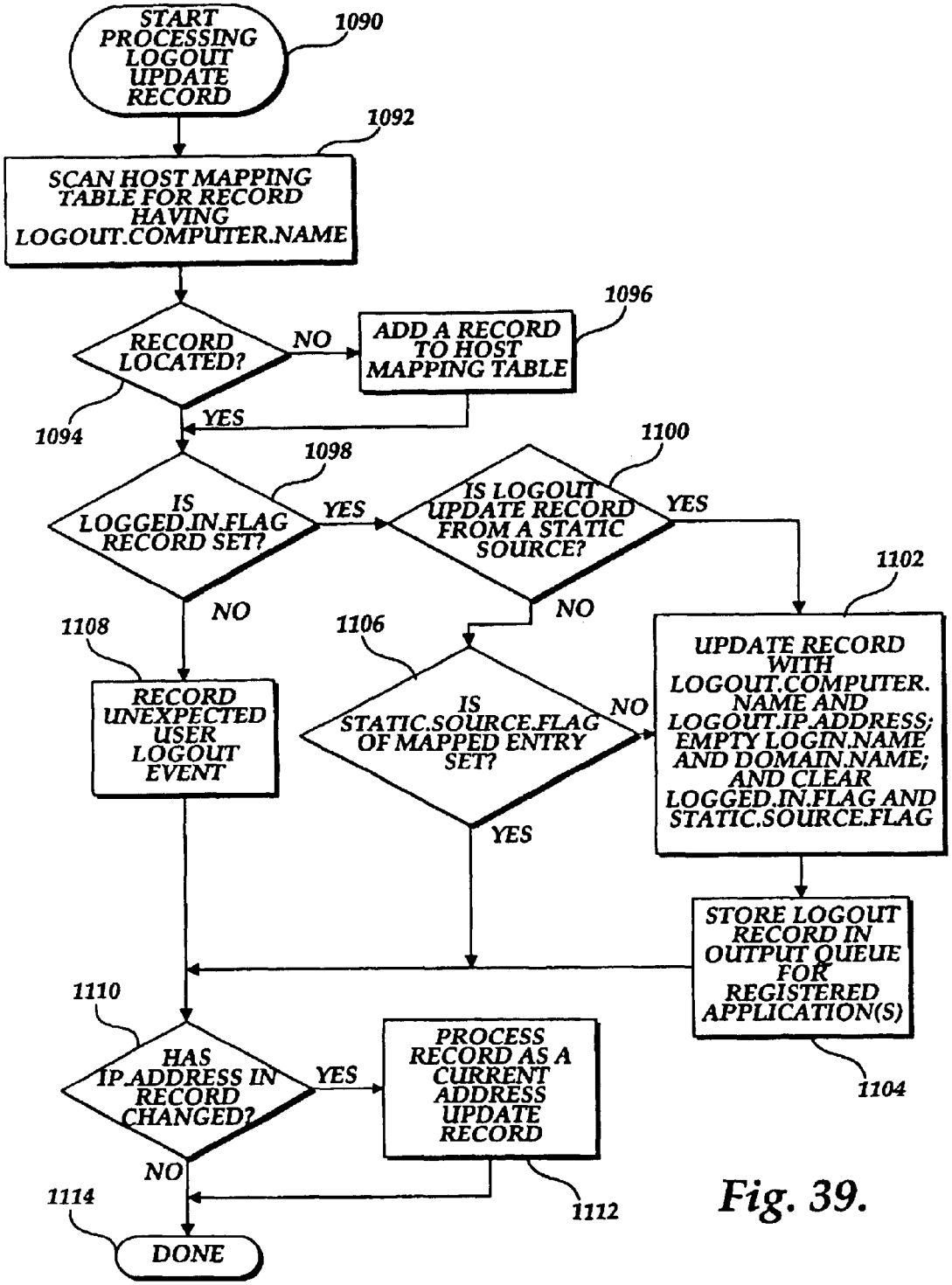
FIG. 39 is a flow chart illustrating the logic used by the naming service manager to process mapping information indicating that a network user has logged out of a computer connected to the LAN shown in FIG. 2.

Returning to decision block 872, if the transaction record is not a current address update record, the naming service manager 74 determines if the transaction record is a logout update record in a decision block 876. If so, the logout update record is processed in a block 878. The logic implemented by the naming service manager 74 to process the logout update record is shown in more detail in FIG. 39. The logout update record contains the login name of the user logging out and the domain name, computer name and IP address of the computer from which the user is logging out. The logic begins in a block 1090 and proceeds to a block 1092 where the naming service manager 74 scans the host mapping table 178 for a record having the same computer name as the computer name identified by the logout record. In a decision block 1094, the naming service manager 74 determines if such a host mapping record is found. If not, the naming service manager 74 adds a record to the host mapping table 178 containing the logout computer name, and an invalid IP address. In addition, all the flags in the added record are cleared.

If a record having the logout computer name is found in the host mapping table 178 or such a record has been added to the host mapping table 178, the logic proceeds to a decision block 1098 where the naming service manager 74 determines if the logged in flag of the host mapping record is set. In other words, the naming service manager 74 determines if a user has already logged in to the computer identified in the host mapping record. If the host mapping table 178 reflects that the user is not already logged into the computer, then an unexpected user logout event has occurred, and the naming service manger records the unexpected event in a block 1108. However, if the result of decision block 1098 is positive, and as expected, a user is logged into the computer identified in the logout update record, the logic proceeds to a decision block 1100 where the naming service manager 74 determines if the logout update record was received from a static source of mapping information, e.g., the filter executive 76.

If the logout update record was received from filter executive 76, the naming service manager 74 is permitted to update the host mapping table 178 with the logout information because mapping information provided by the filter executive 76 is allowed to be overwritten by updated information from the filter executive 76. However, if the logout update record was received from a dynamic source of mapping information, i.e., the domain controller agent 75 or the host agent 77, the naming service manager 74 will only be permitted to update the host mapping record with the logout information if the mapping information in the host mapping record was not provided by the filter executive 76 in the first place. In other words, mapping information provided by a static source, filter executive, is not allowed to be overwritten with mapping information provided by a dynamic source, i.e., the domain controller agent 75 or host agent 77. Hence, if the result of decision block 1100 is positive, the host mapping record is updated with the computer name and IP address specified by the logout update record, while the login name and domain name in the host mapping record are emptied in a block 1102. In addition, the logged in flag and static source flag are cleared. Next, in a block 1104 the naming service manager 74 generates and stores a transaction record in the naming service manager's output queue identified as a logout update record and containing the mapping information from the updated host mapping record.

Returning to decision block 1100, if the logout update record was not received from a static source, the naming service manager must determine whether the mapping information in the host mapping record was originally provided by a dynamic source or a static source. If provided by a dynamic source, i.e., if the static source flag in the host mapping record is not set, the host mapping record is updated as described above in block 1102 and a logout record is stored in the output queue in block 1104. On the other hand, if the mapping information in the host mapping record was provided by a dynamic source, i.e., the static source flag in the host mapping record is set, the logic skips blocks 1102 and 1104 and the host mapping record is not updated, and a logout record is not generated. The logic merely proceeds to a decision block 1110. In decision block 1110, the naming service manager 74 determines if the IP address in the host mapping record has changed during processing of the logout update record. If so, a new IP address has been provided and thus the host mapping record must be processed as a current address update record in accordance with the logic shown in FIG. 38 in a block 1112. If the IP address has not changed or if the host mapping record has been processed as a current address update record, the logic ends in a block 1114.

Returning to FIG. 29B, after the logout transaction record has been processed in block 878, the naming service manager obtains the next transaction in the transaction container 184 received in block 886 so that the naming service manager 74 can process the next transaction record 183.

Figure 40A:
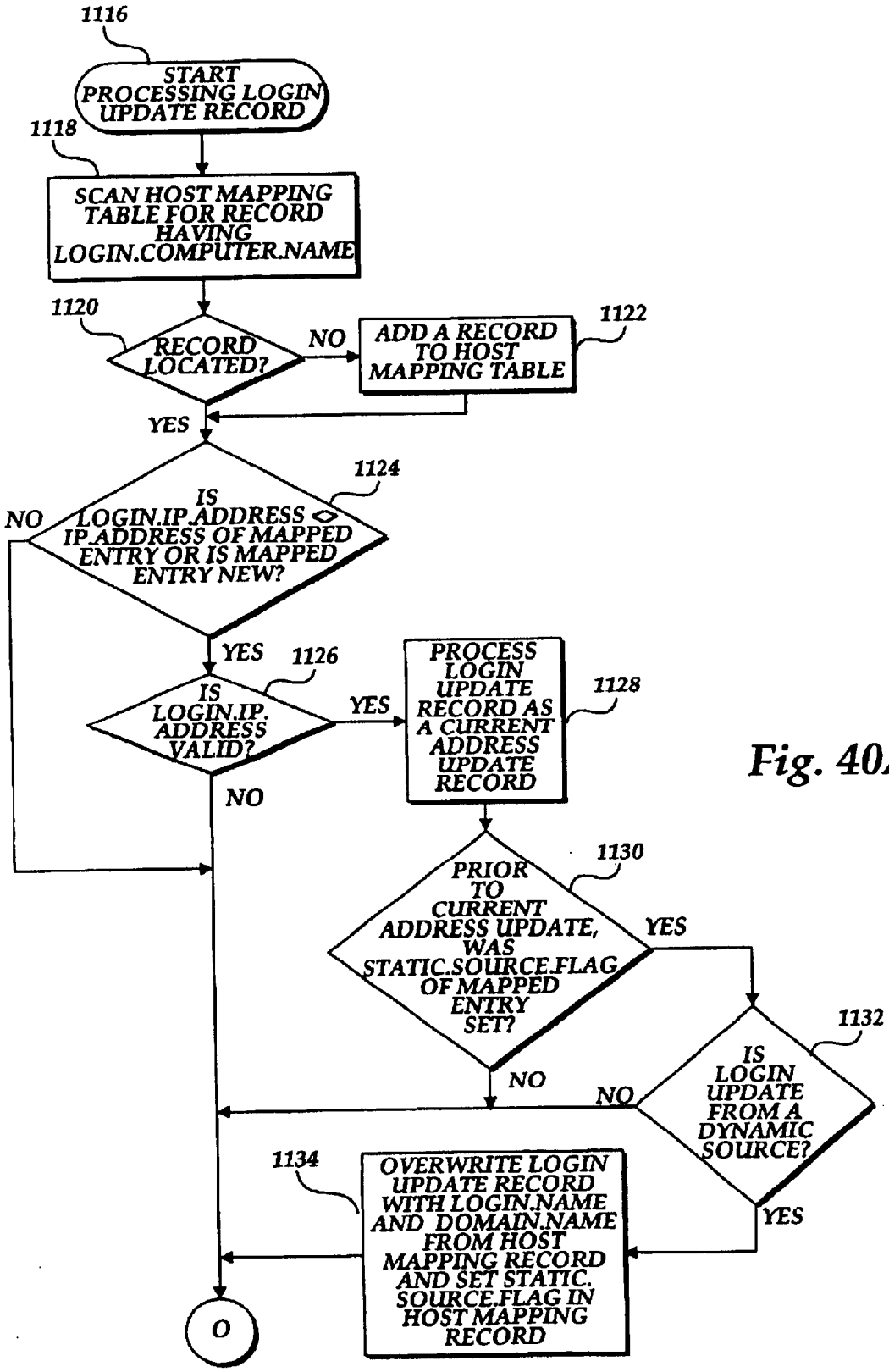
FIGS. 40A and 40B are a flow chart illustrating the logic used by the naming service manager to process mapping information indicating that a network user has logged into a computer connected to the LAN shown in FIG. 2.

Returning to decision block 876, if the transaction record 183 is not logout update record, the naming service manager 74 determines if the transaction record 183 is a login update record in a decision block 880. If so, the naming service manager 74 processes the login update record in a block 882. The logic implemented by the naming service manager 74 to process the login update record is shown in more detail in FIGS. 40A and 40B. The login update record contains the login name of the user logging in and the domain name, computer name and IP address of the computer to which the user is logging in. The logic begins in FIG. 40A in a block 1116 and proceeds to a block 1118 in which the naming service manager 74 scans the host mapping table 178 for a record having the computer name stored in the login update record. In a decision block 1120, the logic determines if the naming service manager 74 has found such a host mapping record in the host mapping table 178. If not, the naming service manager 74 adds a record to the host mapping table 178 containing the login computer name, and an invalid IP address in a block 1122. In addition, all the flags in the added record are cleared.

If a record having the login computer name is found in the host mapping table 178 or if such a record has been added to the host mapping table 178, the logic proceeds to a decision block 1124 where the naming service manager 74 determines if the IP address in the login update record is different than the IP address identified in the host mapping record or if the IP address identified in the login record is a new IP address that cannot be found in the host mapping table 178. If either of these conditions is met, then the computer identified by the computer name stored in the host mapping record and the login update record has been assigned a new IP address and the host mapping table 178 must be updated accordingly. However, in order to avoid unnecessary processing, the naming service manager 74 determines if the login IP address is valid in a decision block 1126 before further processing the new IP address. Hence, if the login IP address is new or changed and is valid, the login updated record is processed as a current address update record in a block 1128. As a result of the logic illustrated in FIG. 38, the host mapping record having the computer name specified in the login update record is updated to the login IP address.

After the login update record is processed as a current address update record, the logic proceeds to a decision block 1130. In decision block 1130, the naming service manager 74 determines if, prior to the current address update, the static source flag of the host mapping record was set, i.e., if the mapping information found in the host mapping record was originally provided by a static source of mapping information, i.e., the filter executive 76. If so, the naming service manager 74 will only allow the host mapping record to be completely overwritten with new login information if the login update record was provided by the filter executive 76. In this regard, the naming service manager 74 determines in a decision block 1132 if the login update record came from a dynamic source of mapping information, e.g., domain controller agent 75, rather than the filter executive 76. If so, the naming service manager 74 overwrites the login name identified in the login update record with the login name found in the host mapping record that was originally provided by the filter executive 76.

Figure 40B:
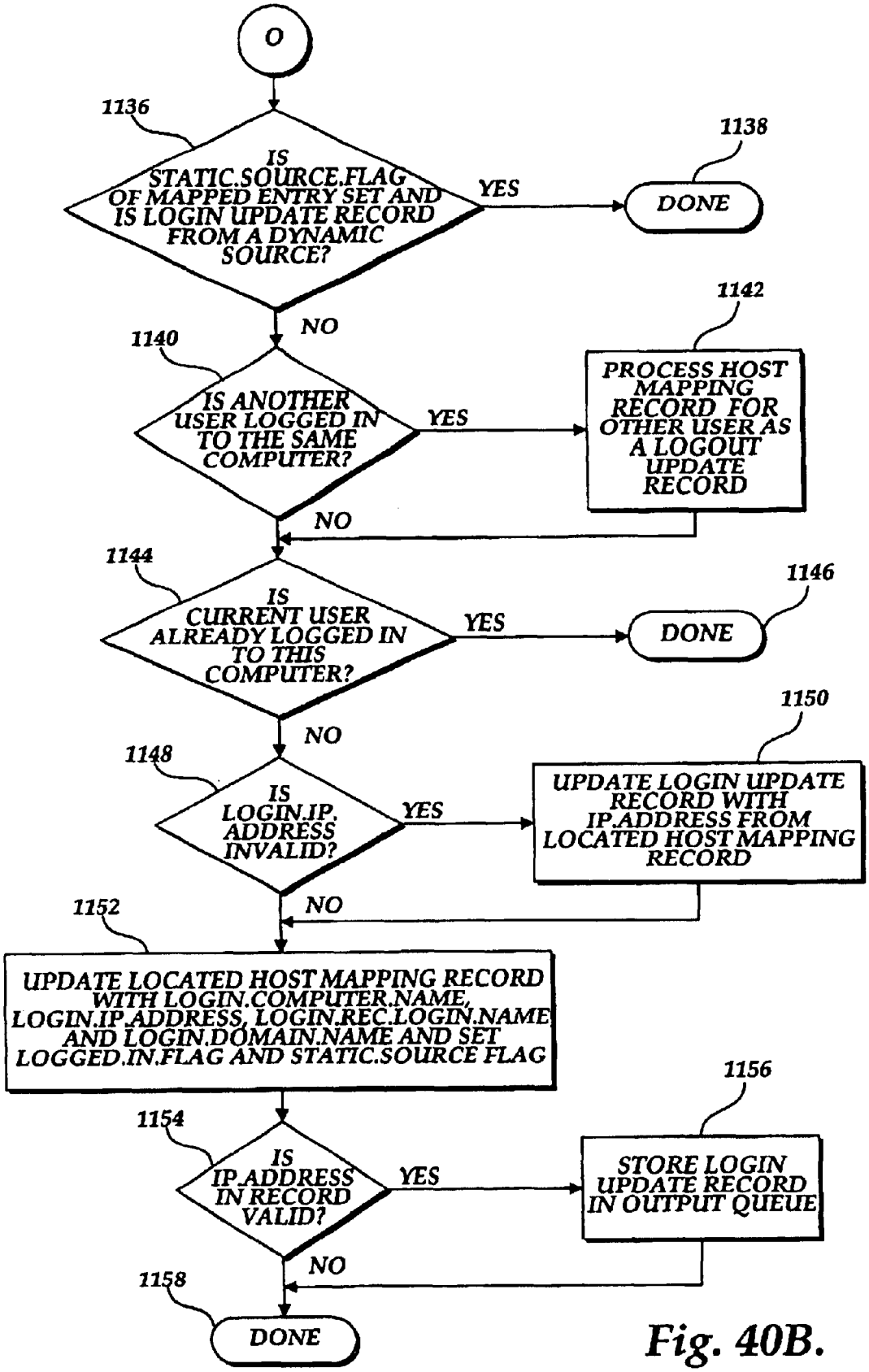

Returning to decision block 1124, if the IP address in the login update record is the same as that in the host mapping record, or if it is invalid, there is no need to process the login update record as a current address update record and the logic proceeds directly to a decision block 1136 in FIG. 40B. In addition, referring to decision block 1130, if the mapping information in the host mapping record was not originally provided by a static source or if the login update record was not received from a dynamic source, there is no need to overwrite the login name specified in the login update record and the login also proceeds directly to decision block 1136.

In decision block 1136, the logic determines if the current static source flag in the host mapping record is set (i.e., if the mapping information in the record was provided by the filter executive 76), and if the login update record was received from a dynamic source such as domain controller agent 75. If so, the mapping information in the host mapping record cannot be overwritten with the mapping information in the login updated record, so the logic ends in a block 1138. Otherwise, the logic proceeds to a decision block 1140 in which it determines if another user is logged in to the same computer. More specifically, the naming service manager 74 determines if the host mapping record contains a login name other than the login name specified by the logout update record. If so, the other host mapping record is processed as a user logout update in a block 1142 so that the host mapping table 178 reflects that the other user has logged out.

If the result of decision block 1140 is negative or if the host mapping record has been processed as a logout update record, the logic proceeds to a decision block 1144. In decision block 1144, the naming service manager determines if the user identified in the login update record has already logged in to the computer identified in the login update record. In other words, the naming service manager 74 determines if the login flag in the host mapping record is set. If so, the logic merely ends in a block 1146.

Returning to decision block 1144, if the user identified in the login update record is not already logged in to the same computer, the logic determines in a block 1148 if the IP address provided in the login update record is invalid. If so, the login update record is updated in a block 1150 with the IP address in the host mapping record.

Returning to decision block 1148, if the IP address provided in the login update record is valid, the logic proceeds to a block 1152. In a block 1152, the naming service manager 74 updates the host mapping record with the computer name, IP address, login name and domain name specified in the login update record. In addition, the logged in flag is set and the static source flag set on cleared to reflect the source of the login update record, i.e., a dynamic source such as the domain controller 75 or a static source such as filter executive 76. Next, in a decision block 1154, the naming service manager 74 determines if the IP address in the host mapping record updated in block 1152 is valid, if not, the naming service manager 74 defers generating and outputting a login update record to the naming service applications until a valid IP address is assigned during a current address update as described above. Consequently, the logic ends in a block 1158. However, if the IP address in the host mapping record is valid, the naming service manager 74 finally generates a login update record containing the computer name, IP address, domain name and login name from the host mapping record in a block 1156. The logic then ends in block 1158.

While the preferred embodiment of the invention has been illustrated and described, it will be appreciated that various changes can be made therein without departing from the spirit and scope of the invention. For example, if the LAN 44 is not connected to the Internet (40) the network management program 80 can be used to manage only intranetwork activity, i.e., to manage the communication of data packets between the computers connected only to the LAN 44.

The embodiments of the invention in which an exclusive property or privilege is claimed are defined as follows:

1. A computer-readable medium having computer-executable components for managing communication of data packets between an intranetwork and an internetwork, the intranetwork connecting a plurality of computers via a communications medium, the internetwork connecting a plurality of intranetworks via communications media, the computer-readable medium having computer-executable components comprising:

(a) a graphical user interface for allowing an administrator of a computer connected to the intranetwork to input:

(i) user information identifying each user of a computer connected to the intranetwork;

(ii) mapping information mapping each identified user to at least one computer connected to intranetwork; and (ii) user policies for each identified user governing the communication of data packets between the identified user and the internetwork;

(b) a database for storing the user information, mapping information and user policies for each identified user provided by the administrator using the graphical user interface;

(c) a filter executive for optimizing the user policies for each identified user stored in the database into a set of rules for each identified user; and (d) a filter engine for filtering data packets communicated between the intranetwork and the internetwork according to the set of rules for each identified user optimized by the filter executive and the mapping information for each identified user.

2. The computer-readable medium of claim 1, wherein the mapping information for each identified user includes:

(a) a computer-to-user mapping which identifies a login name of the identified user and a computer name of the computer to which the identified user is assigned; and (b) a computer-to-address mapping which identifies the computer name of the computer to which the identified user is assigned and the internetwork protocol address of the computer.

3. The computer-readable medium of claim 2, wherein the filter engine filters data packets by:

for each data packet communicated between the intranetwork and the internetwork, (a) scanning the mapping information for each identified user for an internetwork protocol address of a mapped computer assigned to an identified user that matches an address of a computer from which the data packet was sent;

(b) comparing the data packet to the set of rules for the identified user assigned to the mapped computer; and (c) if the data packet matches at least one rule of the set of rules, returning a filter result for the at least one rule, wherein the filter result indicates whether the filter engine is to deny delivery of the data packet.

4. The computer-readable medium of claim 3, wherein the filter engine further filters the data packet by returning a default result for the at least one rule, if the data packet does not match as least one rule of the set of rules, wherein the default result indicates whether the filter engine is to deny delivery of the data packet.

5. The computer-readable medium of claim 4, wherein the filter engine also returns a default result if an internetwork protocol address of a mapped computer is not found that matches the address of the computer from which the data packet was sent.

6. The computer-readable medium of claim 5, wherein the filter result and the default result further indicate whether the filter engine is to log the data packet.

7. The computer-readable medium of claim 5, wherein the filter result and the default result further indicate whether the identified user assigned to the mapped computer whose internetwork protocol address matches the address of the computer from which the data packet was sent, is to be notified that the data packet has matched at least one rule of the set of rules.

8. The computer-readable medium of claim 2, wherein each user policy input by the administrator for each identified user comprises at least one the following:

(a) a file type policy indicating whether a file having a particular file extension may be communicated between the identified user and the internetwork;

(b) an application protocol policy indicating whether a particular application protocol may be used to transfer data between the identified user and the internetwork;

(c) a site policy indicating whether the identified user may communicate with a particular computer site located in the internetwork; and (d) a quota policy indicating how much data may be communicated between the identified user and the internetwork during a given time interval.

9. The computer-readable medium of claim 8, wherein the database periodically calculates a quota violation for each identified user having a quota policy, wherein the quota violation indicates whether an excessive amount of data has been communicated between the identified user and the internetwork, and wherein the quota violation for each identified user having a quota policy is calculated by:

(a) summing a total number of data bytes in each data packet communicated between the identified user and the internetwork during a given time interval; and (b) comparing the summation of data bytes to the quota policy for the identified user.

10. The computer-readable medium of claim 2, wherein the graphical user interface further allows the administrator to organize the identified users into a hierarchy of groups having a root group containing all identified users and a plurality of subgroups, each subgroup containing at least one identified user.

11. The computer-readable medium of claim 10, wherein the graphical user interface further allows the administrator to input at least one user policy as a group policy, wherein the group policy is applied against a group of the hierarchy such that each identified user contained in the group inherits the group policy.

12. The computer-readable medium of claim 11, wherein if the group policy inherited by the identified user conflicts with a user policy for the identified user, the database resolves the conflict such that only one of the user policy and the group policy is applied against the user.

13. The computer-readable medium of claim 12, wherein the database prepares the user and group policies inputted by the administrator for optimization by the filter executive by:

(a) collecting all of the inputted user policies for each identified user;

(b) collecting all of the inputted group policies inherited by each identified user; and (c) storing each group policy and each user policy for each identified user as an individual user policy to be applied directly against the identified user.

14. The computer-readable medium of claim 13, wherein the filter executive optimizes the individual user policies into the set of rules for each identified user by defining each rule of the set of rules from at least one corresponding individual user policy stored in the database, wherein each rule dictates how the filter engine is to filter a data packet which matches the rule.

15. The computer-readable medium of claim 14, wherein each rule in the set of rules for each identified user comprises at least one of the following:

(a) a file extension rule, which dictates how the filter engine should filter a matching data packet communicated between the identified user and the internetwork containing information from a file having a particular file extension;

(b) an application protocol rule, which dictates how the filter engine should filter a matching data packet communicated between the identified user and the internetwork using a particular application protocol; and (c) a combined site and protocol rule, which dictates how the filter engine should filter a matching data packet communicated between the identified user and a particular internetwork site using a particular application protocol.

16. The computer-readable medium of claim 2, wherein the graphical user interface further allows the administrator to input system policies for all identified users governing the communication of data packets between all identified users and the internetwork.

17. The computer-readable medium of claim 16, wherein the system policies include system default policies, and wherein the system default policies include:

(a) an enable logging policy indicating whether the filter engine is to log a data packet which the filter engine has allowed to be delivered between the intranetwork and the internetwork;

(b) a simulate rule enforcement policy indicating whether the filter engine is to simulate filtering of a data packet in accordance with the set of user rules for each identified user; and (c) a violation message policy indicating whether the filter engine is to send a message to the identified user indicating whether how the filter engine has filtered a data packet.

18. The computer-readable medium of claim 17, wherein the filter executive optimizes the system default policies into a set of system default rules for all identified users by:

(a) defining a log-on-off rule from the enable logging policy which dictates whether the filter engine is to log a data packet which the filter engine has allowed to be delivered between the intranetwork and the internetwork;

(b) defining a log-no-block rule from the simulate rule enforcement policy which dictates whether the filter engine is to simulate filtering of a data packet in accordance with the set of user rules for each identified user by logging and delivering the data packet regardless of how the filter engine filtered the data packet; and (c) defining a notify-no-notify rule from the violation message policy which dictates whether the filter engine is to send a message to the identified user indicating how the filter engine filtered a data packet.

19. The computer-readable medium of claim 18, wherein the system polices further include global network protocol policies, wherein each global network protocol policy indicates whether a particular network protocol may be used to transfer data between all of the identified users of the plurality of computers connected to the intranetwork and the internetwork.

20. The computer-readable medium of claim 19, wherein the filter executive optimizes the global network protocol policies into a set of inbound and outbound global network protocol rules for all identified users by:

(a) defining an inbound global network protocol rule from each global network protocol policy which dictates how the filter engine should filter a data packet communicated from the internetwork to an identified user using a particular network protocol; and (b) defining an outbound global network protocol from each global network protocol policy which dictates how the filter engine should filter a data packet communicated from an identified user to the internetwork using a particular network protocol.

21. The computer-readable medium of claim 20, wherein the system policies further include time schedule policies, wherein each time schedule policy indicates a time schedule during which data may be communicated between all of the identified users and the internetwork using a particular application protocol.

22. The computer-readable medium of claim 21, wherein the filter executive optimizes the time schedule policies into a set of timer rules for all identified users by defining a timer rule from each time schedule policy which dictates how the filter engine should filter a data packet communicated between the identified user and the internetwork during a particular time interval using a particular application protocol.

23. The computer-readable medium of claim 2 having a further computer-executable component comprising a naming service manager for updating the mapping information for each identified user inputted by the administrator using the graphical user interface.

24. The computer-readable medium of claim 23, wherein the naming service manager updates the mapping information by:

(a) collecting updated computer-to-user mappings as the identified user logs in to and logs out of computers connected to the intranetwork; and (b) replacing outdated computer-to-user mappings used by the filter executive with the updated computer-to-user mappings collected from the at least one naming service agent.

25. The computer-readable medium of claim 23, wherein the naming service manager updates the mapping information for each identified user by:

(a) collecting updated computer-to-address mappings as the address of the at least one computer to which the identified user is assigned changes; and (b) replacing outdated computer-to-address mappings used by the filter executive with the updated computer-to-address mappings collected from the at least one naming service agent.

26. The computer-readable medium of claim 1, wherein a plurality of administrators are allowed to input user information, mapping information and user policies using the graphical user interface, and wherein each administrator is assigned an administration level which determines what type of user information, mapping information and user policies the administrator is allowed to input using the graphical user interface.

27. An apparatus for managing communication of data packets between an intranetwork and an internetwork, the intranetwork connecting a plurality of computers via a communications medium, the internetwork connecting a plurality of intranetworks via communications media, the apparatus comprising:

(a) a storage medium for storing:

(i) a database which includes user information, mapping information and policies for each user of a computer connected to the intranetwork, wherein the user information identifies each user, wherein the mapping information maps each user to a computer connected to the intranetwork, and wherein the policies govern the communication of data packets between each user and the internetwork;

(ii) a filter executive which optimizes the user policies for each user stored in the database into a set of rules for each user; and (iii) a filter engine which filters data packets communicated between the intranetwork and the internetwork according to the set of rules for each user optimized by the filter executive and the mapping information for each user; and (b) a processing unit electronically coupled to the storage medium for executing program instructions which maintain the database, implement the filter executive and implement the filter engine.

28. The apparatus of claim 27, wherein the mapping information mapping each user to a computer connected to the intranetwork includes:

(a) a computer-to-user mapping which identifies a login name of the user and a computer name of the computer to which the user is assigned; and (b) a computer-to-address mapping which identifies the computer name of the computer to which the user is assigned and the internetwork protocol address of the computer.

29. The apparatus of claim 28, wherein the processing unit executes program instructions which cause the filter engine to filter data packets by:

for each data packet communicated between the intranetwork and the internetwork, (a) scanning the mapping information for each user for an internetwork protocol address of a mapped computer assigned to an user that matches an address of a computer from which the data packet was sent;

(b) comparing the data packet to the set of rules for the user assigned to the mapped computer; and (c) if the data packet matches at least one rule of the set of rules, returning a filter result for the at least one rule, wherein the filter result indicates whether the filter engine is to deny delivery of the data packet.

30. The apparatus of claim 29, wherein the processing unit executes program instructions which cause the filter engine to further filter the data packet by returning a default result for the at least one rule, if the data packet does not match as least one rule of the set of rules, wherein the default result indicates whether the filter engine is to deny delivery of the data packet.

31. The apparatus of claim 30, wherein the filter engine also returns a default result if an internetwork protocol address of a mapped computer is not found that matches the address of the computer from which the data packet was sent.

32. The apparatus of claim 31, wherein the filter result and the default result further indicate whether the filter engine is to log the data packet.

33. The apparatus of claim 31, wherein the filter result and the default result further indicate whether the user assigned to the mapped computer whose internetwork protocol address matches the address of the computer from which the data packet was sent, is to be notified that the data packet has matched at least one rule of the set of rules.

34. The apparatus of claim 28, further comprising an input device for allowing an administrator to input the user information, the mapping information and the policies for each user.

35. The apparatus of claim 34, wherein the input device further allows the administrator to organize the users into a hierarchy of groups having a root group containing all users and a plurality of subgroups, each subgroup containing at least one user.

36. The apparatus of claim 35, wherein the input device further allows the administrator to input at least one user policy against each user, wherein the user policy governs the communication of data packets between the user and the internetwork.

37. The apparatus of claim 36, wherein the input device further allows the administrator to input at least one a group policy, wherein the group policy is applied against a group of the hierarchy such that each user contained in the group inherits the group policy, and wherein the group policy governs the communication of data packets between each user contained in the group and the internetwork.

38. The apparatus of claim 37, wherein if the group policy inherited by the user conflicts with a user policy for the user, the database resolves the conflict such that only one of the user policy and the group policy is applied against the user.

39. The apparatus of claim 37, wherein the processing unit executes program instructions which cause the filter executive to optimize the user policies and the group policies into the set of rules for each user by defining each rule of the set of rules from at least one corresponding individual user policy stored in the database, wherein each rule dictates how the filter engine is to filter a data packet communicated between the user and the internetwork which matches the rule.

40. The apparatus of claim 39, wherein each user policy and each group policy from which each user rule is defined comprise at least one of the following:

(a) a file type policy indicating whether a file having a particular file extension may be communicated between the user and the internetwork;

(b) an application protocol policy indicating whether information transferred using a particular application protocol may be communicated between the user and the internetwork;

(c) a site policy indicating whether the information may be communicated between the user and a particular computer site located in the internetwork; and (d) a quota policy indicating how much information may be communicated between the user and the internetwork during a given time interval.

41. The apparatus of claim 40, wherein the processing unit executes program instructions which cause the filter executive to establish a set of user rules for each user comprises:

(a) defining a file extension rule from each file type policy, wherein the file extension rule dictates whether a data packet containing information from a file having a particular file extension may be communicated between the user and the internetwork;

(b) defining an application protocol rule from each application protocol policy, wherein the application protocol rule dictates whether a data packet communicated using a particular application protocol may be communicated between the user and the internetwork; and (c) a combined site and protocol rule from each site policy and application protocol policy, wherein the combined site and protocol rule dictates whether a data packet may be communicated between the identified user and a particular computer site located in the internetwork.

42. The apparatus of claim 41, wherein the input device further allows the administrator to input a set of system default policies applied against all users contained in the root group of the system hierarchy, wherein each system default policy indicates whether certain information may be communicated between any of the users contained in the root group and the internetwork.

43. The apparatus of claim 42, wherein the processing unit executes program instructions which cause the filter executive to establish a set of system default rules for all users contained in the root group of the system hierarchy from the set of system default policies, wherein the set of system default rules dictate whether a data packet containing said information may be communicated between any of the users contained in the root group and the internetwork.

44. The apparatus of claim 43, wherein the input device further allows the administrator to input a set of global network policies applied against all users contained in the root group of the system hierarchy, wherein each global network policy indicates whether certain information may be communicated between any of the users contained in the root group and the internetwork using a particular network protocol.

45. The apparatus of claim 44, wherein the processing unit executes program instructions which cause the filter executive to establish a set of global network protocol rules for all users contained in the root group of the system hierarchy from the set of global network policies, wherein the set of global network rules dictate whether a data packet containing said information may be communicated between any of the users contained in the root group and the internetwork using the particular network protocol.

46. The apparatus of claim 45, wherein the input device further allows the administrator to input a set of time schedule policies applied against all users contained in the root group of the system hierarchy, wherein each time schedule policy indicates a time schedule during which certain information may be communicated between any of the users contained in the root group and the internetwork using a particular application protocol.

47. The apparatus of claim 46, wherein the processing unit executes program instructions which cause the filter executive to establish a set of timer rules for all users contained in the root group of the system hierarchy from the set of time schedule policies, wherein the set of timer rules dictate whether a data packet containing said information may be communicated between any of the users contained in the root group and the internetwork during the time schedule using the particular application protocol.

48. The apparatus of claim 28, wherein the database further stores a naming service manager for updating the mapping information for each user inputted by the administrator using the input device, and wherein the processing unit executes program instructions to implement the naming service manager.

49. The apparatus of claim 48, wherein the processing unit executes program instructions causing the naming service manager to update the mapping information by:

(a) collecting updated computer-to-user mappings; and (b) replacing outdated computer-to-user mappings used by the filter executive with the updated computer-to-user mappings collected from the at least one naming service agent.

50. The apparatus of claim 49, wherein the processing unit executes program instructions causing the naming service manager to update the mapping information by:

(a) collecting updated computer-to-address mappings; and (b) replacing outdated computer-to-address mappings used by the filter executive with the updated computer-to-address mappings collected from the at least one naming service agent.

51. A method for managing communication of information between users of a plurality of computers connected to an intranetwork, and an internetwork, wherein the internetwork connects a plurality of intranetworks, the method comprising:

(a) *establishing one or more policies for each user of the plurality of computers;*

(*b*) *optimizing the one or more policies so as to establish a set of user rules for each user, the user rules governing the communication of information between the user and the internetwork, wherein at least one of the user rules comprises a rule based on a usage quota for a user;*

(*c*) identifying each user of the plurality of computers connected to the intranetwork;

[(b)] (*d*) mapping each user to at least one computer connected to the intranetwork;

[(c) establishing a set of user rules for each user governing the communication of information between the user and the internetwork;] and

[(d)] (*e*) filtering the information communicated between the users of the plurality of computers connected to the intranetwork and the internetwork according to the set of user rules for each user.

52. The method of claim 51, wherein each user is mapped to at least one computer by:

(a) identifying the at least one computer by host name and address; and (b) assigning the identified at least one computer to the user.

53. The method of claim 52, further adding each user to a system hierarchy of groups including a root group and a plurality of subgroups, wherein the root group contains each user and wherein each subgroup contains at least one user.

54. The method of claim 53, further comprising applying at least one user policy against each user, wherein the user policy indicates whether certain information may be communicated between the user and the internetwork.

55. The method of claim 54, further comprising applying at least one group policy against a group of the system hierarchy such that each user contained in the group of the system hierarchy inherits the group policy, wherein the group policy indicates whether certain information may be communicated between the user and the internetwork.

56. The method of claim 55, wherein establishing a set of user rules for each user comprises:

(a) defining a user rule from each user policy applied against the user, wherein the user rule dictates whether a data packet of information may be communicated between the user and the internetwork; and (b) defining a user rule from each group policy inherited by the user wherein the user rule dictates whether a data packet of information may be communicated between the user and the internetwork.

57. The method of claim 56, wherein the user policy from which the user rule is defined comprises at least one of the following:

(a) a file type policy indicating whether a file having a particular file extension may be communicated between the user and the internetwork;

(b) an application protocol policy indicating whether information transferred using a particular application protocol may be communicated between the user and the internetwork;

(c) a site policy indicating whether the information may be communicated between the user and a particular computer site located in the internetwork; and (d) a quota policy indicating how much information may be communicated between the user and the internetwork during a given time interval.

58. The method of claim 57, wherein establishing a set of user rules for each user comprises:

(a) defining a file extension rule from each file type policy, wherein the file extension rule dictates whether a data packet containing information from a file having a particular file extension may be communicated between the user and the internetwork;

(b) defining an application protocol rule from each application protocol policy, wherein the application protocol rule dictates whether a data packet communicated using a particular application protocol may be communicated between the user and the internetwork; and (c) a combined site and protocol rule from each site policy and application protocol policy, wherein the combined site and protocol rule dictates whether a data packet may be communicated between the identified user and a particular computer site located in the internetwork.

59. The method of claim 56, further comprising applying a set of system default policies applied against all users contained in the root group of the system hierarchy, wherein each system default policy indicates whether certain information may be communicated between any of the users contained in the root group and the internetwork.

60. The method of claim 59, further comprising establishing a set of system default rules for all users contained in the root group of the system hierarchy from the set of system default policies, wherein the set of system default rules dictate whether a data packet containing said information may be communicated between any of the users contained in the root group and the internetwork.

[61. The method of claim 60, further comprising applying a set of global network policies applied against all users contained in the root group of the system hierarchy, wherein each global network policy indicates whether certain information may be communicated between any of the users contained in the root group and the internetwork using a particular network protocol.]

[62. The method of claim 61, further comprising establishing a set of inbound and outbound global network protocol rules for all users contained in the root group of the system hierarchy from the set of global network policies, wherein the set of inbound global network rules dictate whether a data packet of information may be communicated from the internetwork to any of the users contained in the root group using the a particular network protocol; and wherein the outbound global network rules dictate whether a data packet of information may be communicated from any of the users contained in the root group to the internetwork using a particular network protocol.]

[63. The method of claim 62, further comprising applying a set of time schedule policies applied against all users contained in the root group of the system hierarchy, wherein each time schedule policy indicates a time schedule during which certain information may be communicated between any of the users contained in the root group and the internetwork using a particular application protocol.]

[64. The method of claim 63, further comprising establishing a set of timer rules for all users contained in the root group of the system hierarchy from the set of time schedule policies, wherein the set of timer rules comprises a set of inbound global network rules and a set of outbound global network rules, and wherein the timer rules dictate whether a data packet containing said information may be communicated between any of the users contained in the root group and the internetwork during the time schedule using the particular application protocol.]

[65. The method of claim 64, wherein filtering the information communicated between the users of the plurality of computers connected to the intranetwork and the internetwork comprises:

(a) intercepting a data packet containing information as the data packet is communicated between a user and the internetwork;

(b) if a set of inbound global network protocol rules has been established for all users, comparing the data packet to the set of inbound global network protocol rules;

(c) if the data packet matches at least one inbound global network protocol rule, returning a filter result indicating whether to deny delivery of the data packet; and (d) if the data packet does not match at least one inbound global network protocol rule, returning a default result indicating whether to deny delivery of the data packet.]

[66. The method of claim 65, wherein filtering the information communicated between the users of the plurality of computers connected to the intranetwork and the internetwork further comprises:

(a) if a set of inbound global network protocol rules has not been established for all users, determining whether a set of outbound global network protocol rules has been established for all users;

(b) if a set of outbound global network protocol rules has been established for all users, comparing the data packet to the set of outbound global network protocol rules;

(c) if the data packet matches at least one outbound global network protocol rule, returning a filter result indicating whether to deny delivery of the data packet; and (d) if the data packet does not match at least one outbound global network protocol rule, returning a default result indicating whether to deny delivery of the data packet.]

[67. The method of claim 66, wherein filtering the information communicated between the users of the plurality of computers connected to the intranetwork and the internetwork further comprises:

(a) if a set of outbound global network protocol rules has not been established for all users, comparing the data packet to the set of user rules;

(b) if the data packet matches at least one user rule in the set of user rules, returning a filter result indicating whether to deny delivery of the data packet; and (c) if the data packet does not match at least one user rule in the set of user rules, returning a default result indicating whether to deny delivery of the data packet.]

[68. The method of claim 67, wherein comparing the data packet to the set of user rules comprises:

(a) scanning the mapping information for each user for an internetwork protocol address of a mapped computer assigned to a user which matches an address of a computer from which the data packet was sent; and (b) comparing the data packet to the set of user rules for the user assigned to the mapped computer.]

[69. The method of claim 68, wherein filtering the information further comprises, returning a default result if the address of the computer which sent the data packet does not match and internetwork protocol address of a mapped computer.]

[70. The method of claim 51, further comprising updating the mapping information for each user as the user logs out of the at least one computer to which the user is assigned.]

[71. The method of claim 70, further comprising updating the mapping information for each user as the user logs in to another computer.]

[72. The method of claim 71, further comprising updating the mapping information for each user as the address of the at least one computer to which the user is assigned changes.]

*73. The method of claim 51, wherein the information comprises an electronic mail.*

*74. A method of managing communication of information between users of a plurality of computers connected to an intranetwork, and an internetwork, wherein the internetwork connects a plurality of intranetworks, the method comprising:*

*establishing one or more policies for each user of the plurality of computers;*

*optimizing the one or more policies so as to establish a set of user rules for each user, the user rules governing the communication of information between the user and the internetwork;*

*identifying each user of the plurality of computers connected to the intranetwork;*

*mapping each user to at least one computer connected to the intranetwork, thereby defining mapping information for each user;*

*querying a NETBIOS server for an IP address of a computer operated by each user; and*

*filtering information communicated between the users of the plurality of computers connected to the intranetwork and the internetwork according to the set of user rules for each user and the mapping information for each user.*

*75. The method of claim 74, further comprising mapping each user to said IP address of each user.*

*76. A system for managing communication of information between users of a plurality of computers connected to an intranetwork, and an internetwork, wherein the internetwork connects a plurality of intranetworks, the system comprising:*

*means for establishing one or more policies for each user of the plurality of computers;*

*means for optimizing the one or more policies so as to establish a set of user rules for each user, the user rules governing the communication of information between the user and the internetwork, wherein at least one of the user rules comprises a rule based on a usage quota for a user;*

*means for identifying each user of the plurality of computers connected to the intranetwork;*

*means for mapping each user to at least one computer connected to the intranetwork; and*

*means for filtering information communicated between the users of the plurality of computers connected to the intranetwork and the internetwork according to the set of user rules for each user.*

*77. A method of managing communication of information between a user of a computer and an intranetwork, wherein the intranetwork is coupled to an internetwork that connects a plurality of intranetworks, the method comprising:*

*establishing one or more policies for the user;*

*optimizing the one or more policies so as to establish a set of user rules for the user, the user rules governing the communication of information between the user and the internetwork;*

*identifying the user of the computer connected to the intranetwork;*

*mapping the user to the computer connected to the intranetwork as the user logs onto the intranetwork, thereby defining mapping information for each user; and*

*filtering the information communicated between the user and the internetwork according to the set of user rules for the user and the mapping information for each user.*

*78. The method of claim 77, wherein the set of user rules comprises a file type policy indicating whether a file having a particular file extension may be communicated between the user and the internetwork.*

*79. The method of claim 77, wherein the mapping comprises determining an IP address of the user as the user logs onto the intranetwork.*

*80. The method of claim 77, wherein the filtering comprises:*

*intercepting a data packet containing information as the data packet is communicated between the user and the internetwork;*

*determining that transmission of the data packet to the user should be denied if the information matches at least one of the rules in said set of user rules for the user.*

*81. The method of claim 77, further comprising storing in a database an identifier associated with each of said plurality of users, an identifier of the at least one computer mapped to each of said plurality of users, and the set of user rules for each user.*

*82. The method of claim 77, further comprising updating the mapping information for each user as the address of the at least one computer to which the user is assigned changes.*

*83. An apparatus for managing communication of data packets between an intranetwork and an internetwork, the intranetwork connecting a plurality of computers via a communications medium, the internetwork connecting a plurality of intranetworks via communications media, the apparatus comprising:*

*(a) a storage medium for storing:*

*a database which includes user information, mapping information and policies for each user of a computer connected to the intranetwork, wherein the user information identifies each user, wherein the mapping information maps each user to an IP address of a computer connected to the intranetwork, and wherein the policies govern the communication of data packets between each user and the internetwork;*

*a filter executive which optimizes the user policies for each user stored in the database into a set of rules for each user; and*

*a filter engine which filters data packets communicated between the intranetwork and the internetwork*

*according to the set of rules for each user optimized by the filter executive and the mapping information for each user; and*

(*b*) *a processing unit electronically coupled to the storage medium for executing program instructions which maintain the database, implement the filter executive and implement the filter engine.*

*84. A method of managing communication of information between users of a plurality of computers connected to an intranetwork, and an internetwork, wherein the internetwork connects a plurality of intranetworks, the method comprising:*

*identifying each user of the plurality of computers connected to the intranetwork;*

*mapping each user to at least one computer connected to the intranetwork;*

*establishing a set of user rules for each user governing the communication of information between the user and the internetwork, wherein at least one set of user rules comprises a usage quota rule; and*

*filtering the information communicated between the users of the plurality of computers connected to the intranetwork and the internetwork according to the set of user rules for each user.*

*85. A method of managing communication of information between users of a plurality of computers connected to an intranetwork, and an internetwork, wherein the internetwork connects a plurality of intranetworks, the method comprising:*

(*a*) *identifying each user of the plurality of computers connected to the intranetwork;*

(*b*) *mapping each user to at least one computer connected to the intranetwork;*

(*c*) *establishing a set of user rules for each user governing the communication of information between the user and the internetwork, wherein at least one set of user rules comprises a rule based on a usage quota for a user;*

(*d*) *storing in a database an identifier associated with each user, the at least one computer mapped to each identified user, and the set of user rules for each user; and*

(*e*) *filtering the information communicated between the users of the plurality of computers connected to the intranetwork and the internetwork according to the set of user rules for each user.*

*86. The method of claim 85, wherein the usage quota is based on a time period during which the user may access the internetwork.*

*87. The method of claim 85, wherein the usage quota is based on an amount of data that may be transferred to the user.*

*88. A method of managing communication of information between users of a plurality of computers connected to an intranetwork, and an internetwork, wherein the internetwork connects a plurality of intranetworks, the method comprising:*

(*a*) *identifying each user of the plurality of computers connected to the intranetwork;*

(*b*) *mapping each user to at least one computer connected to the intranetwork;*

(*c*) *adding each user to a system hierarchy of groups including a root group and a plurality of subgroups, wherein the root group contains each user and wherein each subgroup contains at least one user;*

(*d*) *establishing a set of user rules for each user governing the communication of information between the user and the internetwork, wherein at least one of the sets of user rules comprises a rule based on a usage quota for a user;*

(*e*) *filtering the information communicated between the users of the plurality of computers connected to the intranetwork and the internetwork according to the set of user rules for each user, wherein the filtering comprises applying a set of global network policies against all users contained in the root group of the system hierarchy, wherein each global network policy indicates whether certain information may be communicated between any of the users contained in the root group and the internetwork using a particular network protocol.*

*89. The method of claim 88, further comprising applying at least one user policy against each user, wherein the user policy indicates whether certain information may be communicated between the user and the internetwork.*

*90. The method of claim 88, wherein the mapping comprises mapping each user to said IP address of each user.*

*91. The method of claim 88, further comprising applying at least one rule against one of the plurality of subgroups such that each user in the one of the plurality of subgroups inherits the rule.*

* * * * *